# (12) United States Patent
Nonaka et al.

(10) Patent No.: US 7,757,101 B2
(45) Date of Patent: Jul. 13, 2010

(54) DATA PROCESSING APPARATUS, DATA PROCESSING SYSTEM, AND DATA PROCESSING METHOD THEREFOR

(75) Inventors: Akira Nonaka, Kanagawa (JP); Tadashi Ezaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 09/741,668

(22) Filed: Dec. 19, 2000

(65) Prior Publication Data

US 2003/0046238 A1 Mar. 6, 2003

(30) Foreign Application Priority Data

Dec. 20, 1999 (JP) ............................... P11-361225

(51) Int. Cl.
 *H04L 9/32* (2006.01)
 *H04L 9/00* (2006.01)
 *G06F 12/14* (2006.01)
 *G06F 11/30* (2006.01)

(52) U.S. Cl. ..................... 713/194; 713/189; 713/168; 713/176; 713/165; 726/26; 726/27; 705/51; 705/57; 705/59

(58) Field of Classification Search ................. 713/194, 713/189, 165, 168, 176, 200; 380/30, 282; 726/26, 27; 705/51, 57, 59

See application file for complete search history.

(56) References Cited

U.S. PATENT DOCUMENTS

| 4,634,807 | A | * | 1/1987 | Chorley et al. | ............... 705/55 |
|---|---|---|---|---|---|
| 4,731,842 | A | * | 3/1988 | Smith | ........................... 705/71 |
| 4,847,902 | A | * | 7/1989 | Hampson | ..................... 713/190 |
| 5,590,288 | A | * | 12/1996 | Castor et al. | ................. 709/201 |
| 5,629,980 | A | * | 5/1997 | Stefik et al. | .................... 705/54 |
| 5,671,412 | A | * | 9/1997 | Christiano | ............... 707/104.1 |
| 5,768,382 | A | * | 6/1998 | Schneier et al. | ............. 380/251 |
| 5,812,664 | A | * | 9/1998 | Bernobich et al. | .......... 380/278 |
| 5,892,900 | A | | 4/1999 | Ginter et al. | |
| 5,960,086 | A | * | 9/1999 | Atalla | ......................... 380/44 |
| 5,982,891 | A | | 11/1999 | Ginter et al. | |

(Continued)

FOREIGN PATENT DOCUMENTS

JP 05-73509 3/1993

(Continued)

OTHER PUBLICATIONS

Notification of Reasons for Refusal, Japanese Patent Application No. 11-361225 drafted on Jun. 30, 2009, 4 pages.

(Continued)

*Primary Examiner*—Emmanuel L Moise
*Assistant Examiner*—Zachary A Davis
(74) *Attorney, Agent, or Firm*—Finnegan, Henderson, Farabow, Garrett and Dunner, L.L.P.

(57) ABSTRACT

A SAM receives a secure container in which content data encrypted with content key data, the encrypted content key data, and UCP data designating a handling policy of the content data are stored, and determines at least one of the purchase mode and the usage mode of the content data based on the UCP data. The SAM serves as a slave for a host CPU, and is also provided with a common memory shared with the host CPU.

18 Claims, 102 Drawing Sheets

U.S. PATENT DOCUMENTS

| | | | |
|---|---|---|---|
| 6,882,979 B1 * | 4/2005 | Reay et al. | 705/26 |
| 6,898,706 B1 * | 5/2005 | Venkatesan et al. | 713/167 |
| 7,103,574 B1 * | 9/2006 | Peinado et al. | 705/51 |

FOREIGN PATENT DOCUMENTS

| | | |
|---|---|---|
| JP | 10-512074 | 11/1998 |
| JP | 11-283327 | 1/1999 |
| JP | 2001-175605 | 6/2001 |
| WO | WO 01/02968 | 1/2001 |
| WO | WO 01/22242 | 3/2001 |

OTHER PUBLICATIONS

Harumitsu Nakajima, Kazuya Miyazaki, at el., Development of secure digital content distribution system Digitex, Institute of Electronics, Information and Communication Engineers 1998 general meeting lecture memoirs, Information system 2, Proceedings of the IEICE General Conference, Japan, Corporate judicial person Institute of Electronics, Information and Communication Engineers, Mar. 30, 1998, p. 532-533.

European Search Report, Application No. EP 00 31 1199 drafted on Sep. 29, 2004, 3 pages.

* cited by examiner

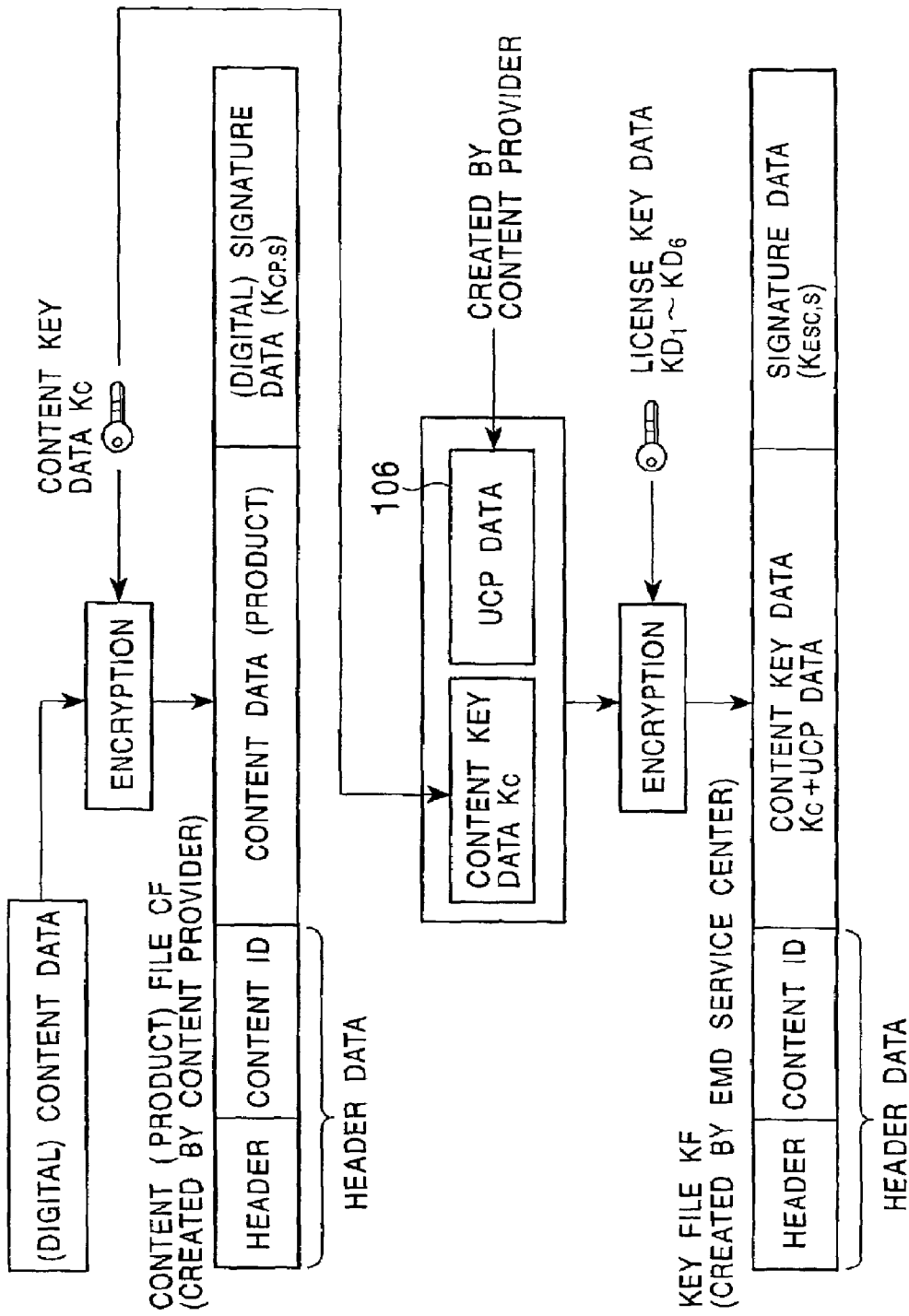

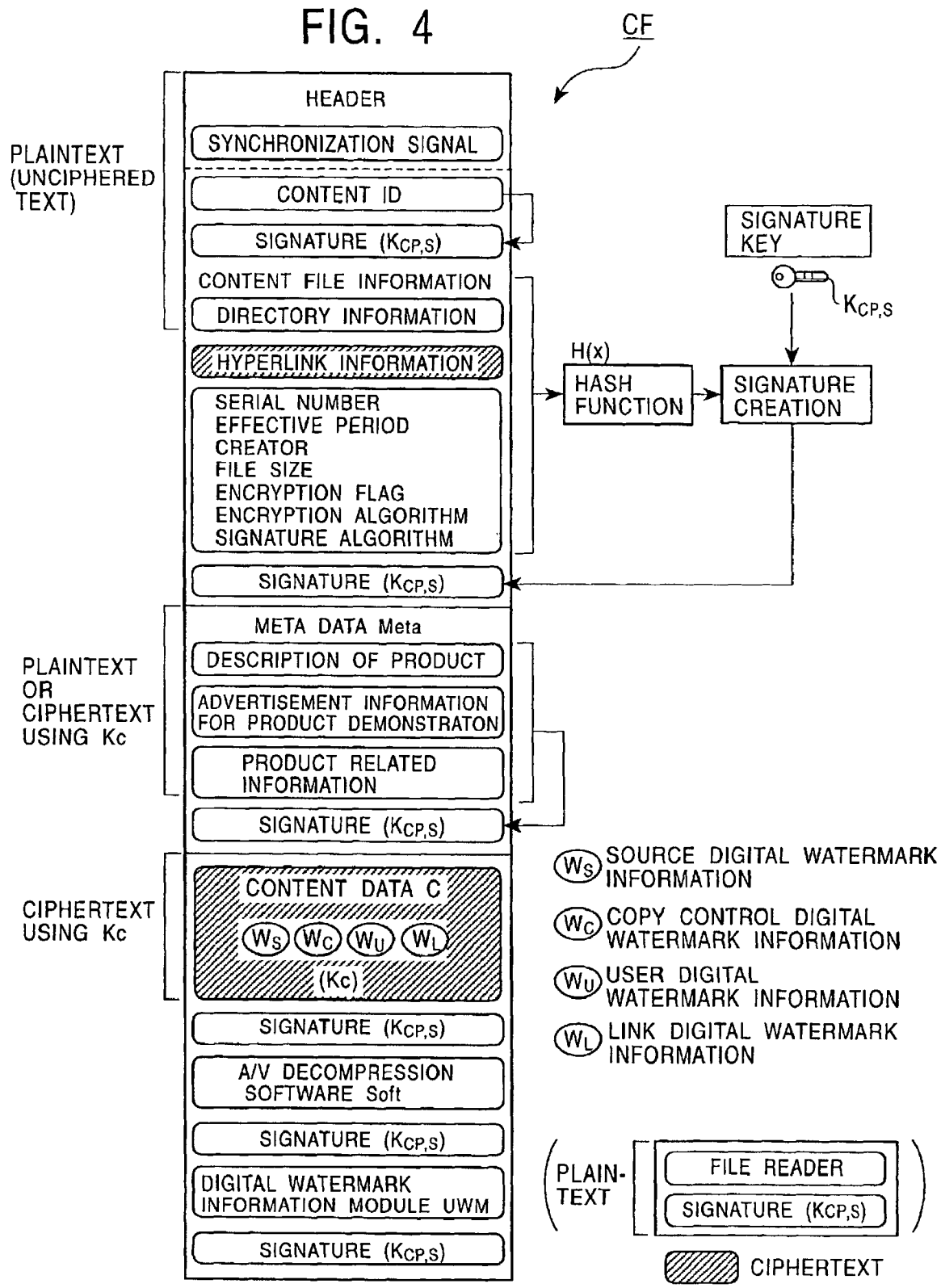

SUPPLY LICENSE KEY DATA TO CONTENT PROVIDER AND SAM

ISSUE PUBLIC KEY CERTIFICATE DATA $CER_{CP}$, $CER_{SAM1}$ THROUGH $CER_{SAM4}$

CREATE KEY FILE KF

PERFORM PAYMENT SETTLEMENT (PROFIT DISTRIBUTION) BASED ON USAGE LOG DATA

FIG. 21

ESC_CONTENT ID
CP_CONTENT ID
(SP_CONTENT ID)
USER ID
USER INFORMATION
SAM_ID
HNG_ID
DISCOUNT INFORMATION
TRACING INFORMATION
(PRICE DATA PT)
CP_ID
(SP_ID)
SERVICE PROVIDER (PORTAL) ID
HARDWARE PROVIDER
MEDIA_ID
COMPONENT ID
IDENTIFIER OF LICENSE OWNER LH_ID
ESC_ID

FIG. 31

USAGE LOG DATA 108
SAM REGISTRATION LIST
(KF: WHEN USING DOWNLOAD MEMORY WITHOUT SAM)

FIG. 32

CONTENT KEY DATA Kc
UCP DATA 106
LOCK KEY DATA $K_{LOC}$ OF STORAGE UNIT 192
PUBLIC KEY CERTIFIDATE $CER_{CP}$ OF CONTENT PROVIDER
UCS DATA 166
SAM PROGRAM DOWNLOAD CONTAINERS $SDC_1 \sim SDC_3$

FIG. 74

| | | |
|---|---|---|
| MEDIUM SAM ID | | |
| STORAGE KEY $K_{STR}$ (MEDIUM KEY $K_{MED}$) | | |
| | | |
| | | |
| PUBLIC KEY OF THIRD PARTY (EMD SERVICE CENTER) | | |
| PUBLIC KEY OF ROOT CA | | |
| PUBLIC KEY CERTIFICATE OF MEDIUM SAM (X.509) | | |
| PUBLIC KEY AND PRIVATE KEY OF MEDIUM SAM | | |
| REVOCATION LIST (UPDATED VALUE) | | |
| RIGHTS PROCESSING (PROFITS DISTRIBUTION) DATA ENTITY ID WHICH RECEIVES PROFITS | | |
| MEDIUM TYPE<br>• MEDIUM TYPE INFORMATION<br>• ROM OR RAM | | |
| PHYSICAL ADDRESS INFORMATION OF KEY FILE KF (REGISTER SPACE) | CHECK VALUES | CIPHERTEXT BY LICENSE KEY KD |
| CHECK VALUES (MAC) | | |
| KF OF CONTENT NUMBER #1 | CHECK VALUES (MAC) | CIPHERTEXT BY LICENSE KEY KD |
| KF OF CONTENT NUMBER #2 | | |
| KF OF CONTENT NUMBER #3 | | |
| KF OF CONTENT NUMBER #4 | | |
| KF OF CONTENT NUMBER #5 | | |
| ⋮ | | |
| KF OF CONTENT NUMBER #n | | |
| CHECK VALUES (MAC) | | |

FIG. 75

| | | |
|---|---|---|
| MEDIUM SAM ID | | |
| STORAGE KEY $K_{STR}$ (MEDIUM KEY $K_{MED}$) | | |
| USER ID | | |
| PASSWORD | | |
| FAVORITE INFORMATION | | |
| SETTLEMENT INFORMATION (CREDIT CARD NO.) | | |
| ELECTRONIC MONEY | | |
| PUBLIC KEY OF THIRD PARTY (EMD SERVICE CENTER) | | |
| PUBLIC KEY OF ROOT CA | | |
| PUBLIC KEY CERTIFICATE OF MEDIUM SAM (X.509) | | |
| PUBLIC KEY AND PRIVATE KEY OF MEDIUM SAM | | |
| REVOCATION LIST (UPDATED VALUE) | | |
| RIGHTS PROCESSING (PROFITS DISTRIBUTION) DATA ENTITY ID WHICH RECEIVES PROFITS | | |
| MEDIUM TYPE<br>• MEDIUM TYPE INFORMATION<br>• ROM OR RAM | | |
| PHYSICAL ADDRESS INFORMATION OF KEY FILE KF (REGISTER SPACE) | CHECK VALUES | CIPHERTEXT BY LICENSE KEY KD |
| CHECK VALUES (MAC) | | |
| KF/KF$_1$ OF CONTENT NUMBER #1 | CHECK VALUES (MAC) | CIPHERTEXT BY LICENSE KEY KD |
| KF/KF$_1$ OF CONTENT NUMBER #2 | | |
| KF/KF$_1$ OF CONTENT NUMBER #3 | | |
| KF/KF$_1$ OF CONTENT NUMBER #4 | | |
| KF/KF$_1$ OF CONTENT NUMBER #5 | | |
| ⋮ | | |
| KF/KF$_1$ OF CONTENT NUMBER #n | | |
| CHECK VALUES (MAC) | | |

FIG. 76

| MEDIUM SAM ID |
|---|
| STORAGE KEY $K_{STR}$ (MEDIUM KEY $K_{MED}$) |
| |
| |
| PUBLIC KEY OF THIRD PARTY (EMD SERVICE CENTER) |
| PUBLIC KEY OF ROOT CA |
| PUBLIC KEY CERTIFICATE OF MEDIUM SAM (X.509) |
| PUBLIC KEY AND PRIVATE KEY OF MEDIUM SAM |
| REVOCATION LIST (UPDATED VALUE) |
| RIGHTS PROCESSING (PROFITS DISTRIBUTION) DATA ENTITY ID WHICH RECEIVES PROFITS |
| MEDIUM TYPE<br>• MEDIUM TYPE INFORMATION<br>• ROM OR RAM |
| |

FIG. 77

| MEDIUM SAM ID | | |
|---|---|---|
| STORAGE KEY $K_{STR}$ (MEDIUM KEY $K_{MED}$) | | |
| USER ID | | |
| PASSWORD | | |
| FAVORITE INFORMATION | | |
| SETTLEMENT INFORMATION (CREDIT CARD NO.) | | |
| ELECTRONIC MONEY | | |
| PUBLIC KEY OF THIRD PARTY (EMD SERVICE CENTER) | | |
| PUBLIC KEY OF ROOT CA | | |
| PUBLIC KEY CERTIFICATE OF MEDIUM SAM (X.509) | | |
| PUBLIC KEY AND PRIVATE KEY OF MEDIUM SAM | | |
| REVOCATION LIST (UPDATED VALUE) | | |
| RIGHTS PROCESSING (PROFITS DISTRIBUTION) DATA ENTITY ID WHICH RECEIVES PROFITS | | |
| MEDIUM TYPE<br>• MEDIUM TYPE INFORMATION<br>• ROM OR RAM | | |
| PHYSICAL ADDRESS INFORMATION OF KEY FILE KF (REGISTER SPACE) | CHECK VALUES | CIPHERTEXT BY STORAGE KEY $K_{STR}$ |
| CHECK VALUES (MAC) | | |
| KF/KF$_1$ OF CONTENT NUMBER #1 | CHECK VALUES (MAC) | CIPHERTEXT BY STORAGE KEY $K_{STR}$ |
| KF/KF$_1$ OF CONTENT NUMBER #2 | | |
| KF/KF$_1$ OF CONTENT NUMBER #3 | | |
| KF/KF$_1$ OF CONTENT NUMBER #4 | | |
| KF/KF$_1$ OF CONTENT NUMBER #5 | | |
| ⋮ | | |
| KF/KF$_1$ OF CONTENT NUMBER #n | | |
| CHECK VALUES (MAC) | | |

FIG. 87

SUPPLY LICENSE KEY DATA TO
CONTENT PROVIDER AND SAM

ISSUE PUBLIC KEY CERTIFICATE
DATA $DER_{CP}$, $CER_{SP}$, $CER_{SAM1}$
$CER_{SAM4}$

CREATE KEY FILE KF

PERFORM PAYMENT SETTLEMENT
(PROFIT DISTRIBUTION BETWEEN
CP AND SP) BASED ON USAGE
LOG DATA

FIG. 91

CONTENT KEY DATA Kc

UCP DATA 106

LOCK KEY DATA $K_{LOC}$ OF NON-VOLATILE MEMORY 201

PUBLIC-KEY CERTIFICATE DATA $CER_{CP}$ OF CONTENT PROVIDER 301

PUBLIC-KEY CERTIFICATE DATA OF $CER_{SP}$ OF SERVICE PROVIDER 301

UCS DATA 166

SAM PROGRAM DOWNLOAD CONTAINERS $SD_1 \sim SD_3$

PRICE TAG DATA 312

FIG. 100

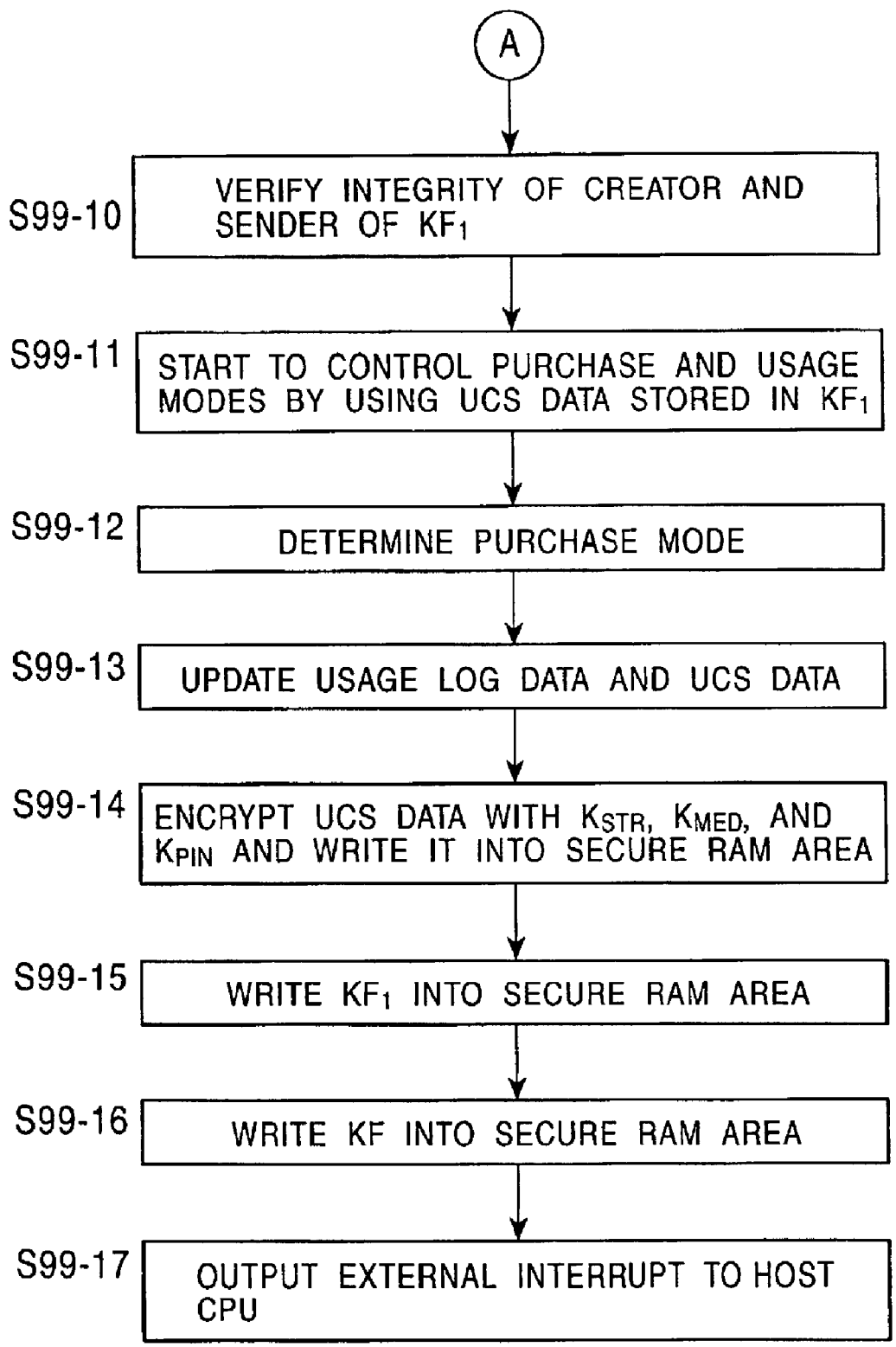

S99-10: VERIFY INTEGRITY OF CREATOR AND SENDER OF $KF_1$

S99-11: START TO CONTROL PURCHASE AND USAGE MODES BY USING UCS DATA STORED IN $KF_1$

S99-12: DETERMINE PURCHASE MODE

S99-13: UPDATE USAGE LOG DATA AND UCS DATA

S99-14: ENCRYPT UCS DATA WITH $K_{STR}$, $K_{MED}$, AND $K_{PIN}$ AND WRITE IT INTO SECURE RAM AREA

S99-15: WRITE $KF_1$ INTO SECURE RAM AREA

S99-16: WRITE KF INTO SECURE RAM AREA

S99-17: OUTPUT EXTERNAL INTERRUPT TO HOST CPU

DATA PROCESSING APPARATUS, DATA PROCESSING SYSTEM, AND DATA PROCESSING METHOD THEREFOR

BACKGROUND OF THE INVENTION

1. Field of the Invention

The present invention relates to a data processing apparatus and system for performing processing for provided content data, and a data processing method for such an apparatus and a system.

2. Description of the Related Art

A data providing system for distributing encrypted content data to data processing apparatuses of users who have made a predetermined contract and for enabling the data processing apparatuses to decode the content data and to read and record it is available. One type of such data providing systems is a conventional electronic music distribution (EMD) system for distributing music data.

FIG. 106 is a schematic diagram illustrating a conventional EMD system 700. In the EMD system 700, content providers 701a and 701b encrypt content data 704a, 704b, and 704c, and copyright information 705a, 705b, and 705c by using session key data obtained after performing mutual authentication, and then provide the encrypted data to a service provider 710 online or offline. The copyright information 705a, 705b, and 705c may include serial copy management system (SCMS) information, digital watermark information for embedding copyright information into the content data, and information for embedding copyright information into transmission protocols of the service provider 710.

The service provider 710 decodes the received content data 704a, 704b, and 704c, and the copyright information 705a, 705b, and 705c by the use of the session key data.

The service provider 710 then embeds the copyright information 705a, 705b, and 705c into the decoded content data 704a, 704b, and 704c which have been received online or offline so as to create content data 707a, 707b, and 7074c. In this case, as part of the copyright information 704a, 704b, and 704c, the service provider 710 embeds the digital watermark information into the content data 704a, 704b, and 704c by changing predetermined frequency domains, and embeds the SCMS information into network protocols used for transmitting the content data 704a, 704b, and 704c to the user.

The service provider 710 also encrypts the content data 707a, 707b, and 707c by using content key data Kca, Kcb, and Kcc, respectively, read from a key database 706. Subsequently, the service provider 710 encrypts a secure container 722, which stores the encrypted content data 707a, 707b, and 707c, by using session key data obtained after performing mutual authentication, and sends the encrypted secure container 722 to a conditional access (CA) module 711 stored in a terminal device 709 of the user.

The CA module 711 decodes the secure container 722 by using the session key data. The CA module 711 also receives the content key data Kca, Kcb, and Kcc from the key database 706 of the service provider 710 by using an accounting function, such as an electronic settlement system or a CA, and decodes it by using the session key data. This enables the terminal device 709 to decode the content data 707a, 707b, and 707c by using the content key data Kca, Kcb, and Kcc, respectively.

The CA module 711 performs accounting processing for each content so as to generate accounting information 721, and encrypts it by using the session key data and sends it to a rights processing module 720 of the service provider 710.

In this case, the CA module 711 performs the processing on the items concerning the services provided by the service provider 710, in other words, the items to be managed by the service provider 710, such as user's contract (renewal) information, collection of, for example, a monthly basic fee incurred by using a network, accounting processing for each content, and ensuring the security of the physical layer of the network.

Upon receiving the accounting information 721 from the CA module 711, the service provider 710 distributes the profits between the service provider 710 and the content providers 701a, 701b, and 701c. In this case, the profits are distributed from the service provider 710 to the content providers 701a, 701b, and 701c via an intermediary, for example, the Japanese Society for Rights of Authors, Composers and Publishers (JASRAC). JASRAC also distributes the profits of the content providers 701a, 701b, and 701c to the copyright holder, the artist, the composer, the writer, and the production company of the content data, etc.

In recording the content data 707a, 707b, and 707c decoded with the content key data Kca, Kcb, and Kcc, respectively, on a recording medium 723, such as a random access memory (RAM), the terminal device 709 performs copy control by overwriting the SCMS bits of the copyright information 705a, 705b, and 705c. That is, the user performs copy control based on the SCMS bits embedded into the content data 7074a, 707b, and 707c, thereby implementing copyright protection.

The SCMS prohibits the copying operation of the content data, for example, for two or more generations (copy free), but allows unlimited one-generation copying (copy once), and is thus insufficient for copyright protection.

In the above-described EMD system 700, it is necessary for the content provider 701 to monitor the action of the service provider 710, who is technically able to freely handle the unencrypted content data, and the profit of the content providers 701a, 701b, and 701c may be unfairly exploited.

Additionally, in the EMD system 700, it is difficult to restrict illegal actions of the user's terminal device 709, such as authoring the content data distributed from the service provider 710 and re-distributing it to another terminal device, thereby also unfairly exploiting the profits of the content providers 701a, 701b, and 701c.

SUMMARY OF THE INVENTION

Accordingly, in order to solve the aforementioned problems inherent in the related art, it is an object of the present invention to provide a data processing apparatus, a data processing system, and a data processing method therefor, for suitably protecting the profits of a content-rights holder, such as a content provider.

It is another object of the present invention to provide a data processing apparatus, a data processing system, and a data processing method therefor, for reducing a load for protecting the profits of a content-rights holder, such as a content provider.

In order to achieve the above objects, according to one aspect of the present invention, there is provided a data processing apparatus for performing rights processing of content data encrypted with content key data based on usage control policy (UCP) data, and for decrypting the encrypted content key data. The data processing apparatus include within a tamper-resistant circuit module: a first bus; an arithmetic processing circuit connected to the first bus, for performing the rights processing of the content data based on the UCP data; a storage circuit connected to the first bus; a second bus;

a first interface circuit interposed between the first bus and the second bus; an encryption processing circuit connected to the second bus, for decrypting the content key data; and an external bus interface circuit connected to the second bus.

According to the aforementioned data processing apparatus, content data, corresponding content key data, and corresponding UCP data are distributed, and also, license key data for decrypting the content key data is distributed. The license key data is stored, for example, in the above-described storage circuit.

Then, in response to an instruction to perform rights processing from an external arithmetic processing apparatus via the external bus interface circuit, the rights processing of the content data based on the UCP data is executed in the aforementioned arithmetic processing circuit. Thereafter, the content key data is decrypted in the arithmetic processing circuit by using the license key data read from the storage circuit.

The aforementioned data processing apparatus performs mutual authentication with another decoding apparatus, and encrypts the decrypted content key data and content data by using the session key data obtained by mutual authentication, and sends them to the decoding apparatus.

In the aforementioned data processing apparatus may further include a second interface circuit within the tamper-resistant circuit module. The first bus may include a third bus connected to the arithmetic processing circuit and the storage circuit, and a fourth bus connected to the first interface circuit, and the second interface circuit may be interposed between the third bus and the fourth bus.

The aforementioned data processing apparatus may further include within the tamper-resistant circuit module: a fifth bus; a third interface circuit connected to the fifth bus, for performing communication with a data processing circuit having an authentication function which is loaded on one of a recording medium and an integrated circuit card; and a fourth interface circuit interposed between the fourth bus and the fifth bus.

In the aforementioned data processing apparatus, the encryption processing circuit may include a public-key encryption circuit and a common-key encryption circuit.

In the aforementioned data processing apparatus, the storage circuit may store private key data of the data processing apparatus and public key data of a second data processing apparatus. The public-key encryption circuit may verify the integrity of signature data, which verifies the integrity of the content data, the content key data, and the UCP data, by using the corresponding public key data. When recording the content data, the content key data, and the UCP data on a recording medium or when sending them to the second data processing apparatus, the public-key encryption circuit may create signature data, which verifies the integrity of the content data, the content key data, and the UCP data, by using the private key data. The common-key encryption circuit may decrypt the content key data, and when sending the content data, the content key data, and the UCP data to the second data processing apparatus online, the common-key encryption circuit may encrypt and decrypt the content data, the content key data, and the UCP data by using session key data obtained by performing mutual authentication with the second data processing apparatus.

The aforementioned data processing apparatus may further include a hash-value generating circuit within the tamper-resistant circuit module, for generating hash values of the content data, the content key data and the UCP data. The public-key encryption circuit may verify the integrity of the signature data and may create the signature data by using the hash values.

The aforementioned data processing apparatus may further include a random-number generating circuit within the tamper-resistant circuit module. The random-number generating circuit may be connected to the second bus, for generating a random number for performing mutual authentication with the second data processing apparatus when sending the content data, the content key data, and the UCP data to the second data processing apparatus online.

In the aforementioned data processing apparatus, the external bus interface circuit may be connected to an external storage circuit for storing at least one of the content data, the content key data, and the UCP data.

The data processing apparatus may further include a storage-circuit control circuit for controlling access to the storage circuit and access to the external storage circuit via the external bus interface circuit in accordance with a command from the arithmetic processing circuit.

In the aforementioned data processing apparatus, the external bus interface circuit may be connected to a host arithmetic processing apparatus for centrally controlling a system on which the data processing apparatus is loaded.

The aforementioned data processing apparatus may further include a storage management circuit for managing an address space of the storage circuit and an address space of the external storage circuit.

In the aforementioned data processing apparatus, the arithmetic processing circuit may determine at least one of a purchase mode and a usage mode of the content data based on a handling policy indicated by the UCP data, and may create log data indicating a result of the determined mode.

In the aforementioned data processing apparatus, after determining the purchase mode, the arithmetic processing circuit may create usage control status data in accordance with the determined purchase mode, and may control the use of the content data based on the usage control status data.

In the aforementioned data processing apparatus, in recording the content data, for which the purchase mode is determined, on a recording medium, the common-key encryption circuit may encrypt the content key data and the usage control status data by using medium key data corresponding to the recording medium.

In the aforementioned data processing apparatus, the content key data may be encrypted with license key data having an effective period. The storage circuit may store the license key data. The data processing apparatus may further include a real time clock for generating real time. The arithmetic processing circuit may read the effective license key data from the storage circuit based on the real time indicated by the real time clock. The common-key encryption circuit may decrypt the content key data by using the read license key data.

In the data processing apparatus, the storage circuit may write and erase data in units of blocks. The data processing apparatus may include within the tamper-resistant circuit module, a write-lock control circuit for controlling the writing and erasing of the data into and from the storage circuit in units of blocks under the control of the arithmetic processing circuit.

According to another aspect of the present invention, there is provided a data processing apparatus for performing rights processing of content data encrypted with content key data based on UCP data, and for decrypting the encrypted content key data. The data processing apparatus includes within a tamper-resistant circuit module: a first bus; an arithmetic processing circuit connected to the first bus, for performing the rights processing of the content data based on the UCP data; a storage circuit connected to the first bus; a second bus;

an interface circuit interposed between the first bus and the second bus; an encryption processing circuit connected to the second bus, for decrypting the content key data; and an external bus interface circuit connected to the second bus. Upon receiving an interrupt from an external circuit via the external bus interface circuit, the arithmetic processing circuit becomes a slave for the external circuit so as to perform processing designated by the interrupt, and reports a result of the processing to the external circuit.

In the aforementioned data processing apparatus, the arithmetic processing circuit may report the result of the processing by outputting an interrupt to the external circuit.

In the aforementioned data processing apparatus, the external bus interface may include a common memory for the arithmetic processing circuit and the external circuit. The arithmetic processing circuit may write the result of the processing into the common memory. The external circuit may obtain the result of the processing by polling.

In the aforementioned data processing apparatus, the external bus interface may include: a first status register indicating an execution status of the processing requested from the external circuit in the arithmetic processing circuit, and including a flag set by the arithmetic processing circuit and read by the external circuit; a second status register indicating whether the external circuit has requested the arithmetic processing circuit to perform processing, and including a flag set by the external circuit and read by the arithmetic processing circuit; and the common memory for storing a result of the processing.

In the aforementioned data processing apparatus, the storage circuit may store an interrupt program describing the processing designated by the interrupt, and the arithmetic processing circuit may perform the processing by executing the interrupt program read from the storage circuit.

In the data processing apparatus, the storage circuit may store a plurality of the interrupt programs, and a plurality of sub-routines to be read when executing the interrupt program. The arithmetic processing circuit may appropriately read and execute the sub-routines from the storage circuit when executing the interrupt program read from the storage circuit.

According to another aspect of the present invention, there is provided a data processing system including: an arithmetic processing apparatus, for executing a predetermined program and for outputting an interrupt according to a predetermined condition by serving as a master; and a data processing apparatus, for performing predetermined processing in response to the interrupt from the arithmetic processing apparatus by serving as a slave for the arithmetic processing apparatus, and for reporting a result of the processing to the arithmetic processing apparatus. The data processing apparatus may include within a tamper-resistant circuit module: a determining unit for determining at least one of a purchase mode and a usage mode of content data based on a handling policy indicated by the UCP data; a log data generator for generating log data indicating a result of the determined mode; and a decryption unit for decrypting the content key data.

In the aforementioned data processing system, upon receiving the interrupt indicating an interrupt type, the arithmetic processing apparatus may output to the data processing apparatus an interrupt indicating an instruction to execute an interrupt routine corresponding to the interrupt type. The data processing apparatus may execute the interrupt routine corresponding to the interrupt type of the interrupt received from the arithmetic processing apparatus.

In the aforementioned data processing system, the data processing apparatus may report a result of the processing by outputting an interrupt to the arithmetic processing apparatus.

In the aforementioned data processing system, the data processing apparatus may include a common memory which is accessible by the data processing apparatus and the arithmetic processing apparatus. The arithmetic processing apparatus may obtain the result of the processing by accessing the common memory through polling.

In the aforementioned data processing system, the data processing apparatus may include a first status register indicating an execution status of the processing requested from the arithmetic processing apparatus, and including a flag read by the arithmetic processing apparatus; a second status register indicating whether the arithmetic processing apparatus has requested the data processing apparatus to perform processing by the interrupt, and including a flag set by the arithmetic processing apparatus; and the common memory for storing a result of the processing.

The aforementioned data processing system may further include a bus for connecting the arithmetic processing apparatus and the data processing apparatus.

In the aforementioned data processing system, the data processing apparatus may enter a low power state after completing the execution of one of an initial program and the interrupt routine.

In the aforementioned data processing system, based on the interrupt received from the arithmetic processing apparatus, the data processing apparatus may execute the interrupt routine in accordance with at least one of processing for determining one of the purchase mode and the usage mode of the content data, processing for reproducing the content data, and processing for downloading the data from a certifying authority.

In the aforementioned data processing system, the arithmetic processing apparatus may execute a predetermined user program.

According to a further aspect of the present invention, there is provided a data processing system in which content data provided by a data providing apparatus is received from a data distribution apparatus, and is managed by a management apparatus. The data processing system includes: a first processing module for receiving from the data distribution apparatus a module in which content data encrypted with content key data, the encrypted content key data, UCP data indicating a handling policy of the content data, and price data for the content data determined by the data distribution apparatus are stored, and for decrypting the received module by using common key data, and for performing accounting processing for a distribution service of the module by the data distribution apparatus. An arithmetic processing apparatus executes a predetermined program and outputs an interrupt according to a predetermined condition by serving as a master. A data processing apparatus performs predetermined processing in response to the interrupt from the arithmetic processing apparatus by serving as a slave for the arithmetic processing apparatus, and reports a result of the processing to the arithmetic processing apparatus. The data processing apparatus includes within a tamper-resistant circuit module: a determining unit for determining at least one of a purchase mode and a usage mode of the content data based on the handling policy indicated by the UCP data stored in the received module. A log data generator generates log data indicating a result of the determined mode. An output unit outputs the price data and the log data to the management apparatus when the purchase mode of the content data is determined. A decryption unit decrypts the content key data.

According to a yet further aspect of the present invention, there is provided a data processing system including: an arithmetic processing apparatus for executing a predetermined program and for outputting an interrupt according to a predetermined condition by serving as a master; a first tamper-resistant data processing apparatus for performing rights processing of content data encrypted with content key data in response to the interrupt from the arithmetic processing apparatus by serving as a slave for the arithmetic processing apparatus, and for reporting a result of the processing to the arithmetic processing apparatus. A second tamper-resistant data processing apparatus decrypts the content data by using the content key data obtained by performing mutual authentication with the first tamper-resistant data processing apparatus and compresses or decompresses the content data in response to the interrupt from the arithmetic processing apparatus or the first tamper-resistant data processing apparatus by serving as a slave for the arithmetic processing apparatus or the first tamper-resistant data processing apparatus.

The aforementioned data processing system may further include a bus for connecting the arithmetic processing apparatus, the first tamper-resistant data processing apparatus, and the second tamper-resistant data processing apparatus.

According to a further aspect of the present invention, there is provided a data processing system including: an arithmetic processing apparatus for executing a predetermined program and for outputting an interrupt according to a predetermined condition by serving as a master. A first tamper-resistant data processing apparatus performs rights processing of content data encrypted with content key data in response to the interrupt from the arithmetic processing apparatus by serving as a slave for the arithmetic processing apparatus, and reports a result of the processing to the arithmetic processing apparatus. A second tamper-resistant data processing apparatus performs mutual authentication with the arithmetic processing apparatus and reads and writes the content data from and into a recording medium in response to the interrupt output from the arithmetic processing apparatus.

In the aforementioned data processing system, the second tamper-resistant processing apparatus may decrypt and encrypt the content data by using medium key data corresponding to the recording medium.

In the aforementioned data processing system, when the recording medium is provided with a processing circuit having a mutual authentication function, the second tamper-resistant processing apparatus may perform mutual authentication with the processing circuit.

According to a further aspect of the present invention, there is provided a data processing system including: an arithmetic processing apparatus for executing a predetermined program and for outputting an interrupt according to a predetermined condition by serving as a master. A first tamper-resistant data processing apparatus performs mutual authentication with the arithmetic processing apparatus and reads and writes content data from and into a recording medium in response to the interrupt from the arithmetic processing apparatus. A second tamper-resistant data processing apparatus decrypts the content data by using content key data and compresses or decompresses the content data in response to the interrupt from the arithmetic processing apparatus by serving as a slave for the arithmetic processing apparatus.

The aforementioned data processing system may further include a storage circuit for temporarily storing the content data read from the recording medium by the first tamper-resistant data processing apparatus, and outputs the stored content data to the second tamper-resistant data processing apparatus.

In the aforementioned data processing system, the storage circuit may utilize part of a storage area of an anti-vibration storage circuit.

The aforementioned data processing system may further include a third tamper-resistant data processing apparatus for performing rights processing of the content data encrypted with the content key data in response to the interrupt from the arithmetic processing apparatus by serving as a slave for the arithmetic processing apparatus, and for reporting a result of the processing to the arithmetic processing apparatus.

According to a further aspect of the present invention, there is provided a data processing method using an arithmetic processing apparatus and a data processing apparatus. The data processing method includes the steps of: executing, in the arithmetic processing apparatus, a predetermined program and outputting an interrupt according to a predetermined condition by serving as a master; and determining, in the data processing apparatus, at least one of a purchase mode and a usage mode of content data based on a handling policy of UCP data, creating log data indicating a result of the determined mode, and decrypting content key data, within a tamper-resistant circuit module in response to the interrupt from the arithmetic processing apparatus by serving as a slave for the arithmetic processing apparatus.

According to another aspect of the present invention, there is provided a data processing method using an arithmetic processing apparatus, a first data processing apparatus, and a second data processing apparatus. The data processing method includes the steps of: executing, in the arithmetic processing apparatus, a predetermined program and outputting an interrupt according to a predetermined condition by serving as a master; performing, in the first data processing apparatus, rights processing of content data encrypted with content key data within a tamper-resistant module in response to the interrupt from the arithmetic processing apparatus by serving as a slave for the arithmetic processing apparatus, and reporting a result of the processing to the arithmetic processing apparatus; and decrypting, in the second data processing apparatus, the content data by using the content key data obtained by performing mutual authentication with the first data processing apparatus and compressing or decompressing the content data within a tamper-resistant module in response to the interrupt from the arithmetic processing apparatus or the first data processing apparatus by serving as a slave for the arithmetic processing apparatus or the first data processing apparatus.

According to still another aspect of the present invention, there is provided a data processing method using an arithmetic processing apparatus, a first data processing apparatus, and a second data processing apparatus. The data processing method includes the steps of: executing, in the arithmetic processing apparatus, a predetermined program and outputting an interrupt according to a predetermined condition by serving as a master; performing, in the first data processing apparatus, rights processing of content data encrypted with content key data within a tamper-resistant module in response to the interrupt from the arithmetic processing apparatus by serving as a slave for the arithmetic processing apparatus, and reporting a result of the processing to the arithmetic processing apparatus; and performing, in the second data processing apparatus, mutual authentication with the arithmetic processing apparatus, and reading and writing the content data from and into a recording medium within a tamper-resistant module in response to the interrupt from the arithmetic processing apparatus.

According to a further aspect of the present invention, there is provided a data processing method using an arithmetic processing apparatus, a first data processing apparatus, and a second data processing apparatus. The data processing method includes the steps of: executing, in the arithmetic processing apparatus, a predetermined program and outputting an interrupt according to a predetermined condition by serving as a master; performing, in the first data processing apparatus, mutual authentication with the arithmetic processing apparatus, and reading and writing content data from and into a recording medium within a tamper-resistant module in response to the interrupt from the arithmetic processing apparatus; and decrypting, in the second data processing apparatus, the content data by using content key data and compressing or decompressing the content data within a tamper-resistant module in response to the interrupt from the arithmetic processing apparatus by serving as a slave for the arithmetic processing apparatus.

BRIEF DESCRIPTION OF THE DRAWINGS

FIG. 2 illustrates the concept of a secure container used in the present invention;

FIG. 4 illustrates details of data contained in a content file shown in FIG. 3A;

FIG. 20 illustrates the functions of the EMD service center shown in FIG. 1;

FIG. 21 illustrates usage log data shown in FIG. 1;

FIG. 31 illustrates data to be stored in an external memory shown in FIG. 22;

FIG. 32 illustrates data to be stored in a work memory;

FIG. 74 illustrates storage data in the medium SAM of a recording medium (ROM) when the ROM is shipped;

FIG. 75 illustrates storage data in the medium SAM of the recording medium (ROM) after registration is conducted;

FIG. 76 illustrates storage data in the medium SAM of a recording medium (RAM) when the RAM is shipped;

FIG. 77 illustrates storage data in the medium SAM of the recording medium (RAM) when registration is conducted;

FIG. 87 illustrates the functions of the EMD service center shown in FIG. 82;

FIG. 91 illustrates data to be stored in a work memory shown in FIG. 90;

FIGS. 99 and 100 are a flow chart illustrating the processing performed by the receiver SAM shown in FIG. 94;

DESCRIPTION OF THE PREFERRED EMBODIMENTS

An electronic music distribution (EMD) system according to an embodiment of the present invention is first described below.

First Embodiment

Figure 1:
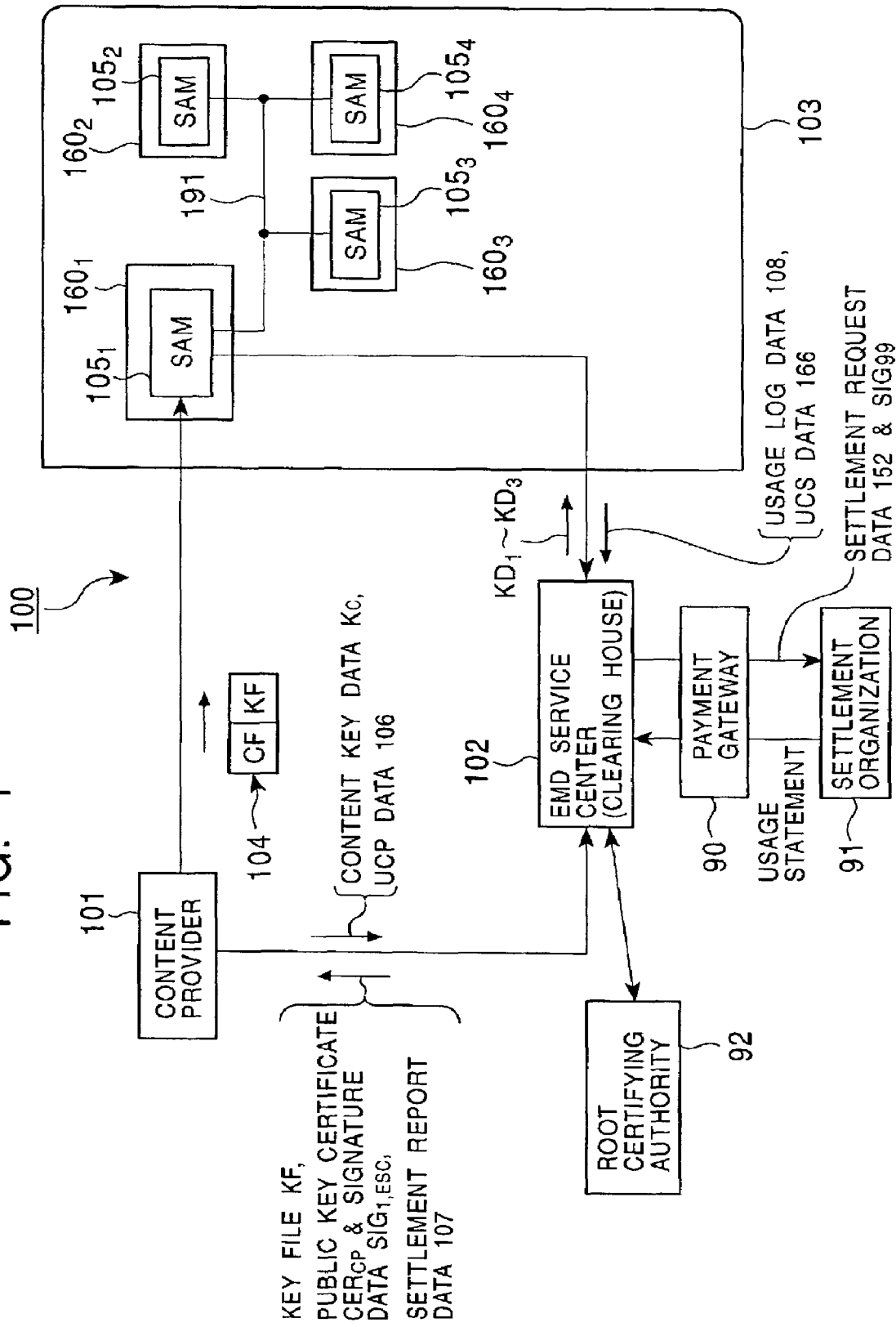
FIG. 1 is a block diagram illustrating the overall configuration of an EMD system according to a first embodiment of the present invention.

FIG. 1 is a block diagram illustrating an EMD system 100 constructed in accordance with an embodiment of the present invention.

In this embodiment, the "content data" to be distributed to users is digital data having meaningful information, which is described below by taking music data as an example.

The EMD system 100 includes, as shown in FIG. 1, a content provider 101, an EMD service center (clearing house, may be hereinafter simply referred to as the "ESC") 102, and a user home network 103.

The content provider 101, the EMD service center 102, and secure application modules (SAMs) $105_1$ through $105_4$ respectively correspond to a data providing apparatus, a data management apparatus, and a data processing apparatus of the present invention.

An overview of the EMD system 100 is first discussed. The EMD system 100 sends to the EMD service center 102, which is a highly reliable authorizing organization, content key data Kc used for encrypting content data C to be provided, UCP (UCP) data 106 indicating, for example, the license agreement conditions of the content data C, and digital-watermark information control data indicating the content of digital watermark information and the position in which digital watermark information is embedded.

The EMD service center 102 registers (authenticates or authorizes) the content key data Kc, the UCP data 106, and the digital-watermark information control data received from the content provider 101.

The EMD service center 102 also creates a key file KF, which stores the content key data Kc encrypted with license key data $KD_1$ through $KD_6$ of corresponding periods, the UCP data 106, and signature data of the EMD service center 102, and sends the key file KF to the content provider 101.

The signature data is used for verifying the integrity of the key file KF and the identity of the creator of the key file KF, and the official registration of the key file KF in the EMD service center 102.

The content provider 101 creates a content file CF by encrypting the content data C with the use of the content key data Kc, and distributes a secure container 104 (corresponding to a module of the present invention), which stores the content file CF, the key file KF received from the EMD service center 102, and the signature data of the content provider 101, to the user home network 103 via a network, such as the Internet, or a digital broadcast, or package media, such as a recording medium.

The signature data stored in the secure container 104 is used for verifying the integrity of the corresponding data and the identity of the creator and the sender of the data.

The user home network 103 includes, for example, a network device $160_1$, and audio-visual (AV) machines $160_2$ through $160_4$. The network device $160_1$ has a built-in SAM $105_1$. The A/V machines $160_2$ through $160_4$ have built-in SAMs $105_2$ through $105_4$, respectively. The SAMs $105_1$ through $105_4$ are interconnected with each other via a bus 191, such as an IEEE-1394 serial interface bus.

The SAMs $105_1$ through $105_4$ decode the secure container 104 received from the content provider 101 online via, for example, a network, and/or the secure container 104 supplied from the content provider 101 to the A/V machines $160_2$ through $160_4$ offline via a recording medium, by using the license key data $KD_1$ through $KD_3$ of corresponding periods, and then verify the signature data.

The secure container 104 supplied to the SAM $105_1$ through $105_4$ is then ready to be played back or recorded on a recording medium in the network device $160_1$ and the A/V machines $160_2$ through $160_4$ after the purchase/usage mode of the secure container 104 has been determined by a user's operation.

The SAMs $105_1$ through $105_4$ record the purchase/usage history of the secure container 104 as usage log data 108, and also create usage control status (UCS) data 166 indicating the purchase mode.

The usage log data 108 is sent from the user home network 103 to the EMD service center 102, for example, in response to a request from the EMD service center 102. The UCS data 166 is sent from the user home network 103 to the EMD service center 102, for example, every time the purchase mode is determined.

The EMD service center 102 determines (calculates) the accounting content based on the usage log data 108, and settles the account, based on the calculated accounting content, by using a settlement organization 91, such as a bank, via a payment gateway 90. According to this settlement, the payment made by the user of the user home network 103 to the settlement organization 91 is given to the content provider 101 by the settlement processing performed by the EMD service center 102. The EMD service center 102 regularly sends settlement report data 107 to the content provider 101.

In this embodiment, the EMD service center 102 has an authentication function, a key-data management function, and a rights processing (profit distribution) function.

More specifically, the EMD service center 102 serves as a second certifying authority located at a layer lower than a root certifying authority 92, which is the neutral supreme authority, and authenticates public key data by attaching a signature to the public-key certificate data of the public key data by using private key data of the EMD service center 102. The public key data is used for verifying the integrity of the signature data in the content provider 101 and the SAMs $105_1$ through $105_4$. As stated above, the EMD service center 102 registers and authorizes the UCP data 106 of the content provider 101, which is also part of the authentication function of the EMD service center 102

The EMD service center 102 also has the key-data management function of managing key data, such as license key data $KD_1$ through $KD_6$.

The EMD service center 102 also has the following rights processing (profit distribution) function. The EMD service center 102 settles the account for the purchase and usage of the content made by the user based on the suggested retailer's price (SRP) stated in the authorized UCP data 106 and the usage log data 108 input from the SAMs $105_1$ through $105_4$, and distributes the payment made by the user to the content provider 101.

FIG. 2 schematically illustrates the concept of the secure container 104.

The secure container 104 stores, as shown in FIG. 2 the content file CF created by the content provider 101 and the key file KF created by the EMD service center 102.

In the content file CF, header data containing a header and a content ID, the content data C encrypted with the content key data Kc, and the signature data encrypted with private key data $K_{CP,S}$ of the content provider 101 are stored.

In the key file KF, header data containing a header and a content ID, the content key data Kc and the UCP data 106 encrypted with the license key data $KD_1$ through $KD_6$, and the signature data encrypted with the private key data $K_{ESC,S}$ of the EMD service center 102 are stored.

In FIG. 2, the UCP data 106 may not be encrypted with the license key data $KD_1$ through $KD_6$, in which case, the signature data encrypted with the private key data $K_{CP,S}$ of the content provider 101 is added to the UCP data 106.

Details of the individual elements of the EMD system 100 are discussed below.

[Content Provider 101]

Before starting to communicate with the EMD service center 102, the content provider 101 offline registers the public key data $K_{CP,P}$ created by the content provider 101, the ID certificate, and the bank account number (for settling the account) of the content provider 101 in the EMD service center 102, and obtains a unique identifier (ID number) CP_ID. The content provider 101 also receives from the EMD service center 102 the public key data $K_{ESC,P}$ of the EMD service center 102 and the public key data $K_{R-CA,P}$ of the root certifying authority 92.

Figure 3A:
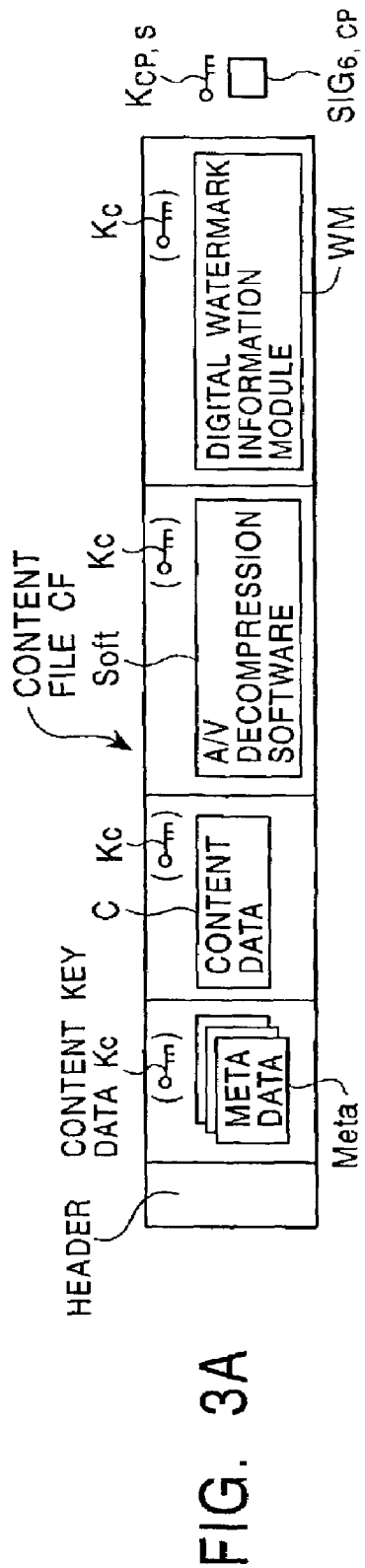
FIGS. 3A, 3B, and 3C illustrate the format of the secure container sent from a content provider to a secure application module (SAM) shown in FIG. 1.
Figure 3B:
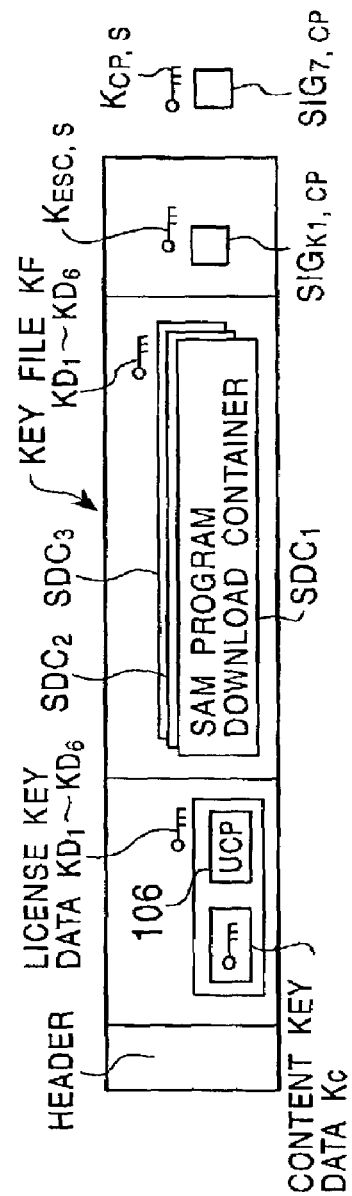
Figure 3C:
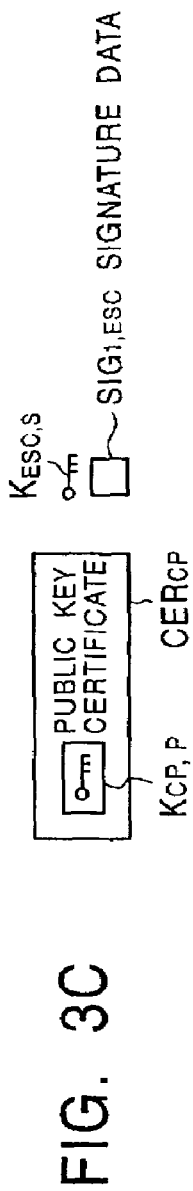

The content provider 101 creates the secure container 104 which stores the content file CF and signature data $SIG_{6,CP}$ of the content file CF shown in FIG. 3A, the key file KF corresponding to the content file CF read from a key file database 118b and signature data $SIG_{7,CP}$ of the key file KF shown in FIG. 3B, public-key certificate data $CER_{CP}$ of the content provider 101 read from a storage unit 119 and signature data $SIG_{1,ESC}$ of the public-key certificate data $CER_{CP}$ shown in FIG. 3C.

The content provider 101 supplies online or offline the secure container 104 to the network device $160_1$ of the user home network 103 shown in FIG. 1.

In this manner, according to this embodiment, an in-band system is employed in which the public key certificate $CER_{CP}$ of the public key data $K_{CP,P}$ of the content provider 101, which is stored in the secure container 104, is directly sent to the user home network 103. This eliminates the need for the user home network 103 to communicate with the EMD service center 102 in order to acquire the public key certificate $CER_{CP}$.

Alternatively, in the present invention, an out-of-band system may be employed in which the user home network 103 may acquire the public key certificate $CER_{CP}$ from the EMD service center 102 instead of storing it in the secure container 104.

In this embodiment, the signature data is generated by hashing the data used for the signature in the content provider 101, the EMD service center 102, and the SAMs $105_1$ through $105_4$ by using the private keys $K_{CP,S}$ $K_{ESC,S}$, $K_{SAM1}$ through $K_{SAM4}$, respectively. The hash values are generated by using hash functions. According to the hash functions, the data used for signatures is input and is compressed into data having a predetermined bit length, which is then output as the hash values. It is difficult to predict the input value from the hash values (output values), and when one bit of the input data changes, many bits of the hash values change. It is also difficult to search for the input data having the same hash value.

Details of the individual data in the secure container 104 are as follows.

Signature Data $SIG_{6,CP}$

The signature data $SIG_{6,CP}$ is used at the destination of the secure container 104 for verifying the integrity of the creator and the sender of the content file CF.

Signature Data $SIG_{7,CP}$

The signature data $SIG_{7,CP}$ is used at the destination of the secure container 104 for verifying the integrity of the sender of the key file KF. The integrity of the creator of the key file KF is verified at the destination of the secure container 104 based on the signature data $SIG_{K1,ESC}$ within the key file KF. The signature data $SIG_{K1,ESC}$ is also used for verifying the registration of the key file KF in the EMD service center 102.

Content File CF

FIG. 4 illustrates details of the content file CF shown in FIG. 3A.

The content file CF stores, as shown in FIGS. 3A and 4, header data, meta data Meta encrypted with the content key data Kc input from an encryption unit 114, content data C, A/V decompression software Soft, and a digital watermark information module (Watermark Module) WM.

FIG. 3A illustrates the configuration of the content file CF when a digital signal processor (DSP) is used as an A/V compression/decompression device for decompressing the content data C. The DSP decompresses the content data C within the secure container 104 and embeds and detects digital watermark information by using the A/V decompression software and the digital watermark information module within the secure container 104. This enables the content provider 101 to employ a desired compression method and an embedding method for digital watermark information.

If hardware or prestored software is used as an A/V compression/decompression device for decompressing the content data C and for embedding and detecting digital watermark information, the A/V decompression software and the digital watermark information module may not be stored within the content file CF.

The header data contains, as shown in FIG. 4, a synchronization signal, a content ID, signature data obtained by the private key data $K_{CP,S}$ of the content provider 101 for verifying the content ID, directory information, hyperlink information, information concerning the serial number, the effective period and the creator of the content file CF, the file size, the encryption flag, the encryption algorithm, and the signature algorithm, and signature data obtained by the private key data $K_{CP,S}$ of the content provider 101 for verifying the directory information.

The meta data Meta includes, as shown in FIG. 4, the description of a product (i.e., content data C), advertisement information for product demonstration, product-related information, and signature data of the content provider 101 for verifying the above information.

In the present invention, the meta data Meta is sent while being stored in the content file CF, as shown in FIGS. 3A and 4. Alternatively, instead of storing the meta data Meta in the content file CF, the meta data Meta may be transmitted from the content provider 101 to, for example, the SAM $105_1$ via a path different from the path for sending the content file CF.

The content data C is obtained in the following manner. Source digital watermark information (Source Watermark) $W_S$, copy control digital watermark information (Copy Control Watermark) $W_C$, user digital watermark information (User Watermark) $W_U$, and link digital watermark information (Link Watermark) $W_L$, etc., are embedded into content data read from, for example, a content master source database. Then, the content data is compressed according to a voice compression method, such as adaptive transform acoustic coding 3 (ATRAC3) (brand name), and is encrypted according to a common key cryptosystem, such as the data encryption standard (DES) or Triple DES, by using a content key Kc as the common key.

The content key data Kc is obtained by, for example, generating a random number having a predetermined number of bits by using a random number generator. The content key data Kc may be generated from information concerning a music piece provided by the content data. The content key data Kc is regularly updated.

In the presence of a plurality of content providers 101, the content key data Kc unique to each content provider 101 may be used, or the common content data Kc may be used for all the content providers 101.

Source digital watermark information $W_S$ indicates information concerning the copyright, such as the name of the copyright holder of the content data, the International Standard Recording Code (ISRC), the authoring date, the authoring machine identification data (ID), and the distribution destination of the content.

The copy control digital watermark information $W_C$ indicates information including a copy prohibit bit for preventing a copying operation via an analog interface.

The user digital watermark information $W_U$ contains, for example, the identifier CP_ID of the content provider 101 for specifying the distribution source and the distribution destination of the secure container 104, and the identifier SAM_ID$_1$ through SAM_ID$_4$ of the SAMs 105$_1$ through 105$_4$, respectively, of the user home network 103.

The link digital watermark information $W_L$ includes, for example, the content ID of the content data C. By embedding the link digital watermark information $W_L$ into the content data C, even for the content data C distributed via an analog broadcast, such as a television broadcast or an amplitude modulation (AM)/frequency modulation (FM) radio broadcast, in response to a request from the user, the EMD service center 102 is able to introduce the content provider 101, which handles the content data C, to the user. That is, the receiving side of the content data C detects the link digital watermark information $W_L$ embedded into the content data C by using a digital watermark information decoder, and sends the detected content ID to the EMD service center 102. This enables the EMD service center 102 to introduce the content provider 101, which handles the content data C, to the user.

More specifically, it is now assumed that the user listens to a piece of music on air in an automobile and finds it interesting, and presses a predetermined button. Then, a digital watermark information decoder integrated in the radio detects the content ID contained in the link digital watermark information $W_L$ embedded into the content data C and the communication address of the EMD service center 102 which registers the content data C. The digital watermark information decoder then records the detected data on a medium SAM loaded in a portable medium, for example, a semiconductor memory, such as, a Memory Stick (brand name), or an optical disc, such as, a mini disc (MD) (brand name). The portable medium is then set in a network device loaded with a SAM connected to a network. After performing mutual authentication between the SAM and the EMD service center 102, the ID information stored in the medium SAM and the recorded content ID are sent from the network device to the EMD service center 102. Then, the network device receives a list of content providers which handle the content data C, such as the content provider 101, from the EMD service center 102.

Alternatively, in response to the content ID from the user, the EMD service center 102 may send information of the user to the content provider 101, which handles the content data C corresponding to the content ID. Upon receiving the above-mentioned information, if the user is found to have already made a contract with the content provider 101, the content provider 101 may send the content data C to the network device of the user. If not, the content provider 101 may send promotion information of the content provider 101 to the network device of the user.

In a second embodiment (described below) of the present invention, based on the link digital watermark information $W_L$, the EMD service center 102 is able to introduce a service provider 310, which handles the content data C, to the user.

Preferably, in the first embodiment, the content and the embedding position of the digital watermark information may be defined as the digital watermark information module WM, which may be registered and managed in the EMD service center 102. The digital watermark information module WM is used for verifying the digital watermark information by, for example, the network device 160$_1$ and the A/V machines 160$_2$ through 160$_4$ within the user home network 103.

More specifically, the user home network 103 determines based on the user digital watermark information module WM managed by the EMD service center 102 whether the content and the embedding position of the digital watermark information detected by the user home network 103 coincide with those managed by the EMD service center 102. If the detected information matches that of the EMD service center 102, the digital watermark information is determined to be legal. It is thus possible to detect illegally embedded digital watermark information with high probability.

The A/V decompression software Soft, which may be ATRAC3 decompression software, is used for decompressing the content file CF in the network device 160$_1$ and the A/V machines 160$_2$ through 160$_4$ of the user home network 103.

This enables the SAMs 105$_1$ through 105$_4$ to decompress the content data C simply by using the A/V decompression software stored in the secure container 104. Accordingly, even if different compression/decompression methods are set for the individual items of content data C or for the individual content providers, a heavy burden of decompressing the content data C is not imposed on the user.

The content file CF may contain, as shown in FIG. 4, a file reader and signature data for verifying the file reader by using a private key $K_{CP,S}$. This enables the SAMs 105$_1$ through 105$_4$ to efficiently process a plurality of different types of secure containers 104 which store the different formats of content files CF.

The file reader is used for reading the content file CF and the corresponding key file KF, and indicates the reading procedure of these files.

In this embodiment, it is assumed that the file reader has been sent from the EMD service center 102 to the SAMs 105$_1$ through 105$_4$, and thus, the content file CF of the secure container 104 does not store a file reader.

In this embodiment, the encrypted content data C is stored in the secure container 104 without depending on factors, such as the compression flag, i.e., whether the content data C is compressed, the compression method of content data C, the encryption method (including the common key cryptosystem and the public key cryptosystem), the signal source of the content data C (for example, the sampling frequency), and the signature-data creating method (algorithm). That is, the above-described factors can be determined at the discretion of the content provider 101.

Key File KF

Figure 5:
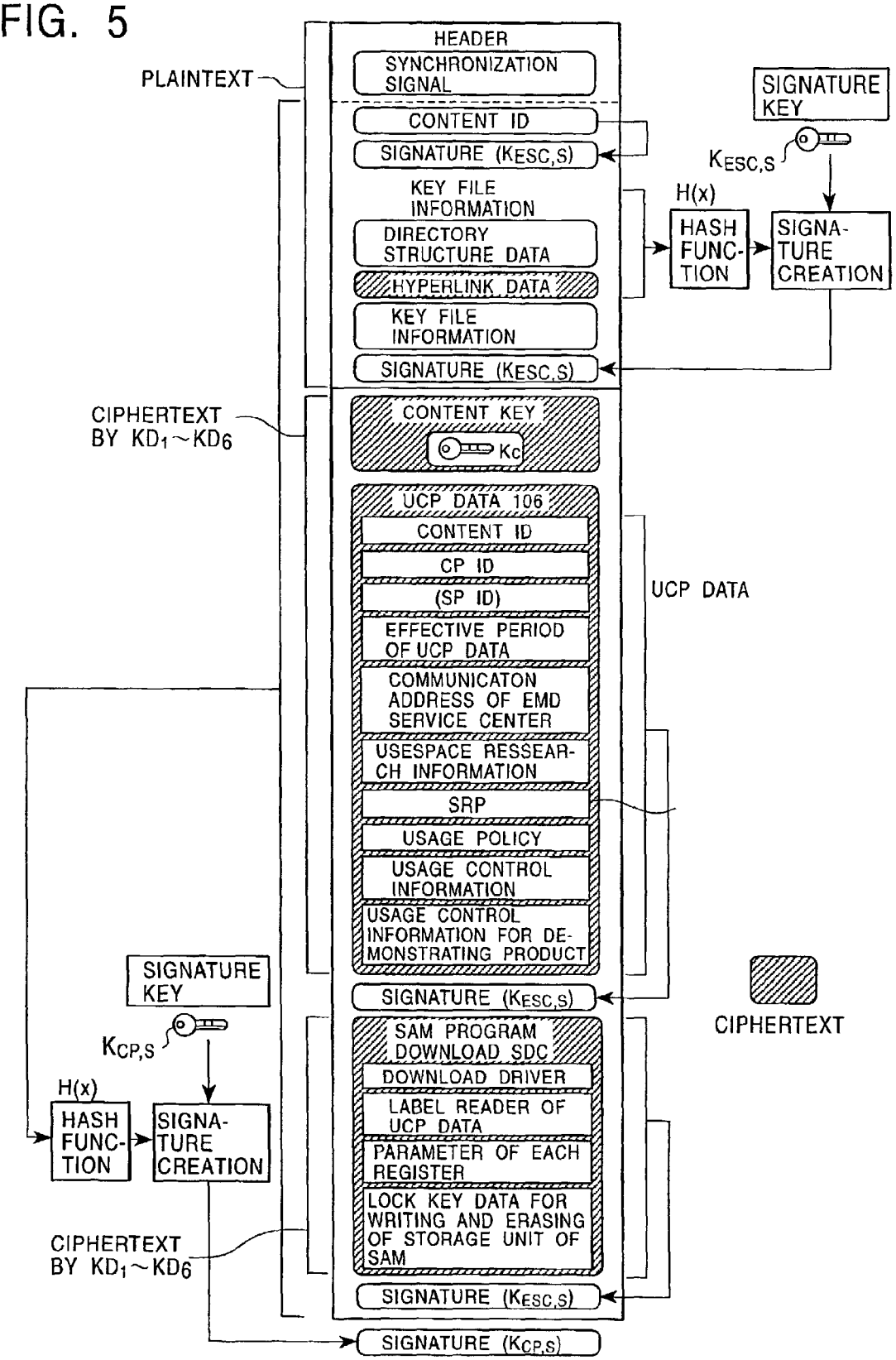
FIG. 5 illustrates details of data contained in a key file shown in FIG. 3B.

FIG. 5 illustrates details of the key file KF shown in FIG. 3B.

Figure 6:
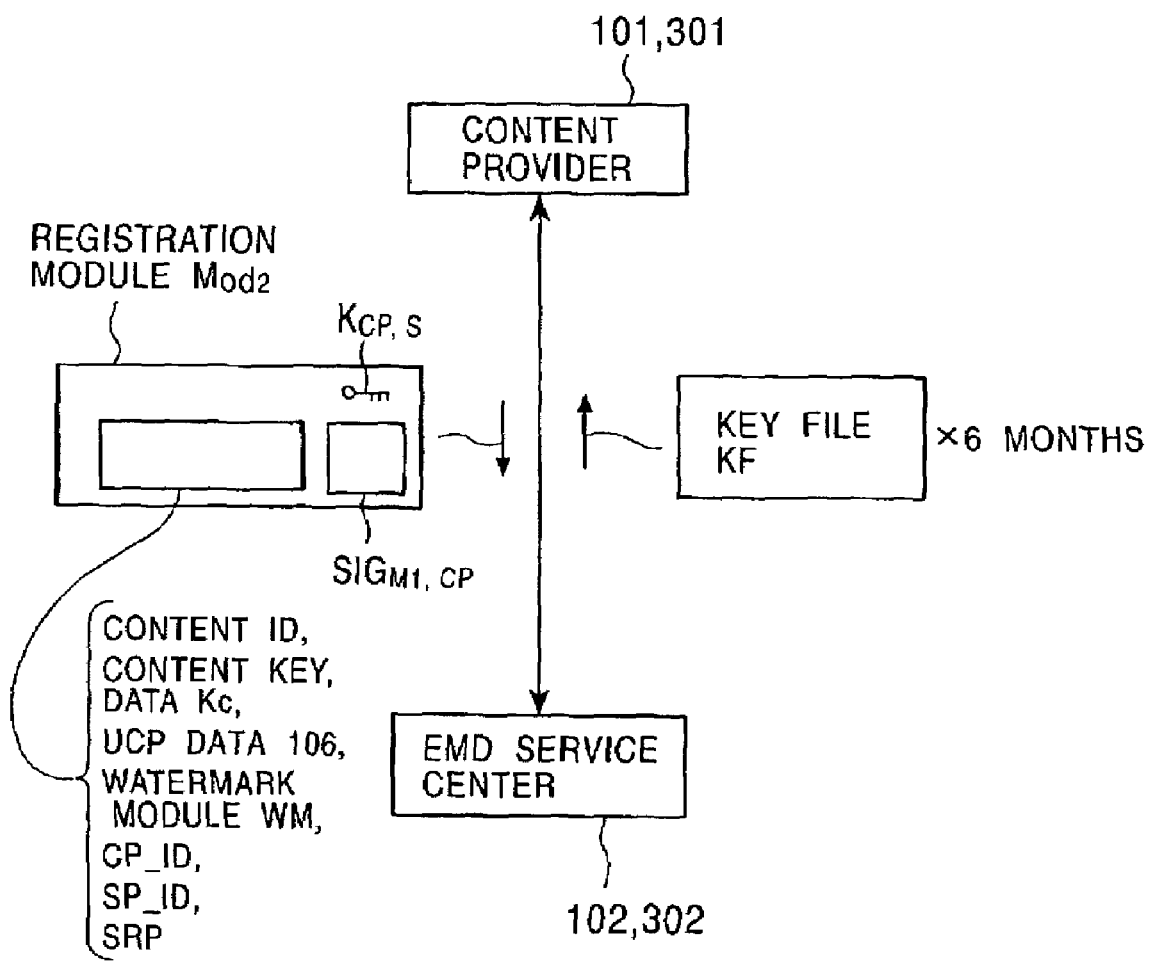
FIG. 6 illustrates the registration and the transfer of the key file between the content provider and an electronic music distribution (EMD) center shown in FIG. 1.

In this embodiment, for example, after registration processing is performed by sending a registration module Mod$_2$ from the content provider 101 to the EMD service center 102, as shown in FIG. 6, the key file KF for six months, for example, is sent from the EMD service center 102 to the content provider 101 and is stored in a key file database. In sending and receiving the registration module Mod$_2$ and the key file KF, mutual authentication is performed between the content provider 101 and the EMD service center 102, and the registration module Mod$_2$ and the key file KF are encrypted and decrypted by using session key data $K_{SES}$.

The key file KF is provided for each content data C, and is linked to the corresponding content file CF according to directory structure data DSD within the header of the content file CF, which is discussed in detail below.

The key file KF stores, as shown in FIGS. 3B and 5, a header, content key data Kc, the UCP data (license agreement conditions) 106, SAM program download containers $SDC_1$ through $SDC_3$, and signature data $SIG_{K1,ESC}$.

The signature data obtained by using the private key $K_{ESC,S}$ of the EMD service center 102 may be signature data $SIG_{K1,ESC}$ for all the data stored in the key file KF, as shown in FIG. 3B. Alternatively, the signature data may be separately provided, as shown in FIG. 5, for information from the header to the key file, for the content key Kc and the UCP data 106, and for the SAM program download containers SDC.

The content key data Kc and the UCP data 106, and the SAM program download containers $SDC_1$ through $SDC_3$ are encrypted with the use of the license key data $KD_1$ through $KD_6$ of corresponding periods.

The UCP data 106 may not be stored in the key file KF, in which case, it is provided with signature data without being encrypted by the license key data.

The header data contains, as shown in FIG. 5, a synchronization signal, a content ID, signature data for verifying the content ID by using the private key $K_{ESC,S}$ of the EMD service center 102, directory structure data, hyperlink data, information concerning the key file KF, and signature data for verifying the directory structure data by using the private key $K_{ESC,S}$ of the EMD service center 102.

Figure 7:
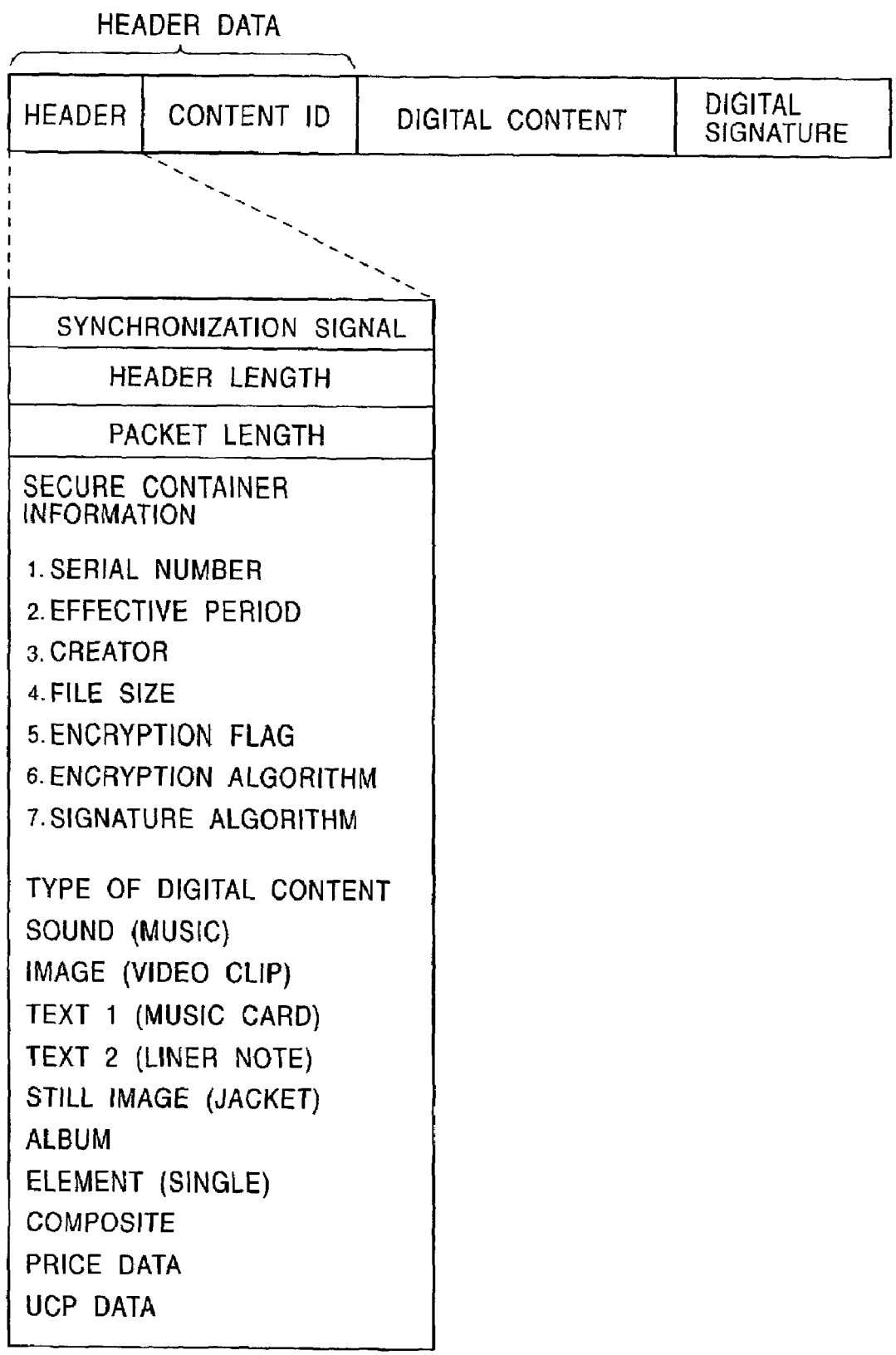
FIG. 7 illustrates header data contained in the content file.

Various types of information may be contained in the header data, and may be variable according to the situation. For example, information shown in FIG. 7 may be contained.

Figure 8:
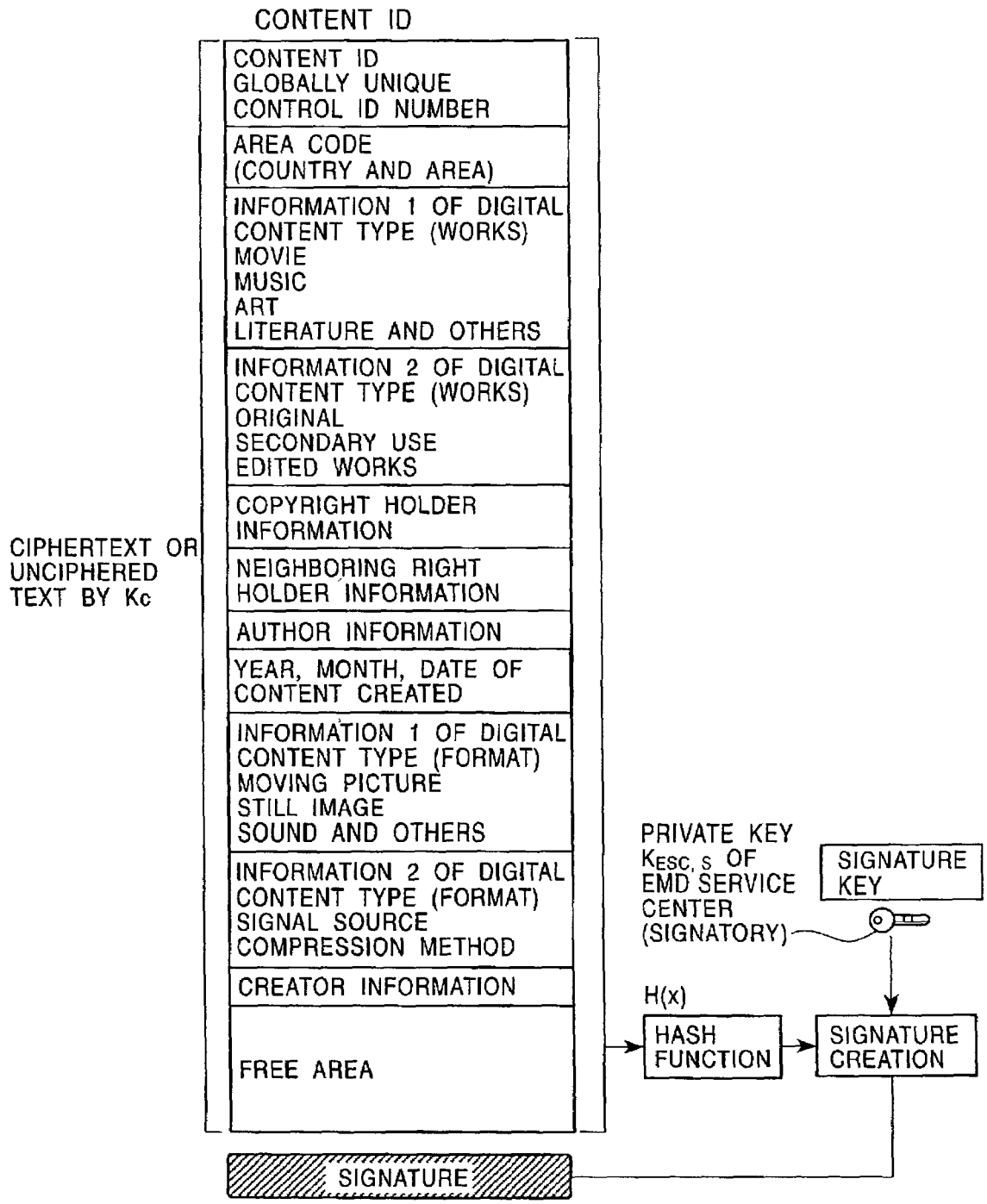
FIG. 8 illustrates a content ID.

The content ID may store information shown in FIG. 8. The content ID is created in the EMD service center 102 or the content provider 101, and the signature data obtained by using the private key data $K_{ESC,S}$ of the EMD service center 102, as shown in FIG. 8, or the signature data obtained with the private key data $K_{CP,S}$ of the content provider 101 is attached to the content ID. The content ID may be created either in the content provider 101 or the EMD service center 102.

The directory structure data represents a relationship among the content files CF and a relationship between the content file CF and the key file KF within the secure container 104.

Figure 9:
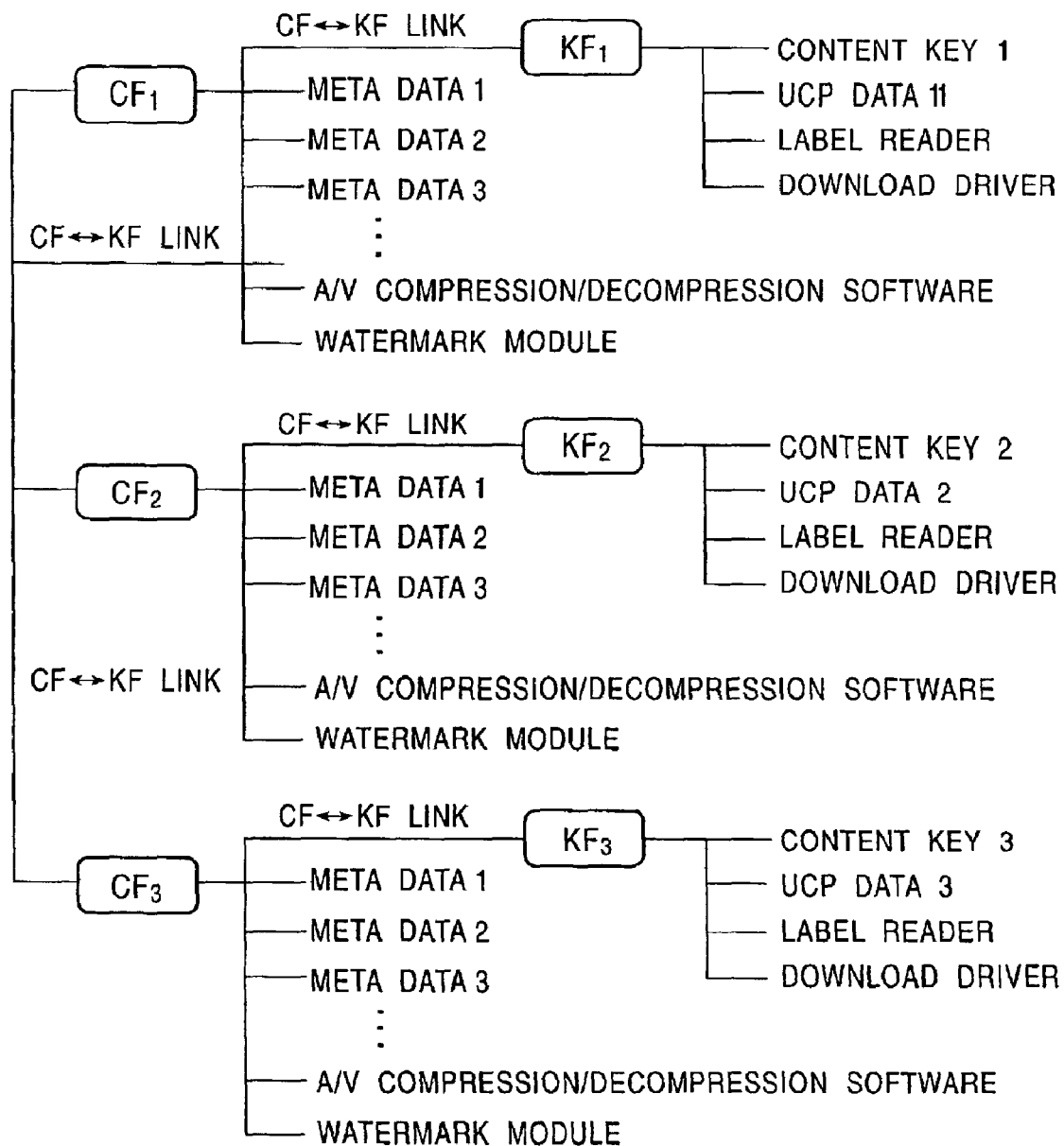
FIG. 9 illustrates the directory structure of the secure container.

For example, if content files $CF_1$ through $CF_3$ and the corresponding key files $KF_1$ through $KF_3$ are stored in the secure container 104, a link between the $CF_1$ through $CF_3$ and a link between the content files $CF_1$ through $CF_3$ and the key files $KF_1$ through $KF_3$ are established, as shown in FIG. 9, by the directory structure data.

The hyperlink data represents a hierarchical structure of the key file KF and a relationship between the content files CF and the key files KF by considering all the files inside and outside the secure container 104.

Figure 10:
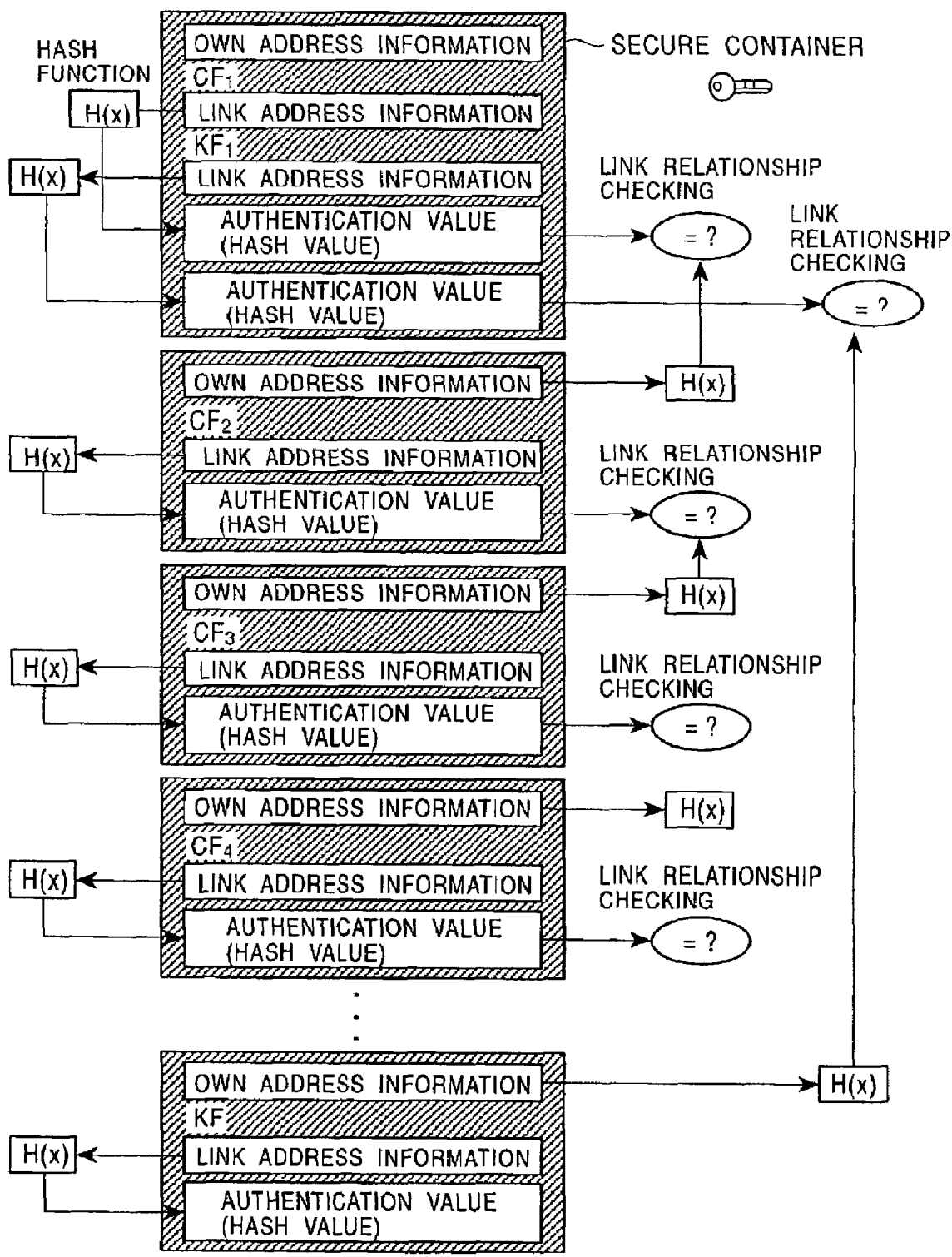
FIG. 10 illustrates the hyperlink structure of the secure container.

More specifically, address information to be linked and the authentication value (hash value) thereof are stored, as shown in FIG. 10, in the secure container 104 for each content file CF and for each key file KF. The hash value of one content file CF or one key file KF obtained by a hash function H(x) is then compared with that of another file CF or another key file KF to be linked, thereby verifying the link between the files.

The UCP data 106 is a descriptor which defines the operation rules of the content data C, for example, the suggested retailer's price (SRP) and the copying rules desired by the operator of the content provider 101.

More specifically, the UCP data 106 contains, as shown in FIG. 5, a content ID, an identifier of the content provider 101 CP_ID, the effective date of the UCP data 106, the communication address of the EMD service center 102, use-space research information, the SRP, the usage policy, the UCS information, the UCS information for demonstrating the product, and signature data for the above-described information.

The UCS information indicates an accepted purchase mode selected from various purchase modes, for example, re-distribution, pay per use, sell through, time limited sell through, sell through pay per play N, pay per time, pay per use for a SCMS device, pay per block, etc.

In the second embodiment, which is discussed below, in sending a secure container 304 to a user home network 303 via a service provider 310, the UCP data 106 contains the identifier of the service provider 310 SP_ID which is provided with the secure container 104 by a content provider 301.

The SAM program download containers $SDC_1$ through $SDC_3$ stores, as shown in FIG. 5, a download driver indicating the procedure for downloading the programs within the SAMs $105_1$ through $105_4$, a label reader, such as UCP-L (label). R (Reader), representing the syntax (grammar) of the UCP data U106, lock key data for locking or unlocking of the writing and the erasing of each block data stored in a storage unit 192 (a flash read only memory (ROM), such as a mask ROM 1104 or a non-volatile memory 1105) built in each of the SAMs $105_1$ through $105_4$, and signature data for the above-described information. The mask ROM 1104 or the non-volatile memory 1105 controls the writing and the erasing of the storage data in units of blocks based on the lock key data.

A description is now given of the mode in which the secure container 104 is supplied from the content provider 101 to the user home network 103.

As discussed above, the content provider 101 supplies the secure container 104 online or offline to the user home network 103.

When the content provider 101 supplies the secure container 104 online to the network device $160_1$ of the user home network 103, the following process is taken. The content provider 101 mutually authenticates with the network device $160_1$ so as to share the session key (common key) $K_{SES}$, and encrypts the secure container 104 by using the session key $K_{SES}$ and sends it to the EMD service center 102. The session key $K_{SES}$ is newly created every time mutual authentication is performed.

As the communication protocol for sending the secure container 104, a Multimedia and Hypermedia information coding Experts Group (MHEG) protocol is used for a digital broadcast, or extensible markup language (XML), synchronized multimedia integration language (SMIL), or hypertext markup language (HTML) may be used for the Internet. The secure container 104 is embedded within the corresponding protocol according to a tunneling technique without depending on the coding method.

Accordingly, the format of the secure container 104 does not have to match the communication protocol, thereby increasing the flexibility in selecting the format of the secure container 104.

The communication protocol used for sending the secure container 104 from the content provider 101 to the user home network 103 is not restricted to the above-described protocols.

In this embodiment, as the modules built in the content provider 101, the EMD service center 102, and the network device $160_1$ for communicating with each other, tamper-free or high tamper-resistant communication gateways which are protected from being monitored are used.

In contrast, when the content provider 101 supplies the secure container 104 offline to the user home network 103, the secure container 104 is recorded on a recording medium (ROM or RAM), which is discussed in detail below, and the contents of the ROM or RAM is then supplied to the user home network 103 via a communication path.

Figure 11:
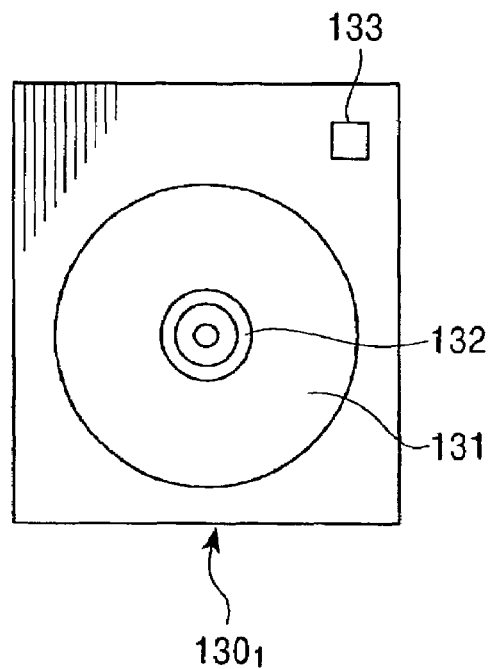
FIG. 11 illustrates one example of a recording medium (ROM) used in the first embodiment.

FIG. 11 illustrates a recording medium (ROM) $130_1$ used in this embodiment.

The recording medium (ROM) $130_1$ has a ROM area 131, a secure RAM area 132, and a medium SAM 133. The content file CF shown in FIG. 3A is stored in the ROM area 131.

The secure RAM area 132 is an area which requires a predetermined permission (authentication) to make access, and stores signature data created by using as arguments the key file KF shown in FIG. 3B, the public-key certificate data $CER_{CP}$ shown in FIG. 3C, and storage key data $K_{STR}$ having a unique value according to the type of machine, by utilizing a message authentication code (MAC) function. The secure RAM area 132 also stores data obtained by encrypting the key file KF and the public-key certificate data $CER_{CP}$ by using medium key data $K_{MED}$ having a value unique to the recording medium.

The secure RAM area 132 also stores public key certificate revocation data for specifying the content provider 101 and the SAMs $105_1$ through $105_4$ which have become invalid due to an illegal action.

In communicating between the medium SAM used in this embodiment and a medium drive SAM 260, which is discussed below, one SAM compares its revocation list with that of the other SAM and determines when the lists were created. The revocation list created earlier is updated by the other revocation list.

The secure RAM area 132 stores the UCS data 166 which is created when the purchase/usage mode of the content data C is determined in the SAMs $105_1$ through $105_4$ of the user home network 103. By storing the UCS data 166 in the secure RAM area 132, the recording medium (ROM) $130_1$ in which the purchase/usage mode is determined can be provided.

The medium SAM 133 stores, for example, the media ID, which is the identifier of the recording medium (ROM) $130_1$, and the medium key data $K_{MED}$. The medium SAM 133 has, for example, a mutual authentication function.

Figure 12:
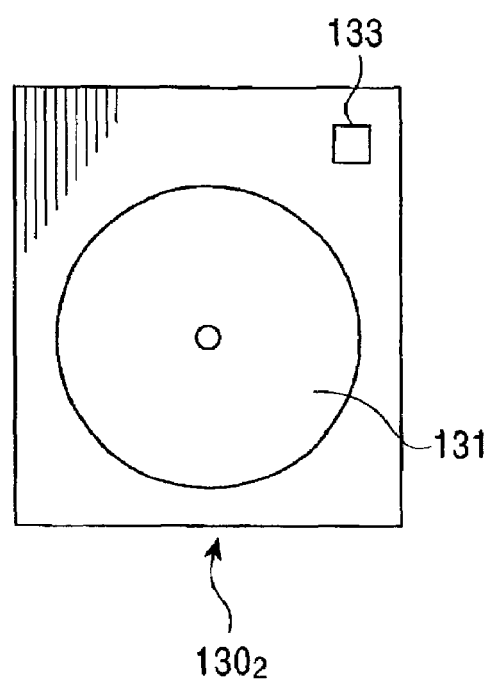
FIG. 12 illustrates another example of a recording medium (ROM) used in the first embodiment.
Figure 13:
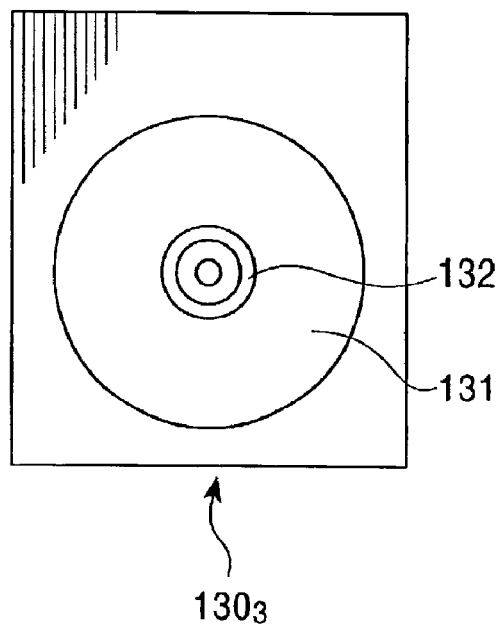
FIG. 13 illustrates still another example of a recording medium (ROM) used in the first embodiment.

The recording medium (ROM) usable in this embodiment may also be a recording medium (ROM) $130_2$ shown in FIG. 12 or a recording medium (ROM) $130_3$ shown in FIG. 13.

The recording medium (ROM) $130_2$ illustrated in FIG. 12 has a ROM area 131 and a medium SAM 133 having an authentication function, but is not provided with a secure RAM area 132, unlike the recording medium (ROM) $130_1$ shown in FIG. 11. If the recording medium (ROM) $130_2$ is used, the content file CF is stored in the ROM area 131 and the key file KF is stored in the medium SAM 133.

The recording medium (ROM) $130_3$ illustrated in FIG. 13 has a ROM area 131 and a secure RAM area 132, but is not provided with a medium SAM 133, unlike the recording medium (ROM) $130_1$ shown in FIG. 11. If the recording medium (ROM) $130_3$ is used, the content file CF is stored in the ROM area 131, and the key file KF is stored in the secure RAM area 132. Authentication is not performed with the corresponding SAM.

Instead of a ROM recording medium, a RAM recording medium may be employed in this embodiment.

Figure 14:
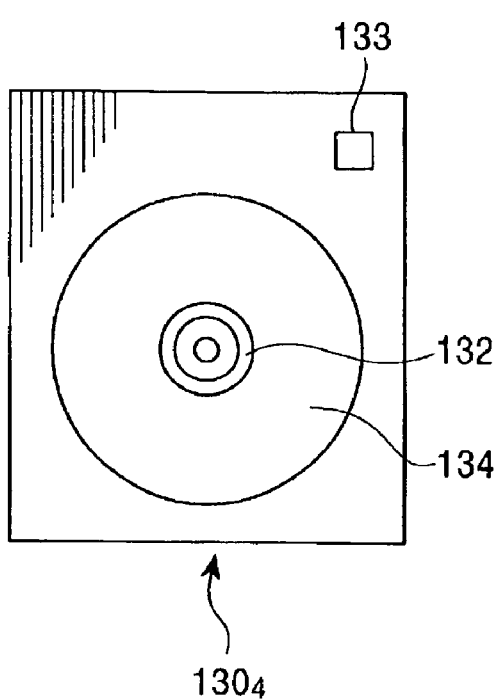
FIG. 14 illustrates an example of a recording medium (RAM) used in the first embodiment.

As the RAM recording medium usable in this embodiment, a recording medium (RAM) $130_4$ having a medium SAM 133, a secure RAM area 132, and an unsecured RAM area 134 may be used, as shown in FIG. 14. In this recording medium (RAM) $130_4$, the medium SAM 133 has an authentication function, and the secure RAM area 132 stores the key file KF. The unsecured RAM area 134 stores the content file CF.

Figure 15:
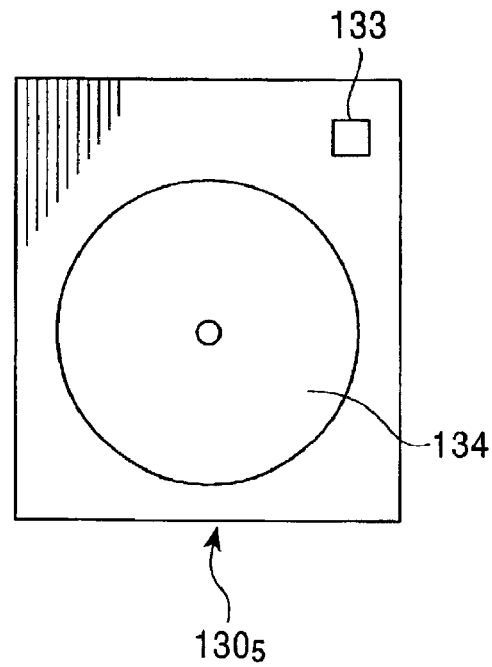
FIG. 15 illustrates another example of a recording medium (RAM) used in the first embodiment.
Figure 16:
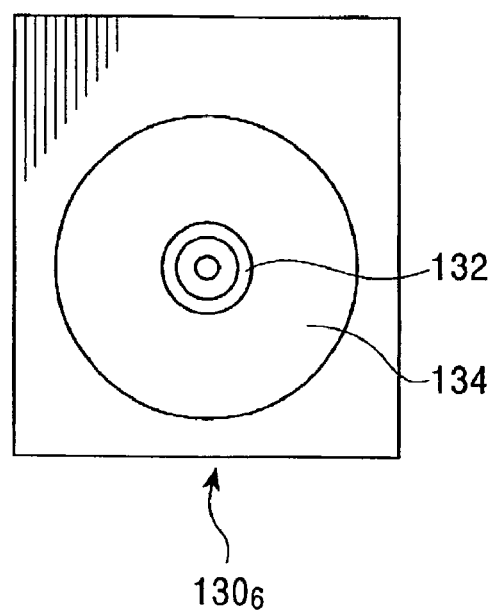
FIG. 16 illustrates still another example of a recording medium (RAM) used in the first embodiment.

Alternatively, a recording medium (RAM) $130_5$ shown in FIG. 15 and a recording medium (RAM) $130_6$ shown in FIG. 16 may be employed.

The recording medium (RAM) $130_5$ shown in FIG. 15 includes an unsecured RAM area 134 and a medium SAM 133 having an authentication function, but is not provided with a secure RAM area 132, unlike the recording medium (RAM) $130_4$ shown in FIG. 14. In using the recording medium (RAM) $130_5$, the content file CF is stored in the unsecured RAM area 134, and the key file KF is stored in the medium SAM 133.

The recording medium (RAM) $130_6$ includes a secure RAM area 132 and an unsecured RAM area 134, but is not provided with a medium SAM 133, unlike the recording medium (RAM) $130_4$ shown in FIG. 14. In using the recording medium (RAM) $130_6$, the content file CF is stored in the unsecured RAM area 134, and the key file KF is stored in the secure RAM area 132. Authentication is not performed with the corresponding SAM.

As stated above, regardless of whether the content data C is distributed online via a network or offline using, for example, the recording medium $130_1$ from the content provider 101 to the user home network 103, the common format of the secure container 104 which stores the UCP data 106 is used for distributing the content data C. This enables the SAMs $105_1$ through $105_4$ of the user home network 103 to perform rights processing based on the common UCP data 106.

As also discussed above, in this embodiment, the in-band system is employed in which the content data C encrypted with the content key data Kc is stored together with the content key data Kc for decrypting the content data C in the secure container 104. According to this in-band system, it is not necessary to separately distribute the content key data Kc when the user home network 103 plays back the content data C, thereby reducing the burden in network communication. The content key data KC is encrypted with the license key data $KD_1$ through $KD_6$. However, the license key data $KD_1$ through $KD_6$ are managed in the EMD service center 102 and have already been distributed to the SAMs $105_1$ through $105_4$ of the user home network 103 when the SAMs $105_1$ through $105_4$ first accessed the EMD service center 102. This enables the user home network 103 to use the content data C offline without accessing the EMD service center 102 online.

In the present invention, the out-of-band system may be employed in which the content data C and the content key data Kc are separately supplied to the user home network 103, which will be described below.

The process for creating the secure container 104 by the content provider 101 is as follows.

Figure 17:
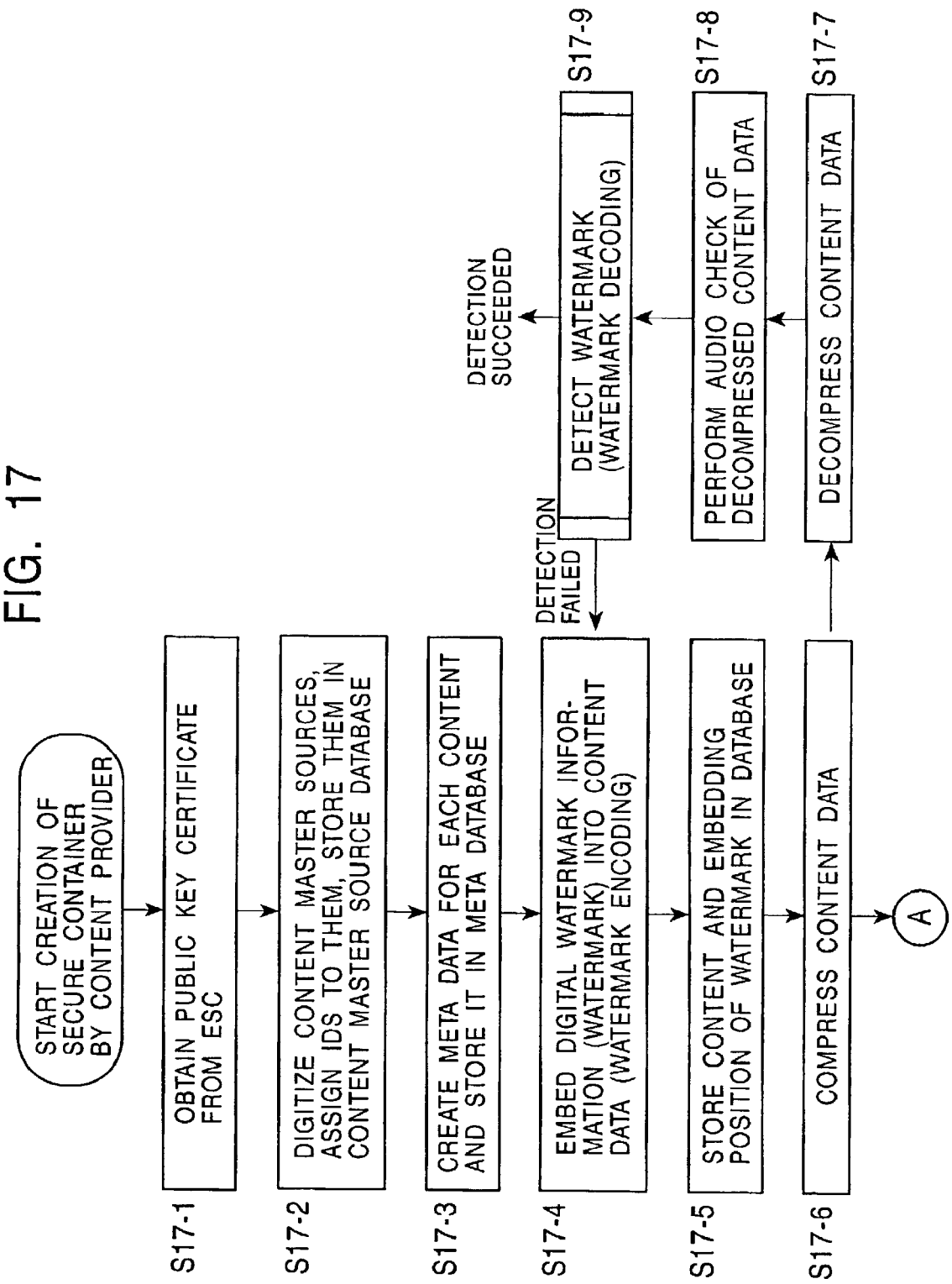
FIGS. 17, 18, and 19 are a flow chart illustrating processing for creating the secure container by the content provider.
Figure 18:
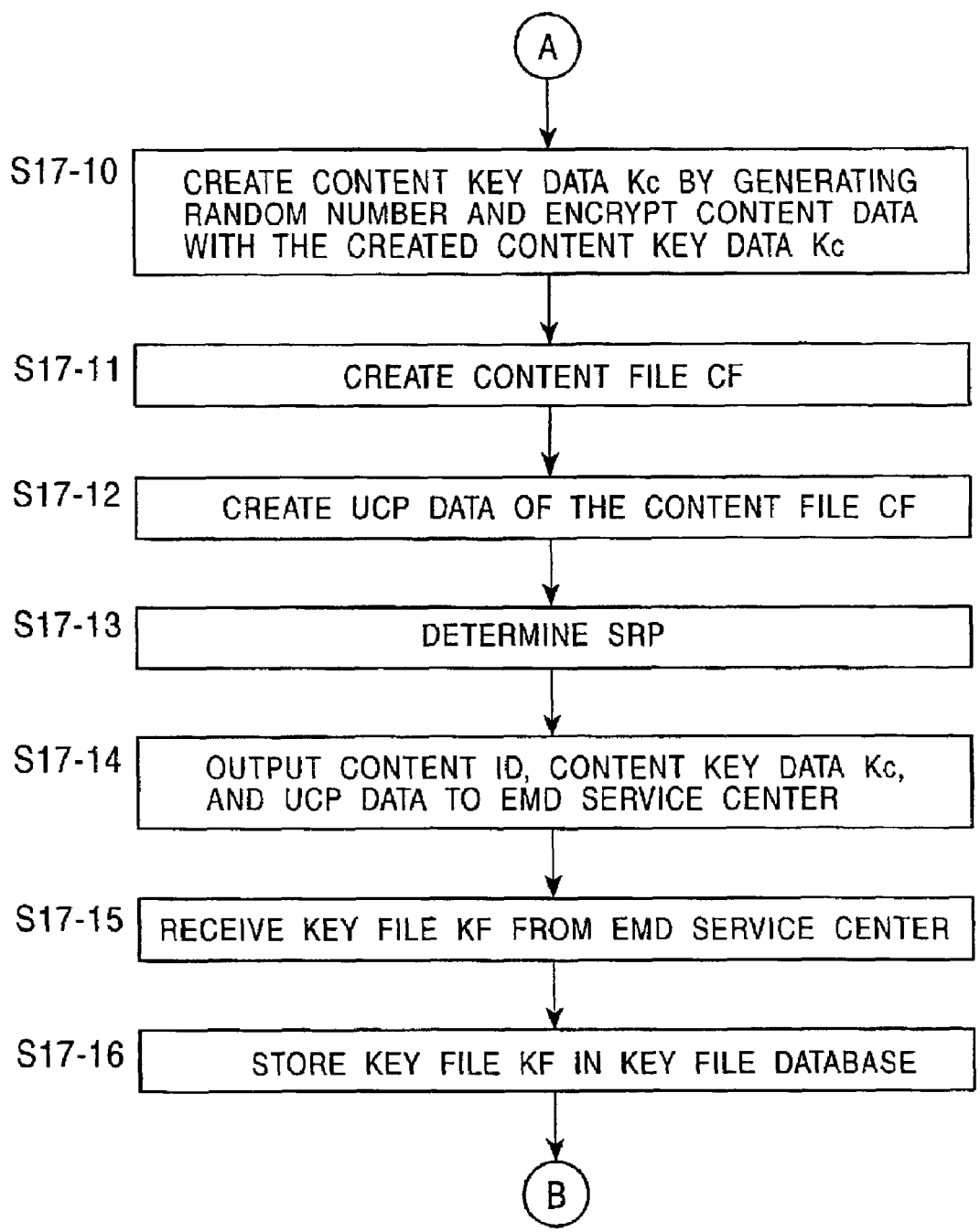
Figure 19:
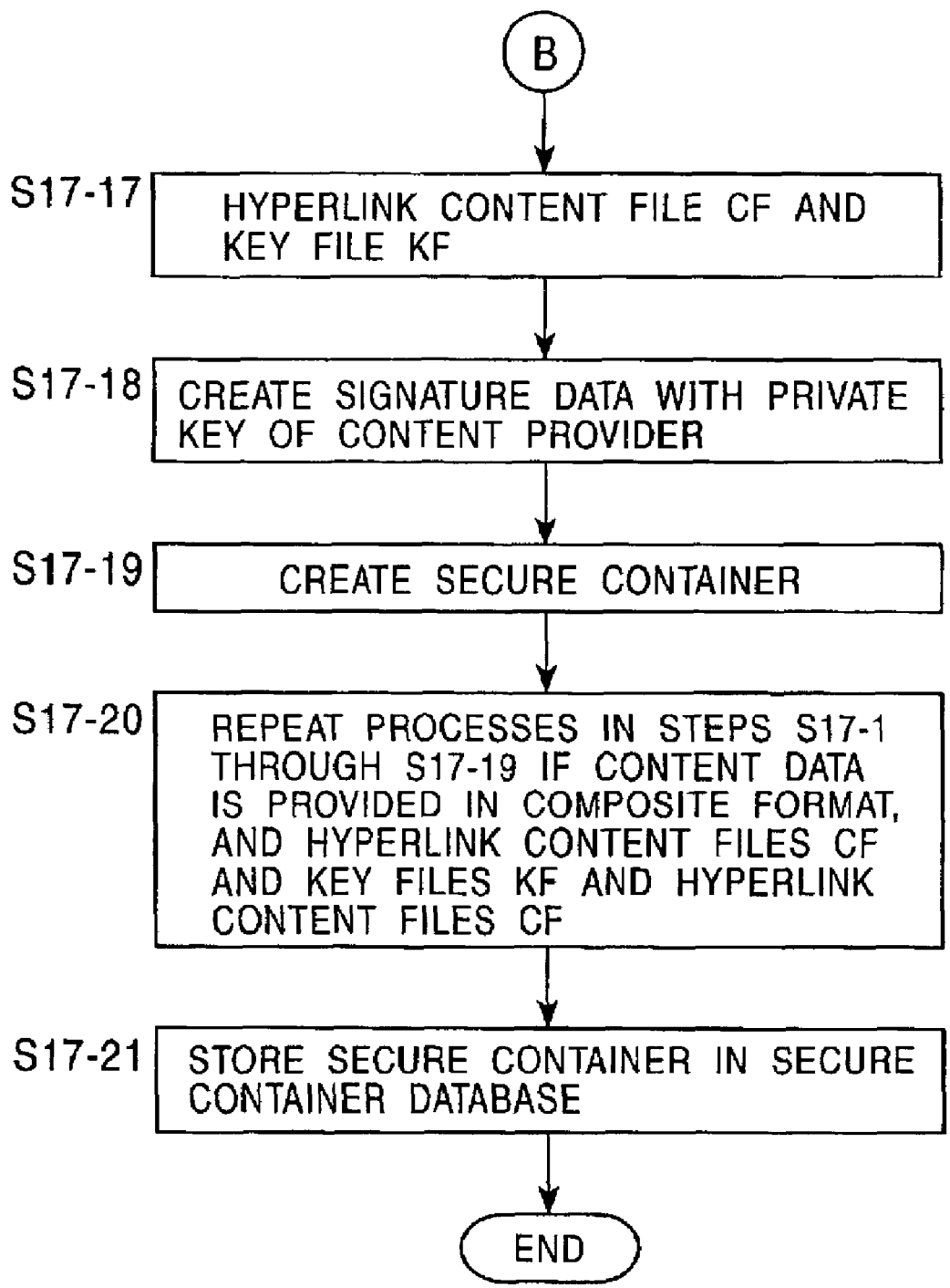

FIGS. 17 through 19 are a flow chart illustrating the above-described process.

In step S17-1 (FIG. 17), the content provider 101 registers offline in the EMD service center 102 by using the ID certificate of the content provider 101 or the bank account for settling the account, and acquires the globally unique identifier CP_ID. The content provider 101 has already obtained the public key certificate $CER_{CP}$ of the content provider 101 from the EMD service center 102.

In step S17-2, the content provider 101 then digitizes content master sources, such as content data to be authored and prestored legacy content data, and assigns the content IDs to such data. The content master sources are then stored in a content master source database and are centrally managed.

Then, in step S17-3, the content provider 101 creates meta data Meta for each of the centrally managed content master sources and stores it in a meta database.

Subsequently, in step S17-4, the content provider 101 reads content data, i.e., a content master source, from the content master source database, and embeds digital watermark information in the content data.

In step S17-5, the content provider 101 stores the content and the embedding position of the digital watermark information embedded in step S17-4 in a predetermined database.

Then, in step S17-6, the content data having the embedded digital watermark information is compressed.

In step S17-7, the content provider 101 creates content data by decompressing the content data compressed in step S17-6.

In step S17-8, the content provider 101 performs an audio check on the compressed content data.

Thereafter, in step S17-9, the content provider 101 detects the digital watermark embedded into the content data based on the content and the embedding position of the digital watermark information stored in the database in step S17-5.

If both the audio check and the detection of the digital watermark information have been successfully performed, the content provider 101 executes processing of step S17-10 (FIG. 18). If either of the above-described processing has failed, the processing of step S17-4 is repeated.

In step S17-10, the content provider 101 generates a random number to create the content key data Kc and retains it. The content provider 101 also encrypts the content data compressed in step S17-6 by using the content key data Kc.

In step S17-11, the content provider 101 creates the content file CF shown in FIG. 3A and stores it in the content file database.

Then, in step S17-12, the content provider 101 creates the UCP data 106 concerning the content data C.

In step S17-13, the content provider 101 determines the SRP and stores it in the database.

In step S17-14, the content provider 101 outputs the content ID, the content key data Kc, and the UCP data 106 to the EMD service center 102.

Subsequently, in step S17-15, the content provider 101 receives the key file KF encrypted with the license key data $KD_1$ through $KD_3$ from the EMD service center 102.

In step S17-16, the content provider 101 stores the received key file KF in the key file database.

In step S17-17 (FIG. 19), the content provider 101 hyperlinks the content file CF and the key file KF.

In step S17-18, the content provider 101 creates the signature data $SIG_{6,CP}$ from the hash value of the content file CF by using the private key data $K_{CP,S}$. The content provider 101 also creates the signature data $SIG_{7,CP}$ from the hash value of the key file KF by using the private key data $K_{CP,S}$.

In step S17-19, the content provider 101 generates the secure container 104 storing the content file CF, the key file KF, the public-key certificate data $CER_{CP}$, the signature data $SIG_{6,CP}$, $SIG_{7,CP}$, and $SIG_{1,ESC}$, as shown in FIGS. 3A through 3C.

If it is desired that content data is provided in a composite format including a plurality of secure containers, each secure container 104 is created by repeating the processes in step S17-1 through S17-19. Then, in step S17-20, a relationship between the content files CF and the key files KF is hyperlinked, and also a relationship between the content files CF is hyperlinked.

Thereafter, in step S17-21, the content provider 101 stores the created secure container 104 in the secure container database.

[EMD Service Center 102]

FIG. 20 illustrates the basic functions of the EMD service center 102. Primarily, as shown in FIG. 20, the EMD center 102 supplies the license key data to the content provider 101 and the SAMS $105_1$ through $105_4$, issues public-key certificate data $CER_{CP}$, and $CER_{SAM1}$ through $CER_{SAM4}$, creates the key file CF, and performs payment settlement (profit-distribution) based on the usage log data 108.

Supply of License Key Data

A description is first given of the process for sending the license key data from the EMD service center 102 to the SAMs $105_1$ through $105_4$ of the user home network 103.

The EMD service center 102 reads the license key data $KD_1$ through $KD_3$ regularly, for example, for three months, from the key database, and creates the signature data $SIG_{KD1,ESC}$ through $SIG_{KD3,ESC}$ from the hash values by using the private key data $K_{ESC,S}$ of the EMD service center 102.

The EMD service center 102 then encrypts the license key data $KD_1$ through $KD_3$ for three months and the signature data $SIG_{KD1,ESC}$ through $SIG_{KD3,ESC}$ by using the session key data $K_{SES}$, which is obtained by performing mutual authentication with the SAMs $105_1$ through $105_4$, and sends the encrypted data to the SAMS $105_1$ through $105_4$.

Similarly, the EMD service center 102 sends, for example, the license key data $KD_1$ through $KD_6$ for six months, to the content provider 101.

Issuing of Public-Key Certificate Data

A description is given below of the process to be executed when the EMD service center 102 receives a request to issue the public-key certificate data $CER_{CP}$ from the content provider 101.

Upon receiving the identifier of the content provider 101 CP_ID, the public key data $K_{CP,P}$ and the signature data $SIG_{9,CP}$ from the content provider 101, the EMD service center 102 decrypts such data by using the session key data $K_{SES}$ obtained by performing mutual authentication with the content provider 101.

After verifying the integrity of the decrypted signature data $SIG_{9,CP}$, the EMD service center 102 makes a determination, based on the identifier CP_ID and the public key data $K_{CP,P}$, whether the content provider 101, which has requested the issuing of the public-key certificate data, is registered in a CP database.

Then, the EMD service center 102 reads the X.509-format public-key certificate data $CER_{CP}$ of the content provider 101 from the certificate database, and creates the signature data $SIG_{1,ESC}$ from the hash value of the public-key certificate data $CER_{CP}$ by using the private key $K_{ESC,S}$ of the EMD service center 102.

The EMD service center 102 encrypts the public-key certificate data $CER_{CP}$ and the signature data $SIG_{1,ESC}$ by using the session key data $K_{SES}$ obtained by performing mutual authentication with the content provider 101, and sends the encrypted data to the content provider 101.

The process to be performed when the EMD service center 102 receives a request from the SAM $105_1$ to issue the public-key certificate data $CER_{SAM1}$ is similar to that when receiving a request to issue the public-key certificate data $CER_{CP}$ from the content provider 101, except that processing is performed with the SAM $105_1$. The public-key certificate data $CER_{SAM1}$ is also described in X.509 format.

In the present invention, if it is designed that the private key data $K_{SAM1,S}$ and the public key data $K_{SAM1,P}$ are stored in a storage unit of the SAM $105_1$ when shipping the SAM $105_1$, the EMD service 102 may create the public-key certificate data $CER_{SAM1}$ of the public key data $K_{SAM1,P}$ when shipping the SAM $105_1$. In this case, the created public-key certificate data $CER_{SAM1}$ may be stored in the storage unit of the SAM $105_1$ when shipping the SAM $105_1$.

Creating of Key File KF

Upon receiving the registration module, $Mod_2$ shown in FIG. 6 from the content provider 101, the EMD service center 102 decodes the registration module $Mod_2$ by using the session key $K_{SES}$ obtained by conducting mutual authentication with the content provider 101.

The EMD service center 102 then verifies the integrity of the signature data $SIG_{M1,CP}$ by using the public key data $K_{CP,P}$ read from the key database.

Subsequently, the EMD service center 102 registers in the UCP database the UCP data 106, the content key data Kc, the digital watermark information control data WM, and the SRP stored in the registration module $Mod_2$.

The EMD service center 102 encrypts the content key data Kc, the UCP data 106, and the SAM program download containers $SDC_1$ through $SDC_3$ by using the license key data $KD_1$ through $KD_6$ of corresponding periods read from a key server.

The EMD service center 102 then creates the signature data $SIG_{K1,ESC}$ from the hash values of the header data, the content key data Kc, the UCP data 106, and the SAM program download containers $SDC_1$ through $SDC_3$ by using the private key data $K_{ESC,S}$ of the EMD service center 102.

In this manner, the EMD service center 102 creates the key file KF shown in FIG. 3B and stores it in the KF database.

Thereafter, the EMD service center 102 reads the key file KF from the KF database and encrypts it by using the session key data $K_{SES}$ obtained by conducting mutual authentication with the content provider 101, and then sends it to the content provider 101.

Settlement Processing

Payment settlement performed in the EMD service center 102 is as follows.

Upon receiving from, for example, the SAM $105_1$ of the user home network 103, the usage log data 108 and signature data $SIG_{200,SAM1}$ thereof, the EMD service center 102 decrypts such data by using the session key data $K_{SES}$ obtained by performing mutual authentication with the SAM $105_1$, thereby verifying the signature data $SIG_{200,SAM1}$ created by the public key data $K_{SAM1}$ of the SAM $105_1$.

FIG. 21 illustrates data described in the usage log data 108. The usage log data 108 contains, as illustrated in FIG. 21, for example, an ESC_content ID, which is a globally unique identifier provided by the EMD service center 102, for the content data C stored in the secure container 104, a CP_content ID, which is a globally unique identifier provided by the content provider 101, for the content data C, a user ID, which is an identifier of the user who has received the secure container 104, user information, a SAM_ID, which is an identifier of each of the SAMs $105_1$ through $105_4$ received the secure container 104, a HNG_ID, which is an identifier of a home network group to which the corresponding SAM belongs, discount information, tracing information, a price tag, a CP_ID of the content provider 101 which has provided the content data C, a service provider (portal) ID, a hardware provider ID, an identifier of a recording medium Media_ID which records the secure container 104, a component ID, which is an identifier of a predetermined component, such as a compression method for the secure container 104, an identifier of a license owner LH_ID of the secure container 104, an identifier of the EMD service center 102 ESC_ID which performs payment settlement of the secure container 104.

In the second embodiment, which is discussed below, in addition to the above-described data contained in the usage log data 108, usage log data 308 includes an identifier SP_content ID provided by the service provider 310 for the content data C, and an identifier of the service provider 310 SP_ID which has distributed the content data C.

If it is necessary that the payment made by the user of the user home network 103 is distributed to neighboring rights holders other than the content provider 101, for example, license owners for the compression method, the recording medium, etc., the EMD service center 102 determines the amount of payment according to a predetermined distribution rate, and creates the settlement report data and settlement request data 152 based on the determined amounts of payment. The distribution rate may be created for each content data stored in the secure container 104.

Thereafter, the EMD service center 102 performs payment settlement based on the SRP and the sales price contained in the UCP data 106 read from the UCP database and also based on the usage log data 108, and creates the settlement request data 152 and the settlement report data 107.

The settlement request data 152 is authorized data which can request the payment from the settlement organization 91 based on the aforementioned data, and if the payment made by the user is to be distributed to a plurality of rights holders, the settlement request data 152 is created for each rights holder.

The EMD service center 102 then decrypts the settlement request data 152 and signature data $SIG_{99}$ thereof through mutual authentication and using the session key data $K_{SES}$, and then sends them to the settlement organization 91 via the payment gateway 90 shown in FIG. 1.

Accordingly, the amount of payment indicated in the settlement request data 152 is paid to the content provider 101.

The EMD service center 102 sends the settlement report data 107 to the content provider 101.

[User Home Network 103]

The user home network 103 has, as illustrated in FIG. 1, the network device $160_1$ and the A/V machines $160_2$ through $160_4$. The network device $160_1$ has the built-in SAM $105_1$. The A/V machines $160_2$ through $160_4$ have the built-in SAMs $105_2$ through $105_4$, respectively. The SAMs $105_2$ through $105_4$ are connected to each other via the bus 191, for example, an IEEE-1394 serial interface bus.

A network communication function may be provided for the A/V machines $160_2$ through $160_4$, though it is not essential. If a network communication function is not provided, the A/V machines $160_2$ through $160_4$ may simply use the network communication function of the network device $160_1$ via the bus 191. Alternatively, the user home network 103 may include only A/V machines without a network function.

Details of the network device $160_1$ are as follows.

Figure 22:
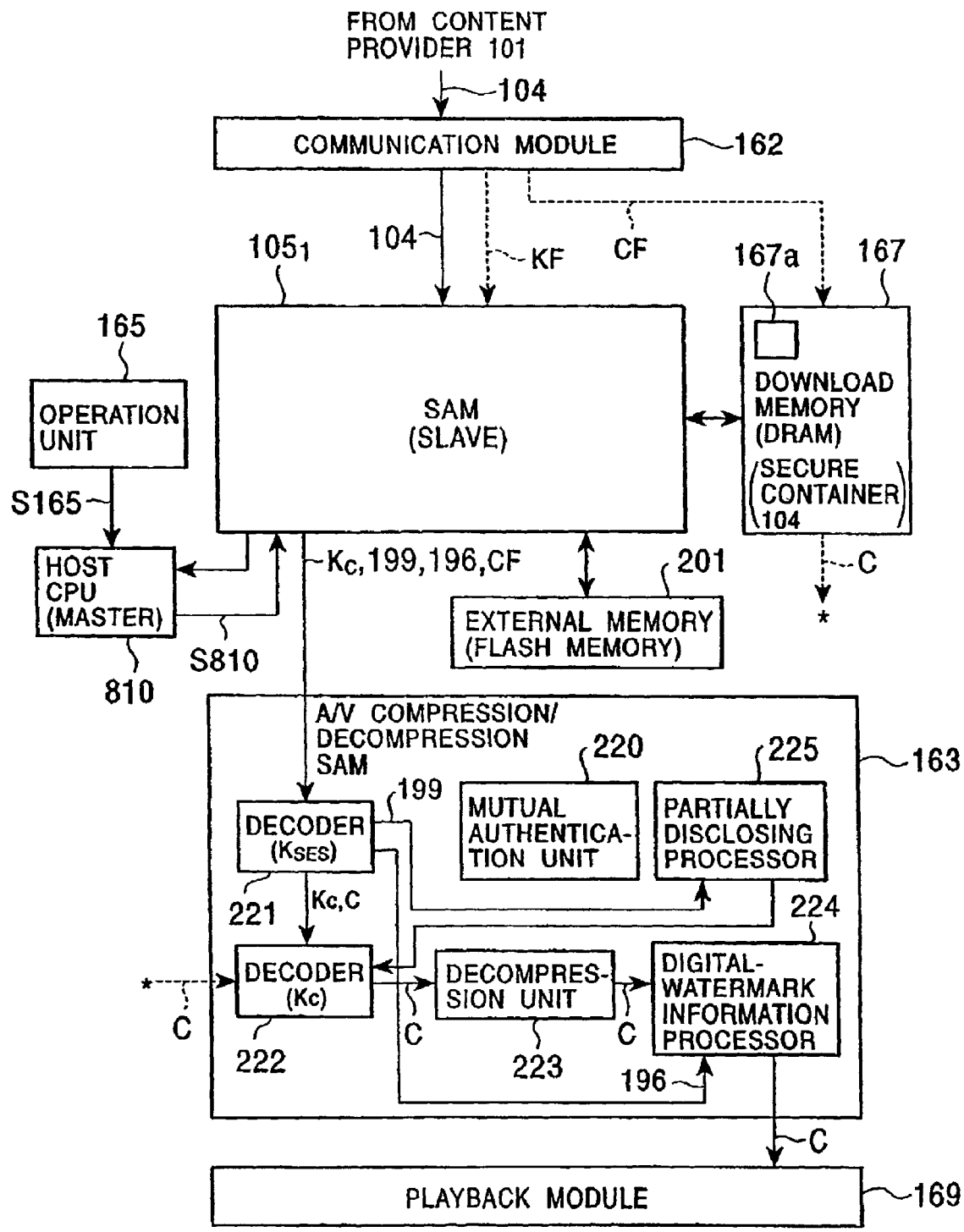
FIG. 22 is a block diagram illustrating an example of the configuration of a network device within a user home network shown in FIG. 1.

FIG. 22 is a block diagram of the network device $160_1$. The network device $160_1$ is formed of the SAM $150_1$, a communication module 162, an A/V compression/decompression SAM 163, an operation unit 165, a download memory 167, a playback module 169, an external memory 201, and a host central processing unit (CPU) 810.

The host CPU 810 centrally controls the processing executed within the network device $160_1$, and the host CPU 810 and the SAM $105_1$ have a master-slave relationship.

The relationship between the host CPU 810 and the SAM $105_1$ is discussed in detail below with reference to FIG. 23.

Figure 23:
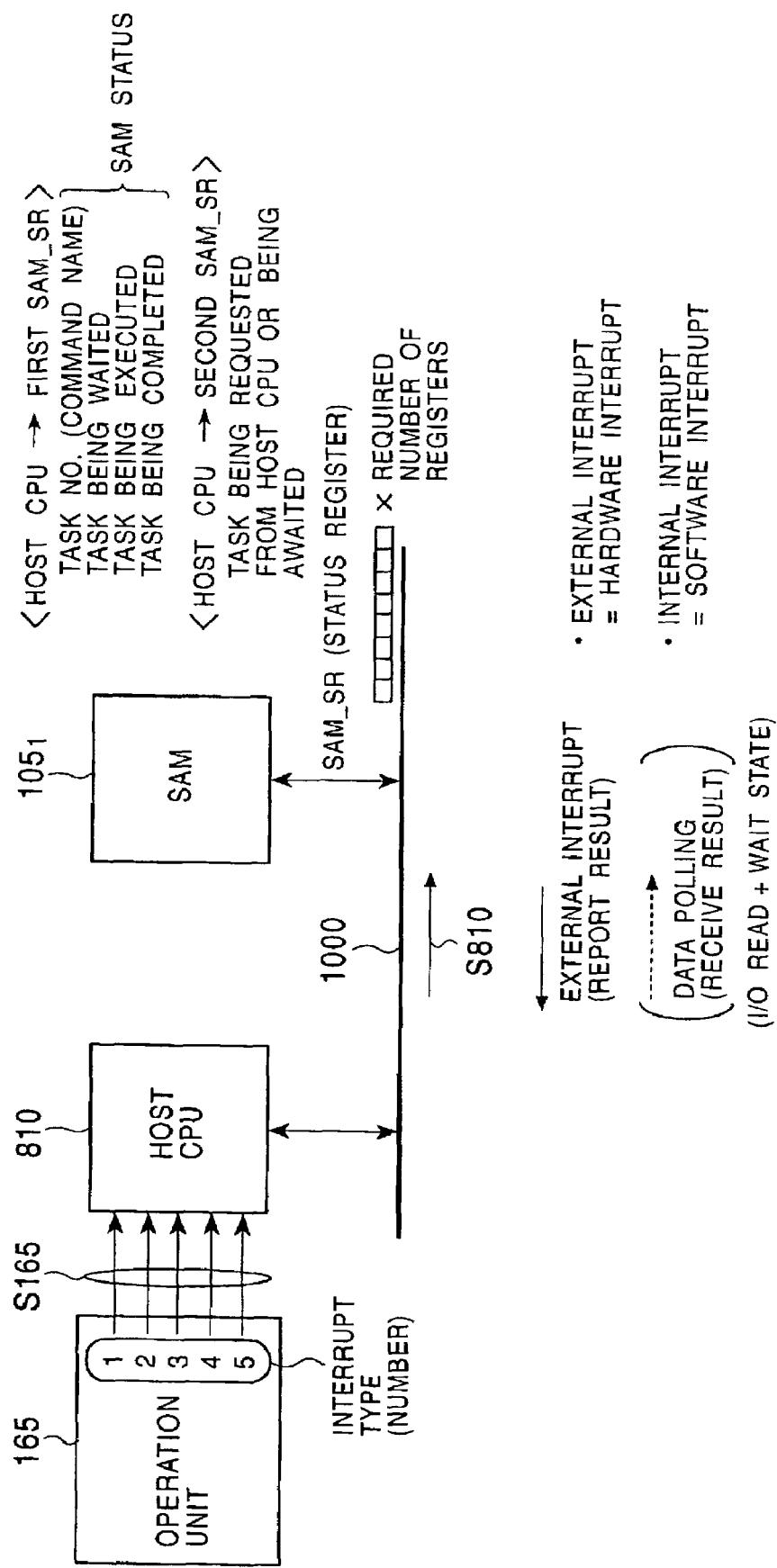
FIG. 23 illustrates the relationship between a host CPU and a SAM shown in FIG. 22.

In the network device $160_1$, as shown in FIG. 23, the host CPU 810 and the SAM $105_1$ are connected via a host CPU bus 1000.

When one of a plurality of interrupt types is selected according to the operation performed on the operation unit 165 by the user, the host CPU 810 receives an external interrupt (hardware interrupt) S165 indicating the selected interrupt.

If the task corresponding to the interrupt S165 is found to be executed by the SAM $105_1$, the host CPU 810 outputs an internal interrupt (software interrupt) S810 indicating the task to the SAM $105_1$ via the host CPU bus 1000.

Then, the SAM $105_1$ is recognized as an input/output (I/O) device by the host CPU 810, and upon receiving the internal interrupt S810, which is a function call, from the host CPU 810, the SAM $105_1$ executes the requested task and returns the execution result to the host CPU 810.

The major tasks executed by the SAM $105_1$ may include processing for purchasing content data (accounting processing), signature checking, mutual authentication, playback of content data, updating, registration, downloading, etc. Such tasks are processed within the SAM $105_1$ while being completely shielded from an external source, thereby preventing the host CPU 810 from monitoring the processed result.

The host CPU 810 knows which tasks should be requested to the SAM $105_1$ according to the type of event. More specifically, upon receiving the external interrupt S165 by the user's operation performed on the operation unit 165, such as an external key device, the host CPU 810 determines that the task by the external interrupt S165 is to be executed by the SAM $105_1$. Then, the host CPU 810 outputs the internal interrupt S810 to the SAM $105_1$ via the host CPU bus 1000 so as to request it to execute the task.

Interrupts from an I/O device, such as an external key device, for example, a commander or a keyboard, to the host CPU 810 occur asynchronously with a user program executed by the host CPU 810. Such interrupts are normally referred to as the "hardware interrupts" or "external interrupts".

Interrupts, received by the host CPU 810, for viewing and listening to the content or purchasing the content are hardware interrupts. In this case, the I/O device which generates a hardware interrupt may be a key device, such as buttons or graphic user interface (GUI) icons, of the network device $160_1$. In this embodiment, the operation unit 165 serves as such an I/O device.

On the other hand, interrupts generated by the execution of a user program (program) by the host CPU 810 are referred to as "software interrupts" or "internal interrupts".

Generally, an interrupt signal of the external interrupt S165 is output from the operation unit 165 to the host CPU 810 via a specific line for external interrupts, which is separately provided from the host CPU bus 1000.

One external interrupt S165 is differentiated from the other external interrupts S165 by assigning numbers to the I/O devices which generate interrupts. For example, for a keyboard, numbers are assigned to the individual buttons (such numbers are referred to as "interrupt types"). Upon pressing one of the buttons, the corresponding information is reported from the operation unit 165 to the host CPU 810 via the specific line, and the number of the pressed button is stored in a memory of the I/O interface. In response to the information indicating that the button has been pressed, the host CPU 810 accesses the memory of the I/O interface and identifies the interrupt type from the number of the button, thereby controlling the execution of an interrupt routine corresponding to the number of the button.

In this case, if the interrupt routine is to be executed by the SAM $105_1$, the host CPU 810 sends the internal interrupt S810 to the SAM $105_1$ to request it to execute the task.

As discussed above, tasks to be executed by the SAM $105_1$ may include:
1. Purchasing content (including purchasing keys and demonstration of the content);
2. Playback of content; and
3. downloading from the content provider 101 and the EMD service center 102 (updating, receiving usage log, and program downloading).

The host CPU 810 first receives external interrupts S165 corresponding to tasks 1, 2, and 3 from the operation unit 165 via the specific line, and outputs the corresponding internal interrupts S810 to the SAM $105_1$, so that the SAM $105_1$ executes tasks 1, 2 and 3.

The I/O devices which generate interrupts corresponding to tasks 1 and 2 are the external key device, such as the buttons or the GUIs of the network device $160_1$. In the case of task 3, it is not that a push-type downloading secure container 104 is sent from the content provider 101, but that an active pull-type secure container 104 is sent to the network device $160_1$ (client) by performing polling to access the content provider 101. Accordingly, the host CPU 810 knows that the downloaded secure container 104 is stored in the download memory 167 within the network device $160_1$. Thus, in actuality, the host CPU 810 merely generates the internal interrupt S810 and sends it to the SAM $105_1$ without receiving the external interrupt S165 from the operation unit 165.

Since the SAM $105_1$ serves as an I/O device (slave) of the host CPU 810, the main routine of the SAM $105_1$ is started when being powered on, and then, enters the standby (waiting) mode.

Subsequently, immediately when receiving the internal interrupt S810 from the host CPU 810 (master), the SAM $105_1$ begins processing the task while being completely shielded from an external source. Then, the SAM $105_1$ reports the completion of processing the task to the host CPU 810 by the external interrupt (hardware interrupt), and requests the host CPU 810 to receive the result. Accordingly, the SAM $105_1$ does not contain a user main program (user program).

The SAM $105_1$ executes processing, such as for purchasing the content, playback of the content, and downloading from the content provider 101 and the EMD service center 102, as an interrupt routine. The SAM $105_1$ generally waits in the standby mode, and upon receiving the internal interrupt S810 from the host CPU 810, the SAM $105_1$ executes the interrupt routine corresponding to the interrupt type (number) (function call command), and requests the host CPU 810 to receive the result.

More specifically, a request to execute a task from the host CPU 810 to the SAM $105_1$ by the internal interrupt S810 is made according to an I/O command, and then, the SAM $105_1$ interrupts itself based on the function call command received from the host CPU 810. In actuality, the host CPU 810 outputs the internal interrupt S810 to the SAM $105_1$ by performing the chip select for selecting the SAM $105_1$.

As discussed above, although the host CPU 810 receives the external interrupt S165 for purchasing or playing back the content, it request the SAM $105_1$ to execute the corresponding task. This is because the task involves the security, such as encryption processing, creating and checking signatures, accompanied by the processing for purchasing the key.

The interrupt routine stored in the SAM $105_1$ serves as a sub routine of the interrupt routine of the host CPU 810.

The interrupt routine executed by the host CPU 810 is a task which makes an instruction to send the internal interrupt (function call) S810 requesting the execution of the task corresponding to the external interrupt S165 to a common memory space of the SAM $105_1$.

Figure 24:
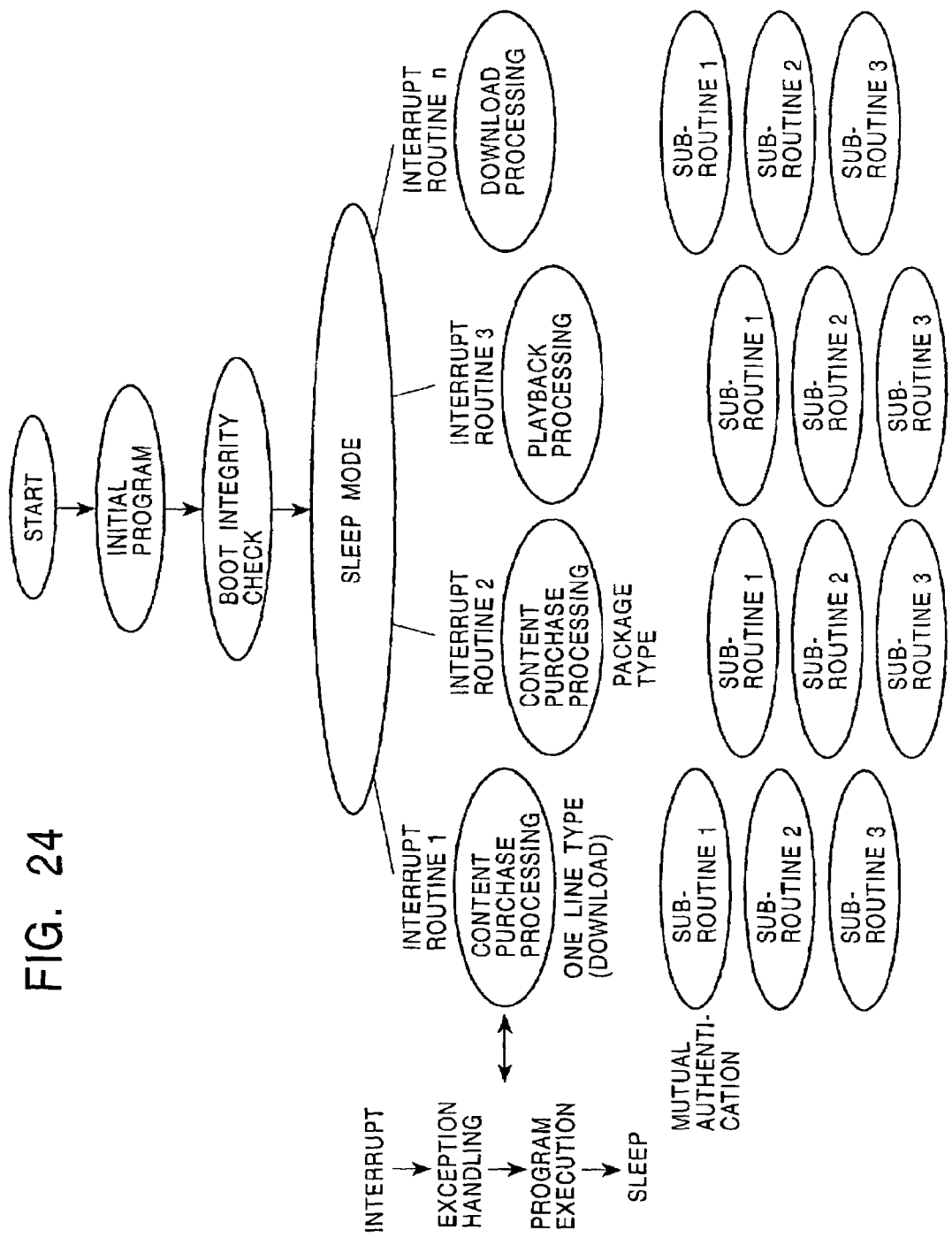
FIG. 24 illustrates the software configuration implementing a SAM.

As shown in FIG. 24, each of the interrupt routines stored in the SAM $105_1$ contains sub routines. Programs which can be shared with the other interrupt routines are preferably defined as sub-routines, thereby saving the memory space. The processing of the SAM $105_1$ may be executed in a manner similar to that executed by a CPU, such as concurrently defining sub-routines from an interrupt routine or defining second-generation sub-routines from a first-generation sub-routine.

Referring back to FIG. 23, the relationship between the host CPU 810 and the SAM $105_1$ is described. As discussed above, the host CPU 810 receives an interrupt from an I/O device, such as an external key device, as the external interrupt (hardware interrupt) S165 via a specific line.

A number is provided for each specific line, and according to the number, the corresponding interrupt vector is extracted from an interrupt vector table stored in a system memory of the host CPU 810, thereby starting the interrupt routine.

There are two kinds of interrupt types: one type is an indirect access indicating a selection number of the interrupt vector in the vector table, and the other type is a direct access indicating the start address of the interrupt routine.

If the received external interrupt indicates a task to be executed by the SAM $105_1$, the host CPU 810 outputs the internal interrupt S810 to the SAM $105_1$ and requests it to execute the task (I/O command).

The type of task is defined by a command name, and the host CPU 810 outputs the command-based internal interrupt S810 to the SAM $105_1$. When being powered on, the SAM $105_1$ initializes the program and checks the integrity of the SAM $105_1$, as shown in FIG. 24, and then, enters a sleep mode (standby mode). In the sleep mode, only the operation of the CPU is stopped, and the sleep mode is released by any interrupt. Thereafter, the status of the SAM $105_1$ is shifted to a program execution status via an execution handling status. Upon receiving an internal interrupt from the host CPU 810, the SAM $105_1$ executes the corresponding task and returns the result to the host CPU 810.

In response to the result from the SAM $105_1$, the host CPU 810 starts to take another action. However, even while the SAM $105_1$ is executing one task, the host CPU 810 may perform another task. The host CPU 810 receives the execution result of the task from the SAM $105_1$ as an interrupt.

There are two approaches to reporting the execution result of the task from the SAM $105_1$ to the host CPU 810. One approach is to output an interrupt to the host CPU 810 and to request the host CPU 810 to receive the result. The other approach is to provide status registers (which is referred to as the "SAM status registers") in an address space of the SAM $105_1$ which is accessible by the host CPU 810. (A read/write command, address information, and data from the host CPU 810 are carried to the address space.) According to the second approach, the type of task, flags indicating whether the task is being waited, executed, or completed, etc. can be set in the SAM status register (SAM_SR), and the host CPU 810 regularly performs polling (reading data) to the SAM status register.

A first SAM status register sets a flag indicating the status of the SAM $105_1$ read by the host CPU 810.

A second SAM status register sets flags designating whether the execution of the task from the host CPU 810 has been requested. These flags are read by the CPU within the SAM $105_1$. Based on the priority of bus mediation, both the host CPU 810 and the SAM $105_1$ are allowed to access the flags set in the first and second SAM status registers.

More specifically, in the first SAM status register, flags are set indicating whether the SAM is executing the task, has completed the task, or is waiting for a task to be executed. The name of the task is also indicated in the first SAM status register. The host CPU 810 regularly performs polling to access the first SAM status register.

In the second SAM status register, flags are set indicating whether the execution of a task has been requested from the host CPU 810 or is in the standby mode.

The I/O write command is first sent from the host CPU 810 to the SAM $105_1$, which is an I/O device, followed by data and address information to be written. The address information (data storage location) is stored in the common memory space shared by the host CPU 810 and the SAM $105_1$.

It is required that the memory address space within the SAM $105_1$ should be invisible from the host CPU 810 (tamper-resistance characteristics). Accordingly, the memory address space within the SAM $105_1$ should be managed so that only part of a static random access memory (SRAM) for a work stack, or part of an external flash ROM (electrically erasable programmable read only memory (EEPROM)) is visible from the host CPU 810. Thus, a large amount of data is written into part of the SRAM or part of the EEPROM from the host CPU 810, and a small amount of data is written into a temporary register within the SAM $105_1$ which can be visible from the host CPU 810.

The address of an interrupt routine to be executed by an interrupt is referred to as the "interrupt vector". The interrupt vectors are stored in the vector table according to the order of the interrupt types.

Figure 25:
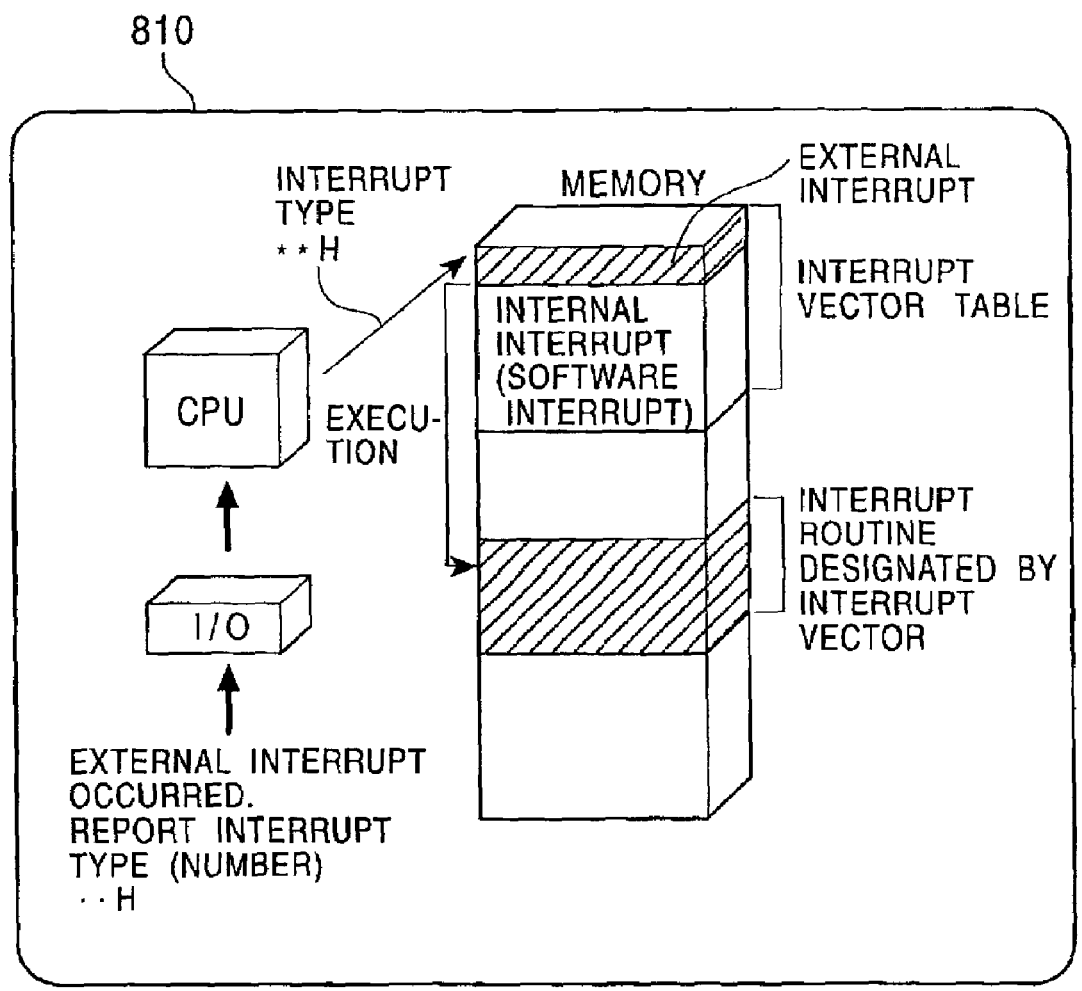
FIG. 25 illustrates an external interrupt to be output to the host CPU.

Upon receiving an external interrupt, as shown in FIG. 25, according to the interrupt type (number), the host CPU 810 extracts the interrupt vector from the interrupt vector table stored in the memory, and executes the corresponding routine started from the address (interrupt vector) as a sub-routine.

In this embodiment, in performing one of the above-described tasks 1 through 3, an external interrupt occurs from the corresponding I/O device by a physical interrupt signal, and the host CPU 810 sends a function call (procedure call) by using an internal interrupt (software interrupt) to the SAM $105_1$ and request it to execute the interrupt routine (task) according to the interrupt type (number). Then, the host CPU 810 receives the execution result of the task and starts to take another action.

Figure 26:
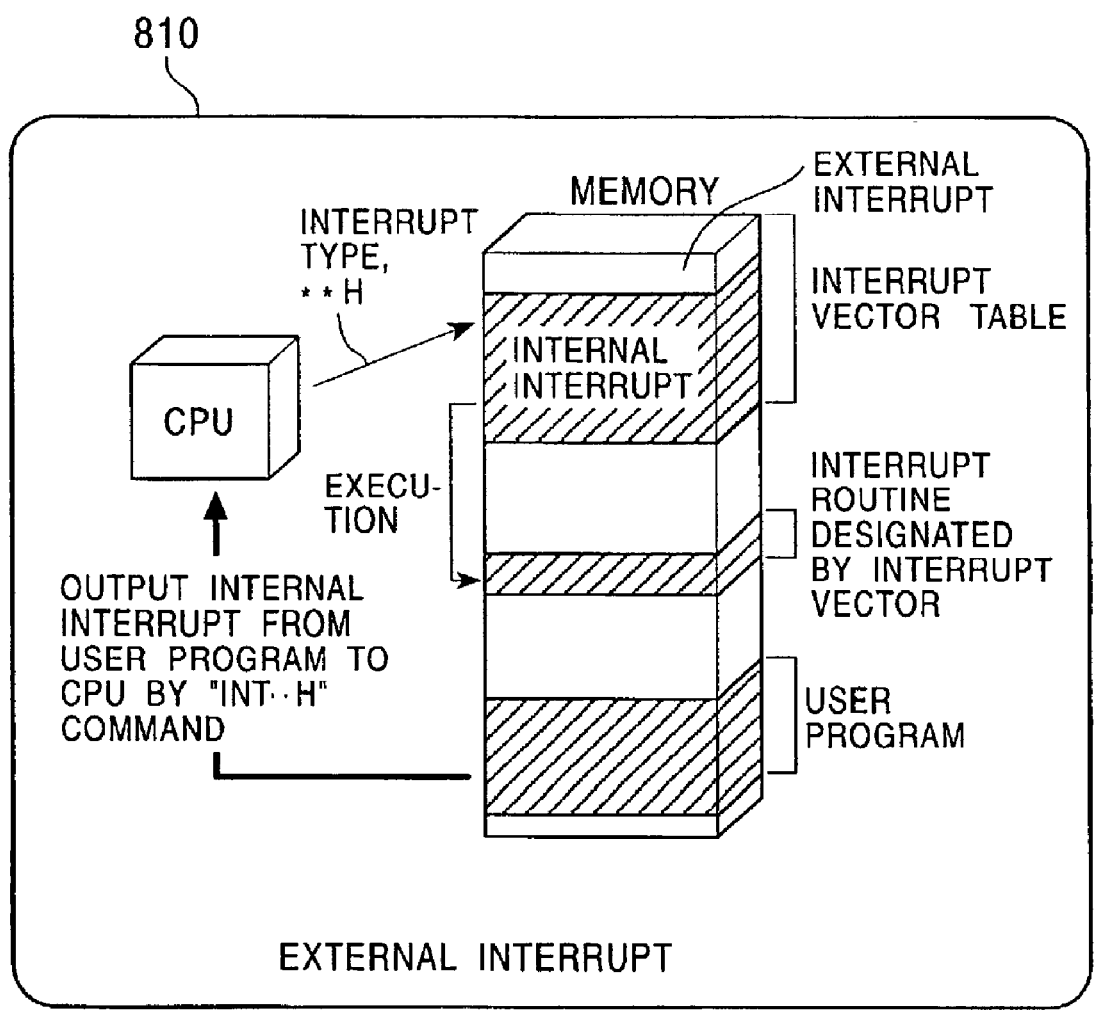
FIG. 26 illustrates an internal interrupt to be output from the host CPU.

The internal interrupt is a software interrupt generated from the user program, i.e., the CPU, as illustrated in FIG. 26. The internal interrupt is generated by the execution of an INT command of a machine language.

Details of the function call (procedure call) are as follows.

An interrupt routine is formed of small functions, and a command name is defined for each function. By designating the command name together with the interrupt command INT from the user program, the target function can be fulfilled. This is referred to as the "function call (procedure call)". In this manner, the function call is performed through the internal interrupt (software interrupt).

In performing the function call, parameters for executing the interrupt routine are delivered by inputting the function call number in the register of the CPU, thereby designating the target function. The result is returned to the register or the memory, or the corresponding operation is performed.

Figure 27:
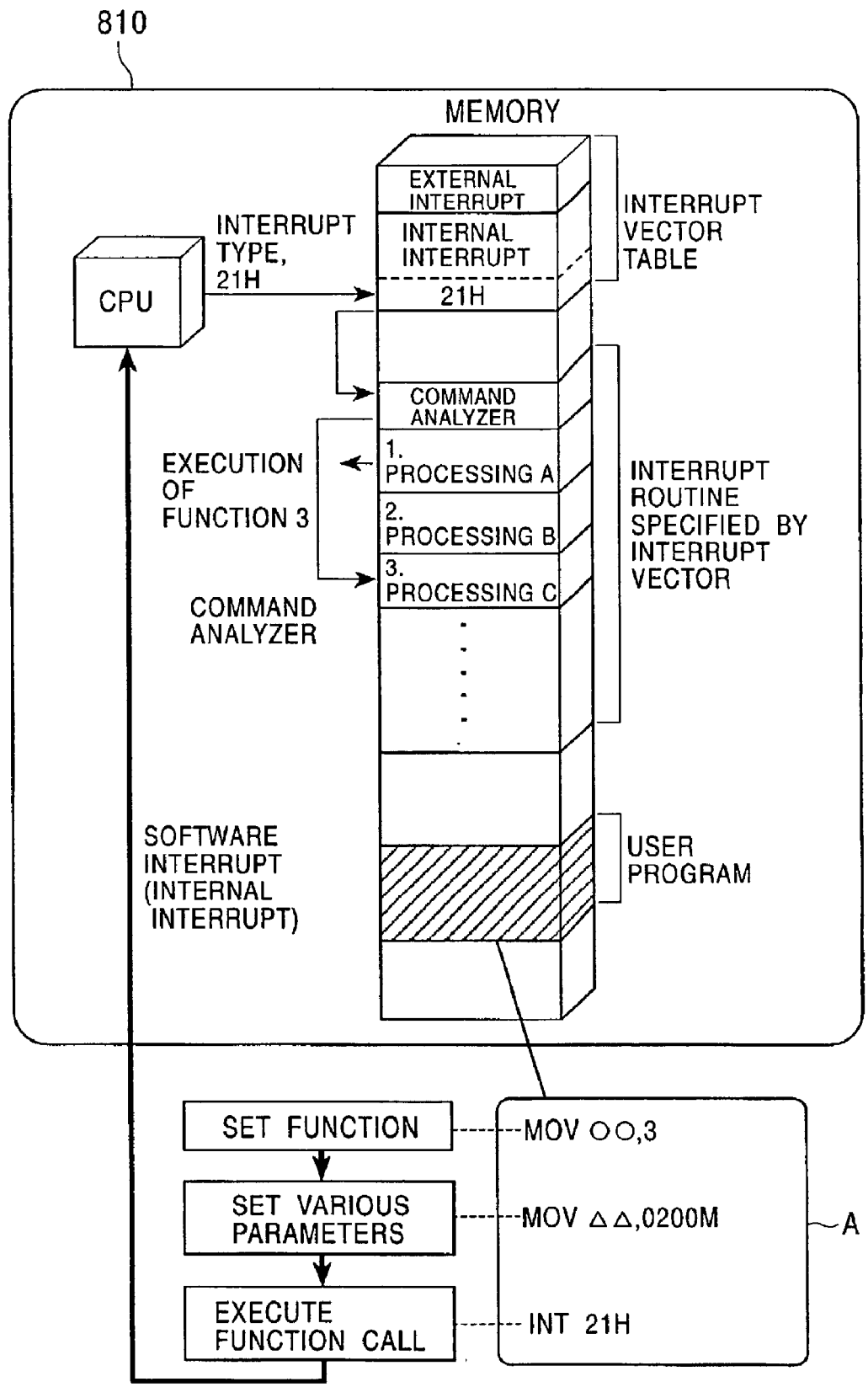
FIG. 27 illustrates function calls output from the host CPU.

For example, in executing code A within the user program shown in FIG. 27, the host CPU 810 designates the interrupt command INT and the command name "INT 21H", and the CPU of the SAM $105_1$ accesses the memory area corresponding to the interrupt type "21H", and also accesses a command analyzer, thereby executing the sub-routine of the function 3.

The processing statuses of the CPU of the SAM $105_1$ are discussed below with reference to FIG. 28.

Figure 28:
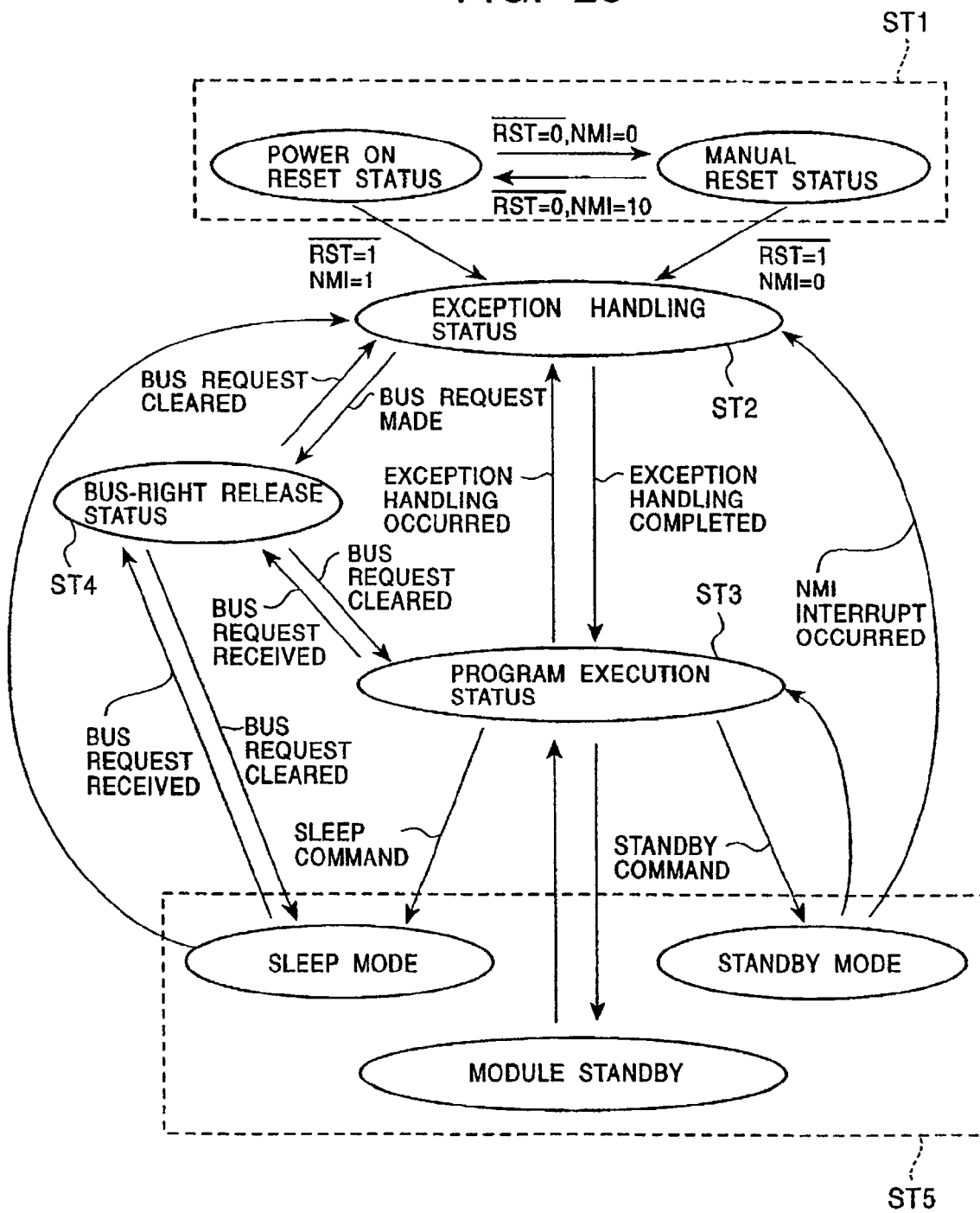
FIG. 28 illustrates the processing status of a CPU of the SAM.

There are five statuses of the CPU of the SAM $105_1$, as illustrated in FIG. 28: a reset status ST1, an exception handling status ST2, a program execution status ST3, a bus-right release status ST4, and a low power status ST5.

Details of the individual statuses are as follows.

The reset status ST1 is a status in which the CPU is reset.

The exception handling status ST2 is a transitional status in which the CPU is shifting the processing status due to an external handling factor, such as resetting or interrupt processing. In performing interrupt processing, by referring to a stack pointer (SP), the count value of a program counter (PC) and the value of a status register (SR) are temporarily stored in a stack area. The address at which the interrupt routine is started is then extracted from the exception-handling vector table, and the routine is branched to the address, thereby starting the program. The status of the CPU is then shifted to the program execution status ST3.

The program execution status ST3 is a status in which the CPU is sequentially executing programs.

The bus-right release status ST4 is a status in which the CPU releases the bus to a device which has requested a bus right.

The low power status ST5 has three modes, such as a sleep mode, a standby mode, and a module standby mode.

(1) Sleep Mode

The operation of the CPU is discontinued, but data stored in the internal register of the CPU, data in a built-in cache memory, and data in a built-in RAM are retained. The functions of built-in peripheral modules other than the CPU are still working.

The sleep mode is released by resetting, any interrupt, or a direct memory access (DMA) address error, and is shifted to the program execution status ST3 via the exception handling status ST2.

(2) Standby Mode

In the standby mode, the functions of the CPU, a built-in module, and an oscillator are completely stopped. Data of a built-in cache memory and data of a built-in RAM are not retained. The standby mode is released by resetting or an external non-maskable interrupt (NMI). After being released, the standby mode is shifted to the normal program status via the exception handling status ST2 after the lapse of a period required for stabilizing oscillations. In the standby mode, since the oscillator is stopped, power consumption is considerably reduced.

(3) Module Standby Mode

The supply of a clock to a built-in module, such as a DMA, is discontinued.

The relationship between the host CPU 810 and the SAM $105_1$ is described below through a memory space with reference to FIG. 29.

Figure 29:
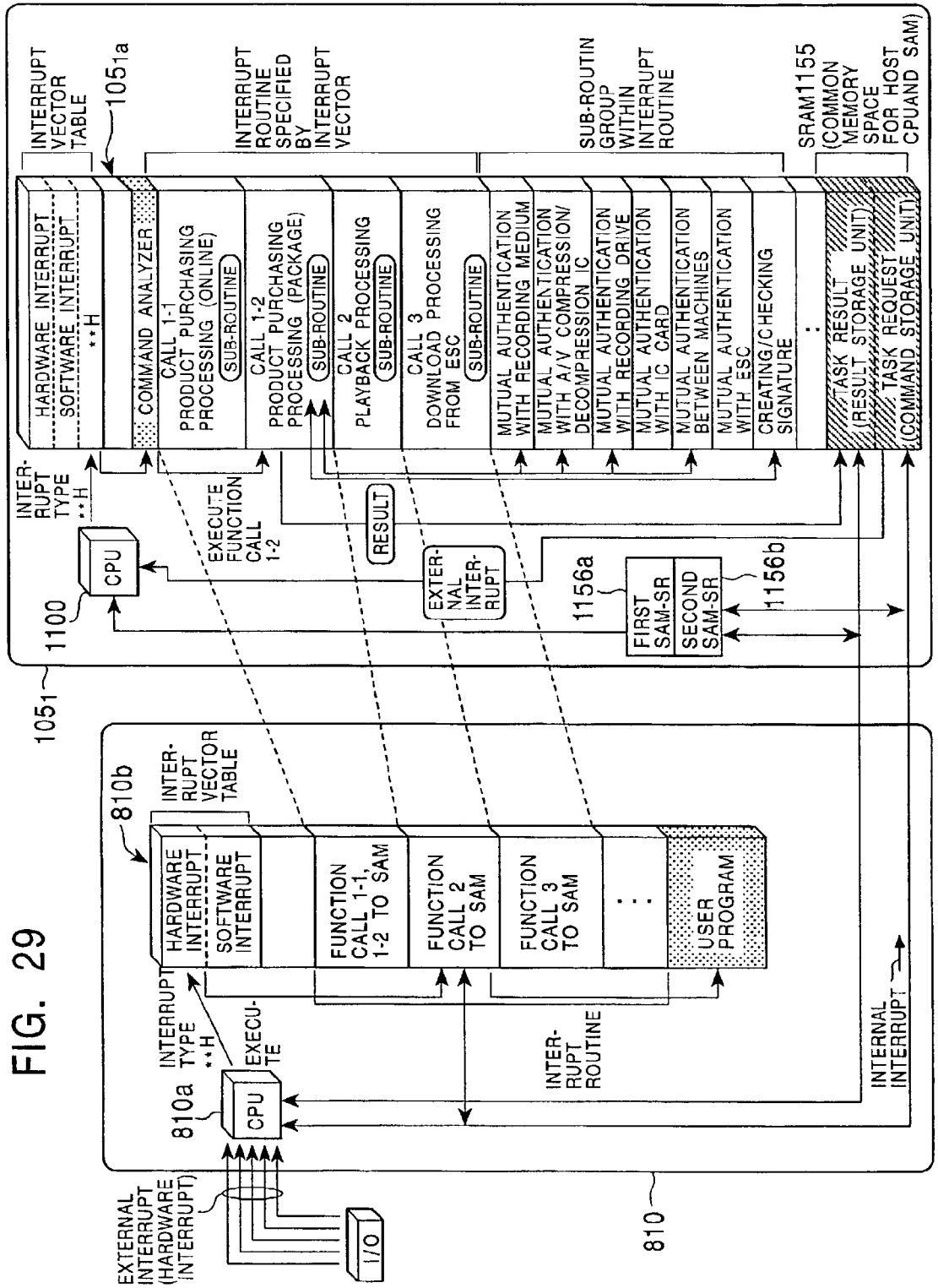
FIG. 29 illustrates memory spaces of the host CPU and the SAM.

Upon receiving an external interrupt through a user's operation on a button, as shown in FIG. 29, a CPU 810a of the host CPU 810 interrupts the execution of the user program, and designates the interrupt type so as to access the hardware interrupt area of the interrupt vector table. Then, the CPU 810a executes the interrupt routine stored in the accessed address. The interrupt routine describes the process for outputting a function call 1-1, 1-2, 2, or 3, which is the internal interrupt, to the SAM $105_1$ so as to request the SAM $105_1$ to execute the corresponding task, and for acquiring the execution result from the SAM $105_1$ and then returning to the user program. More specifically, the CPU 810a writes information for specifying the task into an SRAM 1155, which forms part of a memory $105_1$a within the SAM $105_1$ and which serves as a common memory for the host CPU 810 and the SAM $105_1$.

In outputting the internal interrupt to the SAM $105_1$, the CPU 810a of the host CPU 810 turns on the task waiting flag of a second SAM status register 1156b within the SAM $105_1$.

A CPU 1100 of the SAM $105_1$ checks the second SAM status register 1156b and accesses the SRAM 1155 so as to specify the type of task requested by the host CPU 810, thereby executing the corresponding interrupt routine. The interrupt routine is executed by reading sub-routines, as stated above, which include, for example, mutual authentication with a recording medium, an A/V compression/decompression SAM, a media drive SAM, an IC card, and the EMD service center 102, mutual authentication between machines, and creating and checking of signature data.

The CPU 1100 of the SAM $105_1$ stores the result of the interrupt routine (task result) in the SRAM 1155, and also turns on the task completion flag of a first SAM status register 1156a within the SAM $105_1$.

After checking that the task completion flag of the first SAM status register 1156a is on, the host CPU 810 reads the task result from the SRAM 1155 and returns to the processing of the user program.

The functions of the SAM $105_1$ are as follows. It should be noted that the functions of the SAMs $105_2$ through $105_4$ are similar to those of the SAM $105_1$.

The SAM $105_1$ performs accounting processing for each content, and communicates with the EMD service center 102. The standards and version of the SAM $105_1$ may be managed by the EMD service center 102. If it is desired by electric home appliance manufacturers that the SAM $105_1$ be loaded in electric home appliances, the EMD service center 102 may license such manufacturers to use the SAM $105_1$ as a black-box accounting module for performing accounting in units of contents. For example, the EMD service center 102 standardizes the IC, such as the IC interface, of the SAM $105_1$ without making it known to the manufacturers, and the SAM $105_1$ is loaded in the network device $160_1$ according to the standards. The SAMs $105_2$ through $105_4$ are loaded in the A/V machines $160_2$ through $160_4$, respectively.

The processing content of the SAM $105_1$ is completely shielded from an external source and is thus protected from being externally monitored or tampered. The SAM $105_1$ is a function module which is implemented by executing a tamper-resistant hardware module (for example, an IC module) in which prestored data or currently processing data cannot be tampered with, or by executing software (private program) by the CPU.

If the functions of the SAM $105_1$ are implemented by an IC, a private memory is disposed within the IC, and a private program and private data are stored in the private memory. If the functions of the SAM $105_1$ are incorporated into part of a machine rather than being implemented by using a physical form, such as an IC, the portion incorporating the functions may be defined as a SAM.

In the example of the network device $160_1$ shown in FIG. 22, the secure container 104 is output from the communication module 162 to the SAM $105_1$, as indicated by the solid line. However, as indicated by the one-dot chain lines, the key file KF may be output from the communication module 162 to the SAM $105_1$, and the content file CF may be directly written into the download memory 167 from the communication module 162 via a CPU bus.

The content data C may be output to the A/V compression/decompression SAM 163 directly from the download memory 167 by skipping the SAM $105_1$.

The functions of the SAM $105_1$ are specifically described below with reference to the functional block of FIG. 30.

Figure 30:
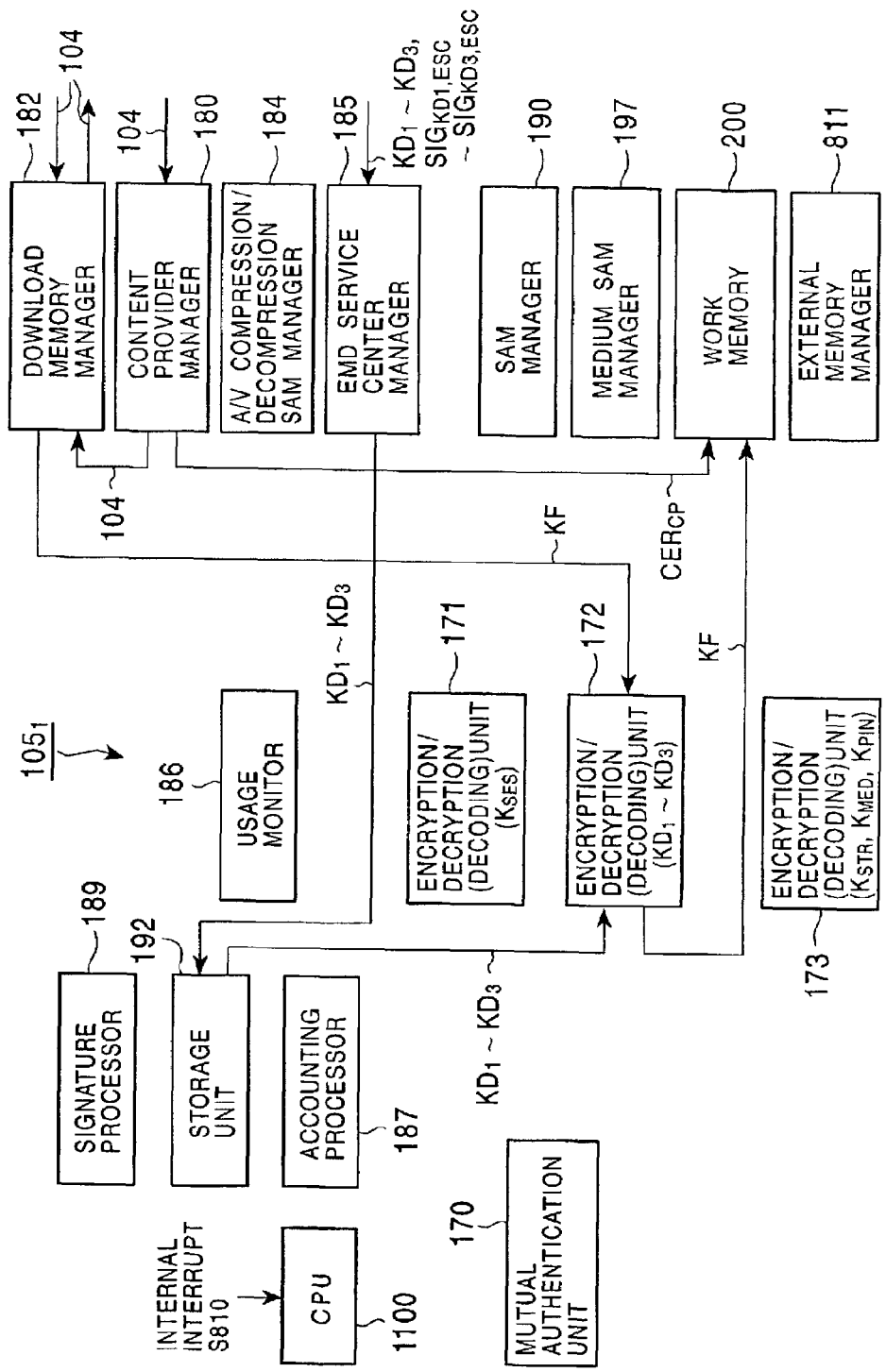
FIG. 30 is a functional block of a SAM within the user home network shown in FIG. 1, and also illustrates the data flow when the secure container received from the content provider is decoded.

FIG. 30 illustrates the data flow for receiving the secure container 104 from the content provider 101 and processing for decoding the key file KF within the secure container 104.

The SAM $105_1$ includes, as shown in FIG. 30, a mutual authentication unit 170, encryption/decryption (decoding) units 171, 172, and 173, a content provider manager 180, a download memory manager 182, an A/V compression/decompression SAM manager 184, an EMD service center manager 185, a usage monitor 186, an accounting processor 187, a signature processor 189, a SAM manager 190, a storage unit 192, a medium SAM manager 197, a work memory 200, an external memory manager 811, and a CPU 1100.

The CPU 1100 receives the internal interrupt S810 from the host CPU 810 and controls the entire processing within the SAM $105_1$.

The correlation of the components of the SAM $105_1$ and the elements of the present invention is as follows. The content provider manager 180 and the download memory manager 182 correspond to input processing means, the accounting processor 187 corresponds to determining means, log data generation means, and UCS data generation means, the encryption/decryption (decoding) unit 172 corresponds to decoding means, and the usage monitor unit 186 corresponds to usage control status means. The encryption/decryption (decoding) unit 173 corresponds to encryption means. A medium drive SAM manager 855 shown in FIG. 45, which is discussed below, corresponds to recording control means. The signature processor 189 corresponds to signature processing means.

As discussed above, the individual functions of the SAM $105_1$ are implemented by executing the private program by the CPU or by operating predetermined hardware. The hardware configuration of the SAM $105_1$ is discussed below.

In the external memory 201 of the network device $160_1$, as shown in FIG. 31, the usage log data 108 and the SAM registration list are stored.

The memory space of the external memory 201 is invisible from an external source of the SAM $105_1$ (for example, the host CPU 810), and only the SAM $105_1$ is allowed to manage access to the storage area of the external memory 201. As the external memory 201, a flash memory or a ferroelectric memory (FeRAM) may be used.

As the work memory 200, an SRAM may be used. The work memory 200 may include, as shown in FIG. 32, the content key data Kc, the UCP data 106, lock key data $K_{LOC}$ of the storage unit 192, the public key certificate $CER_{CP}$ of the content provider 101, the UCS data 166, and the SAM program download containers $SDC_1$ through $SDC_3$, which are stored in the secure container 104.

As one of the functions of the SAM $105_1$, the processing executed by the functional blocks when the secure container 104 is received (downloaded) from the content provider 101 is described below with reference to FIG. 30. This processing is centrally controlled by the CPU 1100 which has received the internal interrupt S810 for downloading the content from the host CPU 810.

In sending and receiving data online by the SAM $105_1$ with the content provider 101 and the EMD service center 102, the mutual authentication unit 170 performs mutual authentication with the content provider 101 and the EMD service center 102 to generate session key data (common key data) $K_{SES}$, and outputs it to the encryption/decryption (decoding) unit 171. The session key data $K_{SES}$ is newly created every time mutual authentication is conducted.

The encryption/decryption (decoding) unit 171 encrypts and decrypts the data sent to and received from the content provider 101 and the EMD service center 102 by using the session key $K_{SES}$ created by the mutual authentication unit 170.

If the download memory 167 shown in FIG. 22 is provided with a medium SAM 167a, as shown in FIG. 22, mutual authentication is performed between the mutual authentication unit 170 and the medium SAM 167a. Then, the download memory manager 182 encrypts the content by using the session key data $K_{SES}$ obtained by mutual authentication, and writes the encrypted data into the download memory 167 shown in FIG. 22. As the download memory 167, a non-volatile semiconductor memory, such as a Memory Stick may be used.

Figure 33:
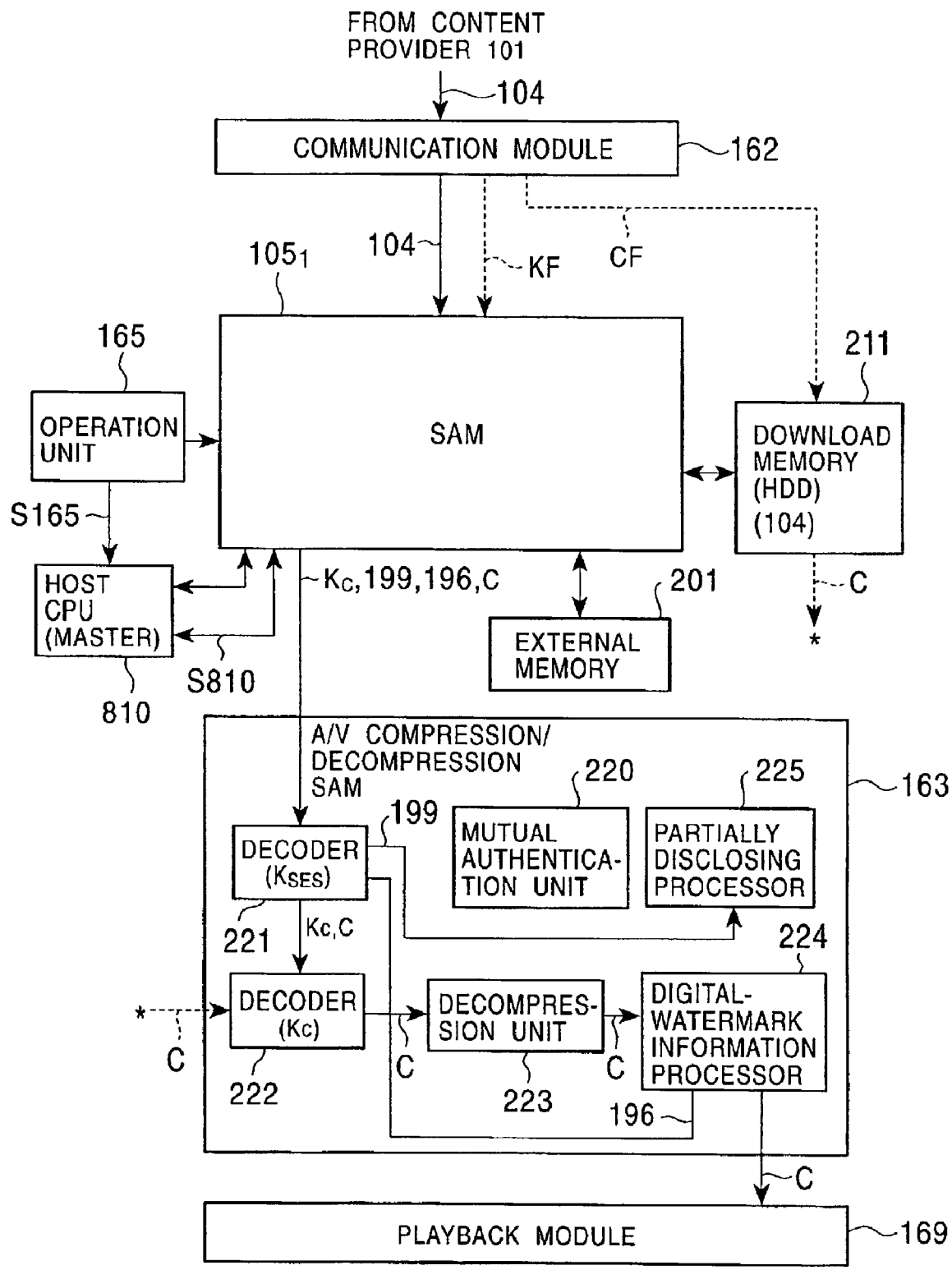
FIG. 33 is a block diagram illustrating another example of the configuration of the network device within the user home network shown in FIG. 1.

If a memory without a mutual authentication function, such as a hard disk drive (HDD), shown in FIG. 33, is used as a download memory 211, the download memory 211 is unsecured. Accordingly, the content file CF is downloaded into the download memory 211, and the highly secret key file KF is downloaded into, for example, the work memory 200 shown in FIG. 30 or the external memory 201 shown in FIG. 22.

In storing the key file KF in the external memory 201, the SAM $105_1$ encrypts it by using message authentication code (MAC) key data $K_{MAC}$ in the CBC mode and stores it in the external memory 201, and also stores part of the final block of the ciphertext in the SAM $105_1$ as a MAC value. In reading the key file KF from the external memory 201 to the SAM $105_1$, the read key file KF is decrypted with the MAC key data $K_{MAC}$, and then, the resulting MAC value is compared with the stored MAC value, thereby verifying the integrity of the key file KF. In this case, instead of the MAC value, a hash value may be used.

The encryption/decryption (decoding) unit 172 decodes the content key data Kc, the UCP data 106, and the SAM program download containers $SDC_1$ through $SDC_3$ within the key file KF stored in the secure container 104 received from the download memory manager 182 by using the license key data $KD_1$ through $KD_3$ of corresponding periods read from the storage unit 192.

The decoded content key data Kc, the UCP data 106, and the SAM program download containers $SDC_1$ through $SDC_3$ are written into the work memory 200.

The EMD service center manager 185 manages communication with the EMD service center 102 shown in FIG. 1.

The signature processor 189 verifies the integrity of the signature data within the secure container 104 by using the public key data $K_{ESC,P}$ of the EMD service center 102 and the public key data $K_{CP,P}$ of the content provider 101 read from the storage unit 192.

Figure 34:
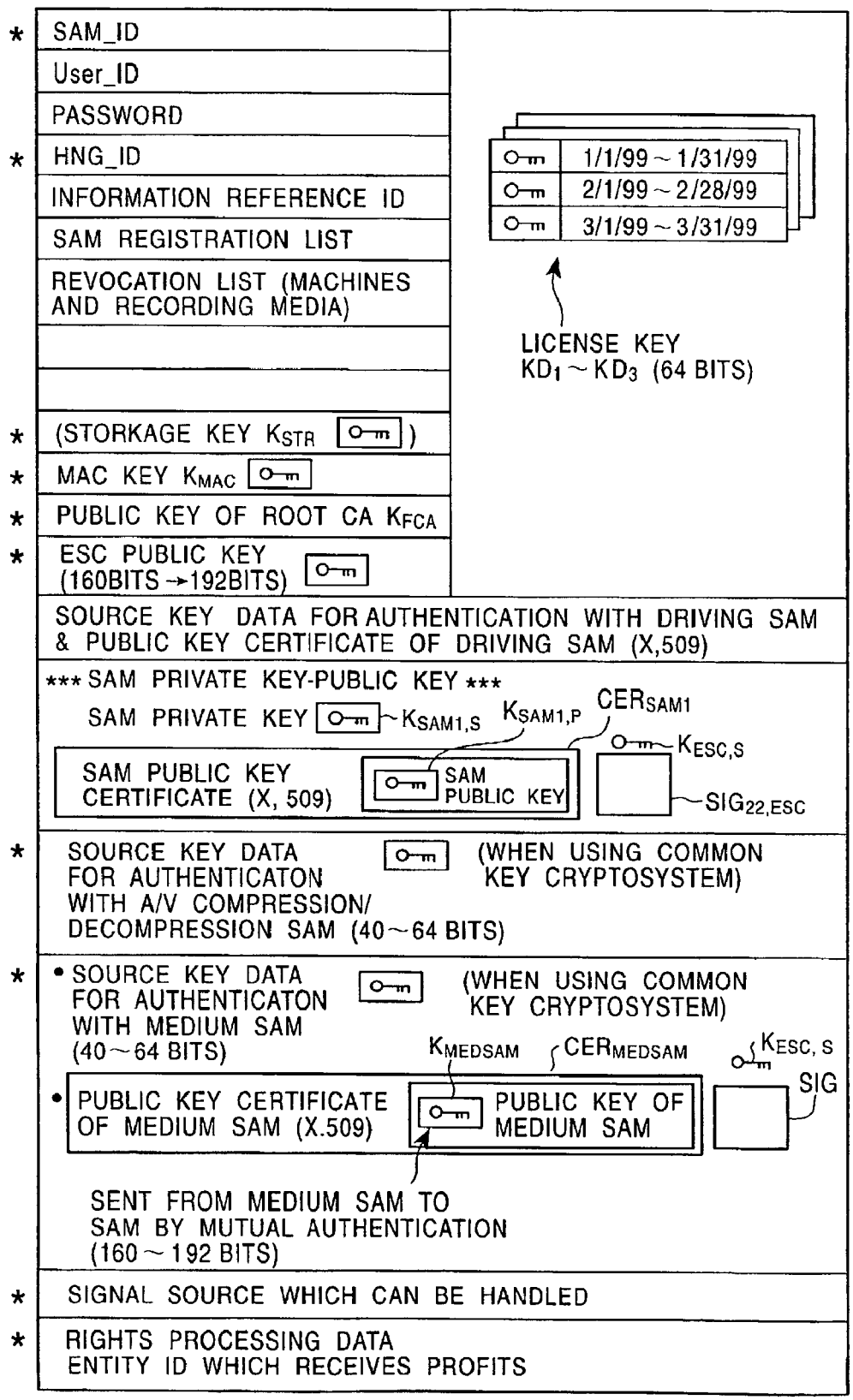
FIG. 34 illustrates data to be stored in a storage unit shown in FIG. 30.

The storage unit 192 has the following data, as shown in FIG. 34, as private data protected from being read or written from outside the SAM $105_1$: a plurality of license key data $KD_1$ through $KD_3$ having effective dates, a SAM_ID, a user ID, a password, an identifier HNG_ID of a home network group to which the SAM $105_1$ belong, an information reference ID, a SAM registration list, a revocation list of devices and recording media, storage key data $K_{STR}$, public key data $K_{R-CA,P}$ of a route CA, public key data $K_{ESC,P}$ of the EMD service center 102, a source key data for mutual authentication with a driving SAM (when the common key cryptosystem is employed), a public key certificate of a driving SAM (when the private key cryptosystem is employed), private key data $K_{SAM1,S}$ of the SAM $105_1$ (when the common key cryptosystem is employed), a public key certificate $CER_{SAM1}$ in which the public key data $K_{SAM1,P}$ of the SAM $105_1$ is stored (when the private key cryptosystem is employed), signature data $SIG_{22}$ of a public key certificate $CER_{ESC}$ obtained by using the private key data $K_{ESC,S}$ of the EMD service center 102, source key data for mutual authentication with the A/V compression/decompression SAM 163 (when the common key cryptosystem is employed), source key data for mutual authentication with the medium SAM (when the common key cryptosystem is employed), public-key certificate data $CER_{MEDSAM}$ of the medium SAM (when the public key cryptosystem is employed), the signal source which can be handled, the compression method, the display performance of a monitor to be connected, the format conversion function, the presence or absence of a bit stream recorder, rights processing (profit distribution) data, an ID of related entities which receive profits, etc.

In FIG. 34, the items of data having the symbol * marked at the left side are stored in the storage unit 192 when shipping the SAM $105_1$, and the other items of data are stored in the storage unit 192 when user registration is performed after shipping the SAM $105_1$.

A private program for implementing at least part of the functions shown in FIG. 30 is also stored in the storage unit 192.

As the storage unit 192, a flash-EEPROM may be used.

Processing to be Executed when License Key Data is Received

Figure 35:
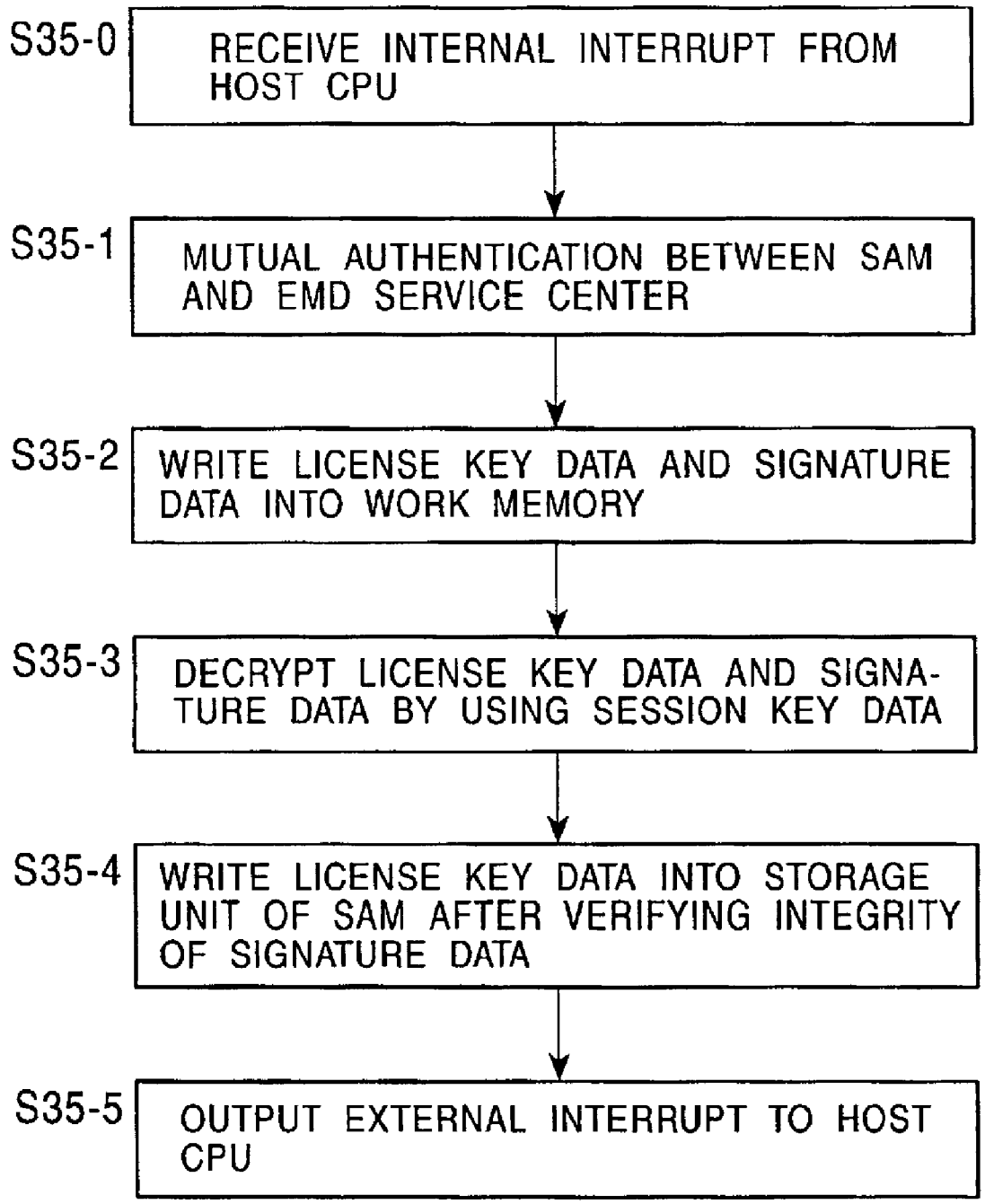
FIG. 35 is a flow chart illustrating the processing performed by the SAM for receiving the license key data from the EMD service center.

A description is now given, with reference to FIGS. 33 and 35, of the process within the SAM $105_1$ when storing the license key data $KD_1$ through $KD_3$ received from the EMD service center 102 in the storage unit 192.

FIG. 35 is a flow chart illustrating the process within the SAM $105_1$ when storing the license key data $KD_1$ from the EMD service center 102 through $KD_3$ in the storage unit 192.

In step S35-0, the CPU 1100 of the SAM $105_1$ receives the internal interrupt S810 indicating an instruction to receive the license key data from the host CPU 810.

In step S35-1, mutual authentication is performed between the mutual authentication unit 170 of the SAM $105_1$ and the EMD service center 102.

Then, in step S35-2, the license key data $KD_1$ through $KD_3$ for three months and the corresponding signature data $SIG_{KD1,ESC}$ through $SIG_{KD3,ESC}$ encrypted with the session key data $K_{SES}$ obtained by mutual authentication performed in step S35-1 are written from the EMD service center 102 to the work memory 200 via the EMD service center manager 185.

In step S35-3, the encryption/decryption (decoding) unit 171 decrypts the license key data $KD_1$ through $KD_3$ and the signature data $SIG_{KD1,ESC}$ through $SIG_{KD3,ESC}$ by using the session key data $K_{SES}$.

Subsequently, in step S35-4, the signature processor 189 verifies the integrity of the signature data $SIG_{KD1,ESC}$ through $SIG_{KD3,ESC}$ stored in the work memory 200 and then writes the license key data $KD_1$ through $KD_3$ in the storage unit 192.

In step S35-5, the CPU 1100 reports the result of the processing for receiving the license key data to the host CPU 810 through an external interrupt.

Alternatively, the CPU 1100 may set a flag in the SAM status register indicating whether the above-described receiving processing has been correctly performed, in which case, the host CPU 810 may read the flag by polling.

Processing to be Executed when the Secure Container 104 is Received from the Content Provider 101

Figure 36:
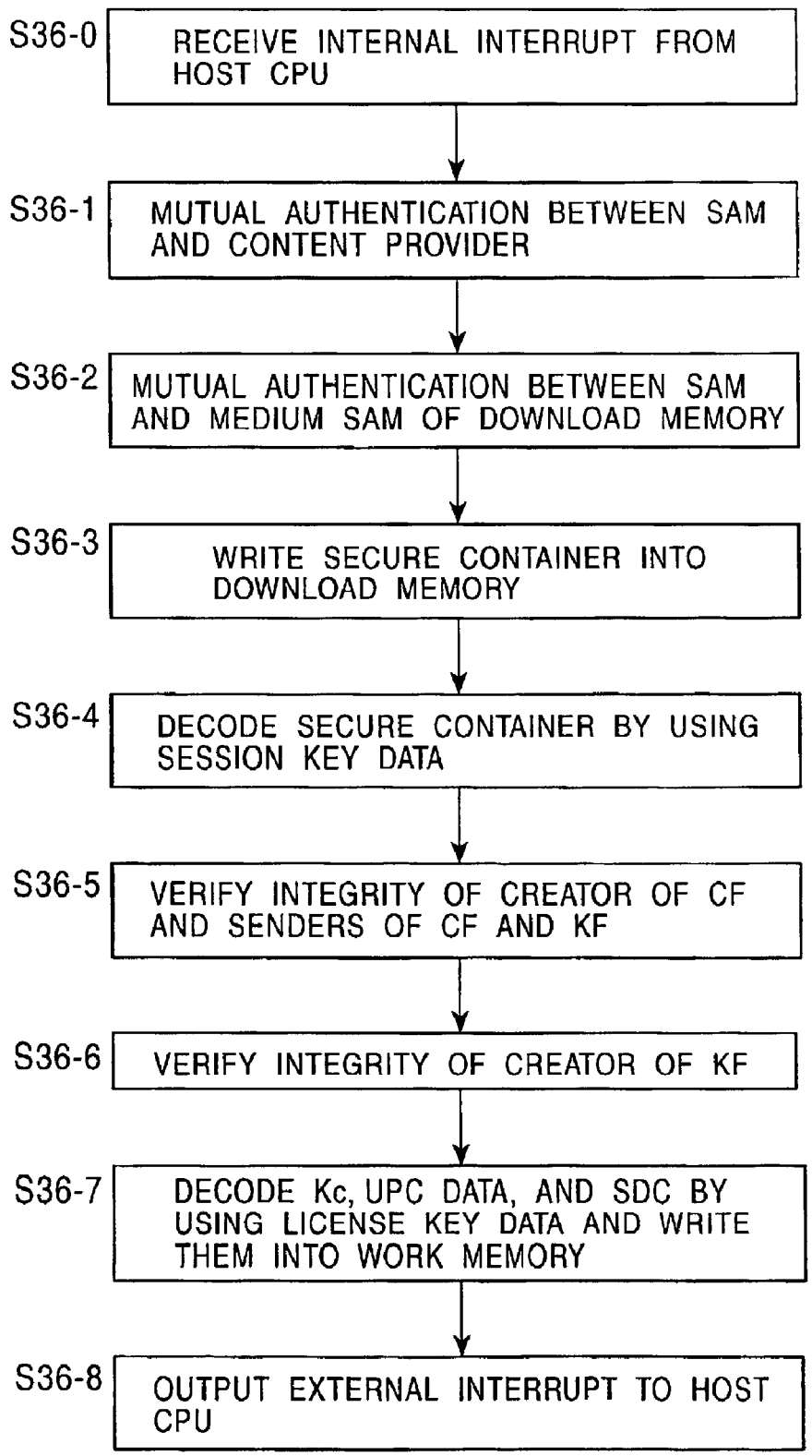
FIG. 36 is a flow chart illustrating the processing performed by the SAM for receiving the secure container.

A description is now given of, with reference to FIGS. 30 and 36, of the flow within the SAM $105_1$ when receiving the secure container 104 from the content provider 101.

In the example described below, the content file CF is written into the download memory 167 via the SAM $105_1$. In the present invention, however, the content file CF may be directly written into the download memory 167 without passing through the SAM $105_1$.

FIG. 36 is a flow chart illustrating the process within the SAM $105_1$ when receiving the secure container 104 from the content provider 101.

In the subsequent example, the SAM $105_1$ verifies the various items of signature data when receiving the secure container 104. Alternatively, the signature data may be verified when the purchase/usage mode is determined.

In step S36-0, the CPU 1100 of the SAM $105_1$ shown in FIG. 30 receives from the host CPU 810 the internal interrupt S810 indicating an instruction to receive the secure container 104.

In step S36-1, mutual authentication is conducted between the mutual authentication unit 170 of the SAM $105_1$ and the content provider 101.

Then, in step S36-2, mutual authentication is performed between the mutual authentication unit 170 of the SAM $105_1$ and the medium SAM 167a of the download memory 167.

In step S36-3, the secure container 104 received from the content provider 101 is written into the download memory 167. Simultaneously, the secure container 104 is encrypted in the mutual authentication unit 170 and is decrypted in the medium SAM 167a by using the session key data obtained in step S36-2.

Subsequently, in step S36-4, the SAM $105_1$ decodes the secure container 104 with the use of the session key data obtained in step S36-1.

In step S36-5, after verifying the signature data $SIG_{1,ESC}$ indicated by FIG. 3C, the signature processor 189 verifies the signature data $SIG_{6,CP}$ and $SIG_{7,CP}$ by using the public key data $K_{CP,P}$ of the content provider 101 stored in the public-key certificate data $CER_{CP}$ shown in FIG. 3C.

When the signature data $SIG_{6,CP}$ is verified, the integrity of the creator and the sender of the content file CF is verified.

When the signature data $SIG_{7,CP}$ is verified, the sender of the integrity of the key file KF is verified.

Thereafter, in step S36-6, the signature processor 189 checks the integrity of the signature data $SIG_{K1,ESC}$ within the key file KF shown in FIG. 3B, i.e., the integrity of the creator of the key file KF, by using the public key data $K_{ESC,P}$ read from the storage unit 192, and also checks whether the key file KF is registered in the EMD service center 102.

In step S36-7, the encryption/decryption (decoding) unit 172 decrypts (decodes) the content key data Kc, the UCP data 106, and the SAM program download containers $SDC_1$ through $SDC_3$ within the key file KF shown in FIG. 3B by using the license key data $KD_1$ through $KD_3$ of corresponding periods read from the storage unit 192, and writes them into the work memory 200.

Then, in step S36-8, the CPU 1100 reports to the host CPU 810 through an external interrupt whether the secure container 104 has been correctly received. Alternatively, the CPU 1100 may set a flag in the SAM status register indicating whether the secure container 104 has been appropriately received, and the host CPU 810 may read the flag by polling.

The processing performed by the individual functional blocks for purchasing and using the content data C downloaded into the download memory 167 is described below with reference to FIG. 37.

The processing of the functional blocks are centrally controlled by the CPU 1100 which receives the internal interrupt S810 from the host CPU 810.

The usage monitor 186 reads the UCP data 106 and the UCS data 166 from the work memory 200, and monitors the situation to make sure that the content is purchased and used within the license restricted by the UCP data 106 and the UCS data 166.

As stated with reference to FIG. 36, the UCP data 106 is stored in the key file KF in the work memory 200 after being decoded.

The UCS data 166 is stored in the work memory 200 when the purchase mode is determined by the user, as discussed below. The UCS data 166 includes the user ID who has purchased the content data C, the tracing information, etc., i.e., the same data as the UCP data 106 shown in FIG. 3B, except for the UCS information indicating the purchase mode determined in the purchase-mode determining processing.

In receiving the internal interrupt S810 indicating an instruction to determine the purchase mode or the usage mode of the content from the CPU 810 shown in FIG. 22, the accounting processor 187 creates the corresponding usage log data 108.

As stated above, the usage log data 108 indicates the history of the purchase and usage modes of the secure container 104 made by the user, and is used when performing the settlement processing and determining the license fee by the EMD service center 102 according to the purchase of the secure container 104.

The accounting processor 187 informs the user of the sales price or the SRP read from the work memory 200 if necessary. The sales price and the SRP are contained within the decoded UCP data 106 of the key file KF shown in FIG. 3B stored in the work memory 200.

The accounting processing by the accounting processor 187 is performed under the monitoring of the usage monitor 186 based on the rights, such as the license agreement conditions, represented by the UCP data 106, and the UCS data 166. That is, the user purchases and uses the content within the allowance of the rights.

The accounting processor 187 also creates, based on the internal interrupt S810, the UCS data 166 indicating the purchase mode of the content determined by the user, and writes it into the work memory 200.

In this embodiment, after the purchase mode is determined, the UCS data 166 is stored in the work memory 200. However, the UCS data 166 and the content key data Kc may be stored in the external memory 201. As the external memory 201, a flash memory, which is a non-volatile RAM, may be used, as stated above. In writing the UCS data 166 and the content key data Kc into the external memory 201, integrity check is performed for verifying the integrity of the external memory 201, in which case, a storage area of the external memory 201 is divided into a plurality of blocks, and a hash value is determined for each block by using SHA-1 or MAC, and the determined hash values are controlled in the SAM 105$_1$.

Instead of determining the purchase mode in the SAM 105$_1$, the secure container 104 may be transferred to another SAM, such as SAM 105$_2$ through 105$_4$, in which case, the UCS data 166 is not created.

The purchase modes of the content include, for example, "sell through" in which no restriction is imposed on playback operation by the purchaser and copying for the use of the purchaser, "time limited" in which the period of use is restricted, "pay per play" in which charging incurs every time the content is played back, "pay per SCMS" in which charging incurs every time the copied content is played back in a SCMS device, "sell through SCMS copy" in which copying in a SCMS device is allowed, and "pay per copy N without copy guard" in which charging incurs every time the content is played back without setting a copy guard.

The UCS data 166 is created when the user determines the purchase mode of the content, and is thereafter used for controlling so that the purchase uses the content within the allowance of the determined purchase mode. The UCS data 166 includes the content ID, the purchase mode, the price according to the purchase mode, a SAM_ID of the SAM which has purchased the content, and a user_ID of the user who has purchased the content.

If the determined purchase mode is "pay per play", "pay per SCMS", or "pay per copy N without copy guard", upon purchasing the content data C, the SAM 105$_1$ may send the UCS data 166 to the content provider 101 in real time, and the content provider 101 may instruct the EMD service center 102 to fetch the usage log data 108 within a predetermined period.

If the determined purchase mode is "sell through", the UCS data 166 may be sent to both the content provider 101 and the EMD service center 102 in real time. Thus, in this embodiment, regardless of the purchase mode, the UCS data 166 is sent to the content provider 101 in real time.

The EMD service center manager 185 regularly sends the usage log data 108 read from the external memory 201 via the external memory manager 811 to the EMD service center 102.

In this case, the signature processor 189 creates the signature data $SIG_{200,SAM1}$ of the usage log data 108 by using the private key data $K_{SAM1,S}$, and the EMD service center manager 185 sends the signature data $SIG_{200,SAM1}$ together with the usage log data 108 to the EMD service center 102.

The EMD service center manager 185 may send the usage log data 108 regularly in response to a request from the EMD service center 102, or when history information in the usage log data 108 exceeds a predetermined amount. The amount of history information is determined according to, for example, the storage capacity of the external memory 201.

When the CPU 1100 receives the internal interrupt S810 indicating an instruction to play back the content from the host CPU 810 shown in FIG. 22, the download memory manager 182 outputs the content data C read from the download memory 167, the content key data Kc read from the work memory 200, and user digital information data 196 input from the accounting processor 187 to the A/V compression/decompression SAM manager 184.

Upon receiving the internal interrupt S810 indicating an instruction to listening to the content for demonstration, the download memory manager 182 outputs the content file CF read from the download memory 167, the content key data Kc and partially disclosing parameter data 199 read from the work memory 200 to the A/V compression/decompression SAM manager 184.

The partially disclosing parameter data 199 is described in the UCP data 106, and indicates the handling of the content in the demonstration mode. This enables the A/V compression/decompression SAM 163 to play back the encrypted content data C in a partially disclosing state based on the partially disclosing parameter data 199. As the partially disclosing techniques, the following techniques are available. By utilizing the fact that the A/V compression/decompression SAM 163 processes data (signal) in units of predetermined blocks, some blocks are decoded by using the content key data Kc, and some blocks are not decoded by using the content key data Kc according to the partially disclosing parameter data 199. Or, the playback functions in the demonstration mode are restricted, or the period for listening to the content for demonstration is limited.

Processing for Determining the Purchase Mode of the Downloaded Secure Container

Figure 37:
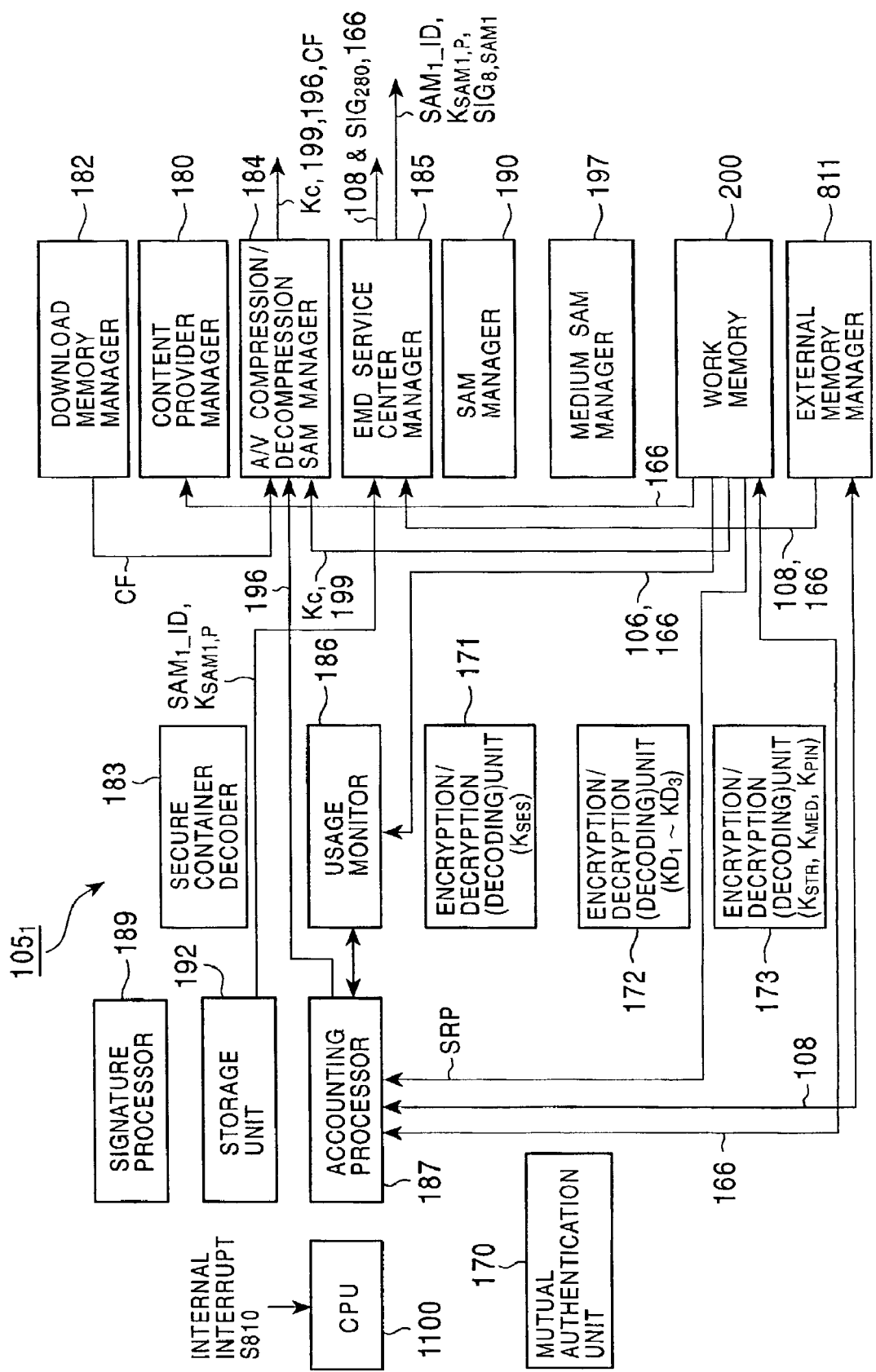
FIG. 37 is a functional block diagram of a SAM within the user home network shown in FIG. 1, and also illustrates the data flow when the content data is utilized and purchased.
Figure 38:
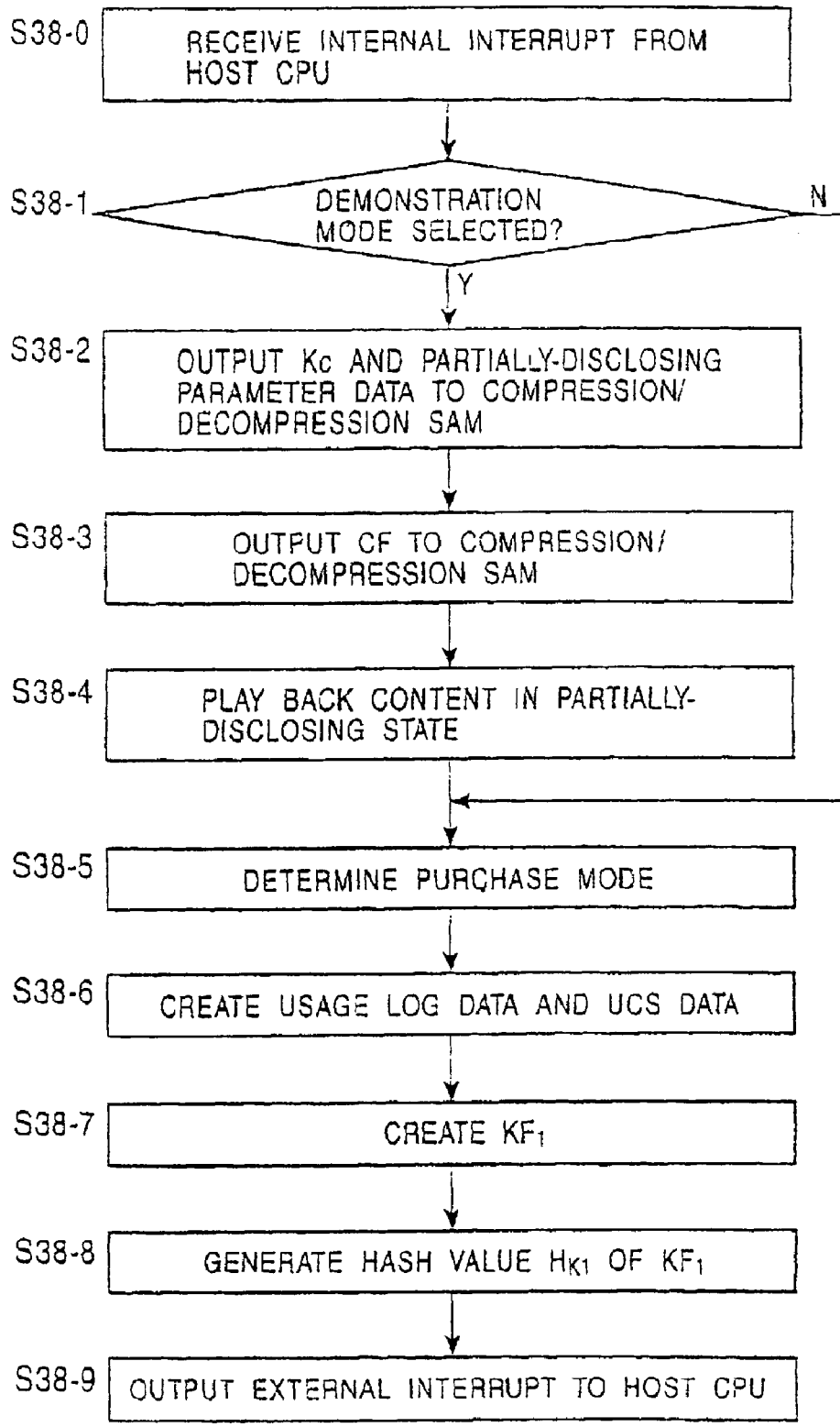
FIG. 38 is a flow chart illustrating the processing by the SAM for determining the purchase mode of the content data.

A description is now given, with reference to FIGS. 37 and 38, of the process of the SAM $105_1$ for determining the purchase mode of the secure container 104 downloaded from the content provider 101 to the download memory 167.

In the subsequent processing, in determining the purchase mode of the secure container 104, the signature data within the secure container 104 is not verified (as stated above, the signature data is verified when receiving the secure container 104). However, the signature data may be checked in determining the purchase mode.

FIG. 38 is a flow chart illustrating the process for determining the purchase mode of the secure container 104 downloaded from the content provider 101 to the download memory 167.

In step S38-0, the CPU 1100 of the SAM $105_1$ shown in FIG. 37 receives from the host CPU 810 the internal interrupt S810 instructing the SAM $105_1$ to determine the purchase mode of the content.

The CPU 1100 then determines in step S38-1 whether the internal interrupt S810 from the host CPU 810 indicates the demonstration mode, and if so, the CPU 1100 executes the processing of step S38-2. If not, the CPU 1100 executes the processing of step S38-5.

In step S38-2, the content key data Kc and the partially disclosing parameter data 199 read from the work memory 200 are output to the A/V compression/decompression SAM 163 shown in FIG. 22. Simultaneously, after performing mutual authentication between the mutual authentication unit 170 of the SAM $105_1$ and a mutual authentication unit 220 of the A/V compression/decompression SAM 163, the content key data Kc and the partially disclosing parameter data 199 are encrypted and decrypted by using the session key data $K_{SES}$.

In step S38-3, upon receiving the internal interrupt S810 indicating the demonstration mode from the host CPU 810, the CPU 1100 outputs the content file CF stored in the download memory 167 to the A/V compression/decompression SAM 163 shown in FIG. 22 via the A/V compression/decompression SAM manager 184.

Simultaneously, mutual authentication for the content file CF is conducted between the mutual authentication unit 170 and the medium SAM 167a of the download memory 167, and the content file CF is encrypted and decoded with the session key data $K_{SES}$. Also, mutual authentication for the content file CF is performed between the mutual authentication unit 170 and the mutual authentication unit 220, and the content file CF is encrypted and decoded with the session key data $K_{SES}$.

The content file CF is decoded with the session key data $K_{SES}$ in a decoder 221 of the A/V compression/decompression SAM 163 shown in FIG. 22, and is then output to a decoder 222.

Then, in step S38-4, the decoded partially disclosing parameter data 199 is output to a partially disclosing processor 225 of the A/V compression/decompression SAM 163, and the content data C is decoded in a partially disclosing state by the decoder 222 using the content key data Kc under the control of the partially disclosing processor 225.

The partially disclosed decoded content data C is decompressed in a decompression unit 223, and is output to a digital-watermark information processor 224.

In the digital-watermark information processor 224, the user digital information data 196 is embedded into the content data C, and then, the content data C is played back in the playback module 169 so as to output sound corresponding to the content data C.

The digital-watermark information processor 224 also detects the digital watermark information embedded in the content data C, and determines whether the processing should be discontinued based on the detection result.

In step S38-5, when the user determines the purchase mode by operating the operation unit 165, the internal interrupt S810 corresponding to the determined purchase mode is output from the host CPU 810 to the SAM $105_1$.

Subsequently, in step S38-6, the accounting processor 187 of the SAM $105_1$ creates the usage log data 108 and the UCS data 166 according to the determined purchase mode, and writes the usage log data 108 to the external memory 201 via the external memory manager 811 and also writes the UCS data 166 to the work memory 200.

Thereafter, the usage monitor 186 controls (monitors) the situation to make sure that the purchase and use of the content are controlled within the conditions allowed by the UCS data 166.

Figure 39:
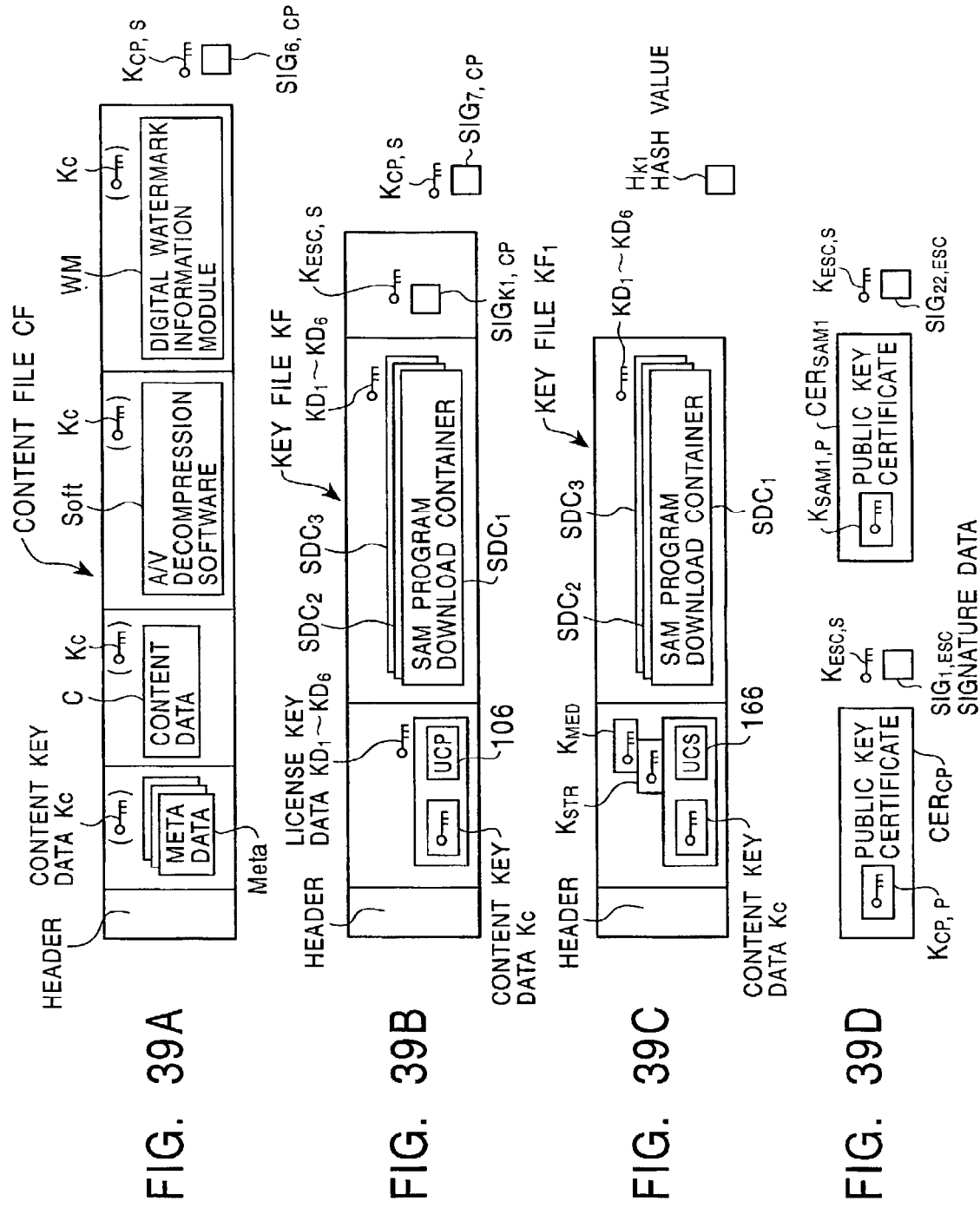
FIGS. 39A through 39D illustrate the secure container for which the purchase mode is determined.

In step S38-7, a new key file $KF_1$ shown in FIG. 39C, which is discussed below, is created, and is stored in the download memory 167 or another memory via the download memory manager 182.

The UCS data 166 stored in the key file $KF_1$ is encrypted, as shown in FIG. 39C, with the storage key data $K_{STR}$ and medium key data $K_{MED}$ by utilizing the CBC mode of the DES.

The storage key data $K_{STR}$ is data determined by the type of machine, such as a super audio compact disc (SACD) machine, a digital versatile disc (DVD) machine, a compact disc recordable (CD-R) machine, or a mini disc (MD) machine, and is used for corresponding one type of machine to one type of recording medium. The medium key data $K_{MED}$ is data unique to the recording medium.

In step S38-8, in the signature processor 189, the hash value $H_{K1}$ of the key file $KF_1$ is created by using the private key data $K_{SAM1,S}$ of the SAM $105_1$, and is written into the work memory 200 in correspondence with the key file $KF_1$. The hash value $H_{K1}$ is used for verifying the integrity of the key file $KF_1$ and the identity of the creator of the key file $KF_1$.

In sending the content data C with the purchase mode determined online or via a recording medium, a secure container 104p is created, as illustrated in FIGS. 39A through 39D, which stores the key file $KF_1$ and hash value $H_{K1}$ therefor, the content file CF and signature data $SIG_{6,CP}$ therefor, the key file KF and signature data $SIG_{7,CP}$, the public-key certificate data $CER_{CP}$ and signature data $SIG_{1,ESC}$ therefor, and public-key certificate data $CER_{SAM1}$ and signature data $SIG_{22,ESC}$ therefor.

As discussed above, upon determining the purchase mode of the secure container 104p, the UCS data 166 is created and is stored in the work memory 200. If the purchase mode of the same secure container 104p is re-determined in the SAM $105_1$, the UCS data 166 stored in the work memory 200 is updated according to the external interrupt (operation signal) S165.

Then, in step S38-9, the CPU 1100 checks whether the above-described purchase-mode determining processing has been correctly executed, and reports the corresponding information to the host CPU 810 via an external interrupt.

Alternatively, the CPU 1100 may set a flag in the SAM status register indicating whether the above-described purchase-mode determining processing has been correctly executed, in which case, the host CPU 810 reads the flag by polling.

Playback Processing of Content Data

Figure 40:
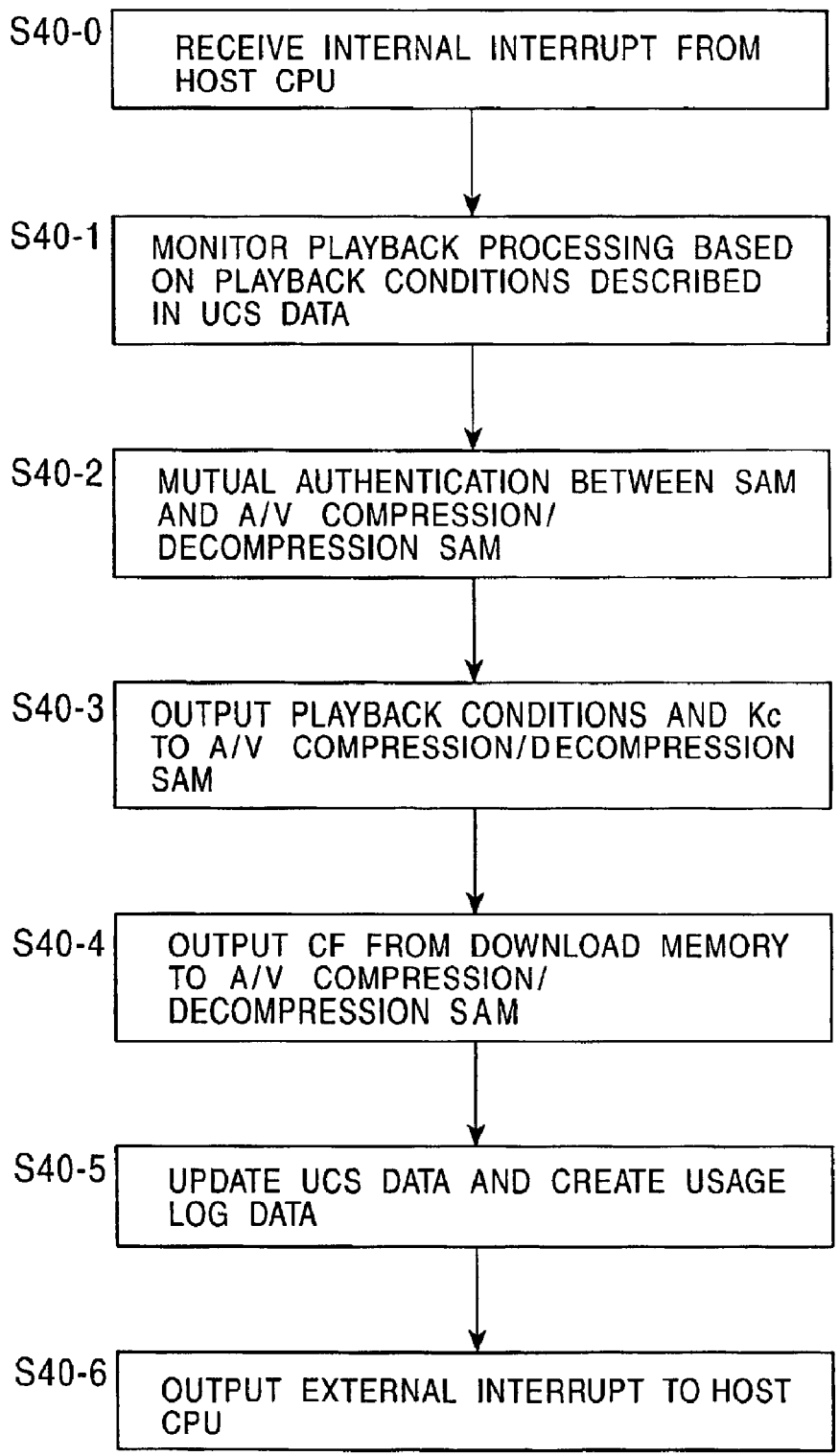
FIG. 40 is a flow chart illustrating the processing performed by the SAM for playing back the content data.

A description is given below, with reference to FIG. 40, of the process for playing back the content data C, for which the purchase mode is determined, stored in the download memory 167.

This processing is executed, assuming that the UCS data 166 is stored in the work memory 200 by the aforementioned purchase-mode determining processing.

In step S40-0, the CPU 1100 of the SAM 105$_1$ shown in FIG. 37 receives the internal interrupt S810 indicating an instruction to play back the content from the host CPU 810.

In step S40-1, the UCP data 166 is read from the work memory 200 to the usage monitor 186, and the usage monitor 186 interprets and verifies the playback conditions described in the UCP 166, and monitors the situation so that the subsequent playback operation is performed based on the UCP data 166.

Then, in step S40-2, mutual authentication is performed between the mutual authentication unit 170 shown in FIG. 37 and the mutual authentication unit 220 of the A/V compression/decompression SAM 163 shown in FIG. 22, and the session key data K$_{SES}$ is shared therebetween.

In step S40-3, the playback conditions interpreted and verified in step S40-1 and the content key data Kc read from the work memory 200 are encrypted by using the session key data K$_{SES}$ obtained in step S40-2, and are output to the A/V compression/decompression SAM 163.

Accordingly, the playback conditions and the content key data Kc are decoded with the session key data K$_{SES}$ in the decoder 221 of the A/V compression/decompression SAM 163 shown in FIG. 22.

Subsequently, in step S40-4, the content file CF read from the download memory 167 is encrypted by using the session key data K$_{SES}$, and is then output to the A/V compression/decompression SAM 163.

Accordingly, the content file CF is decoded with the session key data K$_{SES}$ in the decoder 221 of the A/V compression/decompression SAM 163. Subsequently, the content data C within the content file CF is decompressed in the decompression unit 223 of the A/V compression/decompression SAM 163, and the user digital watermark information is embedded into the decompressed content data C in the digital-watermark information processor 224. Then, the content data C is played back in the playback module 169.

In step S40-5, the UCS data 166 read in step S40-1 is updated if necessary, and the updated UCS data 166 is again written into the work memory 200. The usage log data 108 stored in the external memory 201 is updated or newly created.

The CPU 1100 then determines in step S40-6 whether the content playback processing has been correctly performed, and reports the result to the host CPU 810 through an external interrupt.

Alternatively, the CPU 1100 may set a flag in the SAM status register indicating whether the content playback processing has been correctly performed, and the host CPU 810 may read the flag by polling.

Figure 41:
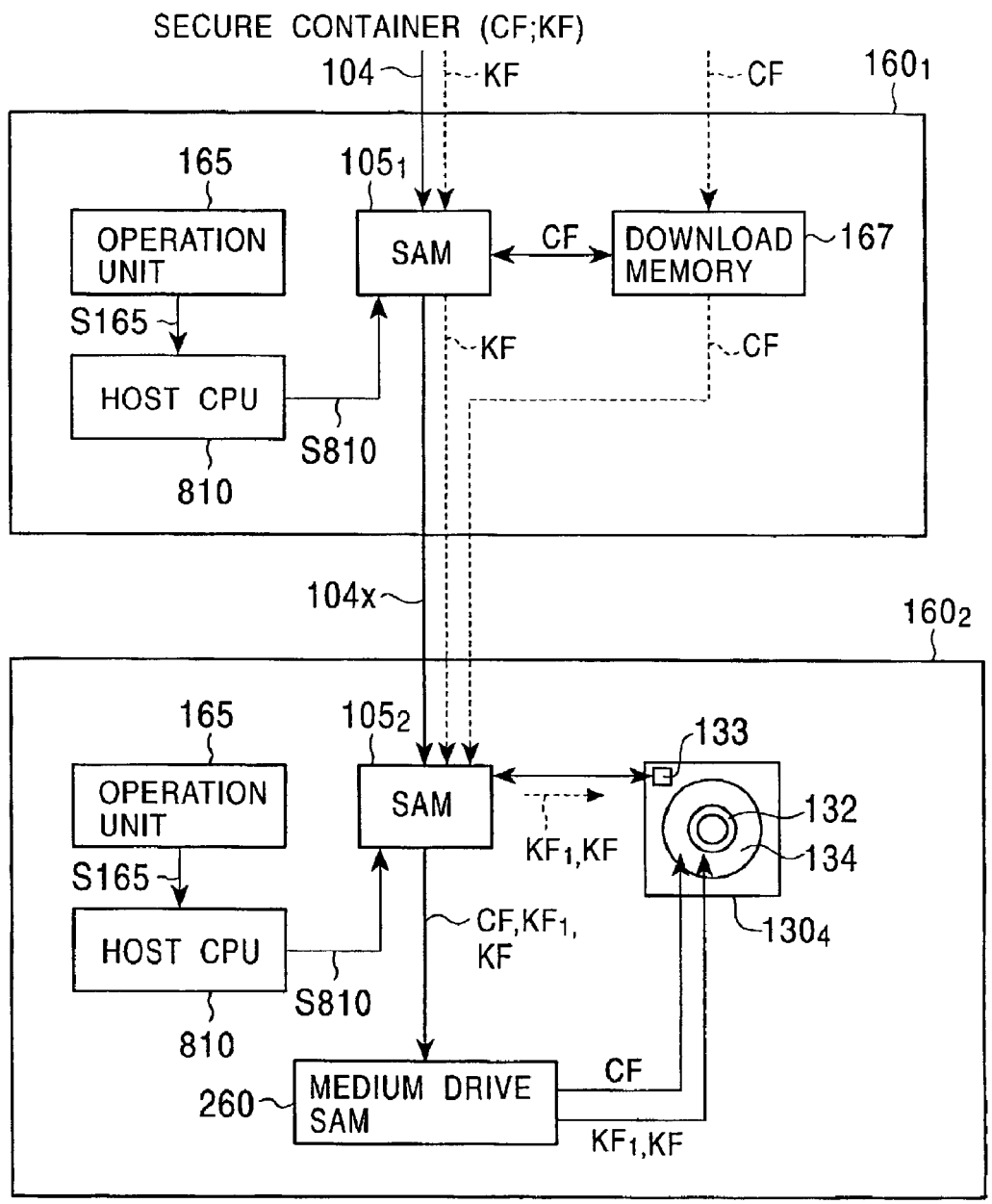
FIG. 41 is a block diagram illustrating the operation of transferring the content file, for which the purchase mode is determined, downloaded into a download memory of the network device shown in FIG. 22 to a SAM of an audio-visual (A/V) machine, and re-purchasing the content file in the A/V machine.

Processing to be Executed when the USC Data 166 of One Machine is Utilized for Re-Purchasing the Content in Another Machine After determining the purchase mode of the content file CF downloaded into the download memory 167 of the network device 160$_1$, a new secure container 104x storing the content file CF is created, as shown in FIG. 41, and is transferred to the SAM 105$_2$ of the A/V machine 160$_2$ via the bus 191. The processing to be executed in the SAM 105$_1$ in the above-described operation is discussed below with reference to FIGS. 42 and 43.

Figure 43:
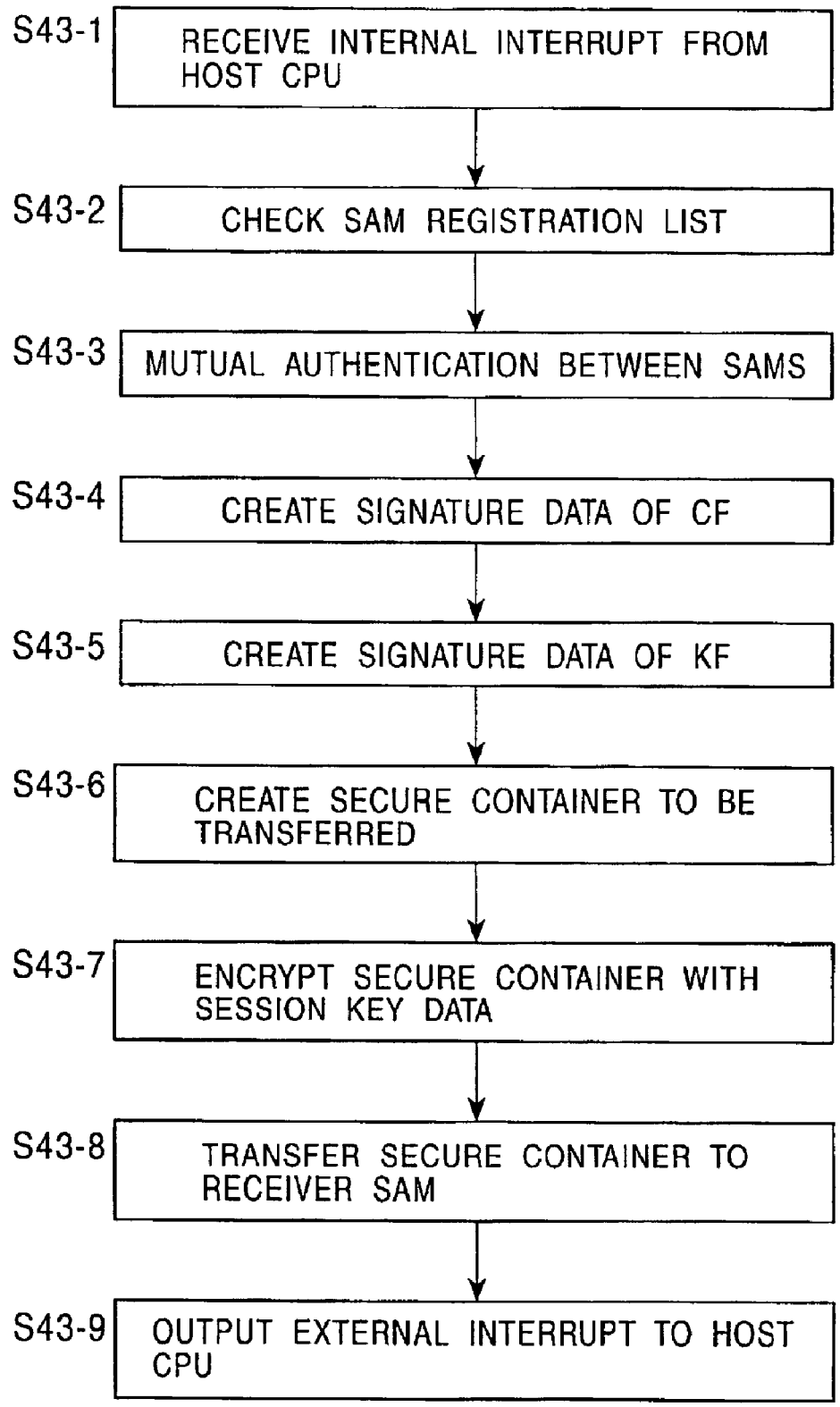
FIG. 43 is a flow chart illustrating the processing shown in FIG. 42.
Figure 44:
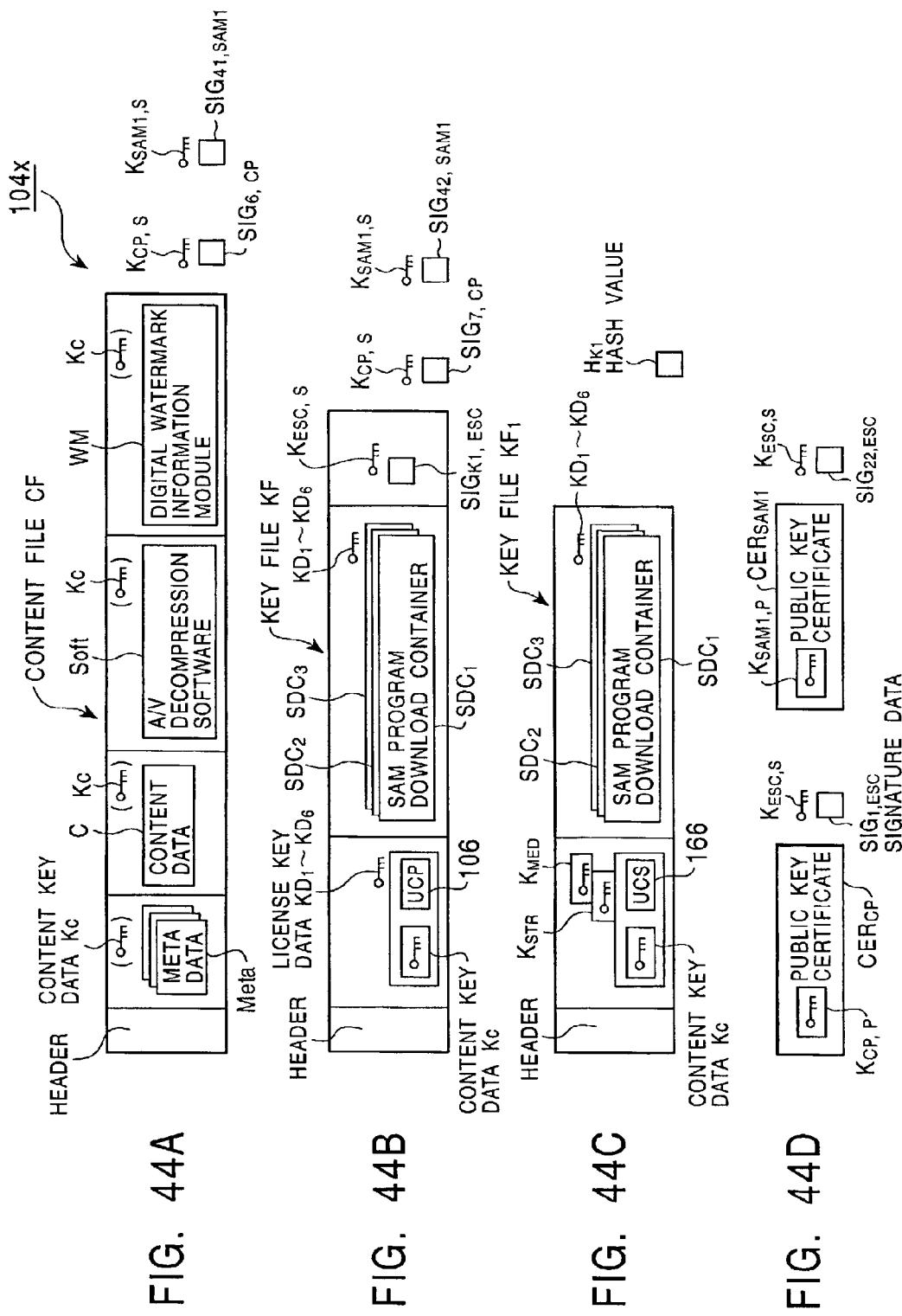
FIGS. 44A through 44D illustrate the format of the secure container to be transferred in FIG. 41.

The processing shown in FIG. 43 is executed, assuming that the key file KF$_1$ and the hash value H$_{K1}$ shown in FIG. 44C are stored in the work memory 200 of the SAM 105$_1$ by the above-described purchase processing.

Figure 42:
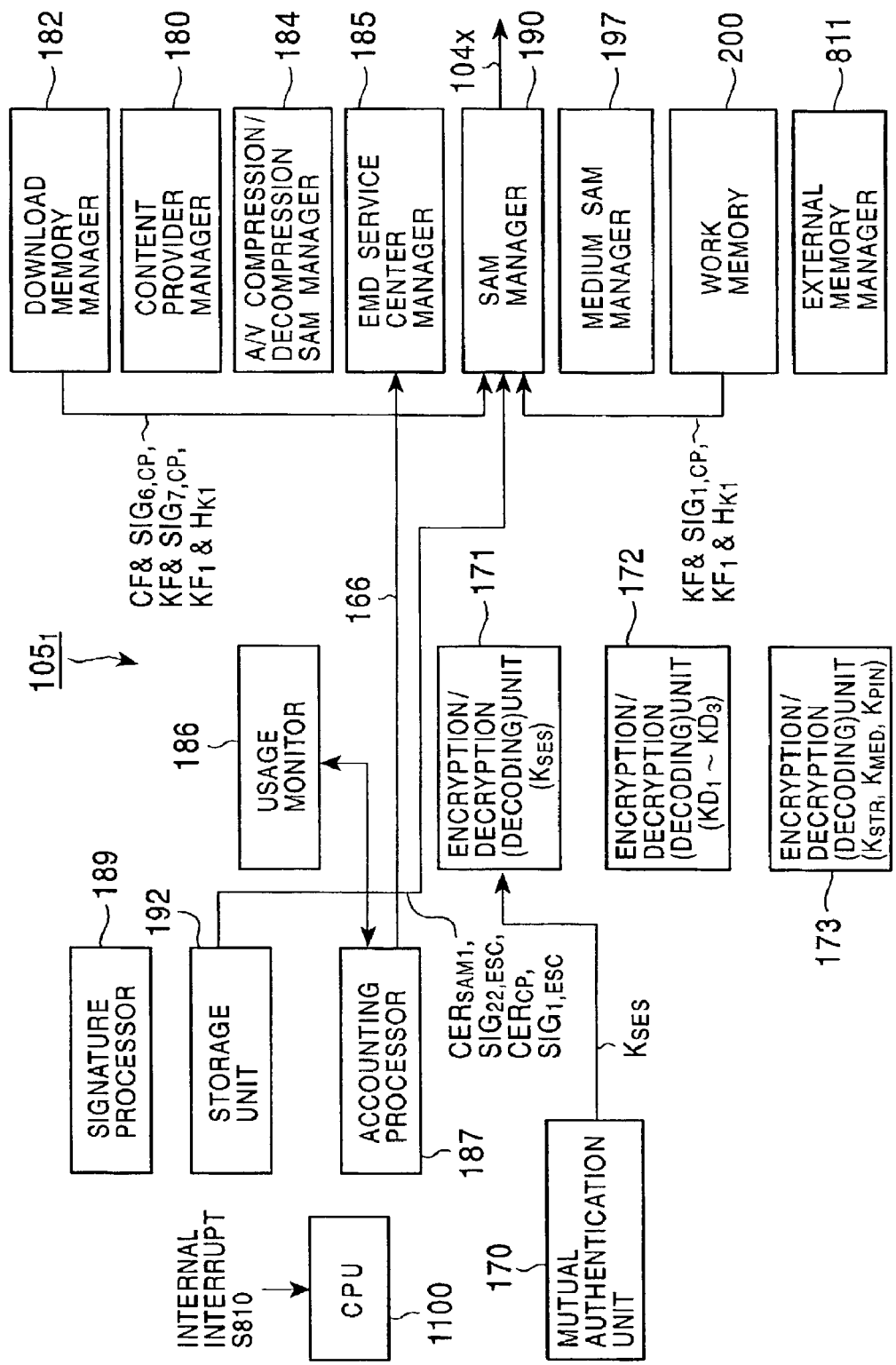
FIG. 42 illustrates the data flow within the receiver SAM shown in FIG. 41.

In step S43-1, according to the user's operation performed on the operation unit 165, the CPU 1100 of the SAM 105$_1$ shown in FIG. 42 receives the internal interrupt S810 indicating an instruction to transfer the secure container 104x, for which the purchase mode is determined, to the SAM 105$_2$. Accordingly, the accounting processor 187 updates the usage log data 108 stored in the external memory 201.

Then, in step S43-2, the SAM 105$_1$ checks the SAM registration list, which is discussed below, to verify the official registration of the SAM 105$_2$, which is to receive the secure container 104x. If so, the SAM 105$_1$ performs the processing of step S43-3. The SAM 105$_1$ also determines whether the SAM 105$_2$ is a SAM within the home network.

In step S43-3, the mutual authentication unit 170 shares the session key data K$_{SES}$ obtained after performing mutual authentication with the SAM 105$_2$.

In step S43-4, the SAM manager 190 reads the content file CF and the signature data SIG$_{6,CP}$ shown in FIG. 39A from the download memory 211, and controls the signature processor 189 to accordingly create signature data SIG$_{41,SAM1}$ by using the private key data K$_{SAM1}$ of the SAM 105$_1$.

Then, in step S43-5, the SAM manager 190 reads the key file KF and the signature data SIG$_{7,CP}$ shown in FIG. 39B from the download memory 211, and controls the signature processor 189 to accordingly create signature data SIG$_{42,SAM1}$ by using the private key data K$_{SAM1}$ of the SAM 105$_1$.

Thereafter, in step S43-6, the SAM manager 190 creates the secure container 104x shown in FIGS. 44A, 44B, and 44C.

In step S43-7, the secure container 104x is encrypted with the session key data K$_{SES}$ obtained in step S43-3 in the encryption/decryption (decoding) unit 171.

Subsequently, in step S43-8, the SAM manager 190 outputs the secure container 104x to the SAM 105$_2$ of the A/V machine 160$_2$ shown in FIG. 41. In this case, simultaneously with mutual authentication between the SAM 105$_1$ and the SAM 105$_2$, mutual authentication for the IEEE-1394 serial bus 191 is performed.

Then, in step S43-9, the CPU 1100 determines whether the secure container 104x, for which the purchase mode is determined, has been correctly transferred to the SAM 105$_2$, and reports the result to the host CPU 810 through an external interrupt.

Alternatively, the CPU 1100 may set a flag in the SAM status register indicating whether the secure container 104x has been correctly transferred to the SAM 105$_2$, and the host CPU 810 may read the flag by polling.

Figure 45:
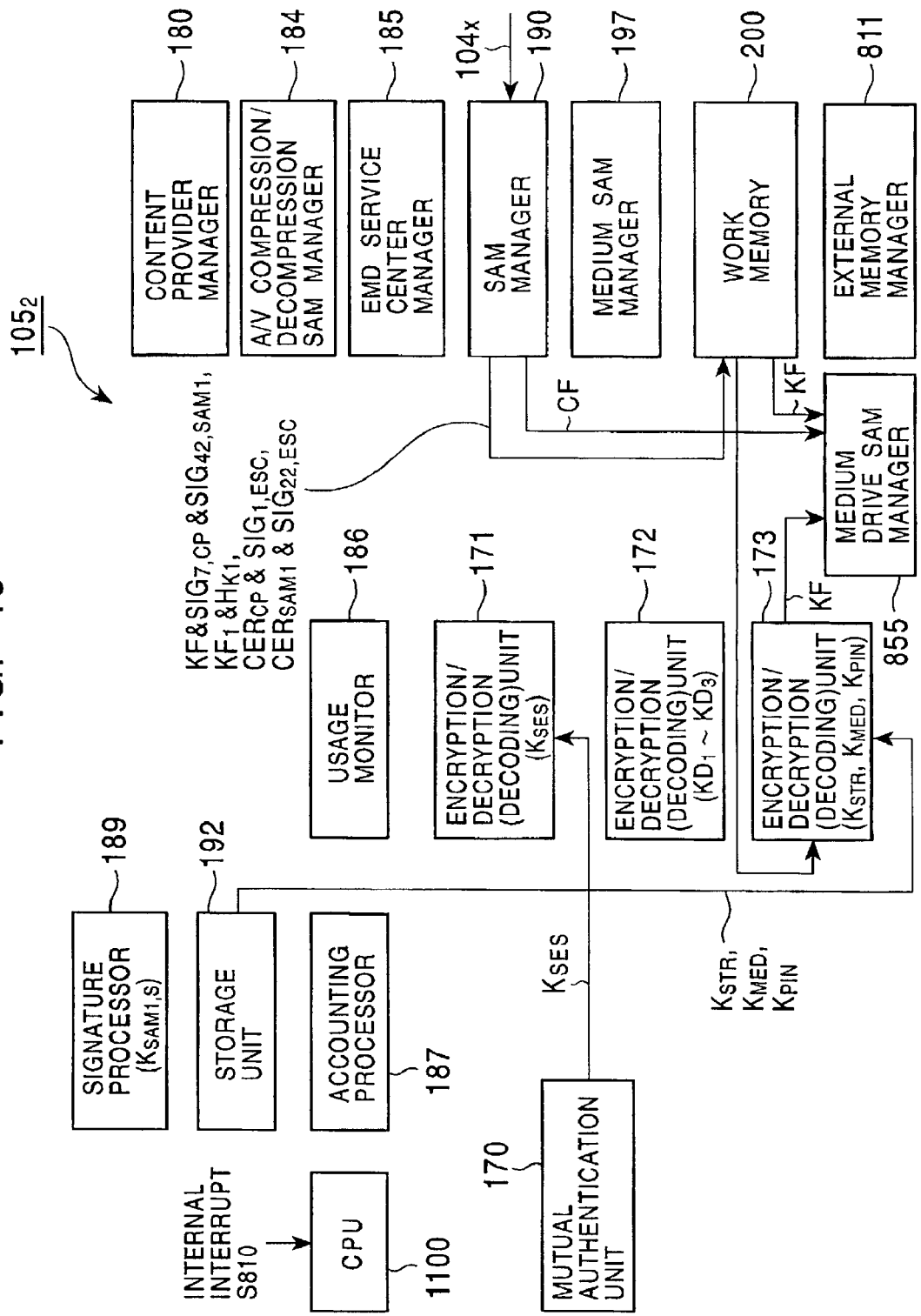
FIG. 45 illustrates the data flow when the received content file in the receiver SAM shown in FIG. 41 is written into a recording medium (ROM or RAM)
Figure 46:
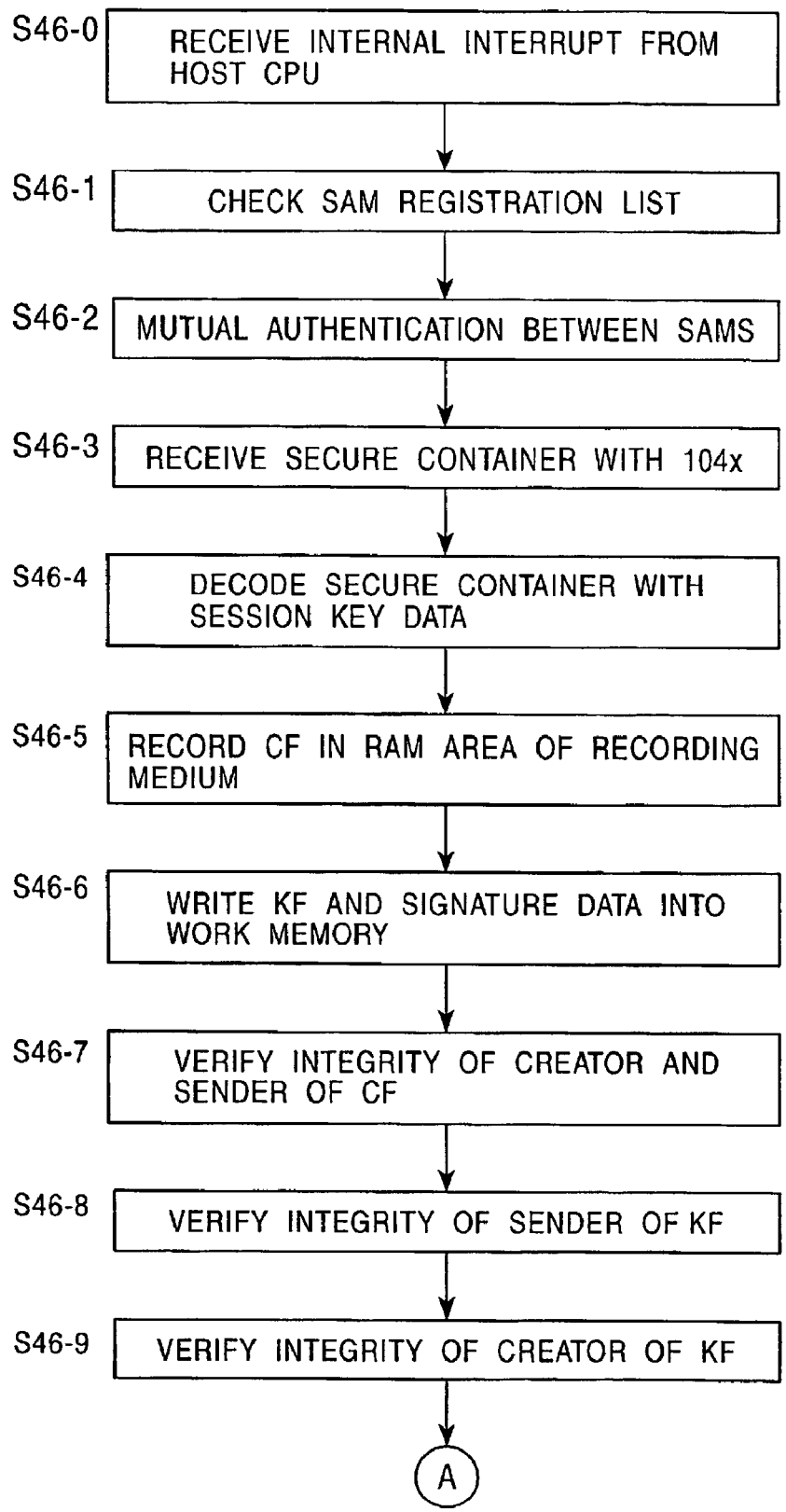
FIGS. 46 and 47 are a flow chart illustrating the processing by the receiver SAM shown in FIG. 41.
Figure 47:
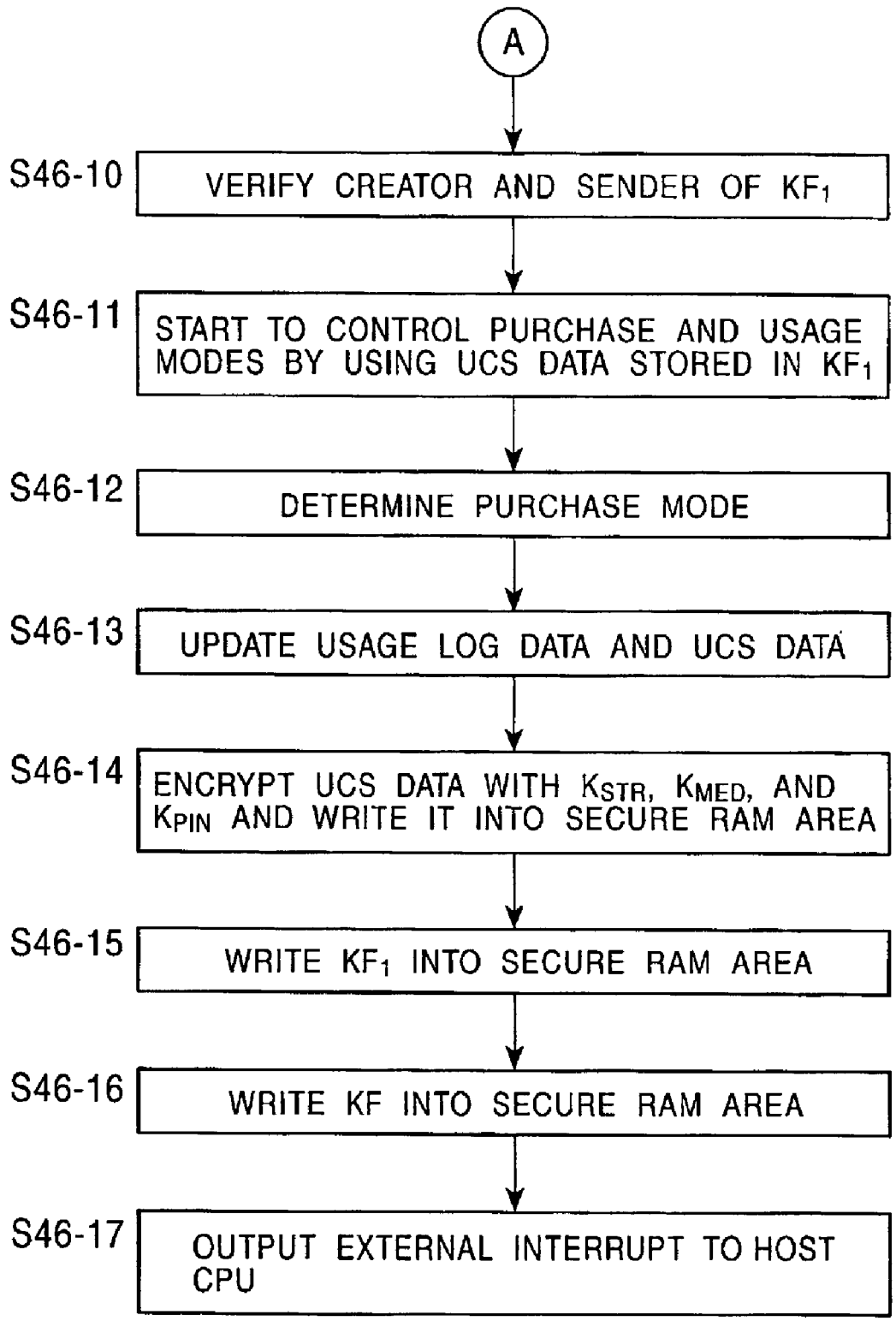

A description is now given, with reference to FIGS. 45, 46, and 47, of the process executed within the SAM 105$_2$ when the secure container 104x shown in FIGS. 44A through 44D received from the SAM 105$_1$ is written into the recording medium (RAM) 130$_4$ (FIG. 14), as illustrated in FIG. 41.

FIGS. 46 and 47 are a flow chart illustrating the above-described process.

As shown in FIGS. 14 and 41, the recording medium (RAM) 130$_4$ has the unsecured RAM area 134, the medium SAM 133, and the secure RAM area 132.

Referring to FIG. 46, in step S46-0, the CPU 1100 shown in FIG. 45 receives, from the host CPU 810 of the network device 160$_2$ shown in FIG. 41, the internal interrupt S810 indicating an instruction to receive the secure container 104x from the network device 160₁.

In step S46-1, the SAM 105₂ checks the SAM registration list to determine whether the SAM 105₁, which sends the secure container 104x, is officially registered. If so, the SAM 105₂ performs the processing of step S46-2. The SAM 105₂ also checks whether the SAM 105₁ is a SAM within the home network.

In response to the processing of the above-described step S43-3 shown in FIG. 43, the SAM 105₂ shares the session key $K_{SES}$ acquired by performing mutual authentication with the SAM 105₁.

In step S46-3, the SAM manager 190 of the SAM 105₂ receives, as shown in FIGS. 41 and 45, the secure container 104x from the SAM 105₁ of the network device 160₁.

In step S46-4, the encryption/decryption (decoding) unit 171 of the SAM 105₂ decodes the secure container 104x received via the SAM manager 190 by using the session key data $K_{SES}$ obtained in step S46-2.

Then, in step S46-5, the content file CF within the secure container 104x decoded by the session key data $K_{SES}$ undergoes processing in the medium drive SAM manager 855 shown in FIG. 45, such as sectorizing, adding a sector header, scrambling, error-correcting code (ECC) encoding, modulating, and synchronizing, and is then stored in the RAM area 134 of the recording medium (RAM) 130₄.

In step S46-6, the signature data $SIG_{6,CP}$ and $SIG_{41,SAM1}$, the key file KF and the signature data $SIG_{7,CP}$ and $SIG_{42,SAM1}$, and the key file KF₁ and the hash value thereof $H_{K1}$, the public key signature data $CER_{CP}$ and the signature data $SIG_{1,ESC}$ therefor, and the public key signature data $CER_{SAM1}$ and the signature data $SIG_{22,ESC}$ therefor within the secure container 104x, all of which are decoded with the session key data $K_{SES}$, are written into the work memory 200.

Subsequently, in step S46-7, the signature processor 189 verifies the integrity of the public-key certificate data $CER_{CP}$ and $CER_{SAM1}$ by using the public key data $K_{CP,P}$ read from the storage unit 192. The signature processor 189 also checks the integrity of the signature data $SIG_{6,CP}$ by using the public key data $K_{CP,P}$ stored in the public-key certificate data $CER_{SAM1}$ so as to verify the integrity of the creator of the content file CF. The signature processor 189 also checks the integrity of the signature data $SIG_{41,SAM1}$ by using the public key data $K_{SAM1,P}$ stored in the public-key certificate data $CER_{SAM1}$ so as to verify the integrity of the sender of the content file CF.

In step S46-8, the signature processor 189 verifies the integrity of the signature data $SIG_{7,CP}$ and $SIG_{42,SAM1}$ stored in the work memory 200 by using the public key data $K_{CP}$ and $K_{SAM1,P}$ so as to verify the sender of the key file KF.

Further, in step S46-9, the signature processor 189 checks the integrity of the signature data $SIG_{K1,ESC}$ stored in the key file KF shown in FIG. 44B by using the public key data $K_{ESC,P}$ read from the storage unit 192, thereby making it possible to verify the creator of the key file KF.

Referring to FIG. 47, in step S46-10, the signature processor 189 checks the integrity of the hash value $H_{K1}$ so as to verify the integrity of the creator and the sender of the key file KF₁.

In this example, the creator and the sender of the key file KF₁ are the same. However, if they are different, signature data for both the creator and the sender are created, and the signal processor 189 verifies the integrity of both the signature data.

In step S46-11, the usage monitor 186 controls the purchase and usage modes of the content data C by using the UCS data 166 stored in the key file KF₁ decoded in step S46-10.

In step S46-12, upon determining the purchase mode by operating the operation unit 165 by the user, the CPU 1100 of the SAM 105₂ receives the corresponding internal interrupt S810.

In step S46-13, the accounting processor 187 updates the usage log data 108 stored in the external memory 201 under the control of the CPU 1100. The accounting processor 187 also updates the UCS data 166 every time the purchase mode of the content data is determined. In this case, the UCS data 166 of the sender SAM is discarded.

Then, in step S46-14, the encryption/decryption (decoding) unit 173 of the SAM 105₂ encrypts the UCS data 166 generated in step S46-12 by sequentially using the storage key data $K_{STR}$, the medium key data $K_{MED}$, and the purchase key data $K_{PIN}$ read from the storage unit 192, and outputs the encrypted UCS data 166 to the medium drive SAM manager 855.

In step S46-15, the medium drive SAM manager 855 executes processing, such as sectorizing, adding a sector header, scrambling, ECC encoding, modulating, and synchronizing, on the key file KF₁ having the updated UCS data 166, and stores it in the secure RAM area 132 of the recording medium (RAM) 130₄.

The medium key data $K_{MED}$ has already been stored in the storage unit 192 by mutual authentication between the mutual authentication unit 170 of the SAM 105₂ shown in FIG. 45 and the medium SAM 133 of the recording medium 130₄ shown in FIG. 41.

The storage key data $K_{STR}$ is data determined by the type of machine (in this example, the A/V machine 160₂), such as a SACD machine, a DVD machine. CD-R machine, or an MD machine, and is used for corresponding one type of machine to one type of recording medium. A SACD and a DVD have the same physical structure of a disk medium. Accordingly, data on a SACD can be recorded and played back by using a DVD machine, in which case, the storage key data $K_{STR}$ serves the function of preventing illegal copying. In this embodiment, encryption with the use of the storage key data $K_{STR}$ may not be performed.

The medium key data $K_{MED}$ is data unique to the recording medium (in this example, the recording medium (RAM) 130₄).

The medium key data $K_{MED}$ is stored in a storage medium (in this example, the storage medium (RAM) 130₄ shown in FIG. 41), and encryption and decryption is preferably performed by using the medium key data $K_{MED}$ in the medium SAM of the recording medium in terms of the security. In this case, if the recording medium is provided with a medium SAM, the medium key data $K_{MED}$ is stored in the medium SAM, and if not, the medium key data $K_{MED}$ is stored within the RAM area, i.e., an area (not shown) outside the control of the host CPU 810.

As in this embodiment, mutual authentication may be performed between the SAM 105₂ and the medium SAM (in this example, medium SAM 133), and then, the medium key data $K_{MED}$ may be transferred to the SAM 105₂ via a secure communication path, and encryption and decryption may be performed in the SAM 105₂ by using the medium key data $K_{MED}$.

In this embodiment, the storage key data $K_{STR}$ and the medium key data $K_{MED}$ may be used for protecting the security of the physical layer of the recording medium.

The purchaser key data $K_{PIN}$ is data indicating the purchaser of the content file CF, and if the content is purchased in the "sell through" mode, the purchaser key data $K_{PIN}$ is assigned to the user from the EMD service center 102. The purchaser key data $K_{PIN}$ is managed by the EMD service center 102.

In step S46-16, the key file KF is read from the work memory 200, and is written into the secure RAM area 132 of the recording medium (RAM) 130$_4$ by the medium drive SAM 260 shown in FIG. 41 via the medium drive SAM manager 855.

In step S46-17, the CPU 1100 of the SAM 105$_2$ reports the result of the processing for the received secure container 104$x$ to the host CPU 810 through an external interrupt.

Alternatively, the CPU 1100 may set a flag in the SAM status register indicating whether the above-described processing has been correctly performed, and the host CPU 810 may read the flag by polling.

In the above-described embodiment, the key files KF and KF$_1$ are recorded on the secure RAM area 132 of the recording medium (RAM) 130$_4$ via the medium drive SAM 260. However, the key files KF and KF$_1$ may be recorded on the medium SAM 133 from the SAM 105$_2$, as indicated by the one-dot chain line in FIG. 41.

In the aforementioned embodiment, the secure container 104$x$ is sent from the SAM 105$_1$ to the SAM 105$_2$. However, the content file CF and the UCP data 106 may be sent from the network device 160$_1$ to the A/V machine 106$_2$ under the control of the host CPUs of the network device 106$_1$ and the A/V machines 106$_2$. In this case, the UCS data 166 and the content key data Kc are sent from the SAM 105$_1$ to the SAM 105$_2$.

As a modification to the above-described embodiment, the purchase mode is determined in the SAM 105$_1$, and the SAM 105$_2$ uses the UCS data 166 without determining the purchase mode. In this case, the usage log data 108 is created only in the SAM 105$_1$, but not in the SAM 105$_2$.

In purchasing the content data C, for example, an album consisting of a plurality of content data C may be purchased. In this case, the plurality of content data C may be provided by different content providers 101 (in the second embodiment, which is described below, the plurality of content data C may be provided by different service providers 310). Alternatively, part of the content data C forming an album may be initially purchased, and later, the remaining content data C may be gradually purchased. As a result, the whole album is purchased.

Figure 48:
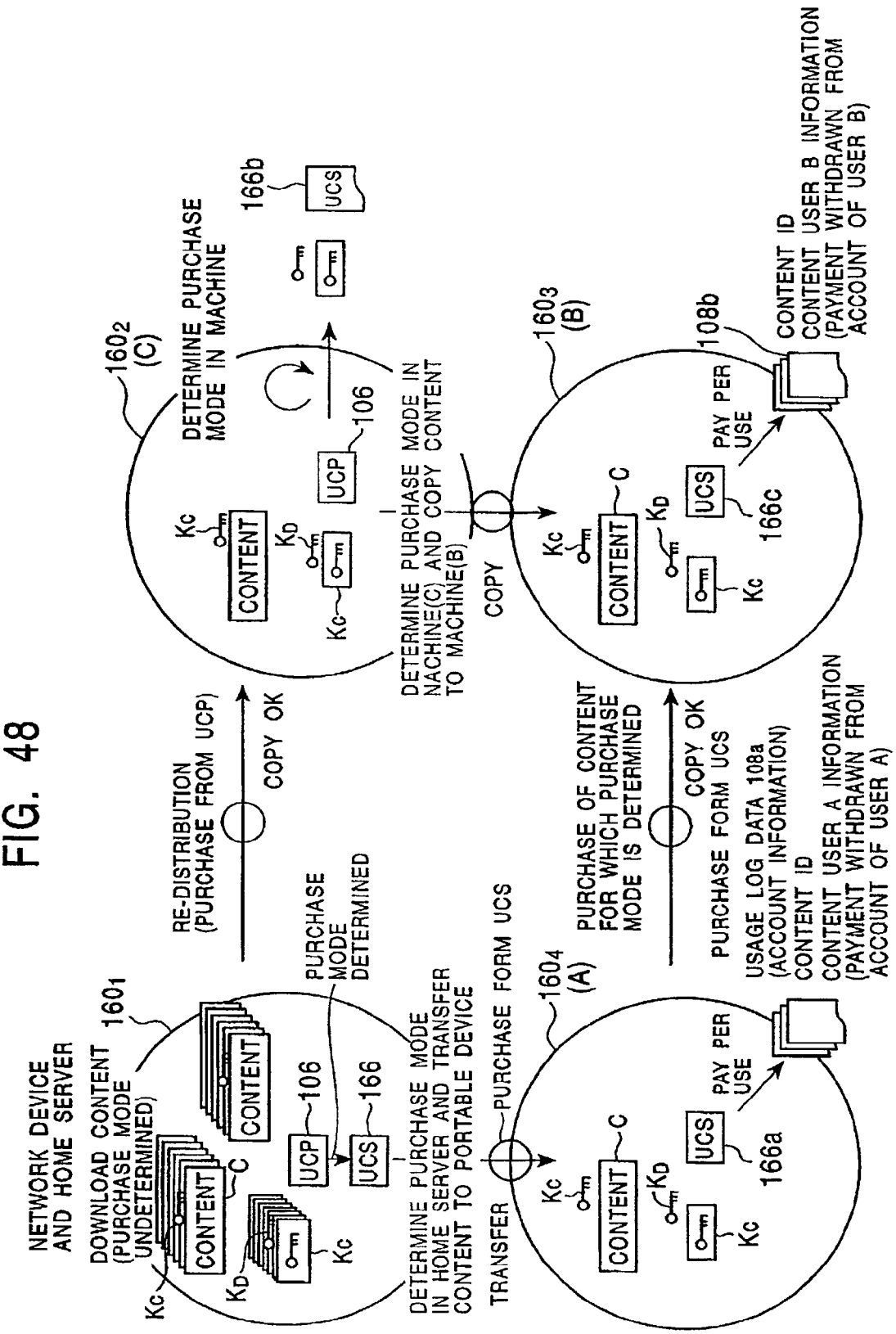
FIG. 48 illustrates various purchase modes in the SAMs within the user home network shown in FIG. 1.

FIG. 48 illustrates examples of various purchase modes of the content data C.

The network device 160$_1$ purchases the content data C which has been received from the content provider 101 by using the UCP data 106, and generates UCS data 166$a$.

Similarly, the A/V machine 160$_2$ purchases the content data C which has been received from the content provider 101 to the network device 160$_1$ by using the UCP data 106, and generates UCS data 166$b$.

The A/V machine 160$_3$ copies the content data C purchased by the A/V machine 160$_2$, and determines the usage mode by using the UCS data 166$b$ created in the A/V machine 160$_2$. As a result, UCS data 166$c$ is generated in the A/V machine 160$_3$. The A/V machine 160$_3$ also creates usage log data 108$b$ from the UCS data 166$c$.

The network device 160$_4$ receives the content data C which has been received from the content provider 101 to the network device 160$_1$ and determined the purchase mode in the network device 160$_1$, and then determines the purchase mode by using the UCS data 166 created by the network device 160$_1$. As a result, the UCS data 166$a$ is generated in the A/V machine 160$_4$, and usage log data 108$a$ is also created from the UCS data 166$a$.

The UCS data 166$a$, 166$b$, and 166$c$ are respectively encrypted in the A/V machines 160$_4$, 160$_2$, and 160$_3$ by using the storage key data $K_{STR}$ unique to the machine and the medium key data $K_{MED}$ unique to the recording medium, and are recorded on the corresponding recording media.

In this embodiment, the user pays for licensing rights for the content data C rather than for property rights. The copying of the content data contributes to promotion of the content, and also satisfies the demands of the right holders of the content data in view of expediting the sale.

Processing for Determining the Purchase Mode of Content Data on a Recording Medium (ROM)

Figure 49:
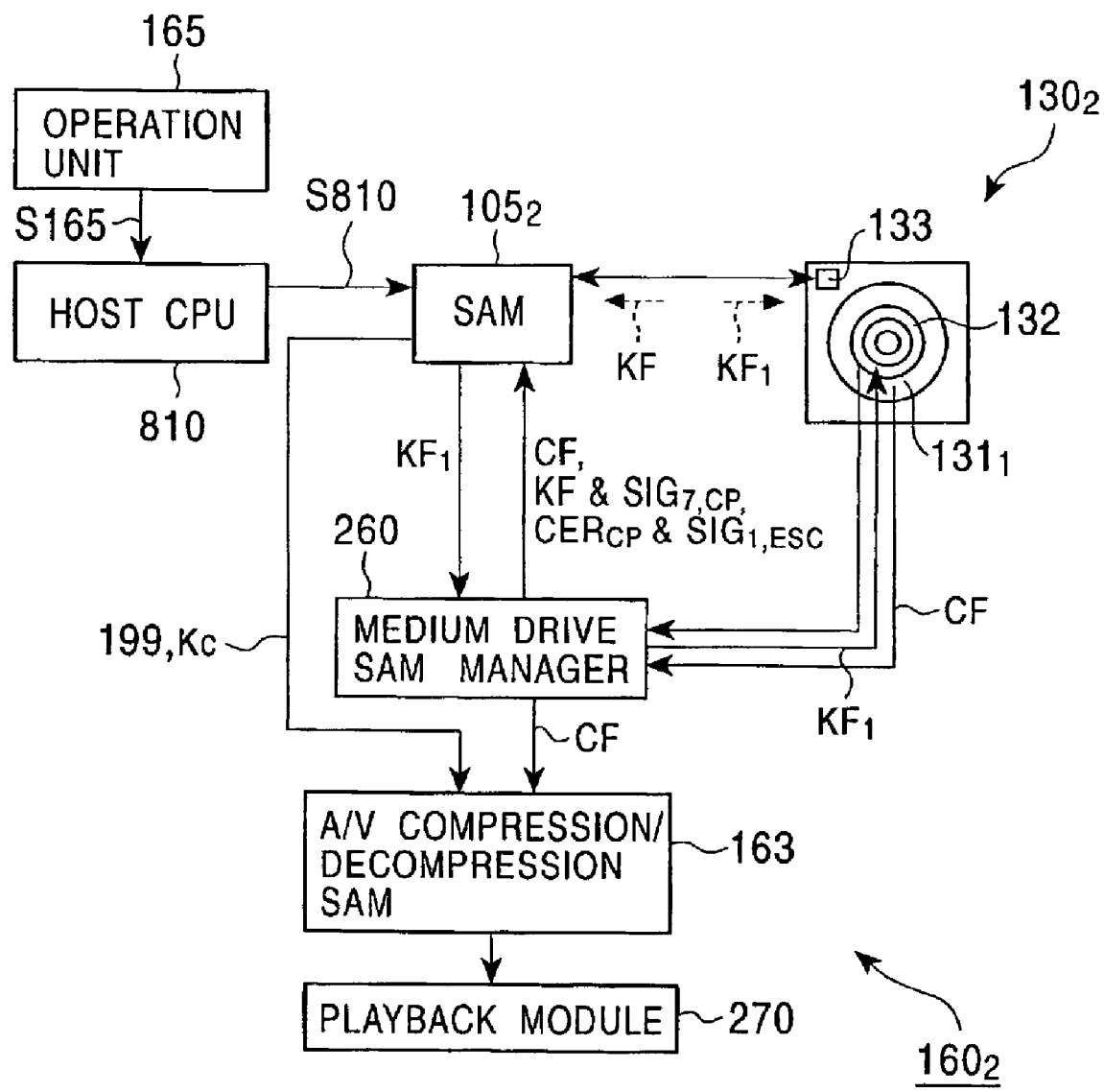
FIG. 49 illustrates the data flow within an A/V machine when the recording medium (ROM) shown in FIG. 11, for which the purchase mode is not determined, is distributed offline to the user home network, and the purchase mode of the content file is determined by the A/V machine.

As shown in FIG. 49, the recording medium (ROM) 130$_1$ shown in FIG. 11 which stores the content and for which the purchase mode is still undetermined is distributed offline to the A/V machine 160$_2$ via a user home network 103, and the A/V machine 160$_2$ determines the purchase mode. This processing is discussed below with reference to FIGS. 50 and 51.

Figure 50:
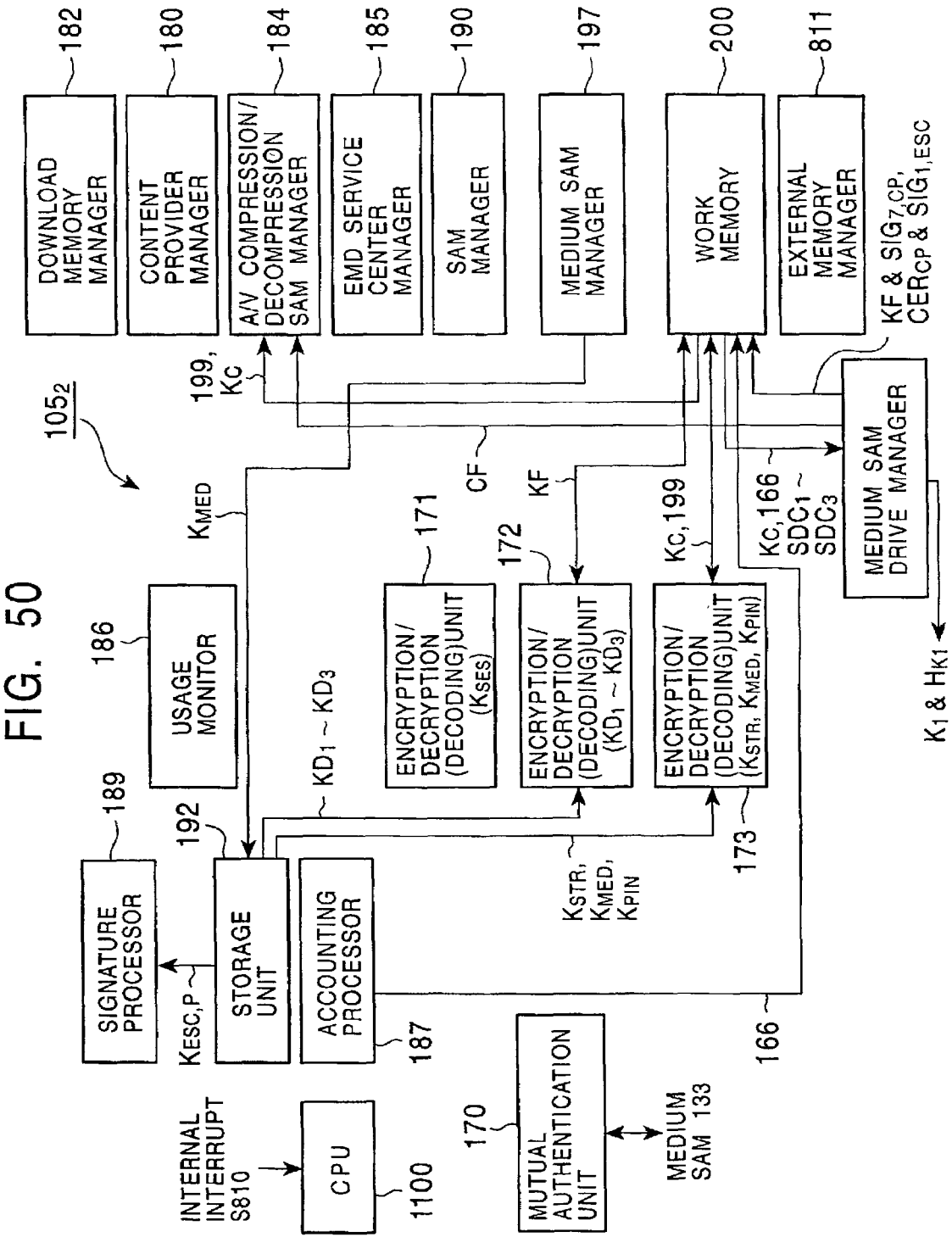
FIG. 50 illustrates the data flow within the SAM of the A/V machine shown in FIG. 49.
Figure 51:
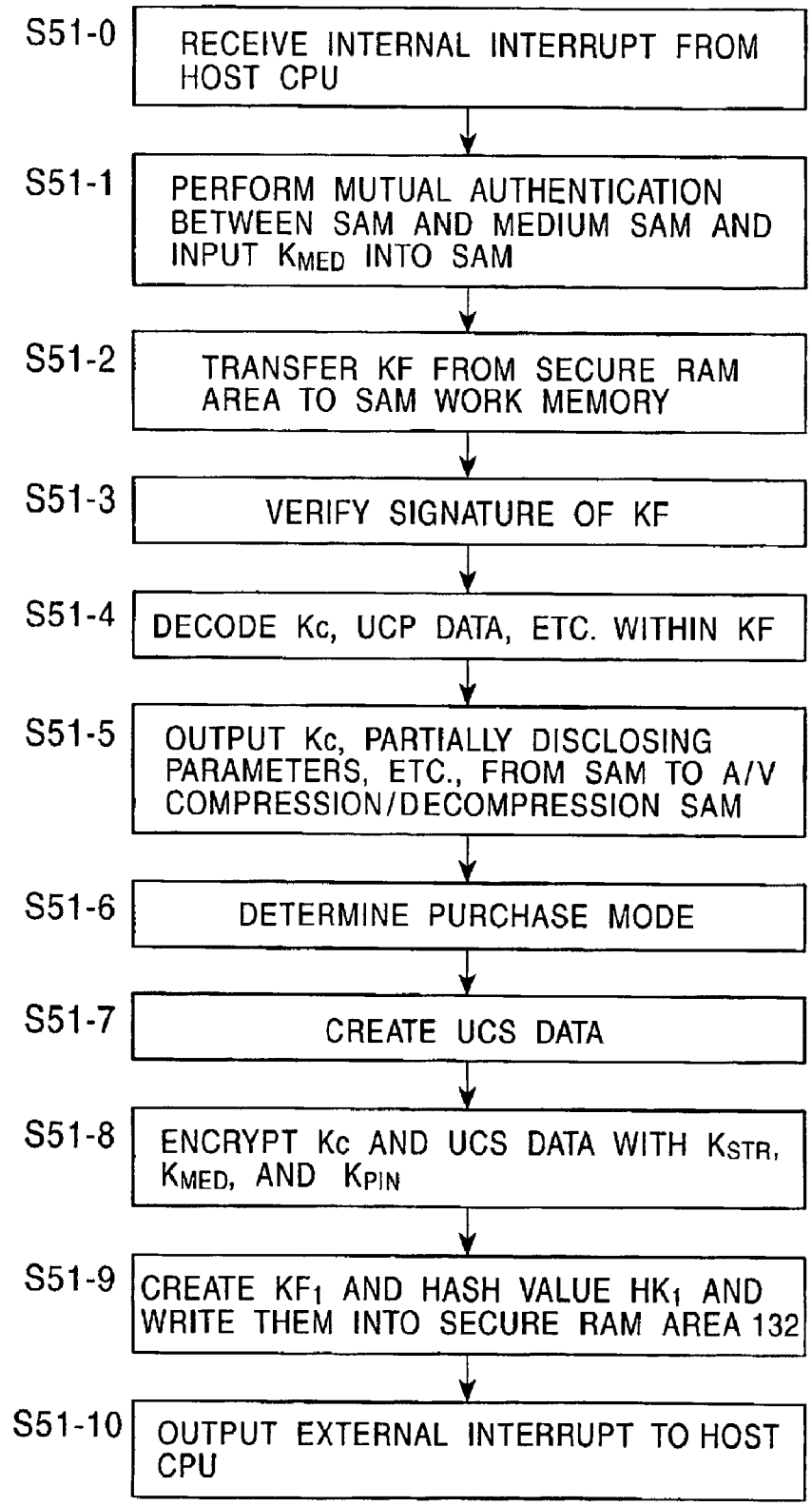
FIG. 51 is a flow chart illustrating the processing performed by the SAM of the A/V machine shown in FIG. 49.

Referring to FIG. 51, in step S51-0, according to the user's operation performed on the operation unit 165, the CPU 1100 of the SAM 105$_2$ shown in FIG. 50 receives the internal interrupt S810 indicating an instruction to determine the purchase mode of the content distributed via a recording medium (ROM).

In step S51-1, after performing mutual authentication between the mutual authentication unit 170 shown in FIG. 50 and the medium SAM 133 of the recording medium (ROM) 130$_1$ shown in FIG. 11, the SAM 105$_2$ receives the medium key data $K_{MED}$ from the medium SAM 133. If the SAM 105$_2$ already has the medium key data $K_{MED}$ stored therein, it is not necessary to receive the medium key data $K_{MED}$.

Then, in step S51-2, the key file KF and the signature data $SIG_{7,CP}$ therefor, and the public-key certificate data $CER_{CP}$ and the signature data $SIG_{1,ESC}$ therefor, which are shown in FIGS. 3B and 3C, stored in the secure container 104 recorded on the secure RAM area 132 of the recording medium (ROM) 130$_1$, are written into the work memory 200 via the medium drive SAM manager 855.

In step S51-3, after verifying the integrity of the signature data $SIG_{1,ESC}$, the signature processor 189 extracts the public key data $K_{CP,P}$ from the public-key certificate data $CER_{CP}$, and verifies the integrity of the signature data $SIG_{7,CP}$, i.e., the sender of the key file KF, by using the public key data $K_{CP,P}$.

The signature processor 189 also verifies the integrity of the signature data $SIG_{K1,ESC}$ stored in the key file KF, i.e., the creator of the key file KF, by using the public key data $K_{ESC,P}$ read from the storage unit 192.

Subsequently, in step S51-4, after verifying the integrity of the signature data $SIG_{7,CP}$ and $SIG_{K1,ESC}$ in the signature processor 189, the key file KF is read from the work memory 200 and written into the encryption/decryption (decoding) unit 172.

Then, the encryption/decryption (decoding) unit 172 decrypts (decodes) the content key data Kc, the UCP data 106, and the SAM program download containers SDC$_1$ through SDC$_3$ stored in the key file KF by using the license key data KD$_1$ through KD$_3$ of corresponding periods, and writes them into the work memory 200.

In step S51-5, after conducting mutual authentication between the mutual authentication unit 170 shown in FIG. 50 and the A/V compression/decompression SAM 163 shown in FIG. 49, the A/V compression/decompression SAM manager 184 of the SAM 150$_2$ outputs the content key data Kc stored in the work memory 200, the partially disclosing parameter data 199 stored in the UCP data 106, and the content data C stored in the content file CF read from the ROM area 131 of the recording medium (ROM) $130_1$ to the A/V compression/decompression SAM 163 shown in FIG. 49.

Then, the A/V compression/decompression SAM 163 decodes and decompresses the content data C in the partially disclosing mode by using the content key data Kc, and outputs it to the playback module 270. The content data C is then played back in the playback module 270.

Thereafter, in step S51-6, the purchase mode of the content is determined according to the user's operation of the operation unit 165 shown in FIG. 49, and the internal interrupt S810 indicating the determined purchase mode is output to the CPU 1100 of the SAM $105_2$.

In step S51-7, the accounting processor 187 creates the UCS data 166 according to the operation signal S165 and writes it into the work memory 200.

In step S51-8, the content key data Kc and the UCS data 166 are output from the work memory 200 to the encryption/decryption (decoding) unit 173.

The encryption/decryption (decoding) unit 173 then sequentially encrypts the content key data Kc and the UCS data 166 by using the storage key data $K_{STR}$, the medium key data $K_{MED}$, and the purchaser key data $K_{PIN}$ read from the storage unit 192, and writes them into the work memory 200.

In step S51-9, the medium SAM manager 197 creates the key file $KF_1$ shown in FIG. 44C from the encrypted content key data Kc, the UCS data 166, and the SAM program download containers $SDC_1$ through $SDC_3$ read from the work memory 200.

In the signature processor 189, the hash value $H_{K1}$ of the key file $KF_1$ shown in FIG. 44C is created, and is output to the medium drive SAM manager 855.

After conducting mutual authentication between the mutual authentication unit 170 shown in FIG. 50 and the medium SAM 133 shown in FIG. 49, the medium drive SAM manager 855 writes the key file $KF_1$ and the hash value $H_{K1}$ to the secure RAM area 132 of the recording medium (ROM) $130_1$ via the medium drive SAM 260 shown in FIG. 49. As a result, the recording medium $130_1$, for which the purchase mode is determined, is obtained.

Simultaneously, the UCS data 166 and the usage log data 108 created by the accounting processor 187 are appropriately sent from the work memory 200 and the external memory 201, respectively, to the EMD service center 102.

If the key file KF is stored in the medium SAM 133 of the recording medium (ROM) $130_1$, the SAM $105_2$ receives the created key file $KF_1$ from the medium SAM 133, as indicated by the one-dot chain line in FIG. 49. In this case, the SAM $105_2$ writes the created key file $KF_1$ into the medium SAM 133.

In step S51-10, the CPU 1100 of the SAM $105_2$ determines whether the processing for determining the purchase mode of the content distributed via the above-described recording medium (ROM) has been correctly performed, and reports the result to the host CPU 810 through an external interrupt.

Alternatively, the CPU 1100 may set a flag in the SAM status register indicating whether the above-described processing has been correctly performed, and the host CPU 810 may read the flag by polling.

Figure 52:
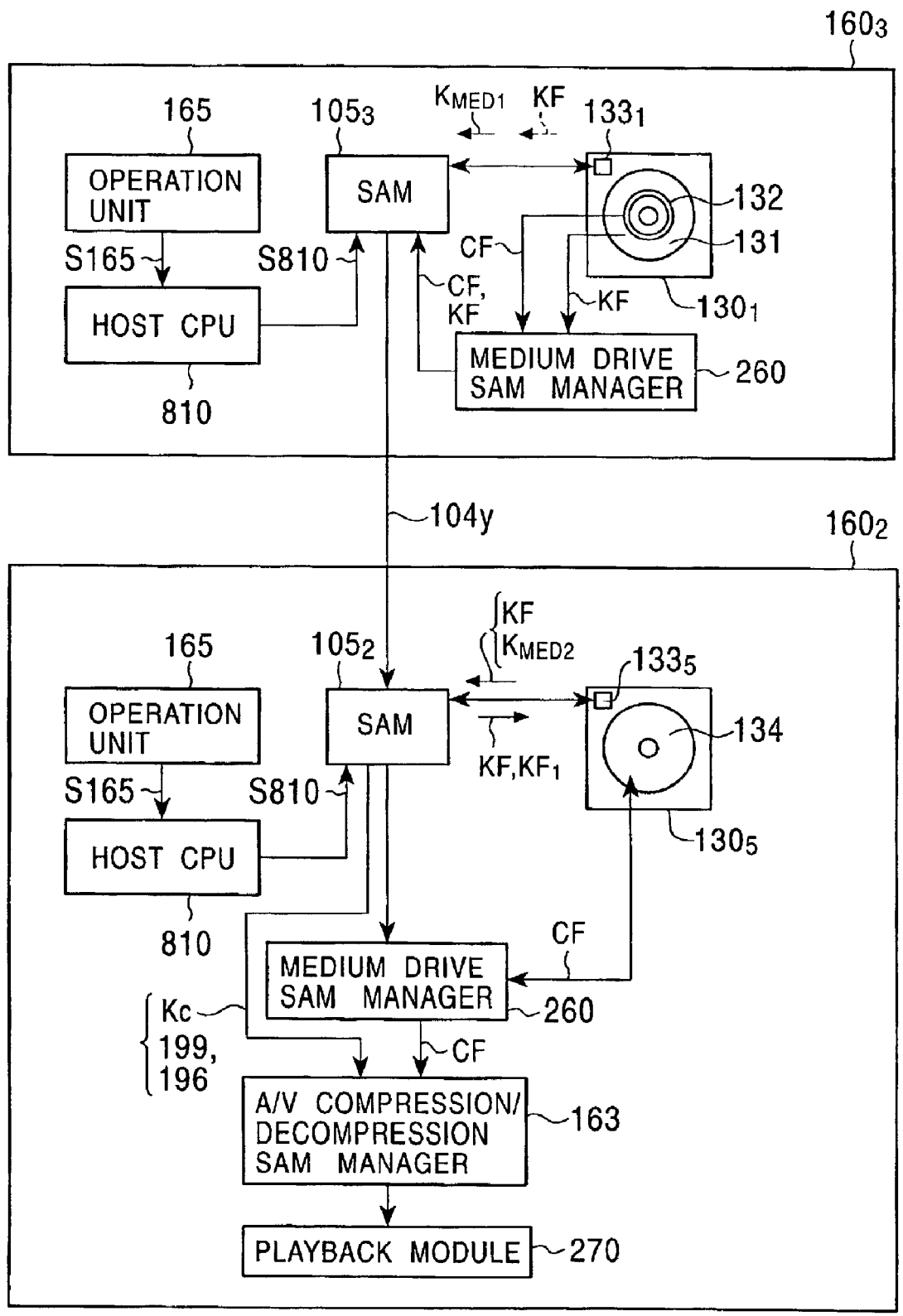
FIG. 52 illustrates the processing for reading the secure container, for which the purchase mode is not determined, from a recording medium (ROM) of an A/V machine within the user home network, and for transferring the secure container to another A/V machine and writing it into a recording medium (RAM)

Processing for Writing Content Data into a Recording Medium (RAM) after the Purchase Mode of the Content Data in a Recording Medium (ROM) has Been Determined As shown in FIG. 52, the secure container 104, for which the purchase mode is still undetermined, is read from the recording medium (ROM) $130_1$, and a new secure container 104y is created in the A/V machine $160_3$ and is transferred to the A/V machine $160_2$. The purchase mode of the secure container 104y is determined in the A/V machine $160_2$, and the secure container 104y is written into the recording medium (RAM) $130_5$. The flow of this process is described below with reference to FIGS. 53, 54, and 55.

It should be noted that the transfer of the secure container 104y from the recording medium (ROM) $130_1$ to the recording medium (RAM) $130_5$ may be performed among any of the network device $160_1$ and the A/V machines $160_2$ through $160_4$ shown in FIG. 1.

Figure 53:
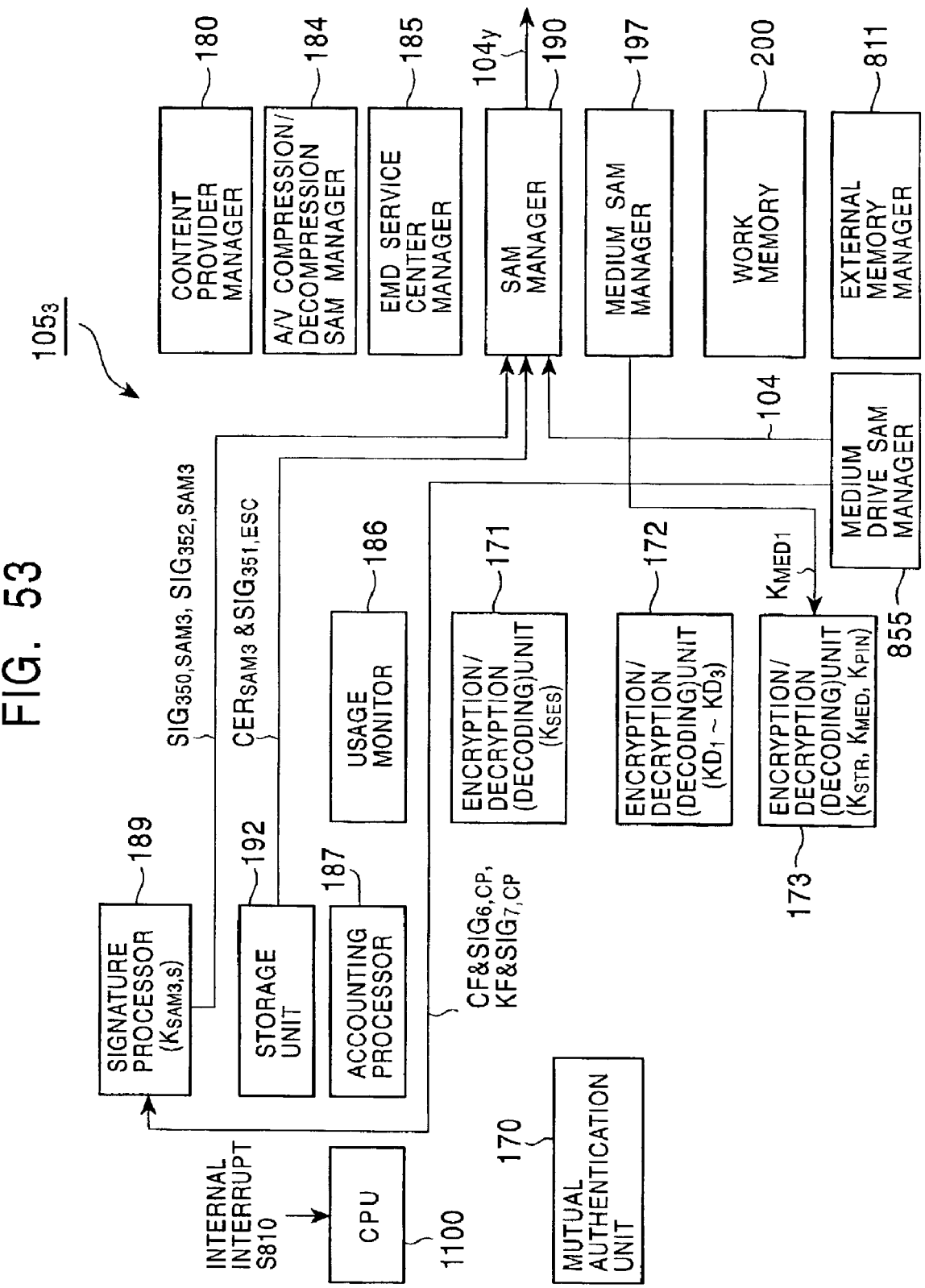
FIG. 53 illustrates the data flow within the receiver SAM shown in FIG. 52.
Figure 54:
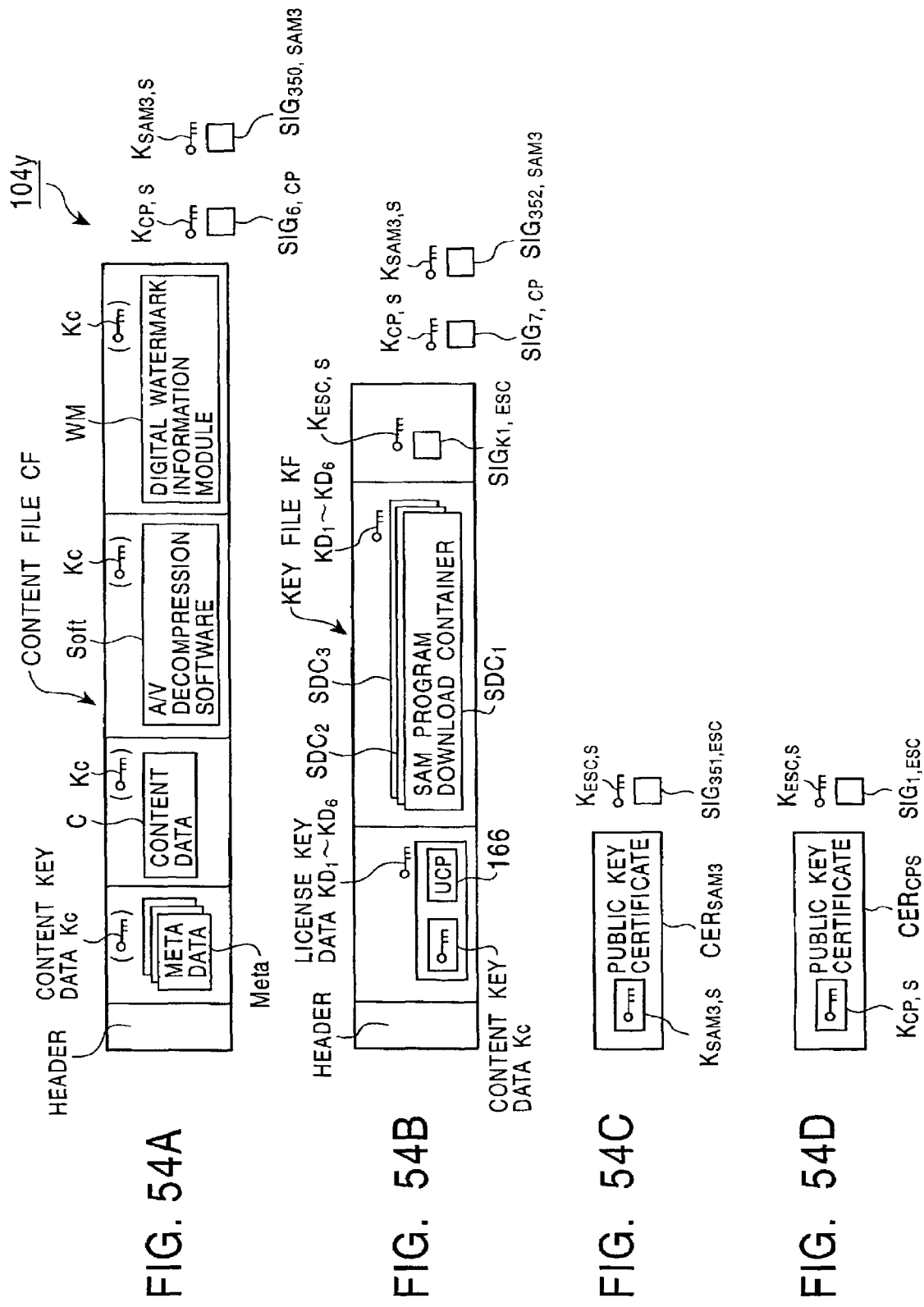
FIGS. 54A through 54D illustrate the format of the secure container transferred from the sender SAM to the receiver SAM shown in FIG. 52.
Figure 55:
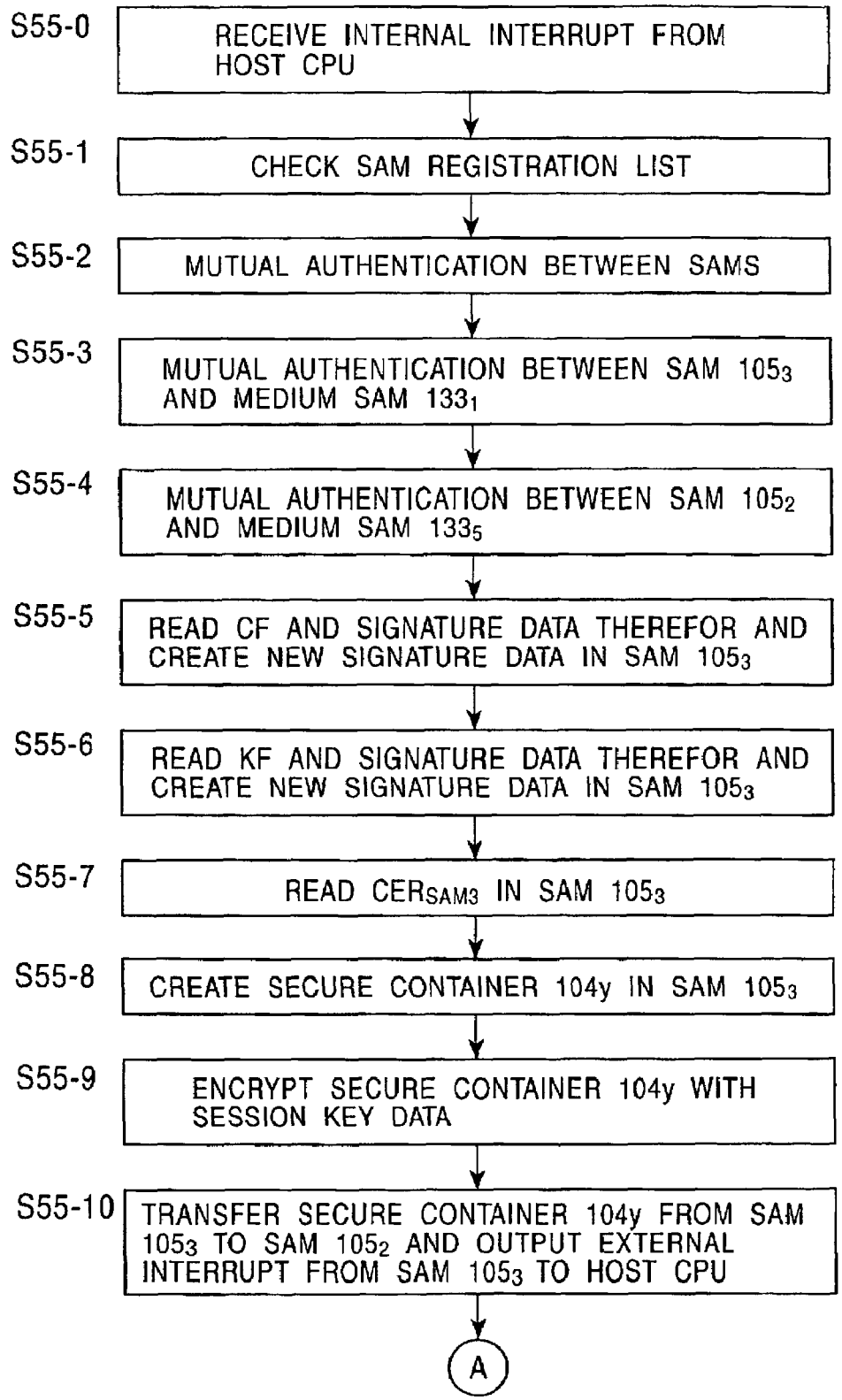
FIGS. 55 and 56 are a flow chart illustrating the processing performed by the sender SAM and the receiver SAM shown in FIG. 52.
Figure 56:
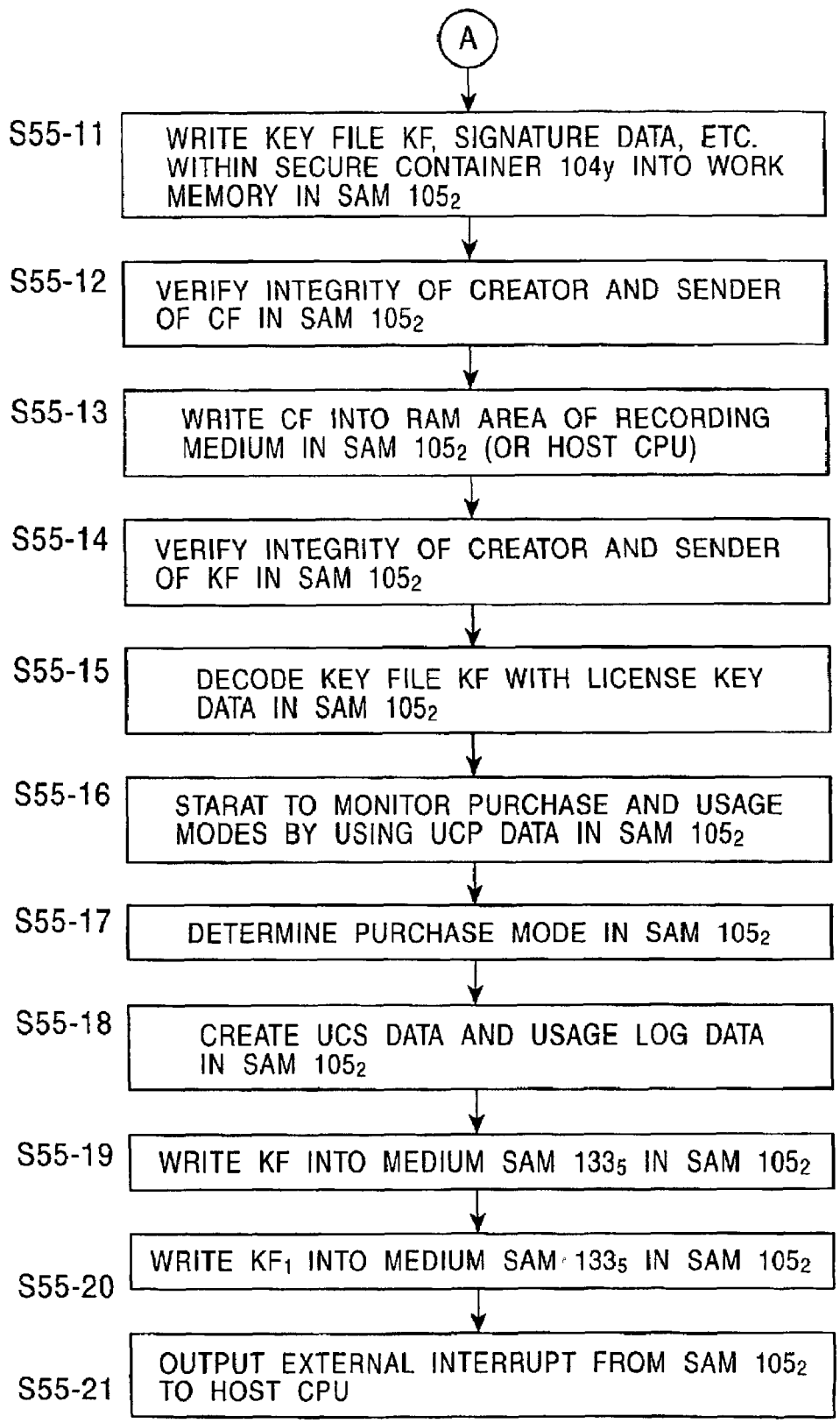

Referring to the flow chart of FIG. 55, in step S55-0, according to the user's operation performed on the operation unit 165, the CPU 1100 shown in FIG. 53 receives the internal interrupt S810 indicating an instruction to transfer the secure container 104, for which the purchase mode is still undetermined, read from the recording medium (ROM) $130_1$ to the SAM $105_2$.

In step S55-1, the SAM $105_3$ checks the SAM registration list so as to determine whether the SAM $105_2$, which is to receive the secure container, is officially registered. If so, the SAM $105_3$ performs processing of step S55-2. The SAM $105_3$ also checks whether the SAM $105_2$ is a SAM within the home network.

Then, in step S55-2, mutual authentication is performed between the SAM $105_3$ and the SAM $105_2$ so as to share the session key data $K_{SES}$.

In step S55-3, mutual authentication is conducted between the SAM $105_3$ of the A/V machine $160_3$ and the medium SAM $133_1$ of the recording medium (ROM) $130_1$, and the medium key data $K_{MED1}$ of the recording medium $130_1$ is transferred to the SAM $105_3$.

If encryption using the medium key data $K_{MED1}$ is performed in the medium SAM $133_1$ of the recording medium (ROM) $130_1$, the medium key data $K_{MED1}$ is not transferred to the SAM $105_3$.

Then, in step S55-4, mutual authentication is performed between the SAM $105_2$ of the A/V machine $160_2$ and the medium SAM $133_5$ of the recording medium (RAM) $130_5$, and the medium key data $K_{MED2}$ of the recording medium $130_5$ is transferred to the SAM $105_2$.

If encryption using the medium key data $K_{MED2}$ is performed in the medium SAM $133_5$ of the recording medium (RAM) $130_5$, the medium key data $K_{MED2}$ is not transferred to the SAM $105_2$.

In step S55-5, as shown in FIG. 53, the SAM $105_3$ reads the content file CF and the signature data $SIG_{6,CP}$ from the ROM area 131 of the recording medium (ROM) $130_1$ via the medium drive SAM manager 855, and outputs them to the SAM manager 190 and also controls the signature processor 189 to create the signature data $SIG_{350,SAM3}$ by using the private key data $K_{SAM3,S}$.

In step S55-6, as shown in FIG. 53, the SAM $105_3$ reads the key file KF and the signature data $SIG_{7,CP}$ from the secure RAM area 132 of the recording medium (ROM) $130_1$ via the medium drive SAM manager 855, and outputs them to the SAM manager 190 and also controls the signature processor 189 to create the signature data $SIG_{352,SAM3}$ by using the private key data $K_{SAM3,S}$.

Then, in step S55-7, in the SAM $105_3$, the public-key certificate data $CER_{SAM3}$ and the signature data $SIG_{351,ESC}$ are read from the storage unit 192 to the SAM manager 190.

In step S55-8, the secure container 104y shown in FIGS. 54A through 54D is created in, for example, the SAM manager 190 of the SAM $105_3$.

In step S55-9, the encryption/decryption (decoding) unit 171 of the SAM $105_3$ encrypts the secure container $104y$ by using the session key data $K_{SES}$ obtained in step S55-2.

Thereafter, in step S55-10, the secure container $104y$ is sent from the SAM manager 190 of the SAM $105_3$ to the A/V machine $160_2$.

Then, the CPU 1100 of the SAM $105_3$ determines whether the above-described processing has been properly performed, and reports the result to the host CPU 810 through an external interrupt.

Alternatively, the CPU 1100 may set a flag in the SAM status register indicating whether the above-described processing has been properly executed, and the host CPU 810 may read the flag by polling.

Figure 57:
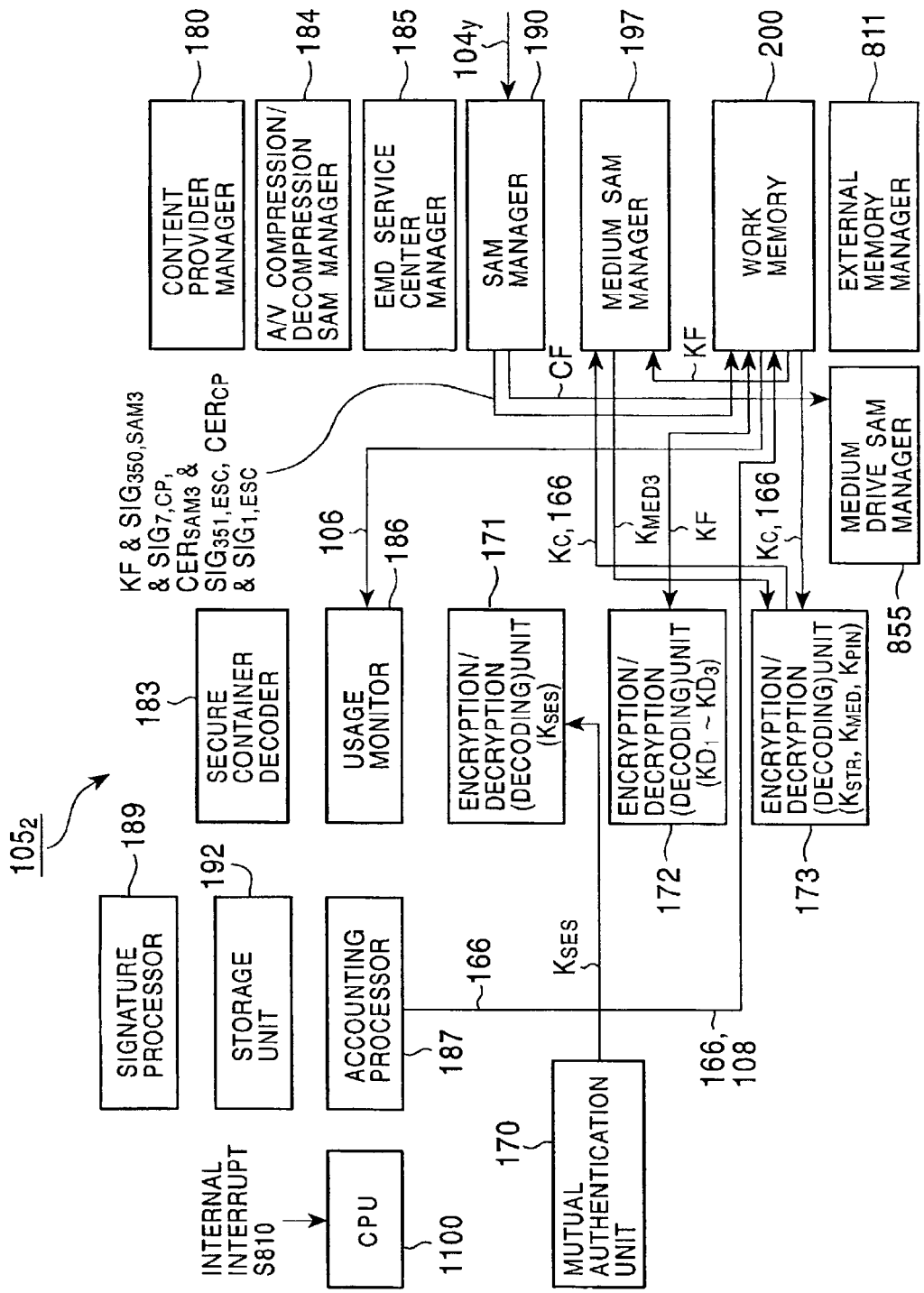
FIG. 57 illustrates the data flow within the receiver SAM shown in FIG. 52.

In the SAM $105_2$, under the control of the CPU 1100 according to the internal interrupt S810 from the host CPU 810, as shown in FIG. 57, the secure container $104y$ shown in FIGS. 54A through 54D input from the SAM $105_3$ via the SAM manager 190 is decoded in the encryption/decryption (decoding) unit 171 by using the session key data $K_{SES}$.

Then, in step S55-11, the key file KF and the signature data $SIG_{7,CP}$ and $SIG_{350,SAM3}$, the public-key certificate data $CER_{SAM3}$ and the signature data $SIG_{351,ESC}$, and the public-key certificate data $CER_{CP}$ and the signature data $SIG_{1,ESC}$ within the secure container $104y$ are written into the work memory 200.

In step S55-12, the signature processor 189 of the SAM $105_2$ verifies the signature data $SIG_{6,CP}$ and $SIG_{350,SAM3}$ stored in the secure container $104y$, i.e., the integrity of the creator and the sender of the content file CF.

Then, in step S55-13, the content file CF is written into the RAM area 134 of the recording medium (RAM) $130_5$ via the medium drive SAM manager 855. The content file CF may be directly written into the RAM area 134 of the recording medium (RAM) $130_5$ without the SAM $105_2$ under the control of the host CPU 810.

Subsequently, in step S55-14, the signature processor 189 checks the signature of the signature data $SIG_{351,ECS}$ so as to verify the integrity of the public-key certificate data $CER_{SAM3}$, and then verifies the integrity of the signature data $SIG_{7,CP}$, $SIG_{352,SAM3}$, and $SIG_{K1,ESC}$, i.e., the integrity of the creator and the sender of the key file KF, by using the public key data $K_{SAM3}$ and the public key data $K_{ESC,P}$ stored in the public-key certificate data $CER_{SAM3}$.

Thereafter, in step S55-15, the key file KF is read from the work memory 200 into the encryption/decryption (decoding) unit 172, and is decoded with the license key data $KD_1$ through $KD_3$ and is again written into the work memory 200.

In step S55-16, the UCP data 106 of the decoded key file KF stored in the work memory 200 is output to the usage monitor 186. Then, the purchase mode and the usage mode are managed (monitored) in the usage monitor 186 based on the UCP data 106.

In step S55-17, by the user's operation on the operation unit 165 shown in FIG. 52, the purchase and usage modes of the content are determined, and the corresponding internal interrupt S810 is output to the CPU 1100 of the SAM $105_2$.

In step S55-18, the UCS data 166 and the usage log data 108 are created in the accounting processor 187 based on the determined purchase and usage modes, and are written into the work memory 200 and the external memory 201, respectively. The UCS data 166 and the usage log data 108 are appropriately sent to the EMD service center 102.

Then, in step S55-19, the content key Kc and the UCS data 166 are read from the work memory 200 into the encryption/decryption (decoding) unit 173, and are sequentially encrypted by using the storage key data $K_{STR}$, the medium key data $K_{MED2}$, and the purchaser key data $K_{PIN}$ read from the storage unit 192. The encrypted data are then output to the medium SAM manager 197. The key file KF is also output from the work memory 200 to the medium SAM manager 197.

In step S55-20, the key file $KF_1$ shown in FIG. 44C is generated in the medium SAM manager 197, and is written into the medium SAM $133_5$ of the recording medium (RAM) $130_5$ via the medium SAM manager 197. The key file KF is also written into the medium SAM $133_5$ of the recording medium (RAM) $130_5$ via the medium SAM manager 197.

In step S55-21, the CPU 1100 of the SAM $105_2$ determines whether the above-described processing has been precisely performed, and reports the result to the host CPU 810 through an external interrupt.

Alternatively, the CPU 1100 may set a flag in the SAM status register indicating whether the aforementioned processing has been accurately performed, and the host CPU 810 may read the flag by polling.

The implementation method of the SAMs $105_1$ through $105_4$ is as follows.

In implementing the functions of the SAMs $105_1$ through $105_4$ as hardware, an application specified IC (ASIC)-type CPU having a built-in memory is used, and a security function module, a program module for performing content rights processing, and highly secret data, such as key data, are stored in the memory to implement the functions shown in FIG. 30. A series of rights processing program modules, such as an encryption library module (public key encryption, common key encryption, a random-number generator, hash functions), a program module for restricting the use of the contents, an accounting program module, etc. are implemented as, for example, software.

For example, a module, such as the encryption/decryption (decoding) unit 171, is implemented as an IP core within an ASIC-type CPU as hardware in view of the processing rate. In terms of the performance, such as the clock rate or the CPU code system, the encryption/decryption (decoding) unit 171 may be implemented as software.

As the storage unit 192 and a memory for storing program modules and data for implementing the functions shown in FIG. 30, a non-volatile memory (flash ROM) may be used, and a fast memory, such as an SRAM, may be used as the work memory. Or, a FeRAM may be employed as a memory integrated in the SAMs $105_1$ through $105_4$.

The SAMs $105_1$ through $105_4$ also have a built-in timing function for checking the time and date required to verify the effective period and contracting period for the usage of the content.

As stated above, the SAMs $105_1$ through $105_4$ have a high tamper-resistance structure in which the program modules, the data, and the processing contents are shielded from an external source. Each SAM sets an address space which is invisible from the corresponding host CPU by using a memory management unit (MMU) for managing the memory address of the host CPU. With this arrangement, highly private programs and the contents of data stored in the memory of the IC of each SAM, a group of registers relating to the system configuration of the SAM, an encryption library, and a group of registers of clocks can be protected from being read or written via a host CPU bus. That is, the above-described data and programs of each SAM are protected from being in the address space assigned by the host CPU.

The SAMs $105_1$ through $105_4$ are also resistant to physical attacks from an external source, such as X rays and heat. Additionally, even if real time debugging (reverse engineering) is performed by using a debugging tool (hardware incircuit emulator (ICE) or software ICE), the processing content is invisible, or the debugging tool itself becomes unusable after manufacturing the IC.

In terms of the hardware structure, the SAMs $105_1$ through $105_4$ are regular ASIC-type CPUs having a built-in memory, and the functions of the SAMs $105_1$ through $105_4$ are dependent on the software which operates the CPU. However, the SAMs $105_1$ through $105_4$ are different from regular ASIC-type CPUs in that they have a hardware structure provided with an encryption function and tamper resistance.

On the other hand, there are two approaches to implement all the functions of the SAMs $105_1$ through $105_4$ as software. One approach is to perform software processing within a totally shielded module having high tamper resistance. The other approach is to perform software processing in a host CPU installed in an ordinary machine, but in which the software processing is very difficult to decode. In the first approach, the encryption library module is stored in the memory as a regular software module rather than an intellectual property (IP) core, namely, it can be considered to be implemented as hardware. On the other hand, according to the second approach, tamper-resistant software is used, and even if the execution content is decoded by an ICE (debugger), the execution order of the tasks may be meaningless (in this case, the tasks are partitioned so that the single task is meaningful as a program so as not to influence the preceding and following tasks), or the tasks themselves may be encrypted. That is, the functions are implemented as a task scheduler (MiniOS) for enhancing the security. The task scheduler provided is embedded in a target program.

Details of the A/V compression/decompression SAM 163 shown in FIG. 22 are given below.

The A/V compression/decompression SAM 163 includes, as shown in FIG. 22, the mutual authentication unit 220, the decoders 221 and 222, the decompression unit 223, the digital-watermark information processor 224, and a partially disclosing processor 225.

The mutual authentication unit 220 performs mutual authentication with the mutual authentication unit 170 of the SAM $105_1$ shown in FIG. 30 when the A/V compression/decompression SAM 163 receives data from the SAM $105_1$, and generates the session key data $K_{SES}$.

The decoder 221 decodes the content key data Kc, the partially disclosing parameter 199, the user digital watermark information data 196, and the content data C received from the SAM $105_1$ by using the session key data $K_{SES}$. The decoder 221 then outputs the decoded content key-data Kc and the content data C to the decoder 222, and outputs the decoded user digital watermark information data 196 to the digital-watermark information processor 224, and also outputs the partially disclosing parameter 199 to the partially disclosing processor 225.

The decoder 222 decodes the content data C in the partially disclosing state by using the content key data Kc under the control of the partially disclosing processor 225, and outputs the decoded content data C to the decompression unit 223. The decoder 222 also decodes the whole content data C with the content key data Kc in the normal operating mode, i.e., the mode other than the partially disclosing mode.

The decompression unit 223 decompresses the decoded content data C and outputs it to the digital-watermark information processor 224. The decompression unit 223 decompresses the content data C by using, for example, the A/V decompression software stored in the content file CF shown in FIG. 3A, according to, for example, the ATRAC3 method.

The digital-watermark information processor 224 embeds the user digital watermark information according to the decoded user digital watermark information data 196 into the decoded content data C so as to create new content data C. The digital-watermark information processor 224 then outputs the newly created content data C to the playback module 169.

In this manner, the user digital watermark information is embedded into the content data C by the A/V compression/decompression SAM 163 when reproducing the content data C.

In the present invention, it may be determined that the user digital watermark information data 196 is not embedded into the content data C.

The partially disclosing processor 225 informs the decoder 222, based on the partially disclosing parameter 199, which blocks are to be decoded and which blocks are not to be decoded. The partially disclosing processor 225 may control the partially disclosing mode by, for example, restricting the playback functions for demonstration or limiting the period for listening to the content for demonstration.

The playback module 169 performs the playback operation according to the decoded and decompressed content data C.

Processing for registering the SAMs $105_1$ through $105_4$ in the EMD service center 102 when they are shipped is as follows. The same registration processing is performed in the SAMs $105_1$ through $105_4$, and thus, only the registration of the SAM $105_1$ is discussed below.

When shipping the SAM $105_1$, the following key data is registered in the storage unit 192 shown in FIG. 30 via a SAM manager 149 by a key server 141 of the EMD service center 102.

When the SAM $105_1$ is shipped, for example, a program used for the initial access by the SAM $105_1$ to the EMD service center 102 is also stored in the storage unit 192.

More specifically, the SAM $105_1$ stores in initial registration, for example, the identifier SAM_ID of the SAM $105_1$, the storage key data $K_{STR}$, the public key data $K_{R-CA}$ of the root certifying authority 92, the public key data $K_{ESC,P}$ of the EMD service center 102, the private key data $K_{SAM1,S}$ of the SAM $105_1$, the public-key certificate data $CER_{SAM1}$ and the signature data therefor $SIG_{22,ESC}$, and the source key data for creating the authentication key data between the A/V compression/decompression SAM 163 and the medium SAM, all of which have the symbol "*" attached on the left side of the data, as shown in FIG. 34.

The public-key certificate data $CER_{SAM1}$ may be sent from the EMD service center 102 to the SAM $105_1$ when the SAM $105_1$ is registered after being shipped.

In shipping the SAM $105_1$, the file reader designating the reading format of the content file CF and the key file KF respectively shown in FIGS. 3A and 3B is written into the storage unit 192 by the EMD service center 102. Then, in the SAM $105_1$, the file reader stored in the storage unit 192 is used when reading the data stored in the content file CF and the key file KF.

The public key data $K_{R-CA}$ of the root certifying authority 92 uses the River-Shamir-Adleman (RSA) algorithm, which is often used in electronic commerce on the Internet, and the data length is, for example, 1024 bits. The public key data $K_{R-CA}$ is issued by the root certifying authority 92 illustrated in FIG. 1.

The public key data $K_{ESC,P}$ of the EMD service center 102 is generated by the elliptic curve cryptosystem, whose encryption strength is comparable to or higher than the RSA, and the data length is only, for example, 160 bits. However, considering the encryption strength, the public key data $K_{ESC,P}$ desirably has 192 bits or greater. The EMD service center 102 registers the public key data $K_{ESC,P}$ in the root certifying authority 92.

The root certifying authority 92 creates the public-key certificate data $CER_{ESC}$ of the public key data $K_{ESC,P}$. The public-key certificate data $CER_{ESC}$ storing the public key data $K_{ESC,P}$ is stored in the storage unit 192 preferably when shipping the SAM $105_1$. In this case, the public-key certificate data $CER_{ESC}$ is signed with the private key data $K_{ROOT,S}$ of the root certifying authority 92.

The EMD service center 102 generates a random number so as to create the private key data $K_{SAM1,S}$ of the SAM $105_1$ and also creates the public key data $K_{SAM1,P}$ to form a pair with the private key data $K_{SAM1,S}$.

The EMD service center 102 also acquires a certificate from the root certifying authority 92 so as to issue the public-key certificate data $CER_{SAM1}$ of the public key data $K_{SAM1,P}$, and attaches signature data with the private key data $K_{ESC,S}$ of the EMD service center 102. That is, the EMD service center 102 serves as a second certifying authority.

The unique identifier SAM_ID is assigned to the SAM $105_1$ from the EMD service center 102 under the control of the EMD service center 102. The unique identifier SAM_ID is stored in the storage unit 192 and is also managed by the EMD service center 102.

After being shipped, the SAM $105_1$ is connected to the EMD service center 102 by, for example, a user, and is registered. Then, the license key data $KD_1$ through $KD_3$ are transferred from the EMD service center 102 to the storage unit 192.

That is, the user of the SAM $105_1$ is required to register in the EMD service center 102 before downloading the content. This registration is performed offline, such as by mail, with a registration sheet attached to the machine (in this example, the network device $160_1$) on which the SAM $105_1$ is loaded by filling in information for specifying the user (user name, address, contact telephone number, gender, settlement account, login name, password, etc.). Until the above-described registration has been conducted, the user is unable to use the SAM $105_1$.

The EMD service center 102 issues an identifier USER_ID unique to the user according to the user's registration, and manages the relationship between the SAM_ID and the USER_ID, which is used for settling the account.

The EMD service center 102 also assigns an information reference identifier ID and a password, which is for initial use of the user of the SAM $105_1$, and reports them to the user. The user makes a query to the EMD service center 102 about, for example, the current usage situation of the content data (usage log) by using the information reference identifier ID and the password.

The EMD service center 102 makes a query to, for example, a credit card company to check the identity of the user, or to the user offline about the identity of himself/herself in the user registration.

A description is now given of the process for storing the SAM registration list in the storage unit 192 within the SAM $105_1$, as shown in FIG. 34.

The SAM $105_1$ shown in FIG. 1 obtains the SAM registration list of the SAMs $105_2$ through $105_4$, which are in the same system as the SAM $105_1$, by utilizing a topology map created when a machine connected to the bus 191, for example, an IEEE-1394 serial bus, is powered on, or when a new machine is connected to the bus 191.

Figure 58:
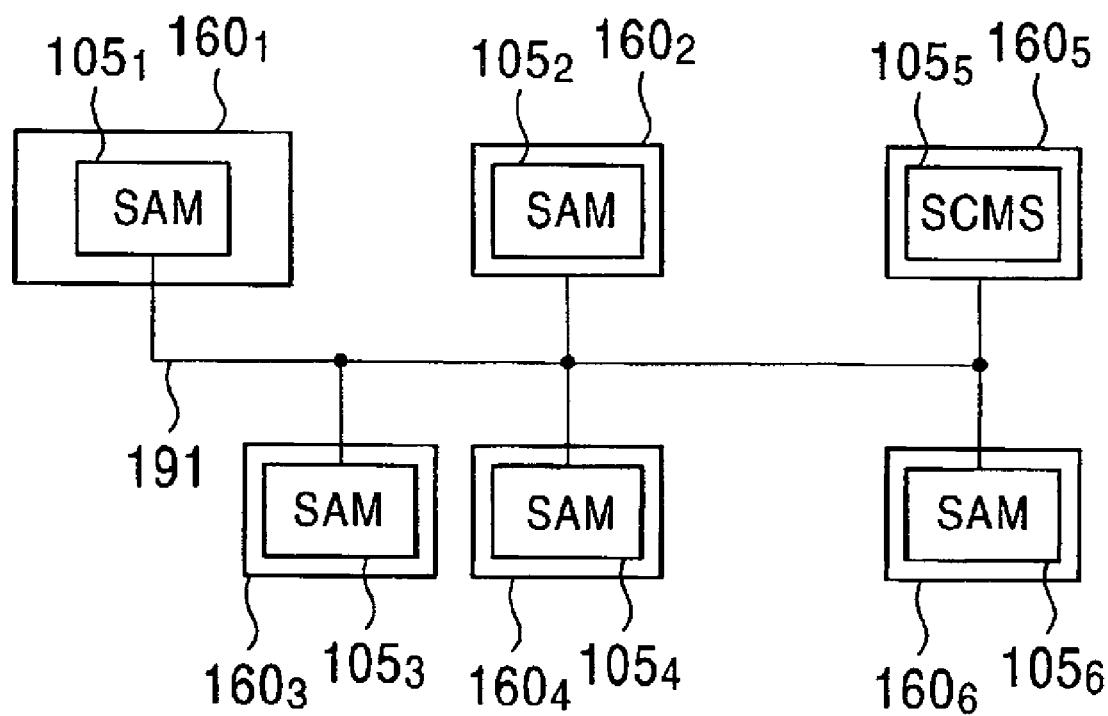
FIG. 58 illustrates an example of connection models of the devices via a bus within the user home network.

The topology map is created according to the bus 191, not only for the SAMs $105_1$ through $105_4$, but also for SCMS processing circuits $105_5$ and $105_6$ of A/V machines $160_5$ and $160_6$ which are also connected to the bus 191, as illustrated in FIG. 58. Accordingly, the SAM $105_1$ creates the SAM registration list shown in FIG. 59 by extracting the information about the SAMs $105_1$ through $105_4$ from the topology map.

Figure 59:
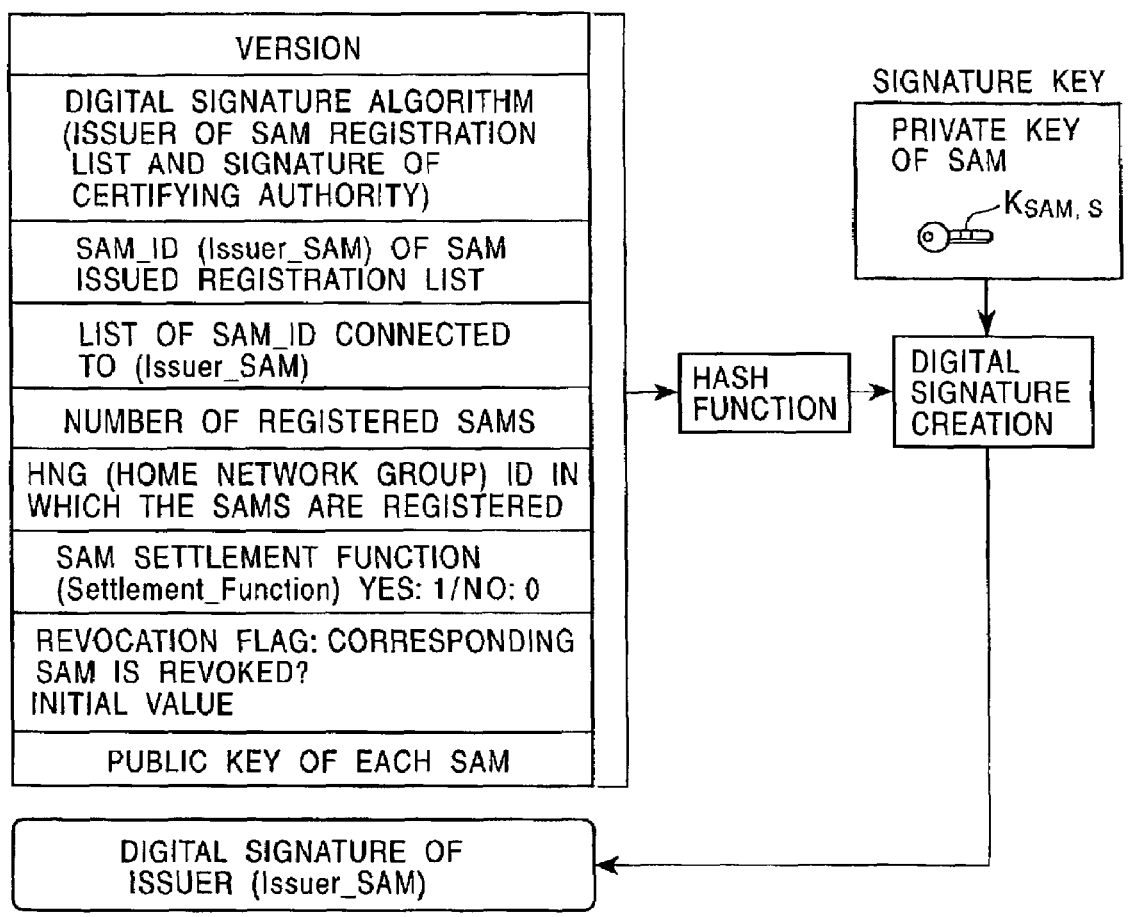
FIG. 59 illustrates the data format of a SAM registration list created by the SAM.

The SAM $105_1$ then registers the SAM registration list shown in FIG. 59 in the EMD service center 102 so as to obtain the signature.

The aforementioned processing is automatically executed by the SAM $105_1$ by utilizing the session of the bus 191, and the SAM $105_1$ issues the registration command of the SAM registration list to the EMD service center 102.

Figure 60:
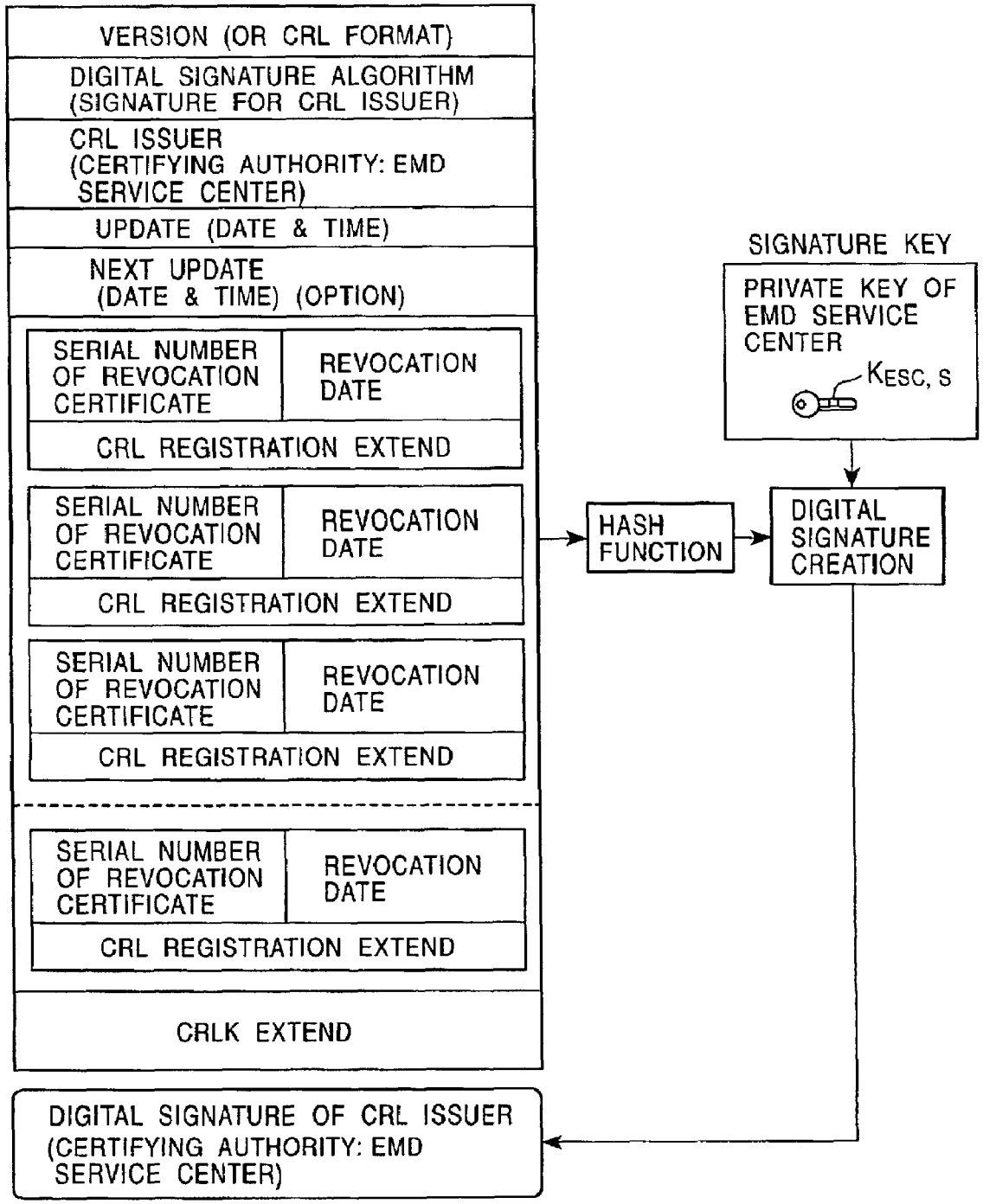
FIG. 60 illustrates the format of a public-key certificate revocation list created by the EMD service center.

Upon receiving the SAM registration list shown in FIG. 59 from the SAM $105_1$, the EMD service center 102 checks the effective period, and also checks for the settlement function designated by the SAM $105_1$ during registration. The EMD service center 102 refers to the prestored revocation list (certificate revocation list (CRL)) shown in FIG. 60 and sets the revocation flag within the SAM registration list. The revocation list is a list of the SAMs which are prohibited from being used (have become invalid) due to illegal use. In performing communication between the SAMs, each SAM checks the revocation list for whether the corresponding SAM has become invalid, in which case, the communication therebetween is discontinued.

In settling the account, the EMD service center 102 checks the SAM registration list of the SAM $105_1$ for whether the SAMs described in the list are contained in the revocation list. The EMD service center 102 also attaches the signature to the SAM registration list.

Figure 61:
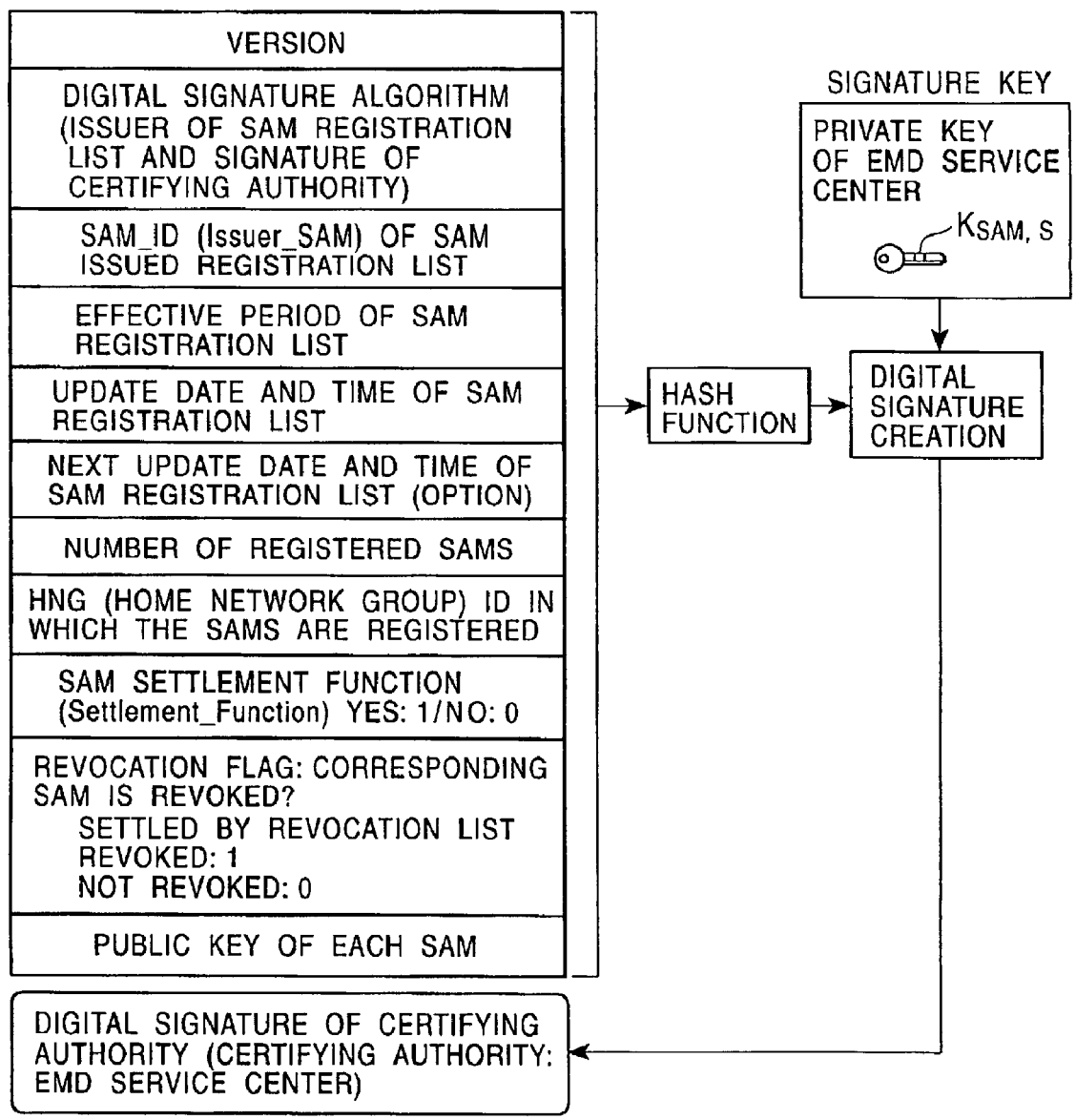
FIG. 61 illustrates the data format of the SAM registration list created by the EMD service center.

As a result, the SAM registration list shown in FIG. 61 is created.

The SAM revocation list is formed for SAMs in the same system (i.e., SAMs connected to the bus 191), and indicates whether each SAM is invalid according to a revocation flag for the corresponding SAM.

The revocation list CRL is preferably updated automatically within the SAM according to, for example, updating data sent from the EMD service center 102 to the SAM. The security functions of the SAM are as follows.

As the security functions, the SAM possesses IP components of the encryption library, such as DES of the common key cryptosystem (Triple DES/advanced encryption standard (AES)), the elliptic curve cryptosystem of the public key cryptosystem (signature creation/checking EC-DSA, common key creation EC-D. H., and public key cryptosystem EC-Elgamal), compression function (hash function) SHA-1, and a random-number generator (intrinsic random number).

The public key cryptosystem (elliptic curve cryptosystem) is employed for mutual authentication, signature creation, signature checking, and common key (session key) creation (delivering). The common key cryptosystem (DES) is employed for encrypting and decoding the content, and compression functions (hash functions) are employed for message authentication in signature creation and checking.

Figure 62:
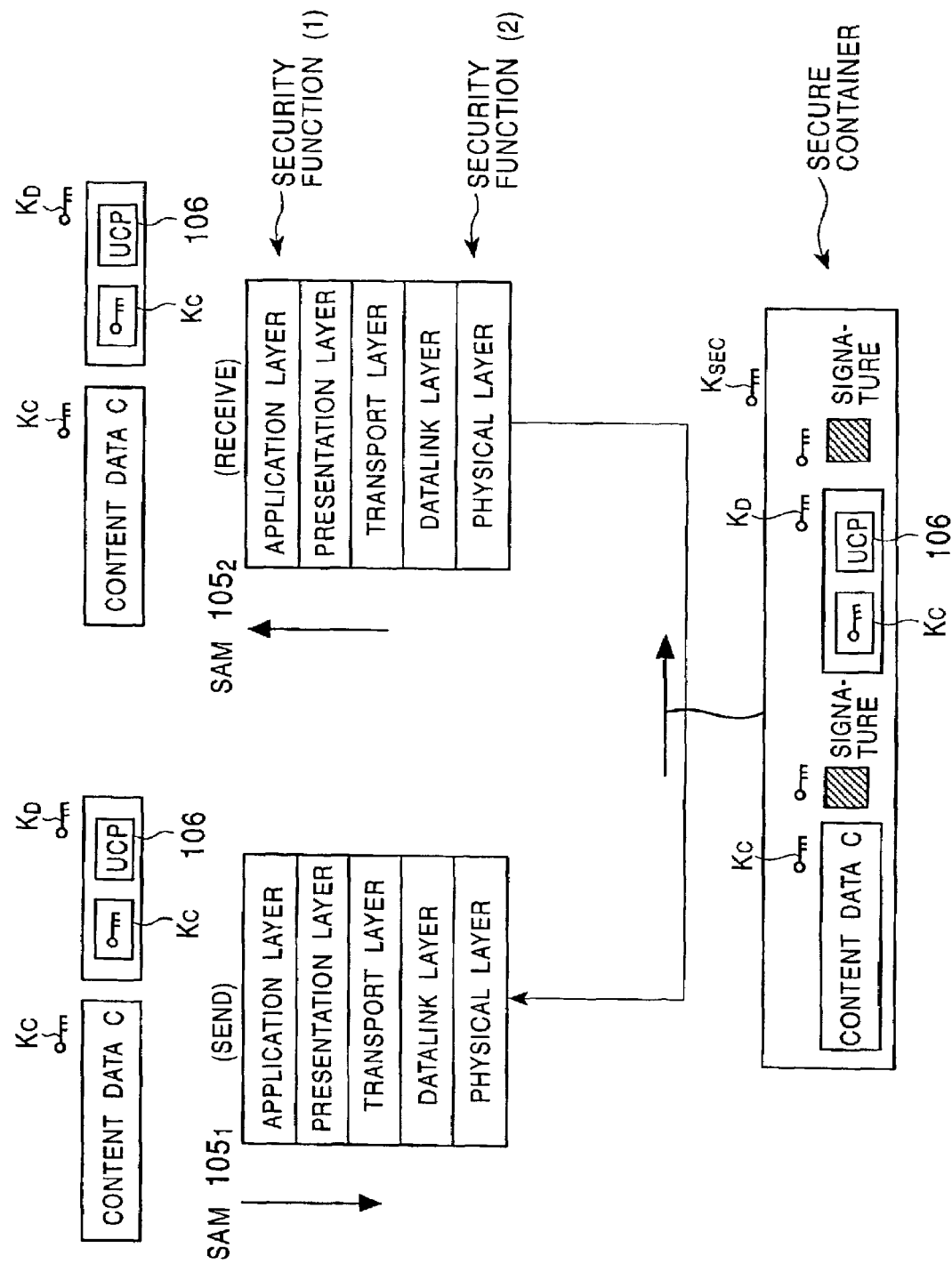
FIG. 62 illustrates a security function of the SAM.

FIG. 62 illustrates the security functions of the SAM. There are two types of security functions managed by the SAM: (1) a security function in the application layer for encrypting and decoding the content, and (2) a security function in the physical layer for securing a communication path by performing mutual authentication with another SAM.

In the EMD system 100, the content data C to be distributed is wholly encrypted, and a key is purchased upon settling the account. Since the UCP data 106 is sent together with the content data C according to the in-band system, it is managed in a layer independent of the type of network medium. It is thus possible to provide a common rights processing system independent of the type of communication path, such as a satellite, terrestrial waves, cable, radio, or a recording medium. For example, when the UCP data 106 is inserted into the header of the protocol of the physical layer of a network, even for the same type of UCP data 106, it is necessary for each network to determine where the header the UCP data 106 is inserted.

In this embodiment, the content data C and the key file KF are encrypted for protection by the application layer. Mutual authentication may be performed in the physical layer, the transport layer, or the application layer. Integrating the encryption function into the physical layer means integrating the encryption function into hardware. Mutual authentication is desirably performed in the physical layer since the main object of performing mutual authentication is to ensure a communication path between the sender and the receiver. In actuality, however, mutual authentication is often implemented in the transport layer while being independent of the transmission channel.

The security functions of the SAM include mutual authentication for verifying the integrity of another SAM to communicate with, and encryption and decryption (decoding) of content data which involves accounting processing in the application layer.

Generally, mutual authentication between SAMs for performing communication between machines is implemented in the application layer. However, it may be implemented in another layer, such as the transport layer or the physical layer.

Mutual authentication to be implemented in the physical layer utilizes 5C1394CP (content protection). According to 1394CP, M6, which is the common key cryptosystem, is implemented in the isochronous channel of a 1394LINKIC (hardware). Mutual authentication (elliptic curve cryptosystem or common key cryptosystem using hash functions) is then performed with an asynchronous channel, and the resulting session key is transferred to M6 of the isochronous channel. As a result, the common key cryptosystem is implemented by M6.

If mutual authentication between SAMs is implemented in hardware of the physical layer, the session key obtained by performing mutual authentication using the public key cryptosystem (elliptic curve cryptosystem) is transferred to M6 of 1394LINKIC via the host CPU, thereby encrypting the content data C by using the above-described session key together with the session key obtained by 1394CP.

If mutual authentication between SAMs is performed in the application layer, the content data C is encrypted by utilizing the common key cryptosystem library (DES/Triple DES/AES) within the SAM.

In this embodiment, for example, mutual authentication between the SAMs is implemented in the application layer, and mutual authentication by 1394CP is implemented in the physical layer (hardware), such as 1394LINKIC.

In this case, encryption and decryption (decoding) of the content data C which involves accounting processing is performed in the application layer. However, the application layer is easy to access by the user and may be analyzed unlimitedly. Accordingly, in this embodiment, accounting-related processing is executed within high tamper-resistant hardware in which the processing content is fully protected from being monitored from an external source. This is the major reason for implementing the SAM as high tamper-resistant hardware.

If accounting processing is executed within the host CPU, tamper-resistant software is implemented in the CPU.

Figure 63:
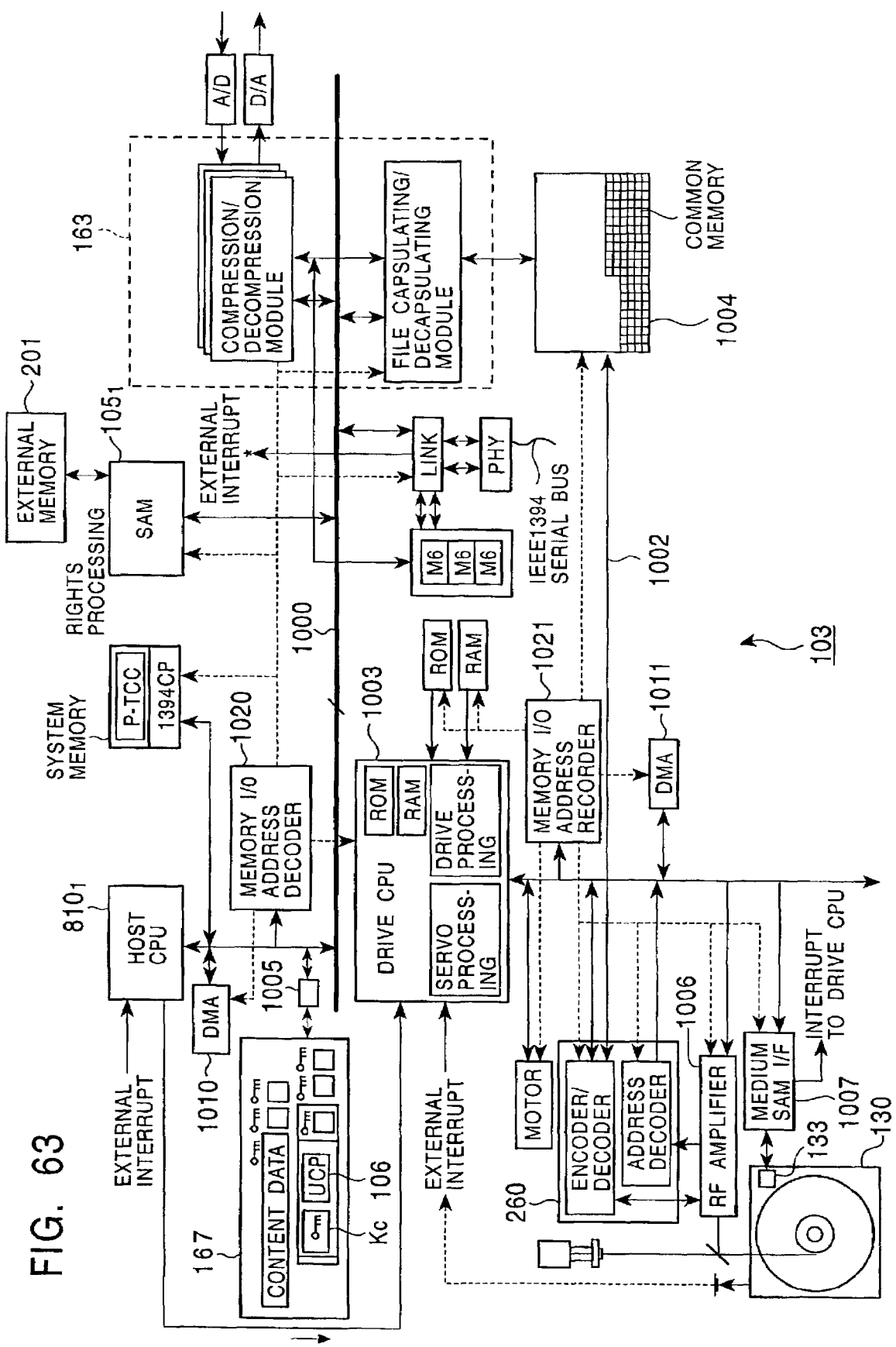
FIG. 63 illustrates an example of loading models of various SAMs in the network device of the user home network shown in FIG. 1.

A description is now given, with reference to FIG. 63, of an example of implementation of various SAMs within, for example, the network device 160₁ of the user home network 103 shown in FIG. 1.

The network device 160₁ includes, as shown in FIG. 63, the host CPU 810₁, the SAM 105₁, the download memory 167, the medium drive SAM 260, a drive CPU 1003, and a shock proof (anti-vibration) memory, such as a dynamic RAM (DRAM) 1004.

Part of the download memory 167 and part of the shock proof memory 1004 are used as a common memory, which can be accessed from both the SAM 105₁ and the host CPU 810₁.

The shock proof memory 1004 stores the content data C received via a data bus 1002, and then outputs it to the A/V compression/decompression SAM 163. This makes it possible to sequentially output the content data C to the A/V compression/decompression SAM 163 even if the reading operation of the content data C from the recording medium 130 is interrupted due to, for example, vibrations. It is thus possible to effectively prevent the interruption of the playback operation of the content data C.

The download memory 167 is connected to the host CPU bus 1000 via a module 1005 which consists of a memory controller and a bus arbiter/bridge.

Figure 64:
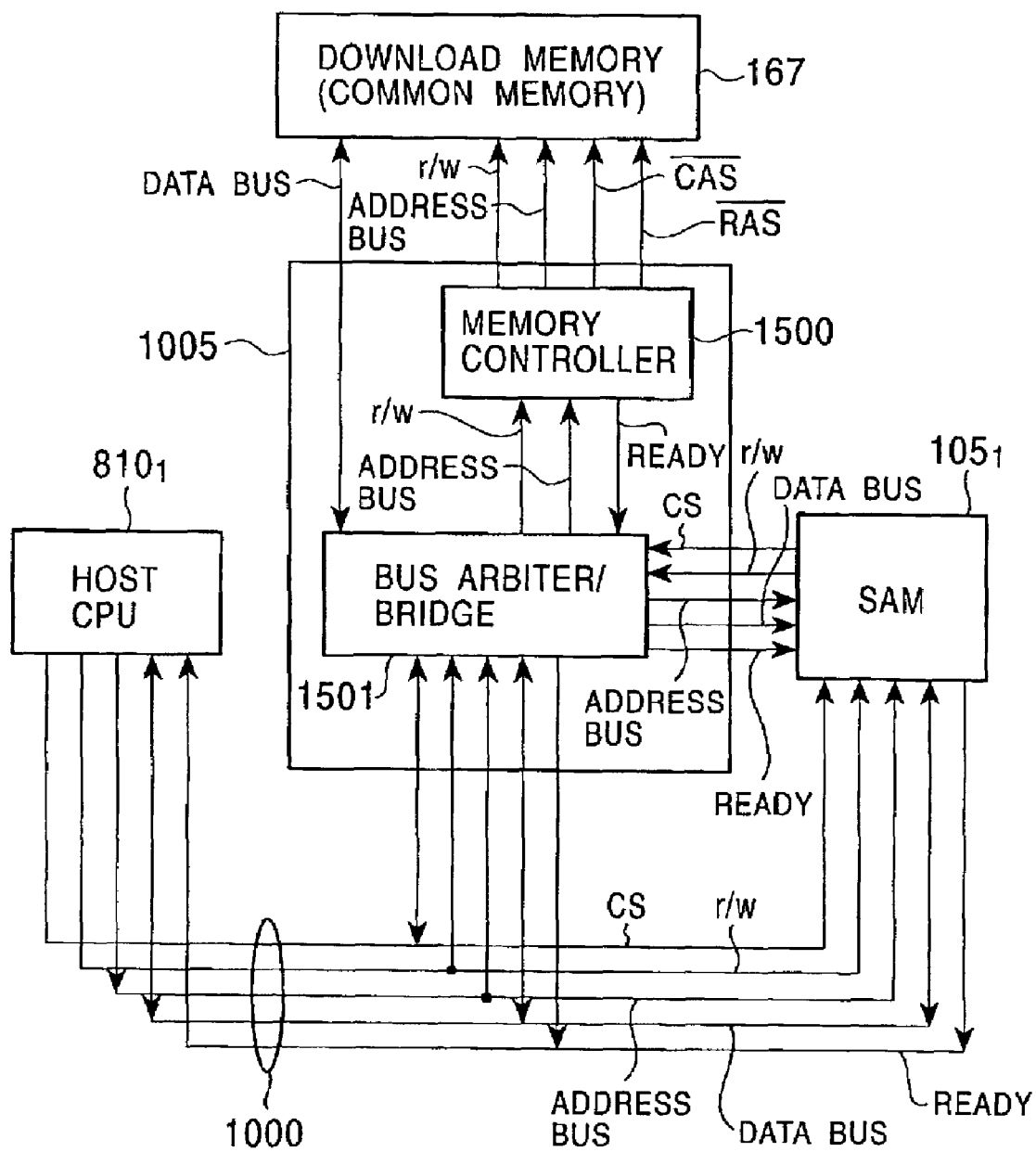
FIG. 64 illustrates the detailed circuit configuration of a download memory and peripheral circuits shown in FIG. 63.

FIG. 64 illustrates the detailed configuration of the module 1005 and the peripheral circuits. The module 1005 includes, as shown in FIG. 64, a controller 1500 and a bus arbiter/bridge 1501.

The controller 1500 serves as a DRAM interface (I/F) when a DRAM is used as the download memory 167, and has a read/write (r/w) line, an address bus, a $\overline{\text{CAS}}$ line, and a $\overline{\text{RAS}}$ line to communicate with the download memory 167.

The bus arbiter/bridge 1501 conducts arbitration of the host CPU bus 1000, and has a data bus to communicate with the download memory 167, and also has a r/w line, an address bus, a ready line, and has a chip select (CS) line, a r/w line, an address bus, a data bus, and a ready line to communicate with the SAM 105₁. The bus arbiter/bridge 1501 is connected to the host CPU bus 1000.

The bus arbiter/bridge 1501, the host CPU 810₁, and the SAM 105₁ are connected to the host CPU bus 1000. The host CPU bus 1000 has a CS line, a r/w line, an address bus, a data bus, and a ready line.

The download memory 167 and the shock proof memory 1004 store the above-described content file CF and the key file KF. The storage area of the shock proof memory 1004 other than the storage area used as the common memory is employed for temporarily storing the content data C received from the medium drive SAM 260 via the data bus 1002 until the content data C is output to the A/V compression/decompression SAM 163.

The A/V compression/decompression SAM 163 transfers data to the download memory 167 via the host CPU bus 1000, and also transfers data to the medium drive SAM 260 via the data bus 1002.

Not only the download memory 167, but also the SAM 105₁, the A/V compression/decompression SAM 163, and a DMA 1010, are connected to the host CU bus 1000.

The DMA 1010 centrally controls access to the download memory 167 via the host CPU bus 1000 according to a command from the host CPU 810₁.

The host CPU bus 1000 is also employed for communication with the other SAMs, i.e., the SAMs 105₂ through 105₄, within the user home network 103 by using a 1394-serial interface link layer.

The drive CPU 1003, the medium drive SAM 260, an RF amplifier 1006, a medium SAM interface 1007, and a DMA 1011 are connected to a drive CPU bus 1001.

The drive CPU 1003 centrally controls access to the disk-type recording medium 130 according to a command from the host CPU $810_1$. In this case, the host CPU $810_1$ serves as a master, while the drive CPU 1003 serves as a slave. The drive CPU 1003 is handled as an I/O as viewed from the host CPU $810_1$.

The drive CPU 1003 encodes and decodes data in accessing to the recording medium (RAM) 130.

When the recording medium (RAM) 130 is set in a drive, the drive CPU 1003 determines whether the recording medium 130 is suitable for the SAM $105_1$ (EMD system 100) (i.e., whether rights processing can be safely performed on the recording medium 130 by the SAM $105_1$). If so, the drive CPU 1003 reports the corresponding information to the host CPU $810_1$ and also instructs the medium drive SAM 260 to perform mutual authentication with the medium SAM 133.

The medium SAM interface 1007 serves as an interface for access to the medium SAM 133 of the recording medium 130 via the drive CPU bus 1001.

The DMA 1011 centrally controls access to the shock proof memory 1004 via the drive CPU bus 1001 and the data bus 1002 according to a command from the drive CPU 1003. The DMA 1011 controls, for example, data transfer between the medium drive SAM 260 and the shock proof memory 1004 via the data bus 1002.

According to the configuration shown in FIG. 63, for example, in performing communication, such as mutual authentication between the SAM $105_1$ and the medium SAM 133 of the recording medium 130, data transfer is conducted therebetween via the host CPU bus 1000, the host CPU $810_1$, a register within the drive CPU 1003, the drive CPU bus 1001, and the medium SAM interface 1007 based on the control of the host CPU $810_1$.

In accessing the recording medium 130, mutual authentication is conducted between the medium drive SAM 260 and the medium SAM 133.

In compressing or decompressing data in the A/V compression/decompression SAM 163 in order to access the download memory 167 or the shock proof memory 1004, as discussed above, mutual authentication is performed between the SAM $105_1$ and the A/V compression/decompression SAM 163.

In this embodiment, in FIG. 63, the SAM $105_1$ and the A/V compression/decompression SAM 163 are handled as devices connected to the I/O interface, as viewed from the host CPU $810_1$. Communication and data transfer of the SAM $105_1$ and the A/V compression/decompression SAM 163 with the host CPU $810_1$ is performed under the control of a memory I/O and address decoder 1020. In this case, the host CPU $810_1$ serves as a master, while the SAM $105_1$ and the A/V compression/decompression SAM 163 serve as slaves. The SAM $105_1$ and the A/V compression/decompression SAM 163 execute processing instructed by the host CPU $810_1$, and reports the results to the host CPU $810_1$ if necessary.

The medium SAM 133 and the medium drive SAM 260 are handled as devices connected to the I/O interface, as viewed from the drive CPU 1003. Communication and data transfer of the medium SAM 133 and the medium drive SAM 260 with the drive CPU 1003 is performed under the control of a memory I/O and address decoder 1021. In this case, the drive CPU 1003 serves as a master, while the medium SAM 133 and the medium drive SAM 260 serve as slaves. The medium SAM 133 and the medium drive SAM 260 execute processing instructed by the drive CPU 1003 and reports the results to the drive CPU 1003 if necessary.

Access control to the content file CF and the key file KF stored in the download memory 167 and the shock proof memory 1004 may be centrally performed by the SAM $105_1$. Alternatively, access control to the content file CF may be performed by the host CPU $810_1$, and access control to the key file KF may be performed by the SAM $105_1$.

The content data C read from the recording medium 130 by the drive CPU 1003 is stored in the shock proof memory 1004 via the RF amplifier 1006 and the medium drive SAM 260, and is then decompressed in the A/V compression/decompression SAM 163. The decompressed content data is converted into analog data in a digital-to-analog (D/A) converter, and sound based on the converted analog signal is output from a speaker.

In this case, the shock proof memory 1004 may temporarily store the content data C consisting of a plurality of tracks, which are non-continuously read from storage areas discretely located in the recording medium 130, and then continuously output the content data C to the A/V compression/decompression SAM 163.

The master-slave relationships of the various SAMs within the user home network 103 shown in FIG. 63 are described below.

Figure 65:
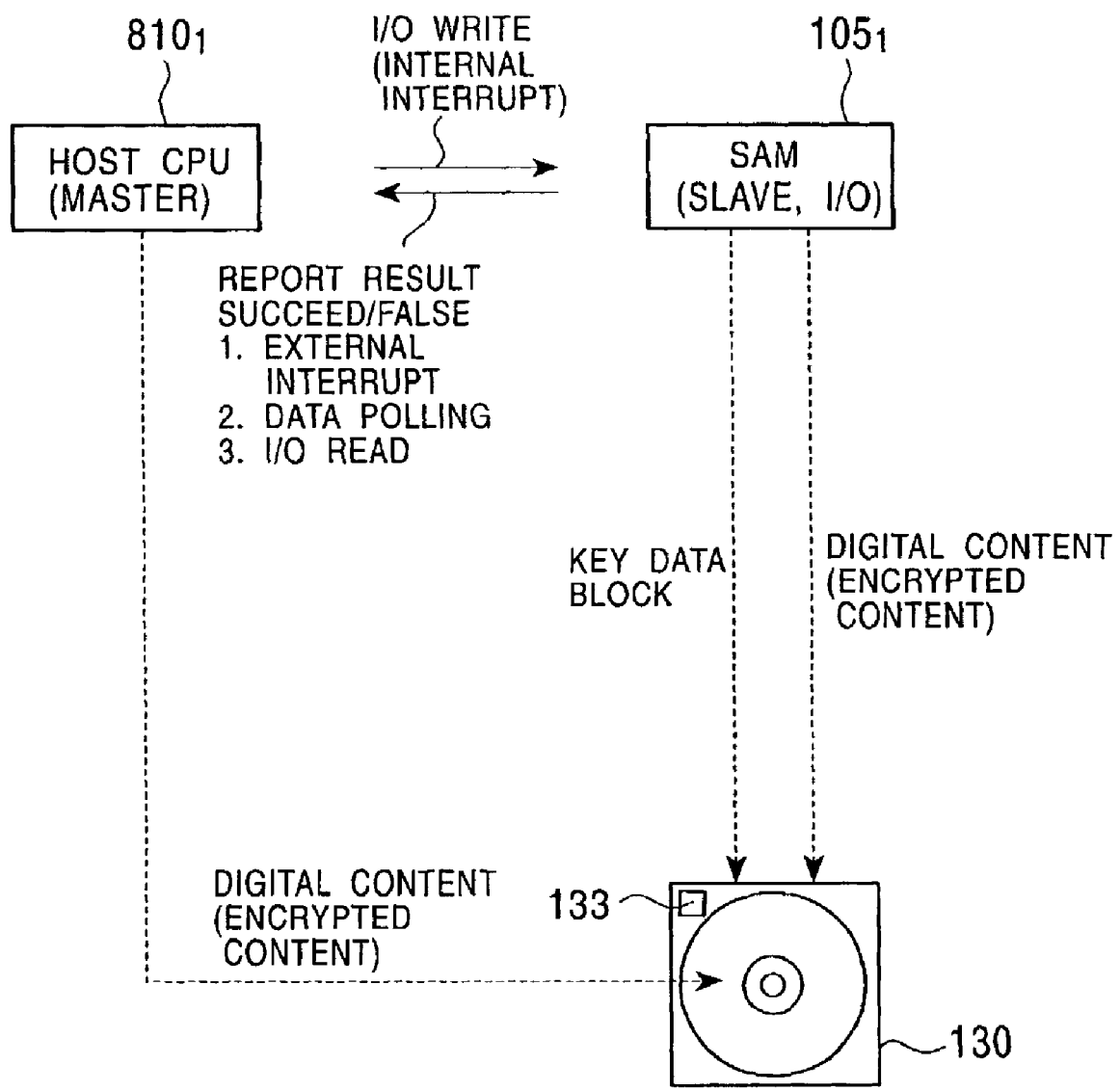
FIG. 65 illustrates the relationship between the host CPU and the SAM shown in FIG. 63.

For example, when the content data C, for which the purchase mode is determined, is recorded on the recording medium 130, as shown in FIG. 65, the host CPU $810_1$ outputs an internal interrupt to instruct the SAM $105_1$, which serves as an I/O device, to determine the purchase mode of the content data C, and also to perform mutual authentication with the medium SAM 133 of the recording medium 130, thereby recording content data C on the recording medium 130.

In this case, the host CPU $810_1$ serves as a master, while the SAM $105_1$ and the recording medium 130 serve as slaves. The recording medium 130 is handled as an I/O device as viewed from the host CPU $810_1$.

In response to the internal interrupt from the host CPU $810_1$, the SAM $105_1$ communicates with the medium SAM 133 to determine the purchase mode of the content data C and also writes predetermined key data, such as the content key data Kc, into the medium SAM 133. Upon completion of this processing, the SAM $105_1$ reports the processing result to the host CPU $810_1$ through an external interrupt or by polling of the host CPU $810_1$.

Figure 66:
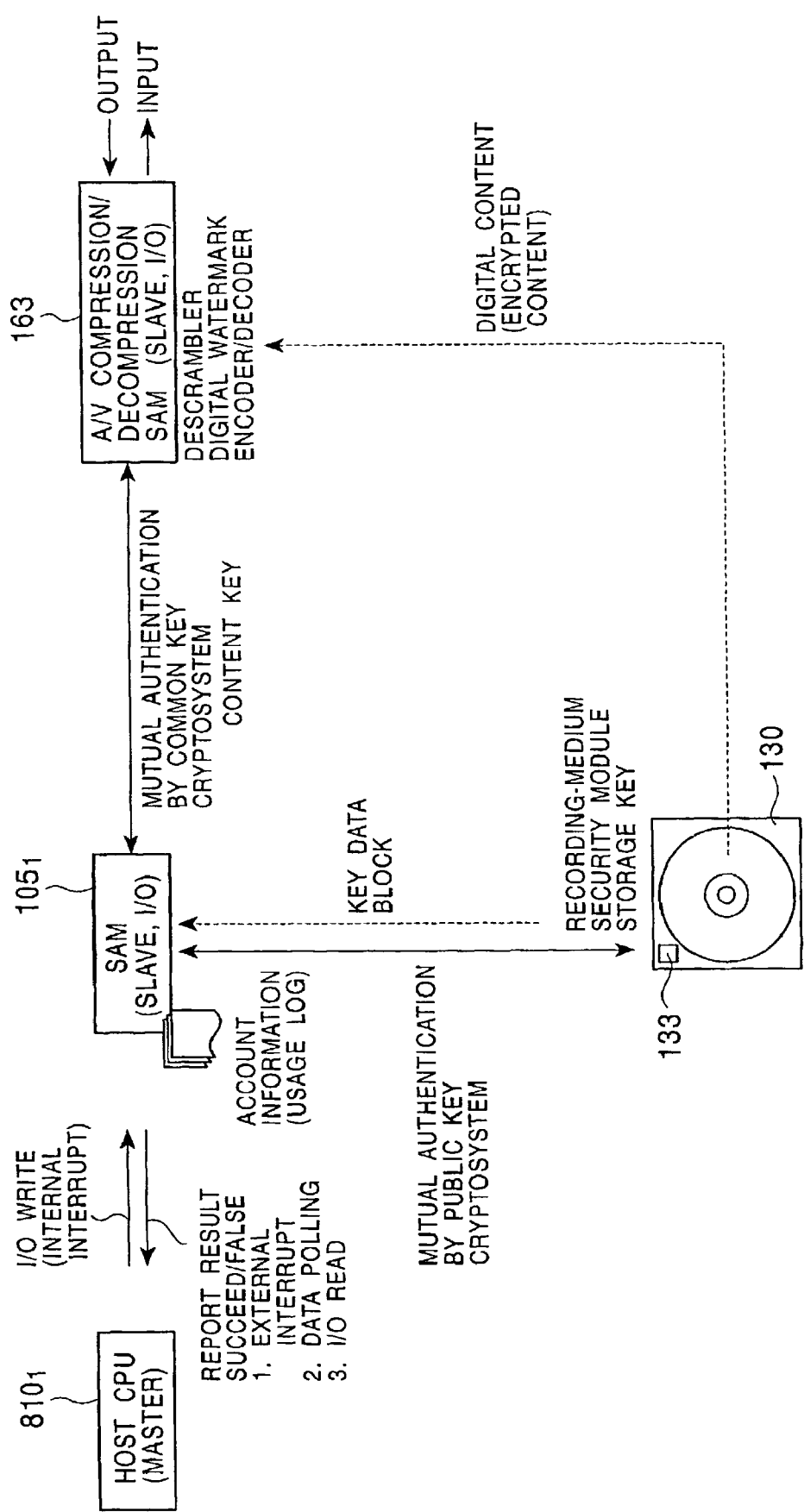
FIG. 66 illustrates the relationship among the host CPU, the SAM, the A/V compression/decompression SAM, and the recording medium shown in FIG. 63.

In playing back the content data C, for which the purchase mode is determined, recorded on a recording medium, an instruction to play back the content data C is given, as illustrated in FIG. 66, from the host CPU $810_1$ to the SAM $105_1$ through an internal interrupt.

In response to the internal interrupt, the SAM $105_1$ reads a key data block, such as the key file KF, from the medium SAM 133 of the recording medium 130, and executes processing for playing back the content data C based on the UCS data 166 stored in the key data block.

The SAM $105_1$ outputs an internal interrupt to instruct the A/V compression/decompression SAM 163 to decompress the content data C read from the recording medium 130.

Upon receiving the internal interrupt from the SAM $105_1$, the A/V compression/decompression SAM 163 descrambles the content data C read from the recording medium 130, embeds and detects the digital watermark information, and decompresses the content data. Then, the A/V compression/decompression SAM 163 outputs the processed content data C to the D/A converter so as to play back the content data C.

After completion of the playback operation, the A/V compression/decompression SAM 163 reports the corresponding information to the SAM $105_1$.

Upon receiving the above-described information, the SAM $105_1$ reports it to the host CPU $810_1$ via an external interrupt.

In this case, in the relationship between the host CPU $810_1$ and the SAM $105_1$, the host CPU $810_1$ serves as a master, while the SAM $105_1$ serves as a slave. In the relationship between the SAM $105_1$ and the A/V compression/decompression SAM 163, the SAM $105_1$ serves as a master, while the A/V compression/decompression SAM 163 serves as a slave.

Although in this embodiment the A/V compression/decompression SAM 163 is the slave for the SAM $105_1$, it may be a slave for the host CPU $810_1$.

Figure 67:
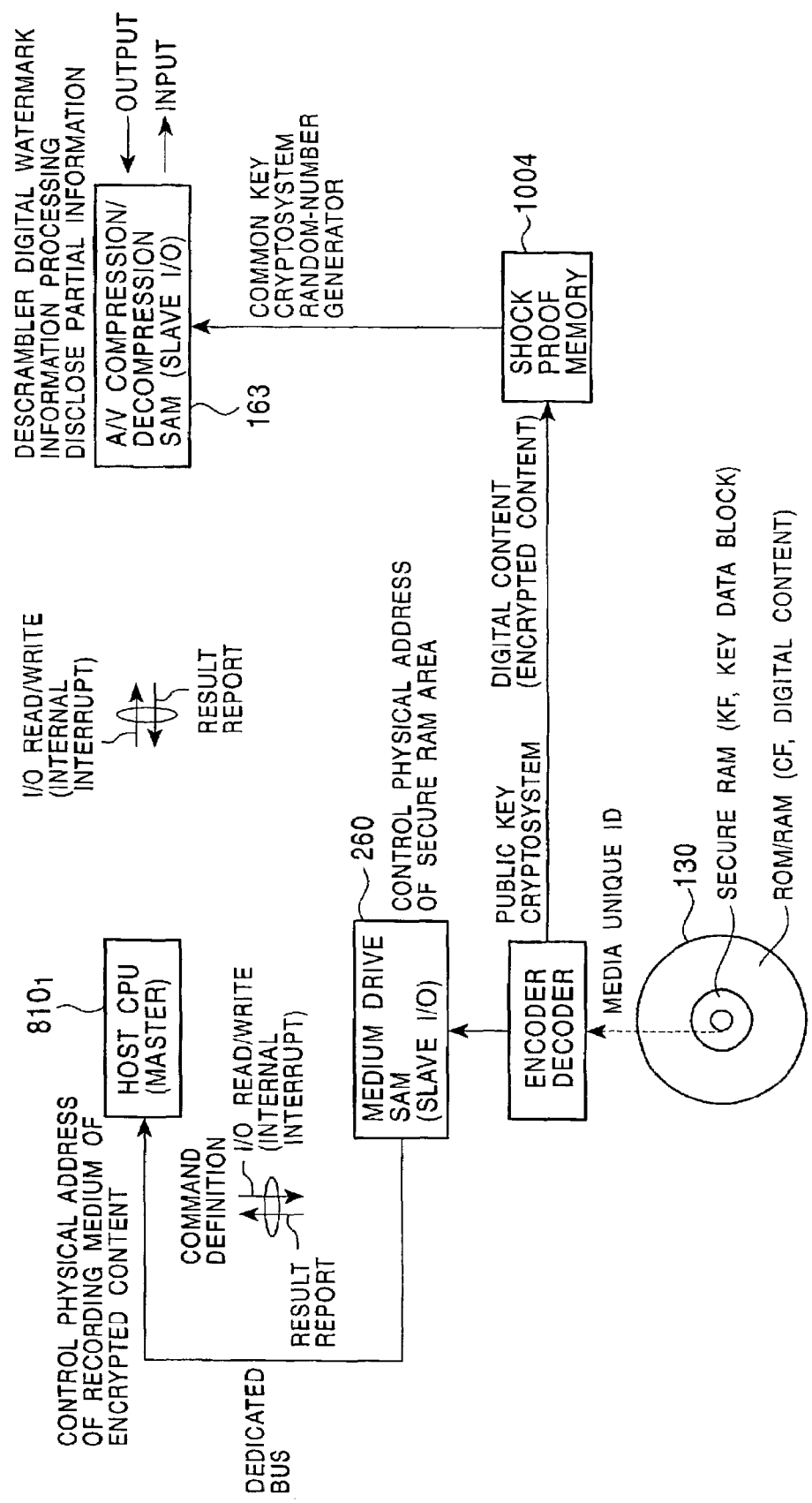
FIG. 67 illustrates the relationship among the host CPU, the medium drive SAM, and the A/V compression/decompression SAM shown in FIG. 63.

If the content data recorded on the recording medium 130 is played back without performing rights processing of the content data, as shown in FIG. 67, the host CPU $810_1$ outputs an internal interrupt to instruct the A/V compression/decompression SAM 163 to execute playback processing. The host CPU $810_1$ also outputs an internal interrupt to instruct the medium drive SAM 260 to read the content data from the recording medium 130.

Upon receiving the internal interrupt, the medium drive SAM 260 decodes the content data read from the recording medium 130 in the decoder, and then stores it in the shock proof memory 1004. Upon completion of this processing, the medium drive SAM 260 reports the corresponding information to the host CPU 810 through an external interrupt.

The content data stored in the shock proof memory 1004 is read into the A/V compression/decompression SAM 163, and undergoes processing, such as descrambling, embedding and detecting digital watermark information, and decompressing, and is then played back via the D/A converter.

Upon completion of this processing, the A/V compression/decompression SAM 163 reports this information to the host CPU $810_1$ through an external interrupt.

In this case, the host CPU $810_1$ serves as a master, while the A/V compression/decompression SAM 163 and the medium drive SAM 163 serve as slaves.

Circuit modules for implementing the above-described functions of the SAMs within the user home network 103 are discussed below.

As discussed above, the SAMs within the user home network 103 include the SAMs 105 ($105_1$ through $105_4$) for performing rights processing (profit distribution), such as determining the purchase mode, the medium SAM 133 disposed in a recording medium, the A/V compression/decompression SAM 163, and the medium drive SAM 260. Circuit modules provided for the above-described SAMs are as follows.

Example of Rights Processing SAM

Figure 68:
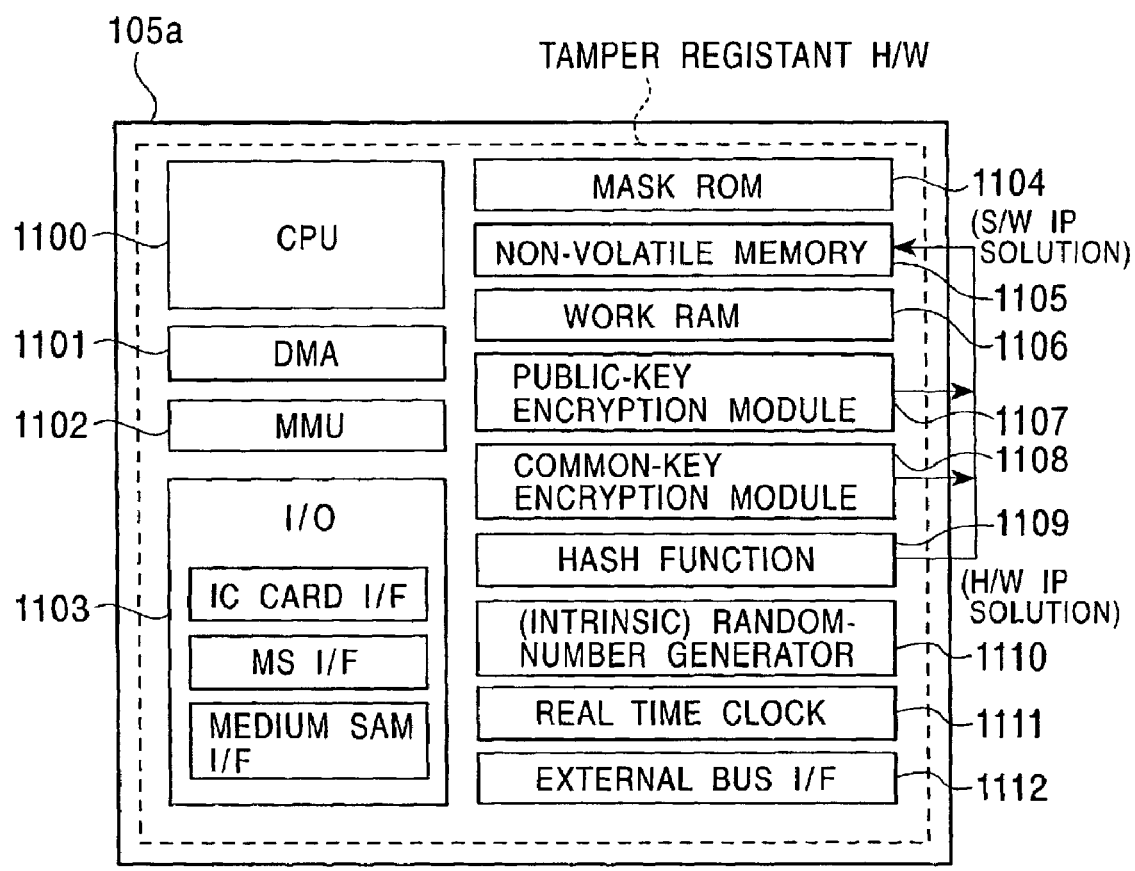
FIG. 68 illustrates one example of the circuit module of a rights processing SAM.

FIG. 68 illustrates a circuit module for a rights processing SAM 105a.

The SAM 105a is tamper-resistant hardware (equivalent to a circuit module of the present invention) including, as shown in FIG. 68, a CPU 1100, a DAM 1101, a MMU 1102, an I/O module 1103, a mask ROM 1104, a non-volatile memory 1105, a work RAM 1106, a public key encryption module 1107, a common key encryption module 1108, a hash function module 1109, an (intrinsic) random-number generator 1110, a real time clock module 1111, and an external bus I/F 1112.

The relationship between the elements of the rights processing SAM 105a and those of the present invention is as follows. The CPU 1100 corresponds to an arithmetic processing circuit. The mask ROM 1104, the non-volatile memory 1105, and the work RAM 1106 correspond to a storage circuit. The common key encryption module 1108 corresponds to an encryption processing circuit. The external bus I/F 1112 corresponds to an external bus interface.

As will be discussed below with reference to FIG. 69, internal buses 1120 and 1121 correspond to a first bus of the present invention, and an external bus 1123 corresponds to a second bus of the present invention.

The internal bus 1120 also corresponds to a third bus, and the internal bus 1121 also corresponds to a fourth bus.

The external bus I/F 1112 corresponds to a first interface circuit, and a bus I/F circuit 1116 corresponds to a second interface circuit.

An internal bus 1122 corresponds to a fifth bus, an I/O module corresponds to a third interface circuit, and a bus I/F circuit 1117 corresponds to a fourth interface circuit.

A brief description of the relationship between the function module of the SAM $105_1$ shown in FIG. 30 and the circuit module shown in FIG. 68 is given below.

The CPU 1100 executes, for example, programs stored in the mask ROM 1104 and the non-volatile memory 1105, so as to implement the functions of the CPU 1100, the accounting processor 187, and the usage monitor 186 shown in FIG. 30.

The DMA 1101 centrally controls access to the download memory 167 shown in FIG. 22 and the storage unit 192 shown in FIG. 30 in response to a command from the CPU 1100.

The MMU 1102 manages the address spaces of the download memory 167 shown in FIG. 22 and the storage unit 192 shown in FIG. 30.

The I/O module 1103 implements part of the functions of the medium SAM manager 197 shown in FIG. 30.

The mask ROM 1104 stores fixed programs and data, such as an initializing program and an integrity check program for the SAM 105a, when manufacturing the SAM $105_1$, and implements part of the functions of the storage unit 192 shown in FIG. 30.

The non-volatile memory 1105 stores variable programs and data, such as encryption programs and key data, and implements part of the functions of the storage unit 192 shown in FIG. 30.

The work RAM 1106 corresponds to the work memory 200 illustrated in FIG. 30.

The public key encryption module 1107 implements part of the functions of the signature processor 189 illustrated in FIG. 30, and is used for performing mutual authentication with the medium SAM 133 according to the public key cryptosystem, creating signature data of the SAM 105, checking signature data (of the EMD service center 102, the content provider 101, and, in the second embodiment, the service provider 310), encryption and decryption of a small amount of data (such as the key file KF) to be transferred, and sharing a key. The public key encryption module 1107 may be implemented as a circuit module (hardware (H/W) IP solution), or may be implemented by executing a public key encryption program stored in the non-volatile memory 1105 by the CPU 1100 (software (S/W) IP solution).

The common key encryption module 1108 implements part of the functions of the signature processor 189 and the encryption/decryption (decoding) units 171, 172, and 173, and is used for performing mutual authentication and encrypting and decrypting data by using the session key data $K_{SES}$ obtained by mutual authentication. The common key cryptosystem realizes much faster processing than the public key cryptosystem, and is thus used for, for example, encrypting and decrypting a large amount of content data (content file CF). The common key encryption module 1108 may be implemented as a circuit module (H/W IP solution), or may be implemented by executing the common key encryption program stored in the non-volatile memory 1105 by the CPU 1100 (S/W IP solution).

Mutual authentication is achieved by encryption and decryption of one or both of the public key encryption module 1107 and the common key encryption module 1108.

The common key encryption module 1108 decodes the content key data Kc with the license key data KD.

The hash function module 1109 implements part of the functions of the signature processor 189 shown in FIG. 30, and is used for generating hash values of data for which signature data is to be created. More specifically, the hash function module 1109 is used for checking the signature data of the content provider 101 and the EMD service center 102, and also checking the hash value $H_{K1}$ of the key file $KF_1$ of the secure container 104x illustrated in FIGS. 44A through 44D. The hash function module 1109 may be implemented as a circuit module (H/W IP solution), or may be implemented by executing a hash circuit module program stored in the non-volatile memory 1105 by the CPU 1100 (S/W IP solution).

The random-number generator 1110 implements part of the functions of the mutual authentication unit 170 illustrated in FIG. 30.

The real time clock module 1111 generates real time, which is used for selecting the license key data KD with an effective period, or determining whether the requirements of an effective period indicated by the UCS data 166 are satisfied.

The external bus I/F 1112 implements part of the functions of the content provider manager 180, the download memory manager 182, and the EMD service center manager 185 shown in FIG. 30.

Figure 69:
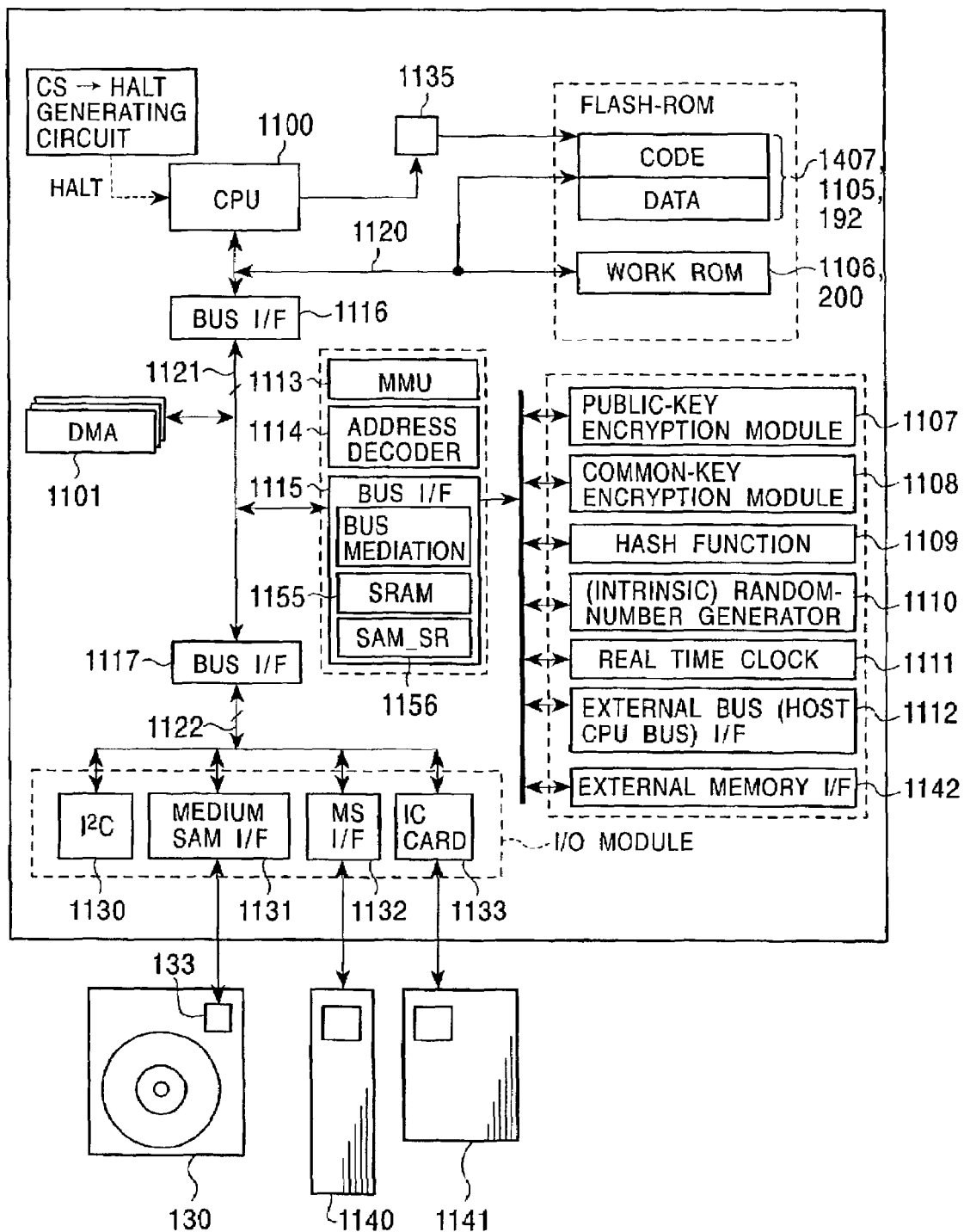
FIG. 69 illustrates one example of hardware configuration within the SAM configured as the circuit module shown in FIG. 68.

FIG. 69 illustrates the hardware configuration within the SAM 105a. In FIG. 69, the same elements as those shown in FIG. 68 are designated with like reference numerals.

As shown in FIG. 69, within the SAM 105a, the CPU 1100, the mask ROM 1104, and the non-volatile memory 1105 are connected to each other via the SAM/CPU bus 1120.

The DMA 1101 is connected to the internal bus 1121. An I2C interface 1134, a medium SAM interface 1131, a Memory Stick (MS) interface 1132, and an IC card interface 1133 are connected to the internal bus 1122.

The medium SAM interface 1131 transfers and receives data to and from the medium SAM 133 of the recording medium 130. The MS interface 1132 transfers and receives data to and from a memory stick 1140. The IC card interface 1133 transfer and receives data to and from an IC card 1141.

The public key encryption module 1107, the common key encryption module 1108, the hash function module 1109, the random-number generator 1110, the real time clock module 1111, the external bus I/F 1112, and an external memory I/F 1142 are connected to the external bus 1123.

The host CPU bus 1000 shown in FIG. 63 is connected to the external bus I/F 1112, and the external memory 201 shown in FIG. 63 is connected to the external memory I/F 1142.

The SAM/CPU bus 1120 and the internal bus 1121 are connected via the bus interface 1116. The internal buses 1122 and 1121 are connected via the bus interface 1117. The internal bus 1121 and the external bus 1123 are connected via a bus interface 1115.

The above-described SRAM 1155 and the SAM status register 1156 are stored in the bus interface 1115.

As stated above, the SAM status register 1156 has the first SAM status register 1156a and the second SAM status register 1156b. A flag indicating the status of the SAM $105_1$ read by the host CPU $810_1$ is set in the first SAM status register 1156a. A flag indicating whether a request to execute a task has been output from the host CPU $810_1$ is set in the second SAM status register 1156b, and this flag is read from the CPU 1100 of the SAM $105_1$.

The DMA 1101 centrally controls the mask ROM 1104, the non-volatile memory 1105, and the work RAM 1106 via the internal bus 1121 in response to a command from the CPU 1100.

A MMU 1113 manages memory spaces of the mask ROM 1104, the non-volatile memory 1105, the work RAM 1106, and the download memory 167 shown in FIG. 63.

An address decoder 1114 performs address conversion when data is transferred between the internal bus 1121 and the external bus 1123.

A writing lock control circuit 1135 controls writing and erasing of each block of data into and from a flash ROM based on the lock key data of the CPU 1100.

The address space of the rights processing SAM 105a is described below.

Figure 70:
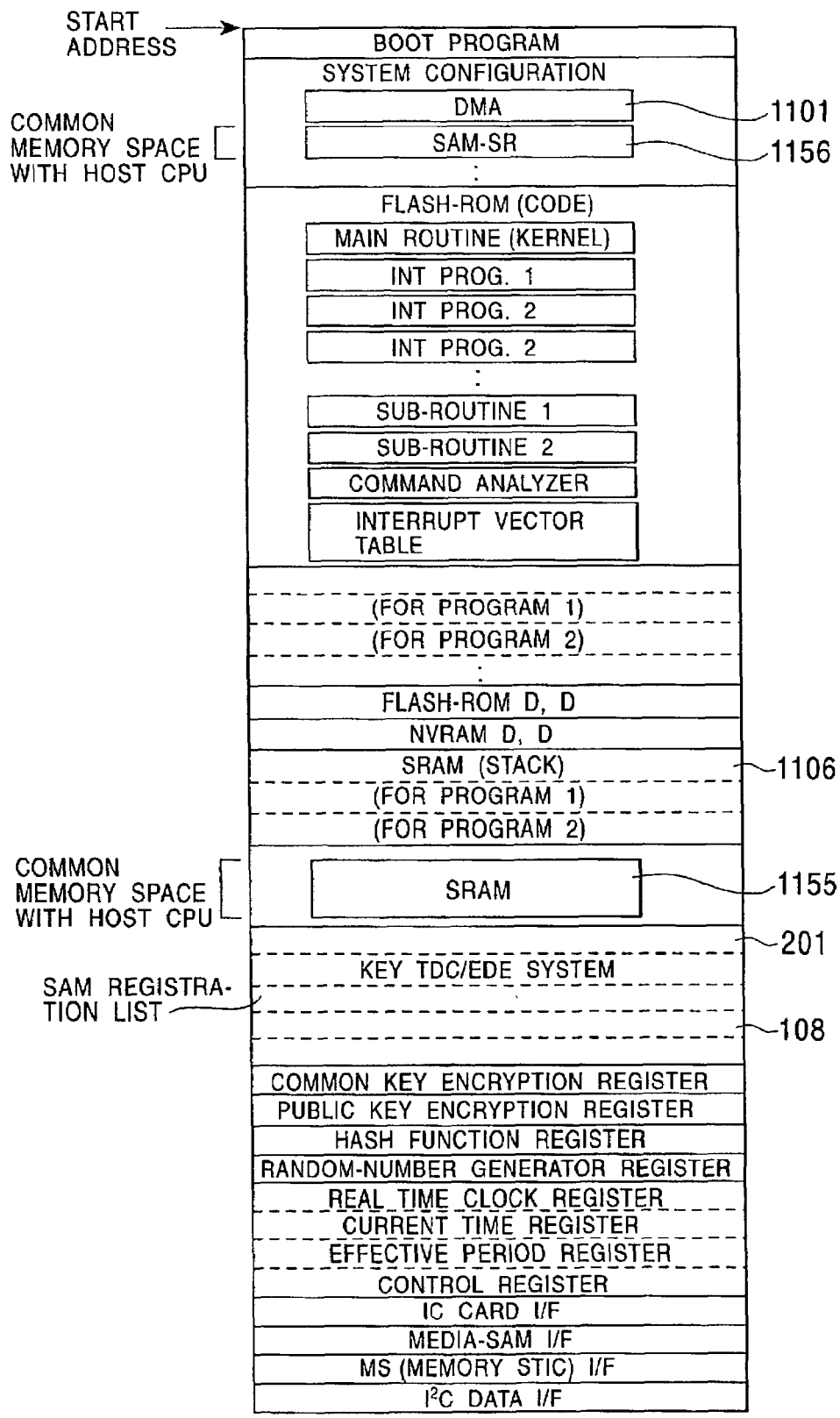
FIG. 70 illustrates an address space of the rights processing SAM.

FIG. 70 illustrates the address space of the rights processing SAM 105a. The address space contains, starting from the start address, a boot program, the system configuration, a flash ROM, predetermined programs, a device driver for the flash ROM, a device driver for a non-volatile memory, the work RAM 1106 shown in FIG. 69, predetermined programs, the SRAM 1155 shown in FIG. 69, the external memory 201, Key_TOC/File_System, a SAM registration list, the usage log data 108, a register for the common key encryption module 1108 shown in FIG. 69, a register for the public key encryption module 1107 shown in FIG. 69, a register for the hash function module 1109 shown in FIG. 69, a register for the random-number generator 1110 shown in FIG. 69, a register for the real time clock module 1111 shown in FIG. 69, a current time register, an effective period register, a control register, an IC card interface, a medium SAM interface, a Memory Stick interface, and an I²C bus interface.

In the field of the address space assigned to the system configuration, the DMA 1101 and the SAM status register 1156 shown in FIG. 69 are stored.

In the field of the address space assigned to the flash ROM, a main routine (kernel), interrupt programs, sub-routines called by the interrupt programs, a command analyzer (table indicating the relationship between the commands and start addresses of the interrupt programs), and an interrupt vector table are stored.

In the address space of the SAM 105a illustrated in FIG. 70, the SAM status register 1156 and the SRAM 1155 are used as common memory spaces with the host CPU 810.

The address space of the host CPU $810_1$ shown in FIG. 63 is described below with reference to FIG. 71.

Figure 71:
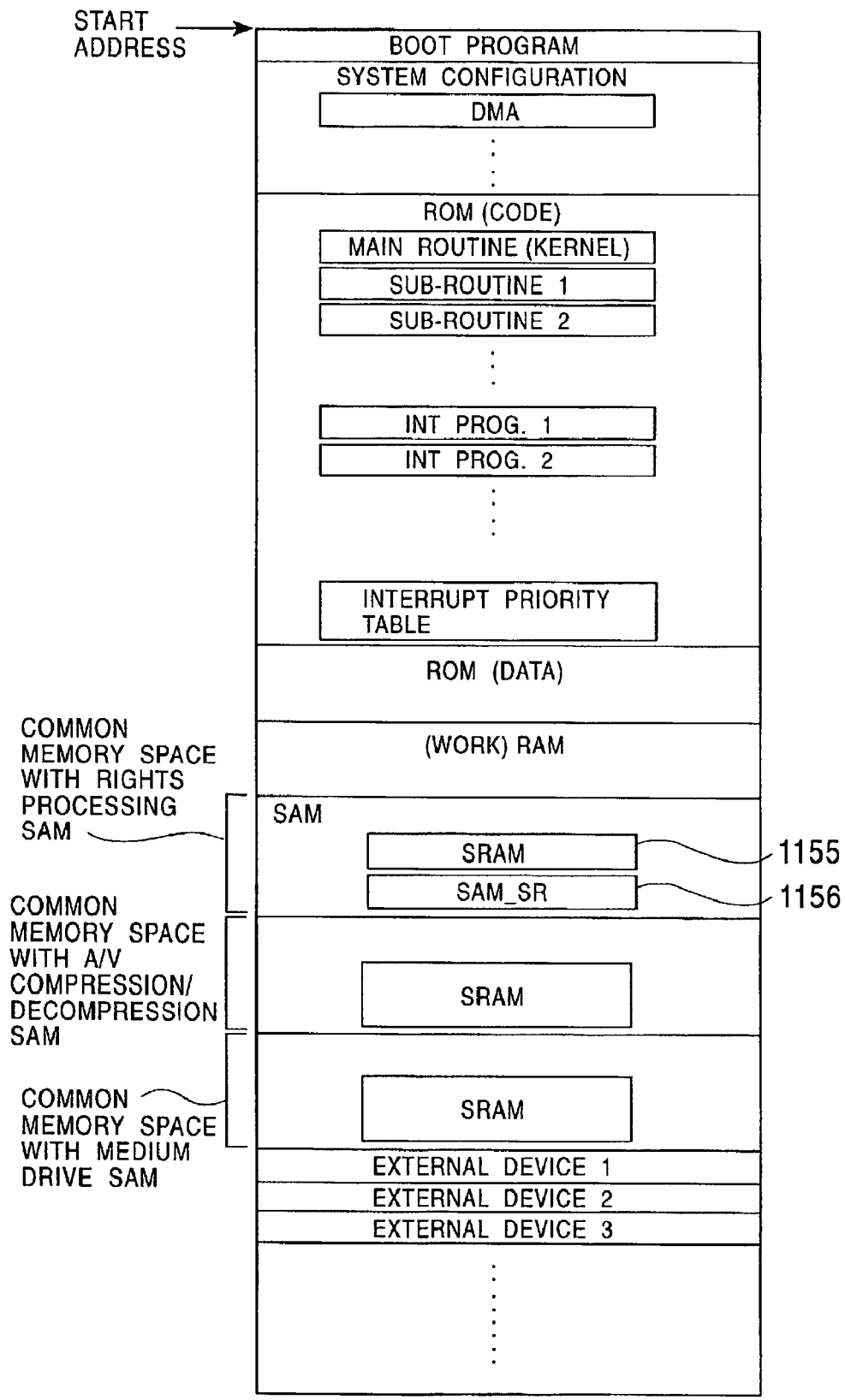
FIG. 71 illustrates an address space of the host CPU.

The address space of the host CPU $810_1$ contains, as shown in FIG. 71, starting from the start address, a boot program, the system configuration, a code ROM, a data ROM, a work RAM, a common memory shared with the SAM $105_1$ shown in FIG. 63, a common memory shared with the A/V compression/decompression SAM 163 shown in FIG. 63, a common memory shared with the medium drive SAM 260 shown in FIG. 63, and external devices.

The SRAM 1155 and the SAM status register 1156 shown in FIG. 69 are assigned to the common memory shared with the SAM $105_1$ shown in FIG. 63.

Another Example of Rights Processing SAM

Figure 72:
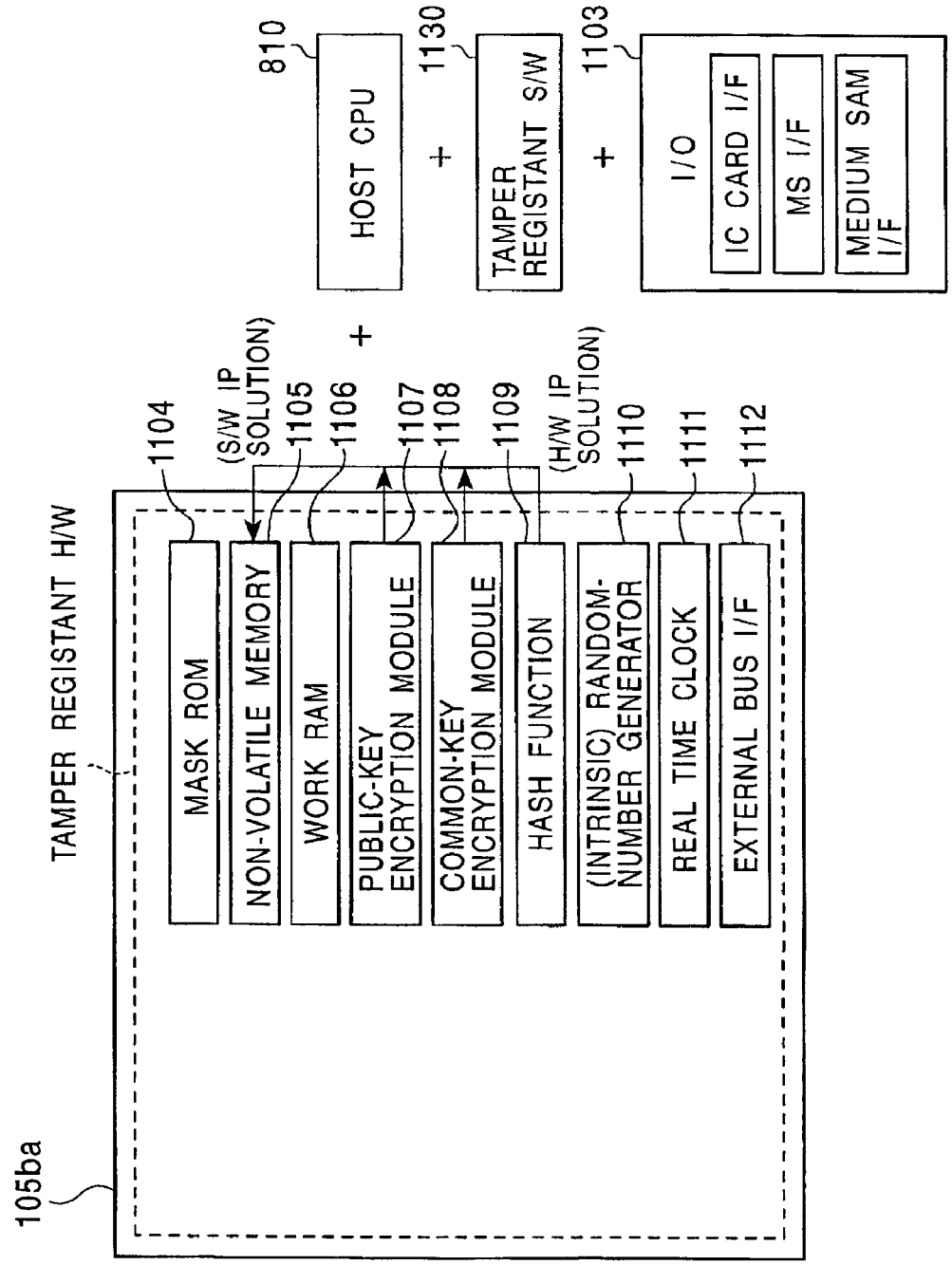
FIG. 72 illustrates another example of the circuit module of the rights processing SAM.

FIG. 72 illustrates a circuit module of a rights processing SAM 105b. In FIG. 72, the same elements as those shown in FIG. 69 are designated with like reference numerals.

The SAM 105b is formed of, as shown in FIG. 72, a secure memory 105ba, a host CPU 810, tamper-resistant software 1130, and an I/O module 1103.

In the SAM 105b, the tamper-resistant software 1130 is executed by the host CPU 810 so as to implement the same function as the CPU 1100 shown in FIG. 68. As stated above, the tamper-resistant software 1130 is software in which the processing is totally shielded from an external source, and is difficult to be analyzed or overwritten.

The secure memory 105ba is tamper-resistant hardware including a mask ROM 1104, a non-volatile memory 1105, a work RAM 1106, a public key encryption module 1107, a common key encryption module 1108, a hash function module 1109, an (intrinsic) random-number generator 1110, a real time clock module 1111, and an external bus I/F 1112.

The public key encryption module 1107, the common key encryption module 1108, and the hash function module 1109 may be implemented as a circuit module (H/W IP solution), or may be implemented by executing a public key encryption program, a common key encryption program, and a hash function program, respectively, stored in the non-volatile memory 1105 by the host CPU 810 (S/W IP solution).

Figure 73:
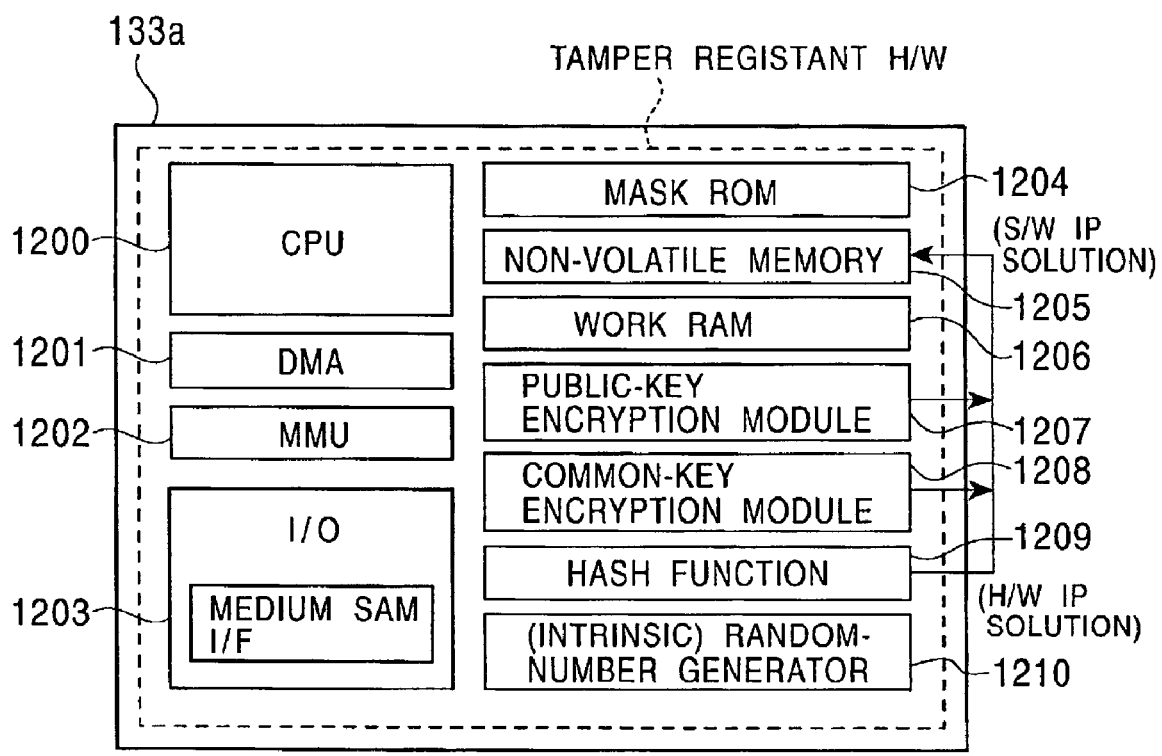
FIG. 73 illustrates a circuit module of the medium SAM.

An example of the configuration of the above-described medium SAM 133 is as follows. FIG. 73 illustrates a circuit module of the medium SAM 133.

The medium SAM 133 is tamper-resistant hardware including, as shown in FIG. 73, a CPU 1200, a DMA 1201, an I/O module 1203, a mask ROM 1204, a non-volatile memory 1205, a work RAM 1206, a public key encryption module 1207, a common key encryption module 1208, a hash function module 1209, and an (intrinsic) random-number generator 1210.

The CPU 1200 controls the individual circuits within the tamper-resistant hardware.

The work RAM 1206 corresponds to the work memory 200 shown in FIG. 30.

The public key encryption module 1207 is used for performing operations according to the public key cryptosystem, for example, (1) performing mutual authentication with the SAM 105₁ and the drive CPU 1003 shown in FIG. 63, (2) creating signature data of the medium SAM 133a and checking signature data (of the EMD service center 102, the content provider 101, and in the second embodiment, the service provider 310), (3) encrypting and decrypting a small amount of data to be transferred, and (4) sharing the session key data $K_{SES}$ obtained by mutual authentication. The public key encryption module 1107 may be implemented as a circuit module (H/W IP solution), or may be implemented by executing the public key encryption program stored in the non-volatile memory 1205 by the CPU 1200 (S/W IP solution).

The common key encryption module 1208 is used for performing mutual authentication and for encrypting and decrypting data, such as the key files KF and $KF_1$ by using the session key data $K_{SES}$ obtained by performing mutual authentication. The common key encryption module 1108 may be implemented as a circuit module (H/W IP solution), or may be implemented by executing the common key encryption program stored in the non-volatile memory 1205 by the CPU 1200 (S/W IP solution).

Mutual authentication can be realized by encrypting and decrypting by one or both of the public key encryption module 1207 and the common key encryption module 1208.

The hash function module 1209 is used for generating hash functions of data. More specifically, the hash function module 1209 is used for verifying the hash value $H_{K1}$ of the key file $KF_1$ of the secure container 104x shown in FIGS. 44A through 44D. The hash function module 1109 may be implemented as a circuit module (H/W IP solution), or may be implemented by executing the hash circuit module stored in the non-volatile memory 1205 by the CPU 1200 (S/W IP solution).

The random-number generator 1210 is used for performing, for example, mutual authentication.

The I/O module 1203 is used for performing communication with the medium SAM I/F 1007 shown in FIG. 63.

The mask ROM 1204 stores fixed programs and data, such as an initializing program and an integrity check program for the medium SAM 133, when being shipped.

The non-volatile memory 1205 stores variable programs and data, such as encryption programs and key data.

FIG. 74 illustrates data stored in the mask ROM 1204 and the non-volatile memory 1205 when shipping the medium SAM 133 to be installed in a recording medium (ROM).

When shipping the recording medium (ROM), the medium SAM 133 stores, as shown in FIG. 74, an identifier (ID) of the medium SAM, storage key data $K_{STR}$ (medium key data $K_{MED}$, public key data $K_{ESC,P}$ of the EMD service center 102, public key data $K_{R-CA,P}$ of the root certifying authority 92, public-key certificate data $CER_{MSAM}$ of the medium SAM 133, public key data $K_{MSAM,P}$ of the medium SAM 133, private key data $K_{MSAM,S}$ of the medium SAM 133, a revocation list, rights processing data, an entity ID which receives profits, the type of medium (medium type information and information specifying either a ROM or a RAM), physical address information (register space address) of the key files KF, the key file KF of each content data C (content file CF), and predetermined check values (MAC values).

The physical address information (register space address) of the key files KF, the key file KF of each content data C (content file CF), and the predetermined check values (MAC values) are encrypted with the license key data KD managed by the EMD service center 102.

FIG. 75 illustrates data stored in the mask ROM 1204 and the non-volatile memory 1205 when user registration is conducted and the purchase mode is determined after the medium SAM 133 to be installed in a recording medium (ROM) has been shipped.

As shown in FIG. 75, a user ID, a password, favorite information, settlement information (for example, a credit card number), electronic money information, a key file $KF_1$, etc. are newly added to the medium SAM 133 by the user registration.

FIG. 76 illustrates data stored in the mask ROM 1204 and the non-volatile memory 1205 when the medium SAM 133 to be installed in a recording medium (RAM) is shipped.

As illustrated in FIG. 76, when shipping the recording medium (RAM), the medium SAM 133 stores an identifier (ID) of the medium SAM 133, recording key data $K_{STR}$ (medium key data $K_{MED}$), public key data $K_{ESC,P}$ of the EMD service center 102, public key data $K_{R-CA,P}$ of the root certifying authority 92, public-key certificate data $CER_{MSAM}$ of the medium SAM 133, public key data $K_{MSAM,P}$ of the medium SAM 133, private key data $K_{MSAM,S}$ of the medium SAM 133, a revocation list, rights processing data, an entity ID which receives profits, and the type of medium (medium type information and information specifying either a ROM or a RAM). However, physical address information (register space address) of the key files KF, key files KF and $KF_1$ of each content data C (content file CF), and predetermined check values (MAC values) are not stored.

FIG. 77 illustrates data stored in the mask ROM 1204 and the non-volatile memory 1205 when user registration is conducted and the purchase mode is determined after the medium SAM 133 to be installed in a recording medium (RAM) has been shipped.

As illustrated in FIG. 77, in addition to a user ID, a password, favorite information, settlement information (for example, a credit card number), and electronic money information, physical address information (register space address) of the key files KF, the key files KF and $KF_1$ of each content data C (content file CF), and predetermined values (MAC values) are newly written into the medium SAM 133 by the user registration.

The physical address information (register space address) of the key file KF, the key files KF and $KF_1$ of each content data C (content file CF), and the predetermined values (MAC values) are encrypted with the storage key data $K_{STR}$.

A/V Compression/Decompression SAM 163

The A/V compression/decompression SAM 163 implements, for example, the functions shown in FIG. 22.

Figure 78:
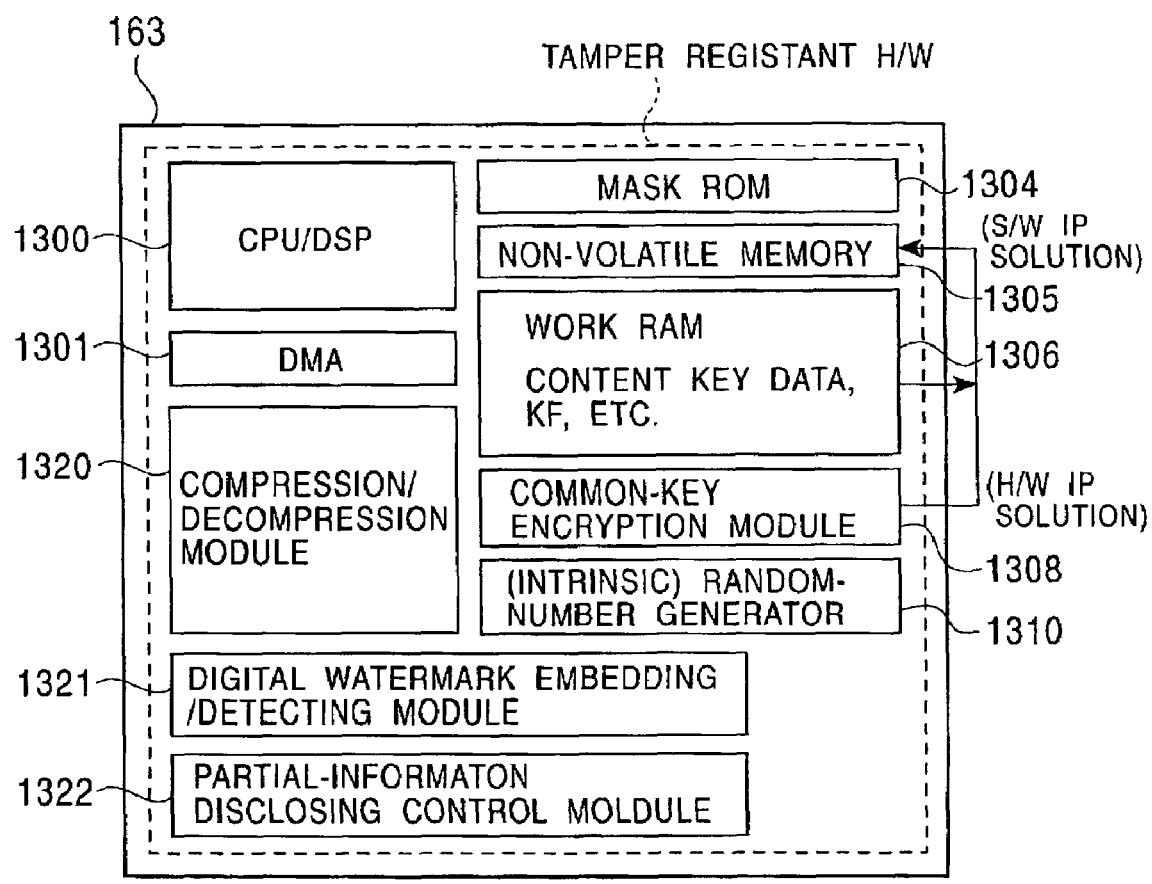
FIG. 78 illustrates an example of a circuit module of the A/V compression/decompression SAM.

FIG. 78 illustrates a circuit module of the A/V compression/decompression SAM 163.

The A/V compression/decompression SAM 163 is tamper-resistant hardware including, as shown in FIG. 78, a CPU/DSP 1300, a DMA 1301, a mask ROM 1304, a non-volatile memory 1305, a work RAM 1306, a common key encryption module 1308, an (intrinsic) random-number generator 1310, a compression/decompression module 1320, a digital watermark embedding/detecting module 1321, and a partial-information disclosing control module 1322.

The CPU/DSP 1300 centrally controls the individual circuit modules within the A/V compression/decompression SAM 163 by executing programs stored in the mask ROM 1304 and the non-volatile memory 1305 in accordance with a command, for example, from the SAM $105_1$ shown in FIG. 63.

The DMA 1301 centrally controls access to the mask ROM 1304, the non-volatile memory 1305, and the work ROM 1306 in accordance with a command from the CPU/DSP 1300.

When the A/V compression/decompression SAM 163, the mask ROM 1304 stores fixed programs, such as an initializing program and an integrity check program for the A/V compression/decompression SAM 163, and fixed data, such as an identifier AVSAM_ID of the A/V compression/decompression SAM 163.

The non-volatile memory 1305 stores variable programs and data, such as an encryption program and key data.

The work RAM 1306 stores the key file KF received from the SAM $105_1$.

The common key encryption module 1308 is used for conducting mutual authentication and for encrypting and decrypting the content data C and the content key data Kc by using the session key data $K_{SES}$ obtained by mutual authentication. The common key encryption module 1308 may be implemented as a circuit module (H/W IP solution) or may be implemented by executing the common key encryption program stored in the non-volatile memory 1305 by the CPU/DSP 1300 (S/W IP solution). The common key encryption module 1308 also decrypts the content data C by using the content key data Kc obtained from the SAM $105_1$.

The (intrinsic) random-number generator 1310 is used for performing mutual authentication with, for example, the SAM $105_1$.

The compression/decompression module 1320 implements the functions of, for example, the decompression unit 223 shown in FIG. 22. More specifically, the compression/decompression module 1320 decompresses the content data received from the download memory 167 and the shock proof memory 1004 shown in FIG. 63, and compresses the content data received from the A/D converter.

The digital watermark embedding/detecting module 1321 implements the functions of the digital-watermark information processor 224 shown in FIG. 22. For example, the digital watermark embedding/detecting module 1321 embeds predetermined digital watermark information into the content data to be processed by the compression/decompression module 1320 and detects the digital watermark information embedded into the content data, that is, it determines whether the processing executed by the compression/decompression module 1320 is suitable.

The partial-information disclosing control module 1322 implements the partially disclosing processor 225 shown in FIG. 22, and plays back the content data according to the playback mode.

Medium Drive SAM 260

Figure 79:
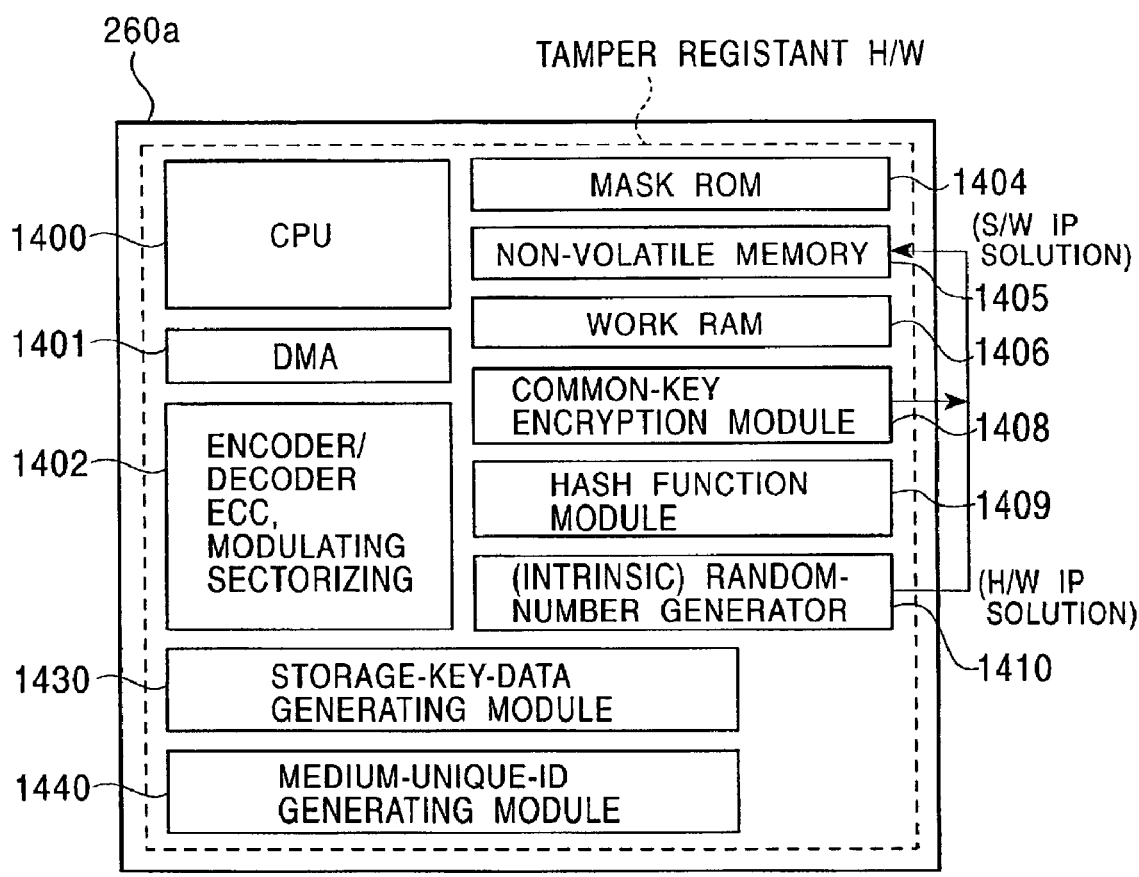
FIG. 79 illustrates an example of a circuit module of the medium drive SAM.

FIG. 79 illustrates a circuit module of the medium drive SAM 260.

The medium drive SAM 260 is tamper-resistant hardware including, as illustrated in FIG. 79, a CPU 1400, a DMA 1401, a mask ROM 1404, a non-volatile memory 1405, a work RAM 1406, a common key encryption module 1408, a hash function module 1409, an (intrinsic) random-number generator 1410, an encode/decoder module 1420, a storage-key-data generating module 1430, and a medium-unique-ID generating module 1440.

The CPU 1400 executes programs stored in the mask ROM 1404 and the non-volatile memory 1405 in accordance with a command from the drive CPU 1003 shown in FIG. 63, and centrally controls the individual circuit modules within the medium drive SAM 260.

The DMA 1401 centrally controls access to the mask ROM 1404, the non-volatile memory 1405, and the work RAM 1406 in accordance with a command from the CPU 1400.

When the medium drive SAM 260 is shipped, the mask ROM 1404 stores fixed programs, such as an initializing program and an integrity check program for the medium drive SAM 260, and fixed data, such as identifier MDSAM_ID of the medium drive SAM 260.

The non-volatile memory 1405 stores variable programs and data, such as encryption programs and key data.

The work RAM 1406 serves as a work memory for executing various processing.

The common key encryption module 1408 is used for performing mutual authentication between the medium SAM 133 and the A/V compression/decompression SAM 163, and for encrypting and decrypting the content file CF and the key file KF by using the session key data $K_{SES}$, which is a common key obtained by mutual authentication, and also for encrypting the content key data Kc using the storage key data $K_{STR}$ and the medium key data $K_{MED}$. The common key encryption module 1408 verifies signature data and creates signature data by using the common key data and the hash values of data, for which signature data is to be created.

The common key encryption module 1408 may be implemented as a circuit module (H/W IP solution), or may be implemented by executing the common key encryption program stored in the non-volatile memory 1405 by the CPU 1400 (S/W IP solution).

Encryption of the content key data Kc by using the storage key data $K_{STR}$ may be performed by either the common key encryption module 1408 of the medium drive SAM 260 or the medium SAM module 133.

The hash function module 1409 is used for verifying signature data and for generating hash values of data, for which signature data is to be created.

The (intrinsic) random-number generator 1410 is used for performing mutual authentication with, for example, the medium SAM 133.

When accessing the content data stored in the ROM area or the RAM area of the recording medium 130, the encoder/decoder module 1420 executes processing, such as encoding, decoding, ECC, modulating, demodulating, sectorizing, and desectorizing, on the content data.

The storage-key-data generating module 1430 generates the storage key data $K_{STR}$ unique to each medium by using the medium unique ID generated by the medium-unique-ID generating module 1440.

The medium-unique-ID generating module 1440 generates a medium unique ID unique to each recording medium from the drive ID generated by the medium drive SAM 260 and the SAM_ID of the medium SAM 133.

Figure 80:
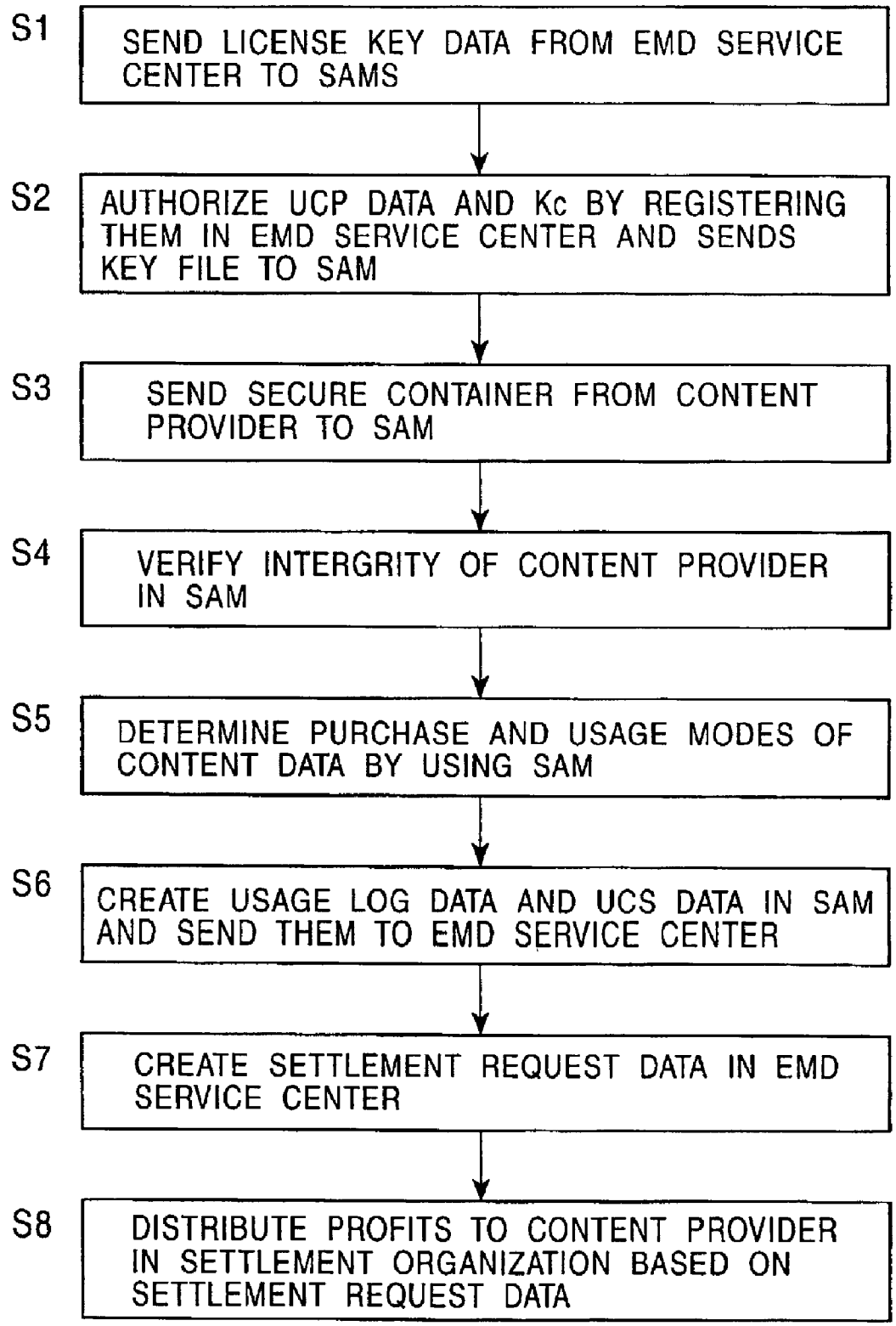
FIG. 80 is a flow chart illustrating the overall operation of the EMD system shown in FIG. 1.

The overall operation of the EMD system 100 shown in FIG. 1 is described below with reference to the flow chart of FIG. 80.

In step S1, after the content provider 101 performs predetermined registration, the EMD service center 102 sends the public key certificate $CER_{CP}$ of the public key data $K_{CP,P}$ of the content provider 101.

After the SAMs $105_1$ through $105_4$ perform predetermined registration processing, the EMD service center 102 also sends the public key certificates $CER_{CP1}$ through $CER_{CP4}$ of the public key data $K_{SAM1,P}$ through $K_{SAM4,P}$ of the SAMs $105_1$ through $105_4$, respectively.

After conducting mutual authentication, the EMD service center 102 sends the license key data $KD_1$ through $KD_3$ for three months, each having a one-month effective period, to the SAMs $105_1$ through $105_4$ of the user home network 103.

In this manner, in the EMD system 100, the license key data $KD_1$ through $KD_3$ are distributed to the SAMs $105_1$ through $105_4$ in advance. This enables the SAMs $105_1$ through $105_4$ to purchase and utilize the secure container 104 distributed from the content provider 101 by decoding the secure container 104 even while the SAMs $105_1$ through $105_4$ are disconnected from the EMD service center 102. In this case, the purchase and usage log is recorded in the usage log data 108, which is then automatically sent to the EMD service center 102 when the SAMs $105_1$ through $105_4$ are connected to the EMD service center 102. It is thus possible for the EMD service center 102 to reliably perform settlement processing. If the EMD service center 102 does not receive the usage log data 108 in a predetermined period, it is able to make the corresponding SAM invalid in the revocation list. The UCS data 166 is transmitted basically in real time from the SAMs $105_1$ through $105_4$ to the EMD service center 102.

In step S2, after performing mutual authentication with the EMD service center 102, the content provider 101 authorizes the UCP data 106 and the content key data Kc by registering them in the EMD service center 102. The EMD service center 102 also creates the key file KF for six months and sends it to the content provider 101.

In step S3, the content provider 101 creates the content file CF and the signature data $SIG_{6,CP}$ therefor, shown in FIG. 3A, and the key file KF and the signature data $SIG_{7,CP}$ therefor, shown in FIG. 3B. The content provider 101 then sends the secure container 104 in which the above-described files and data, and the public-key certificate data $CER_{CP}$ and the signature data $SIG_{1,ESC}$ therefor, shown in FIG. 3C, are stored, to the SAMs $105_1$ through $105_4$ of the user home network 103 online or offline.

In sending the secure container 104 online, a specific protocol for the content provider 101 is used to distribute the secure container 104 from the content provider 101 to the user home network 103 in the format independent of the protocol (i.e., data to be transmitted by using a predetermined layer of a communication protocol consisting of a plurality of layers).

In sending the secure container 104 offline, the secure container 104 is stored in a recording medium (ROM or RAM) and is sent from the content provider 101 to the user home network 103.

Then, in step S4, the SAMs $105_1$ through $105_4$ of the user home network 103 check the signature data $SIG_{6,CP}$, $SIG_{7,CP}$, and $SIGK_{1,ESC}$ within the secure container 104 distributed from the content provider 101 so as to verify the integrity of the creators and senders of the content file CF and the key file KF. Thereafter, the SAMs $105_1$ through $105_4$ decode the key file KF by using the license key data $KD_1$ through $KD_6$ of corresponding periods.

Subsequently, in step S5, in the SAMs $105_1$ through $105_4$, the purchase and usage modes are determined based on the internal interrupt S810 from the host CPU 810 according to the user's operation on the operation unit 185 shown in FIG. 22.

In this case, the usage monitor 186 shown in FIG. 37 manages the purchase and usage modes of the content file CF selected by the user based on the UCP data 106 stored in the secure container 104.

In step S6, the accounting processors 187 of the SAMs $105_1$ through $105_4$ shown in FIG. 37 create the usage log data 108 and the UCS data 166 in which the purchase and usage modes are recorded, and send them to the EMD service center 102.

In step S7, the EMD service center 102 executes accounting processing based on the usage log data 108, and creates the settlement request data 152 and the settlement report data 107. The EMD service center 102 sends the settlement request data 152 and the signature data $SIG_{99}$ therefor, to the settlement organization 91 via the payment gateway 90 shown in FIG. 1. The EMD service center 102 also sends the settlement report data 107 to the content provider 101.

Then, in step S8, after verifying the signature data $SIG_{99}$, the settlement organization 91 distributes the payment made by the user to content rights holders, such as the content provider 101, based on the settlement report data 152.

As described above, in the EMD system 100, the secure container 104 shown in FIGS. 3A through 3C is distributed from the content provider 101 to the user home network 103, and the key file KF within the secure container 104 is processed in the SAMs $105_1$ through $105_4$.

The content key data Kc and the UCP data 106 stored in the key file KF are encrypted with the license key data $KD_1$ through $KD_3$, and are decrypted only in the SAMs $105_1$ through $105_4$ which hold the license key data $KD_1$ through $KD_3$. The SAMs $105_1$ through $105_4$ are tamper-resistant hardware in which the purchase and usage modes of the content data C are determined based on the handling contents of the content data C recorded in the UCP data 106.

Therefore, according to the EMD system 100, the content data C can be reliably purchased and utilized in the user home network 103 based on the UCP data 106 created by the content provider 101 or a content-rights holder.

Additionally, in the EMD system 100, the content data C may be distributed from the content provider 101 to the user home network 103 online or offline by storing it in the secure container 104. In this case, the rights processing of the content data C in the SAMs $105_1$ through $105_4$ are not influenced by whether the content data C is sent online or offline.

In the EMD system 100, in purchasing, utilizing, recording, and transferring the content data C in the network device $160_1$ and the A/V machines $160_2$ through $160_4$ within the user home network 103, processing is always executed based on the UCP data 106. Thus, rights processing rules in common to the whole user home network 103 can be established.

Figure 81:
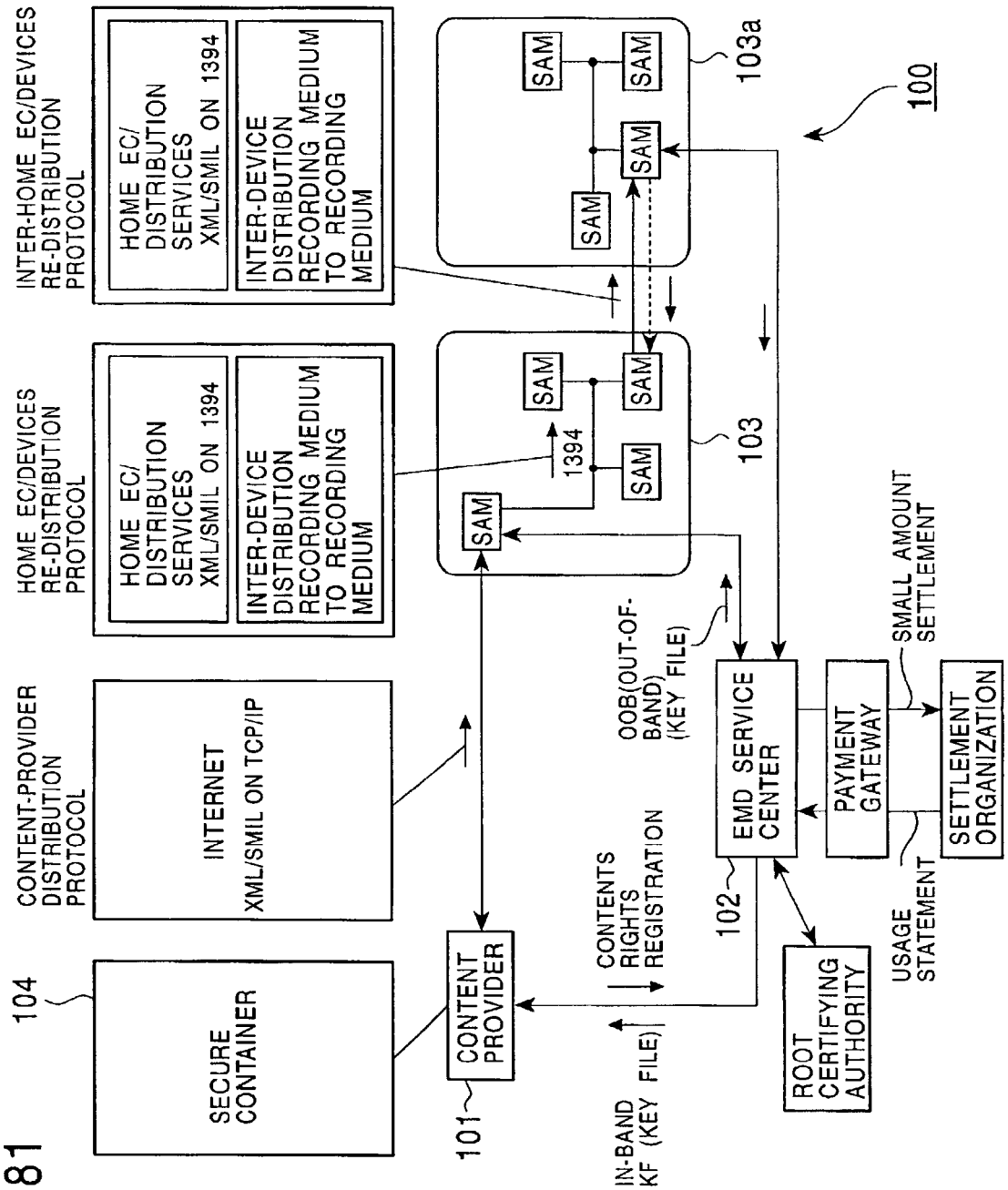
FIG. 81 illustrates examples of distribution protocols for the secure container used in the EMD system of the first embodiment.

FIG. 81 illustrates an example of protocols for distributing the secure container 104 used in the first embodiment.

In the multiple processor system (EMD system) 100, as illustrated in FIG. 81, as protocols for delivering the secure container 104 from the content provider 101 to the user home network 103, TCP/IP and XML/SMIL, for example, are used.

As protocols for transferring the secure container 104 between the SAMs of the user home network 103 or between the user home networks 103 and 103a, for example, XML/SMIL which is constructed on a 1394-serial bus/interface is used. In this case, the secure container 104 may be stored in a recording medium (ROM or RAM) and distributed between the SAMs.

Second Embodiment

In the first embodiment, the content data is directly distributed from the content provider 101 to the SAMs $105_1$ through $105_4$ of the user home network 103. In the second embodiment, the content data is distributed from a content provider to SAMs of a user home network via a service provider.

Figure 82:
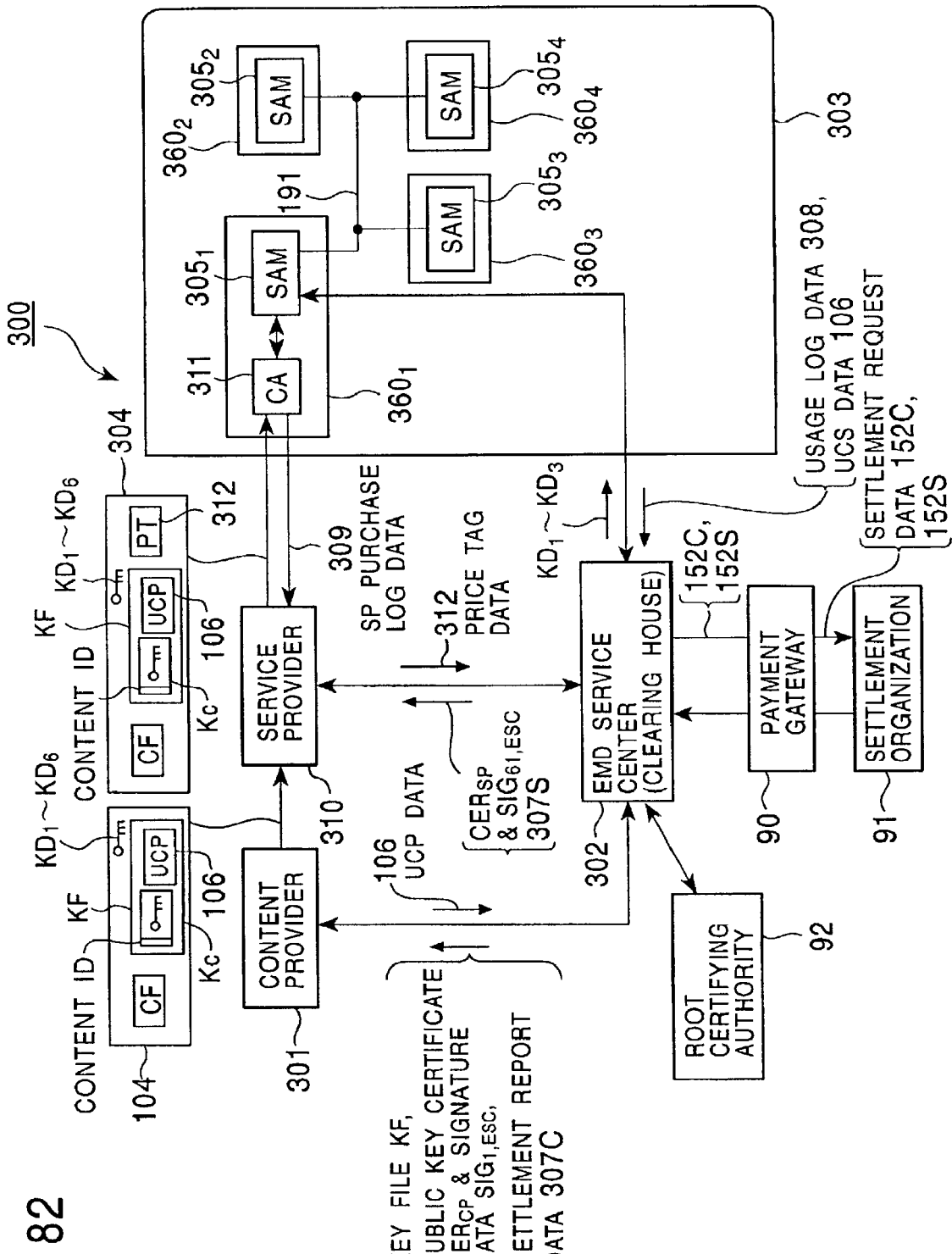
FIG. 82 is a block diagram illustrating the overall configuration of an EMD-system according to a second embodiment of the present invention.

FIG. 82 is a block diagram illustrating an EMD service system 300 of the second embodiment.

The EMD service center 300 includes, as shown in FIG. 82, a content provider 301, an EMD service center 302, a user home network 303, a service provider 310, a payment gateway 90, and a settlement organization 91.

The content provider 301, the EMD service center 302, the SAMs $305_1$ through $305_4$, and the service provider 310 respectively correspond to a data providing apparatus, a management apparatus, a data processing apparatus, and a data distribution apparatus of the present invention.

The content provider 301 is similar to the content provider 101 of the first embodiment except that it supplies content data to the service provider 310.

The EMD service center 302 is similar to the EMD service center 102 of the first embodiment except that it exercises an authentication function, a key-data management function, and a rights processing function, not only for the content provider 101 and the SAMs $305_1$ through $305_4$, but also for the service provider 301.

The user home network 303 includes a network device $360_1$, and A/V machines $360_2$ through $360_4$. The network device $360_1$ integrates a SAM $305_1$ and a CA module 311 therein, and the A/V machines $360_2$ through $360_4$ integrate SAMs $305_2$ through $305_4$ therein.

The SAMs $305_1$ through $305_4$ are similar to the SAMs $105_1$ through $105_4$, respectively, of the first embodiment, except that they receive a secure container 304 from the service provider 310, and verify signature data of the content provider 301 and the service provider 310, and also create service-provider (SP) purchase log data (data for a data distribution apparatus) 309 for the service provider 310.

An overview of the EMD system 300 is as follows.

In the EMD system 300, the content provider 301 transmits the content key data Kc and the UCP data 106, which is similar to that of the first embodiment and which indicates the rights of the content data, such as license agreement conditions of the content data C to be provided, to the EMD service center 302, which is a highly reliable authorizing organization. The UCP data 106 and the content key data Kc are authorized (authenticated) by being registered in the EMD service center 302.

The content provider 301 encrypts the content data C with the content key data Kc so as to create the content file CF. The content provider 301 receives a key file KF for six months for each content file CF from the EMD service center 302.

The key file KF contains signature data for verifying the integrity of the key file KF and integrity of the creator and the sender of the key file KF.

The content provider 301 then supplies the secure container 104 shown in FIGS. 3A through 3C in which the content file CF, the key file KF, and the signature data are stored to the service provider 310 offline via a recording medium or online via a network, such as the Internet, a digital broadcast, or by using an unofficial protocol.

The signature data stored in the secure container 104 is used for verifying the integrity of the corresponding data and the integrity of the creator and the sender of the data.

Upon receiving the secure container 104 from the content provider 301, the service provider 310 checks the signature data so as to verify the integrity of the creator and the sender of the secure container 104.

The service provider 310 then creates price tag data (PT) 312 obtained by adding a price for the services given by the service provider 310, such as authoring services, to the SRP, which has been reported to the service provider 310 offline, desired by the content provider 301.

The service provider 310 then extracts the content file CF and the key file from the secure container 104 and creates the secure container 304 in which the content file CF, the key file KF, the price tag data 312, and signature data $K_{SP,S}$ therefor are stored.

The key file KF is encrypted with the license key data $KD_1$ through $KD_6$, and the service provider 310 is unable to see the content of the key file KF or overwrite it since it does not own the license key data $KD_1$ through $KD_6$.

The EMD service center 302 also authorizes the price tag data 312 by registering it.

The service provider 310 distributes the secure container 304 to the user home network 303 online or offline. If the secure container 304 is supplied offline, it is recorded on a recording medium (ROM) and is directly supplied to the SAMs $305_1$ through $305_4$. If the secure container 304 is supplied online, the service provider 310 first performs mutual authentication with the CA module 311, and encrypts the secure container 304 by using the session key data $K_{SES}$ and sends it. The CA module 311 receives the encrypted secure container 304 and decrypts it by using the session key data $K_{SES}$, and then transfers it to the SAMs $305_1$ through $305_4$.

In this case, as communication protocols for sending the secure container 304 from the content provider 301 to the user home network 303, MHEG is used for a digital broadcast, and XML/SMIL/HTML is used for the Internet. The secure container 304 is embedded within the corresponding protocol according to a tunneling technique without depending on the communication protocol (coding method).

Accordingly, the format of the secure container 304 does not have to match the communication protocol, thereby increasing the flexibility in selecting the format of the secure container 304.

Subsequently, the SAMs $305_1$ through $305_4$ check the signature data stored in the secure container 304 so as to verify the integrity of the creator and the sender of the content file CF and the key file KF stored in the secure container 304. The SAMs $305_1$ through $305_4$ then decode the key file KF by using the license key data $KD_1$ through $KD_3$ of corresponding periods distributed from the EMD service center 302.

In the network device $360_1$ and the A/V machines $360_2$ through $360_4$, the purchase and usage modes of the secure container 304 supplied to the SAMs $305_1$ through $305_4$ are determined according to the user's operation, and the secure container 304 is then ready to be played back or recorded on a recording medium.

The SAMs $305_1$ through $305_4$ record the purchase and usage log of the secure container 304 as the usage log data 308. The usage log data (log data or a management-apparatus log data) 308 is sent from the user home network 303 to the EMD service center 302 in response to, for example, a request from the EMD service center 302.

Upon determining the purchase mode of the content, the SAMs $305_1$ through $305_4$ send the UCS data 166 indicating the purchase mode to the EMD service center 302.

The EMD service center 302 determines (calculates) the accounting content for each of the content provider 301 and the service provider 310 based on the usage log data 308, and settles the account, based on the calculated accounting content, by using the settlement organization 91, such as a bank, via the payment gateway 90. According to this settlement, the payment made by the user of the user home network 303 to the settlement organization 91 is given to the content provider 301 and the service provider 310 by the settlement processing performed by the EMD service center 302.

In this embodiment, the EMD service center 302 has an authentication function, a key-data management function, and a rights processing (profit distribution) function.

More specifically, the EMD service center 302 serves as a second certifying authority located at a layer lower than the root certifying authority 92, which is the neutral supreme authority, and authenticates public key data by attaching a signature to the public-key certificate data of the public key data by using private key data of the EMD service center 102. The public key data is used for verifying the integrity of the signature data in the content provider 301, the service provider 310, and the SAMs $305_1$ through $305_4$. As stated above, the EMD service center 102 registers and authorizes the UCP data 106 of the content provider 301, the content key data Kc, and the price tag data 312 of the service provider 310, which is also part of the authentication function of the EMD service center 302.

The EMD service center 302 also has the key-data management function of managing key data, such as license key data $KD_1$ through $KD_6$.

The EMD service center 302 also has the following rights processing (profit distribution) function. The EMD service center 302 settles the account for the purchase and usage of the content made by the user based on the UCP data 106 registered by the content provider 301, the usage log data 308 input from the SAMs $305_1$ through $305_4$, and the price tag data 312 registered by the service provider 310, and distributes the payment made by the user to the content provider 301 and the service provider 310.

Details of the individual elements of the content provider 301 are as follows.

[Content Provider 301]

The content provider 301 is similar to the content provider 101 of the first embodiment except that it supplies the secure container 104 shown in FIGS. 3A through 3C to the service provider 310 online or offline.

That is, the content provider 301 creates the secure container 104 and inserts it into a product distributing protocol for the content provider according to the process shown in FIGS. 17 through 19.

The service provider 310 then downloads the secure container 104 and extracts it from the protocol.

[Service Provider 310]

The service provider 310 creates the secure container 304 in which the content file CF and the key file KF supplied from the content provider 301 and the price tag data 312 are stored, and distributes it to the network device $360_1$ and the A/V machines $360_2$ through $360_4$ of the user home network 303 online or offline.

The services by the service provider 310 to the distribution of the content are largely divided into two types, i.e., independent services and dependent services.

The independent services are downloading services for individually distributing the contents. The dependent services are services for distributing the content together with programs or commercials (CM), for example, supplying the content of a theme song of a drama program by inserting it in a drama program stream. This enables the user to purchase the content stored in the stream while watching the drama program.

Upon receiving the secure container 104 from the content provider 301, the service provider 310 creates the secure container 304 according to the following process.

Figure 83:
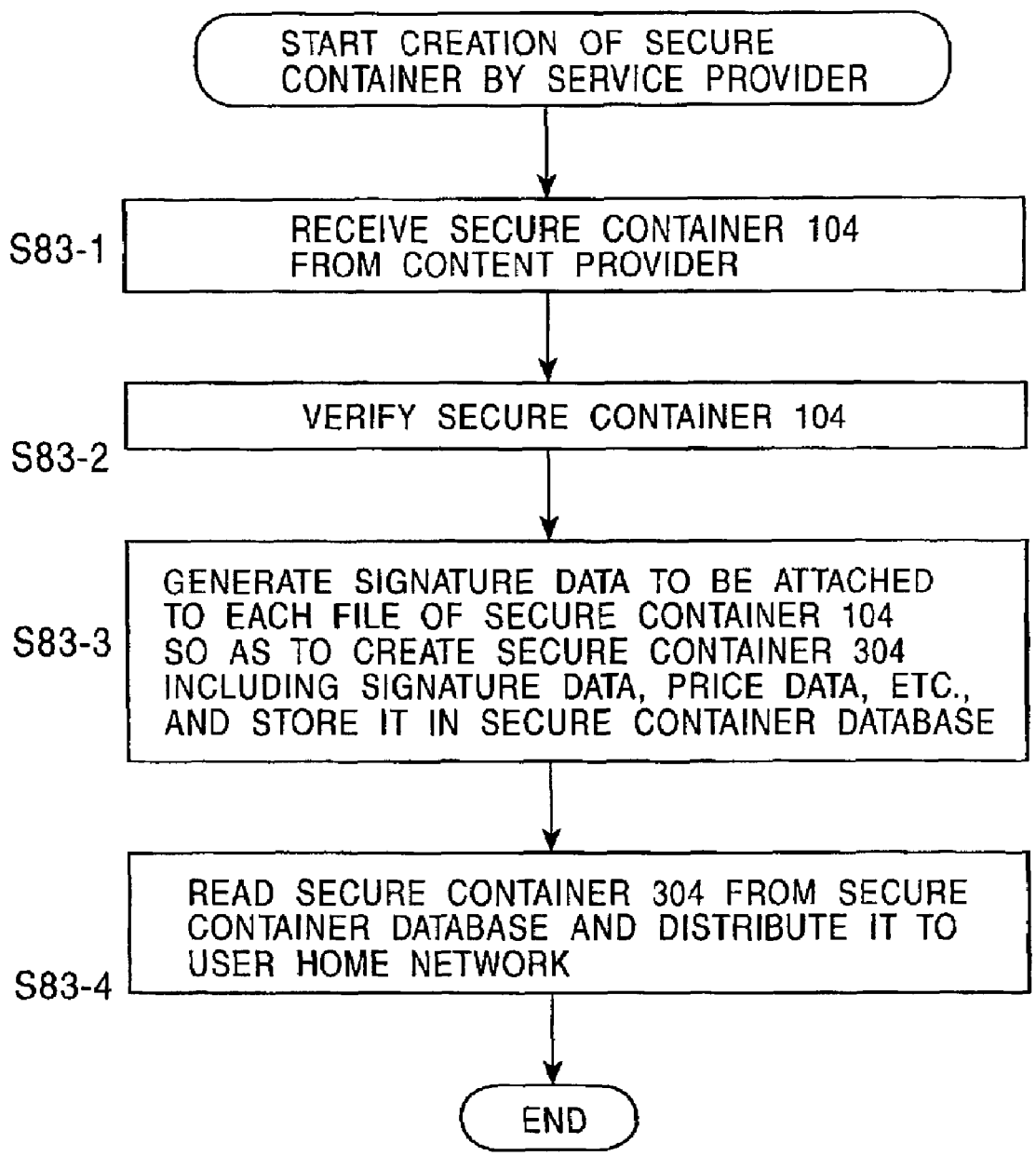
FIG. 83 is a flow chart illustrating the processing for creating a secure container in a service provider.

A description is now given, with reference to the flow chart of FIG. 83, of the process of creating the secure container 304 from the secure container 104 received from the content provider 301 and distributing it to the user home network 303.

In step S83-1, the service provider 310 receives the secure container 104 shown in FIGS. 3A through 3C from the content provider 301 online or offline, and stores it.

If the secure container 104 is sent online, the secure container 104 is decoded by using the session key data $K_{SES}$ obtained by mutual authentication between the content provider 301 and the service provider 310.

In step S83-2, the service provider 310 verifies the integrity of the signature data $SIG_{1,ESC}$ shown in FIG. 3C of the secure container 104 by using the public key data $K_{ESC,P}$ of the EMD service center 302, and then, extracts the public key data $K_{CP,P}$ from the public-key certificate data $CER_{CP}$ shown in FIG. 3C.

The service provider 310 then checks the signature data $SIG_{6,CP}$ and $SIG_{7,CP}$ shown in FIGS. 3A and 3B, respectively, of the secure container 104 by using the extracted public key data $K_{CP,P}$ so as to verify the integrity of the creator and the sender of the content file CF and the sender of the key file KF.

The service provider 310 also checks the signature data $SIG_{K1,ESC}$ stored in the key file KF shown in FIG. 3B by using the public key data $K_{ESC,P}$ so as to verify the integrity of the creator of the key file KF. This also verifies the official registration of the key file in the EMD service center 102.

Thereafter, in step S83-3, the service provider 310 creates the price tag data 312 obtained by adding a price for the services of the service provider 310 to the RSP desired by the content provider 301 which has been reported from the content provider 301 offline.

The service provider 310 also creates signature data $SIG_{62,SP}$, $SIG_{63,SP}$, and $SIG_{64,SP}$ from the hash values of the content file CF, the key file KF, and the price tag data 312, respectively, by using the private key data $K_{SP,P}$ of the service provider 310.

The signature data $SIG_{62,SP}$ is used for verifying the integrity of the sender of the content file CF, the signature data $SIG_{63,SP}$ is used for verifying the sender of the key file KF, and the signature data $SIG_{64,SP}$ is used for verifying the creator and the sender of the price tag data 312.

Figure 84:
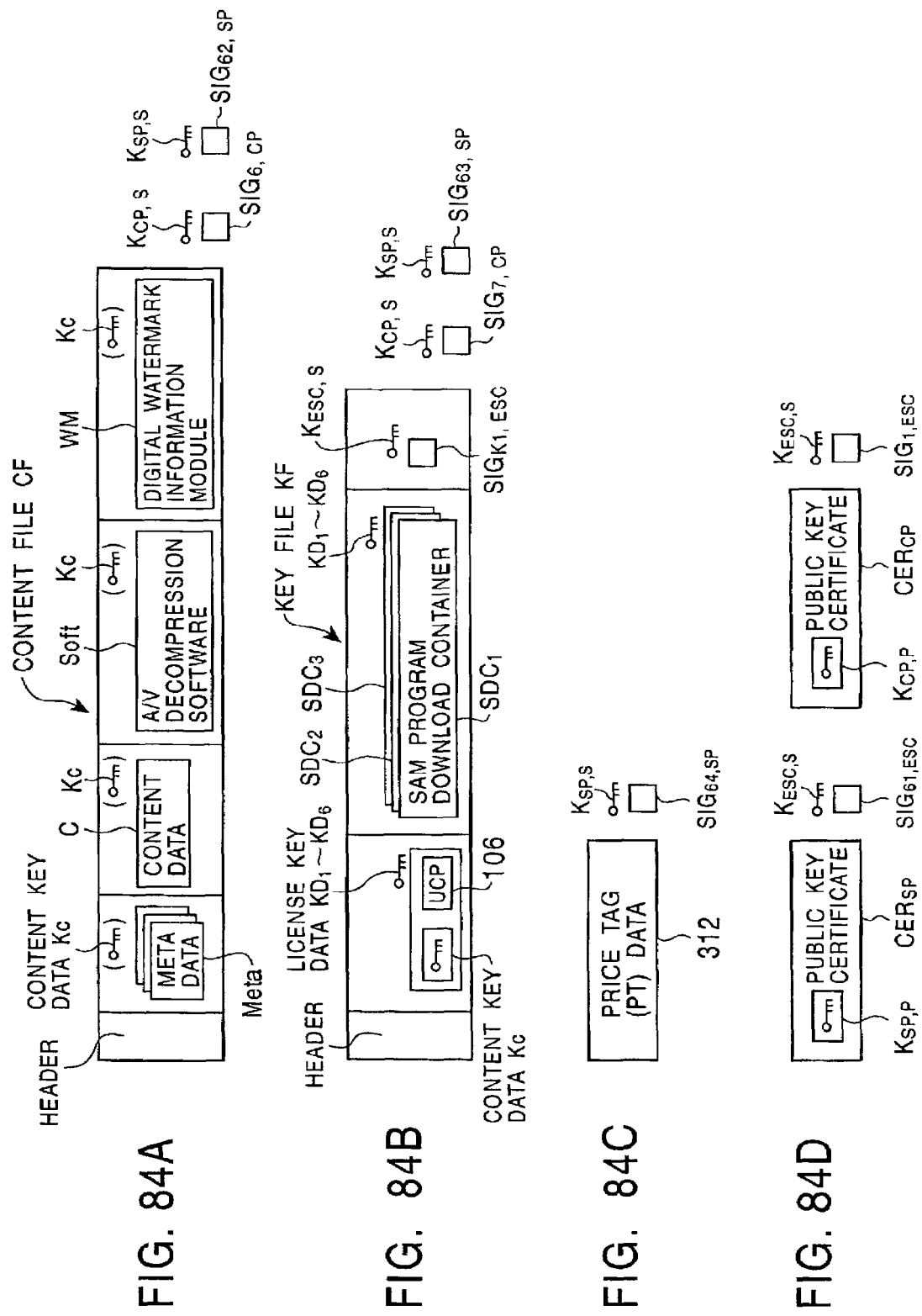
FIGS. 84A through 84D illustrate the format of the secure container sent from the service provider to the user home network shown in FIG. 82.

The service provider 310 then creates the secure container 304 in which the content file CF and the signature data $SIG_{6,CP}$ and $SIG_{62,SP}$ therefor, shown in FIG. 84A, the key file KF and the signature data $SIG_{7,CP}$ and $SIG_{63,ESC}$ therefor, shown in FIG. 84B, the price tag data 312 and the signature data $SIG_{64,SP}$ therefor, shown in FIG. 84C, and the public-key certificate data $CER_{SP}$ and the signature data $SIG_{61,ESC}$ therefor and the public-key certificate data $CER_{CP}$ and the signature data $SIG_{1,ESC}$ therefor, shown in FIG. 84D, are stored, and then stores the created secure container 304 in a secure container database.

The secure container 304 stored in the secure container database is centrally managed by the service provider 310 by using, for example, the content ID.

FIG. 84A illustrates the configuration of the content file CF when a DSP is used as an A/V compression/decompression device for decompressing the content data C. The DSP decompresses the content data C within the secure container 104, and also embeds and detects digital watermark information by using A/V decompression software and a digital watermark information module within the secure container 304. This enables the content provider 301 to employ a desired compression method and a digital-watermark embedding method.

If hardware or prestored software is used as an A/V compression/decompression device for decompressing the content data C and for embedding and detecting digital watermark information, the A/V decompression software and the digital watermark information module may not be stored within the content file CF.

Then, in step S83-4, the service provider 310 reads the secure container 304 from the secure container database in response to a request from the user home network 303.

In this case, the secure container 304 may be a composite container in which a plurality of content files CF and a plurality of corresponding key files KF are stored. For example, in a single secure container 304, a plurality of content files CF concerning a piece of music, a video clip, a word card, a liner note, and a jacket may be stored. The plurality of content files CF may be stored within the secure container 304 in a directory structure.

If the secure container 304 is sent via a digital broadcast, the MHEG protocol is employed. If the secure container 304 is sent via the Internet, the XML/SMIL/HTML protocol is employed.

In this case, the content file CF and the key file KF within the secure container 104 are stored in a predetermined layer of a communication protocol which is employed between the service provider 310 and the user home network 303 without being dependent on the coding method, such as the MHEG or HTML protocol.

Figure 85:
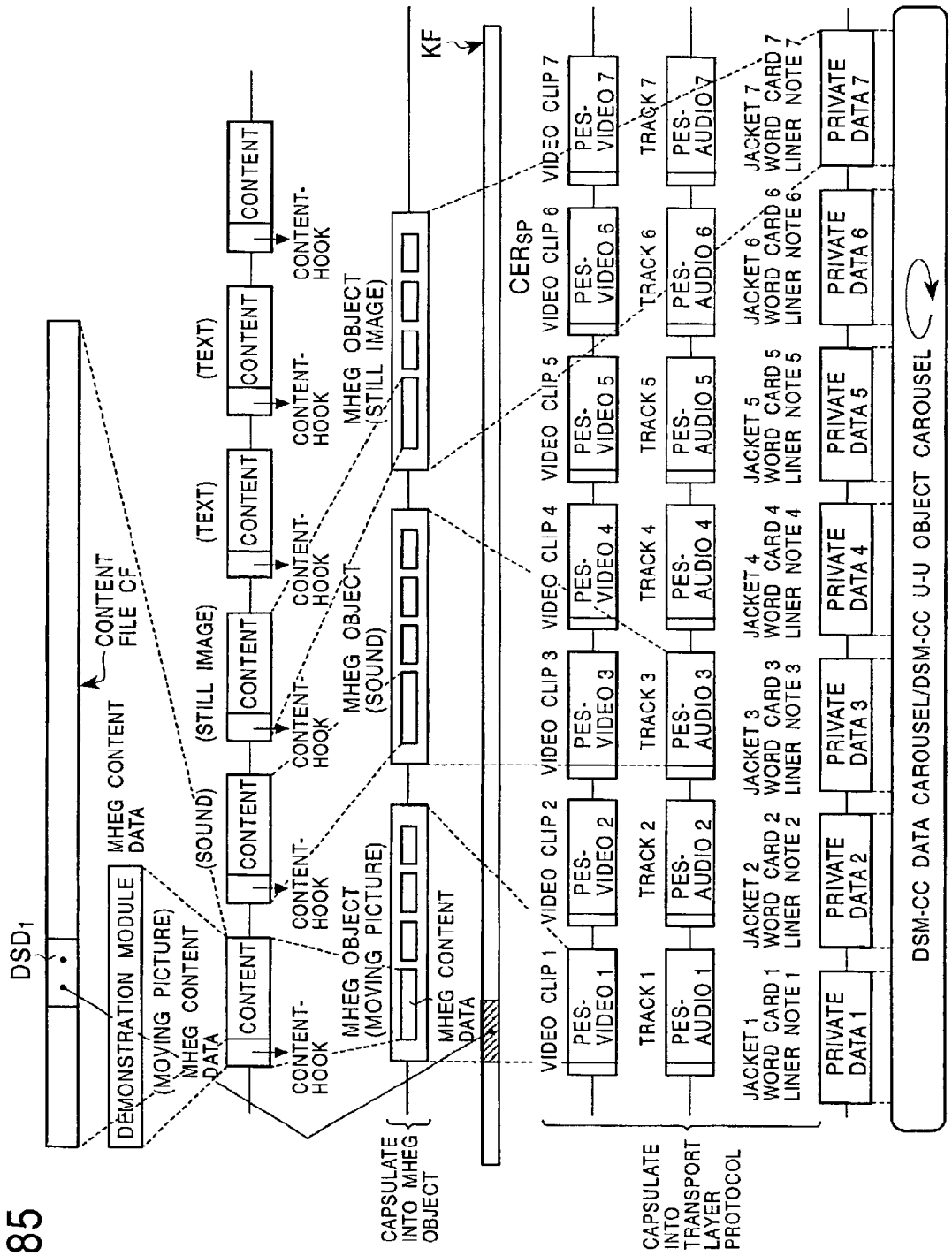
FIG. 85 illustrates the sending format of a content file stored in the secure container shown in FIGS. 84A through 84D.

For example, if the secure container 304 is sent via a digital broadcast, as shown in FIG. 85, the content file CF is stored as MHEG content data within a MHEG object.

A MHEG object which is a moving picture is stored in a packetized elementary stream (PES)-video in the transport layer protocol, a MHEG object which is sound is stored in PES-audio in the transport layer protocol, and a MHEG object which is a still image is stored in Private-Data.

Figure 86:
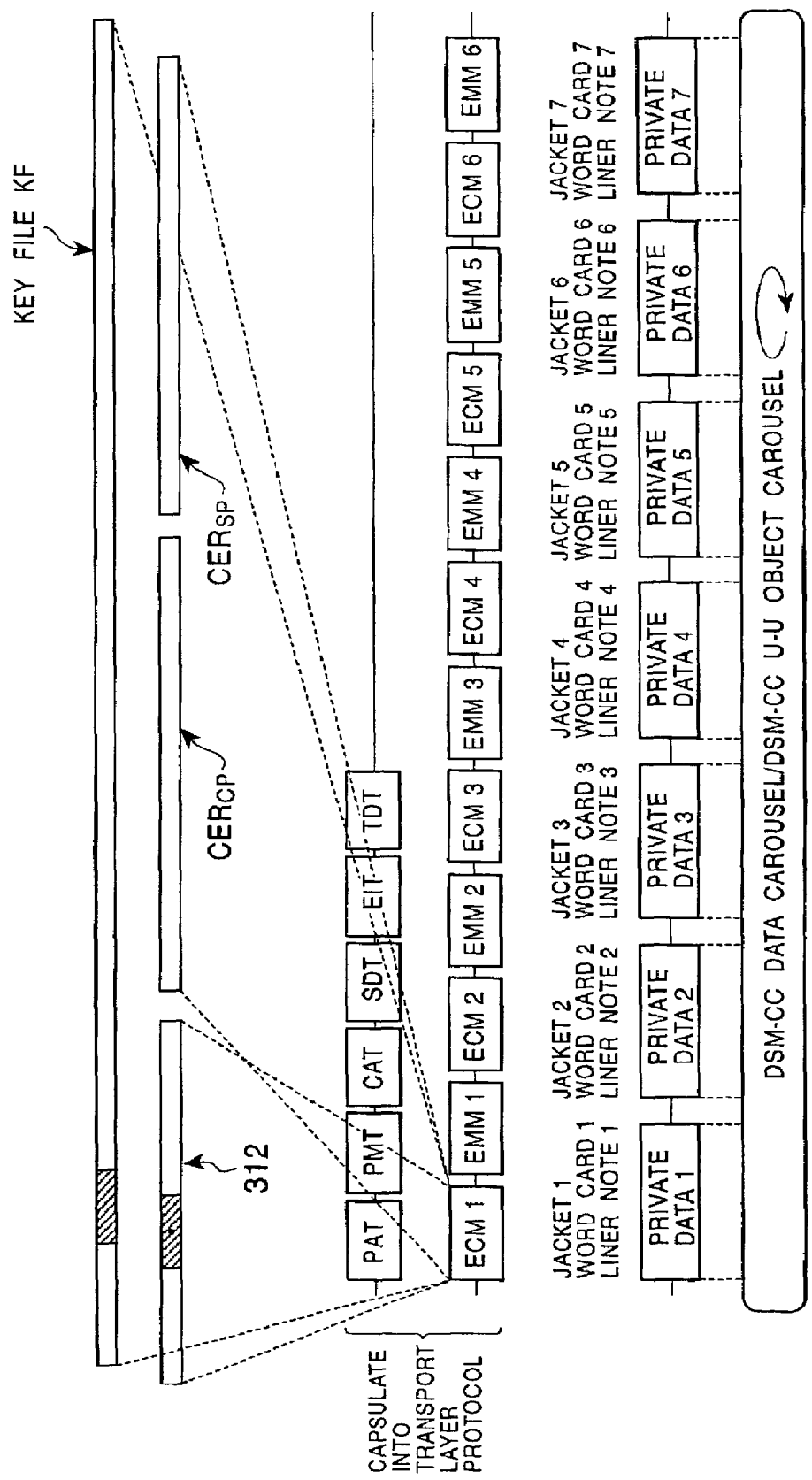
FIG. 86 illustrates the sending format of a key file stored in the secure container shown in FIGS. 84A through 84D.

The key file KF, the price tag data 312, and the public-key certificate data $CER_{CP}$, $CER_{SP}$ are stored, as shown in FIG. 86, in entitlement control message (ECM) within a TS packet of the transport layer protocol.

The content file CF, the key file KF, the price tag data 312, and the public-key certificate data $CER_{CP}$, $CER_{SP}$ are linked by the directory structure data $DSD_1$ within the header of the content file CF.

The service provider 310 then supplies the secure container 304 to the user home network 303 online and/or offline.

If the secure container 304 is distributed to the network device $360_1$ of the user home network 303, the service provider 310 encrypts the secure container 304 by using the session key data $K_{SES}$ after performing mutual authentication, and then distributes it to the network device $360_1$ via a network.

If the secure container 304 is broadcast via a satellite, the service provider 310 encrypts the secure container 304 with scrambling key data $K_{SCR}$. The scrambling key data $K_{SCR}$ is also encrypted with work key data $K_W$, and the work key data $K_W$ is encrypted with master key data $K_M$.

The service provider 310 then sends the scrambling key data $K_{SCR}$ and the work key data $K_W$ together with the secure container 304 to the user home network 303 via a satellite. The service provider 310 also distributes the master key data $K_W$ by storing it in, for example, an IC card, to the user home network 303 offline.

Upon receiving the SP purchase log data 309 concerning the content data C from the user home network 303, the service provider 310 stores it.

In determining future services, the service provider 310 refers to the SP purchase log data 309. The service provider 310 also analyzes, based on the purchase log data 309, the user's favorites of the SAMs $305_1$ through $305_4$ which have sent the SP purchase log data 309, and then creates user favorite filer data 900 and sends it to the CA module 311 of the user home network 303.

The service provider 310 or a service-provider related organization registers in the EMD service center 302 offline, and acquires a globally unique identifier SP_ID by using an ID certificate of the service provider 310 or a bank account for performing settlement processing.

The service provider 310 also authorizes the price tag data 312 by registering it in the EMD service center 302.

[EMD Service Center 302]

As discussed above, the EMD service center 302 serves as a certifying authority (CA), a key management authority, and a rights processing (rights clearing) authority.

FIG. 87 illustrates the major functions of the EMD service center 302. The EMD service center 302 performs processing, as illustrated in FIG. 87, such as supplying the license key data to the content provider 301 and the SAMs $305_1$ through $305_4$, issuing the public-key certificate data $CER_{CP}$, $CER_{SP}$, and $CER_{SAM1}$ through $CER_{SAM4}$, creating the key file KF, and settlement processing (profits distribution) based on the usage log data 308.

Among the above-described functions, supplying the license key data, issuing the public-key certificate data $CER_{CP}$ and $CER_{SAM1}$ through $CER_{SAM4}$, and creating the key file KF are similar to those of the EMD service center 102 of the first embodiment.

Unlike the EMD service center 102, however, the EMD service center 302 issues the public-key certificate data $CER_{SP}$ of the service provider 310, and also distributes, based on the usage log data 308, the profits obtained by the purchase of the content data C in the SAMs $305_1$ through $305_4$ to the content provider 301, content-provider rights holders, the service provider 310, and service-provider rights holders.

The contents of the usage log data 308 may be those shown in FIG. 21.

The EMD service center 302 also creates the user favorite filter data 900 for selecting content data C according to the user's favorites of the SAMs $305_1$ through $305_4$ which have sent the usage log data 308, and sends it to the SAMs $305_1$ through $305_4$ via the SAM manager 149.

[User Home Network 303]

The user home network 303 includes, as shown in FIG. 82, the network device $360_1$ and the A/V machines $360_2$ through $360_4$.

The network device $360_1$ integrates the CA module 311 and the SAM $305_1$ therein. The A/V machines $360_2$ through $360_4$ integrate the SAMs $305_2$ through $305_4$, respectively. The SAMs 305₁ through 305₄ are connected to each other via the bus 191, such as a 1394-serial interface bus.

The A/V machines 360₂ through 360₄ may be provided with a network communication function, though it is not essential. If a network communication function is not provided, the A/V machines 360₂ through 360₄ may simply use the network communication function of the network device 360₁ via the bus 191. Alternatively, the user home network 303 may include only A/V machines without a network function.

Details of the network device 360₁ are as follows.

Figure 88:
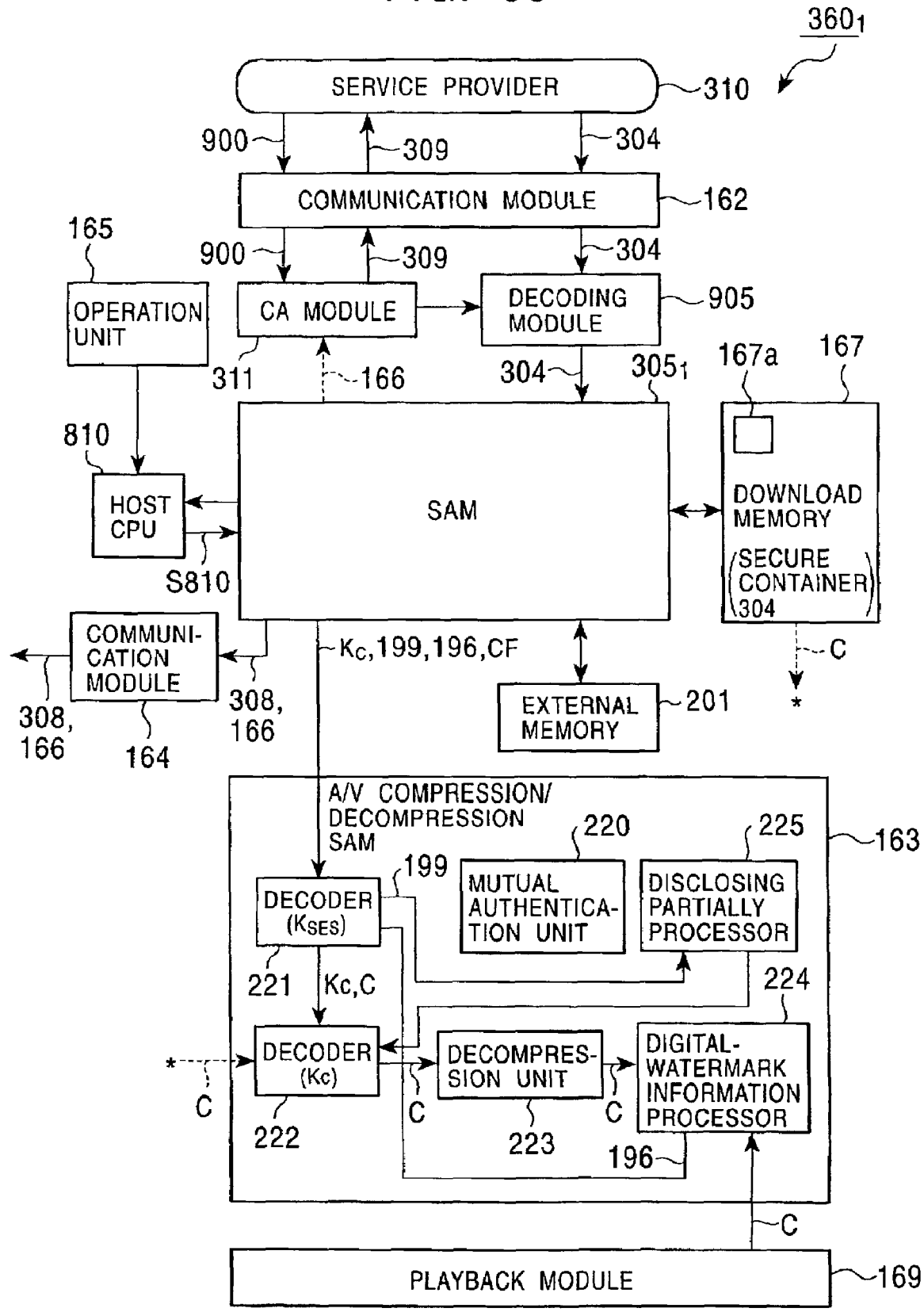
FIG. 88 is a block diagram illustrating a network device shown in FIG. 82.

FIG. 88 is a block diagram illustrating the network device 360₁. The network device 360₁ includes, as shown in FIG. 88, the communication module 162, the CA module 311, a decoding module 905, the SAM 305₁, the A/V compression/decompression SAM 163, the operation unit 165, the download memory 167, the playback module 169, the external memory 201, and the host CPU 810. The same elements as those shown in FIG. 22 are designated with like reference numerals.

The communication module 162 performs processing for communicating with the service provider 310. More specifically, the communication module 162 outputs the secure container 304 received from the service provider 310 via, for example, a satellite broadcast, to the decoding module 905. The communication module 162 also outputs the user favorite filter data 900 received from the service provider 310 via, for example, a telephone line, to the CA module 311, and also sends the SP purchase log data 309 received from the CA module 311 to the service provider 310 via, for example, a telephone line.

Figure 89:
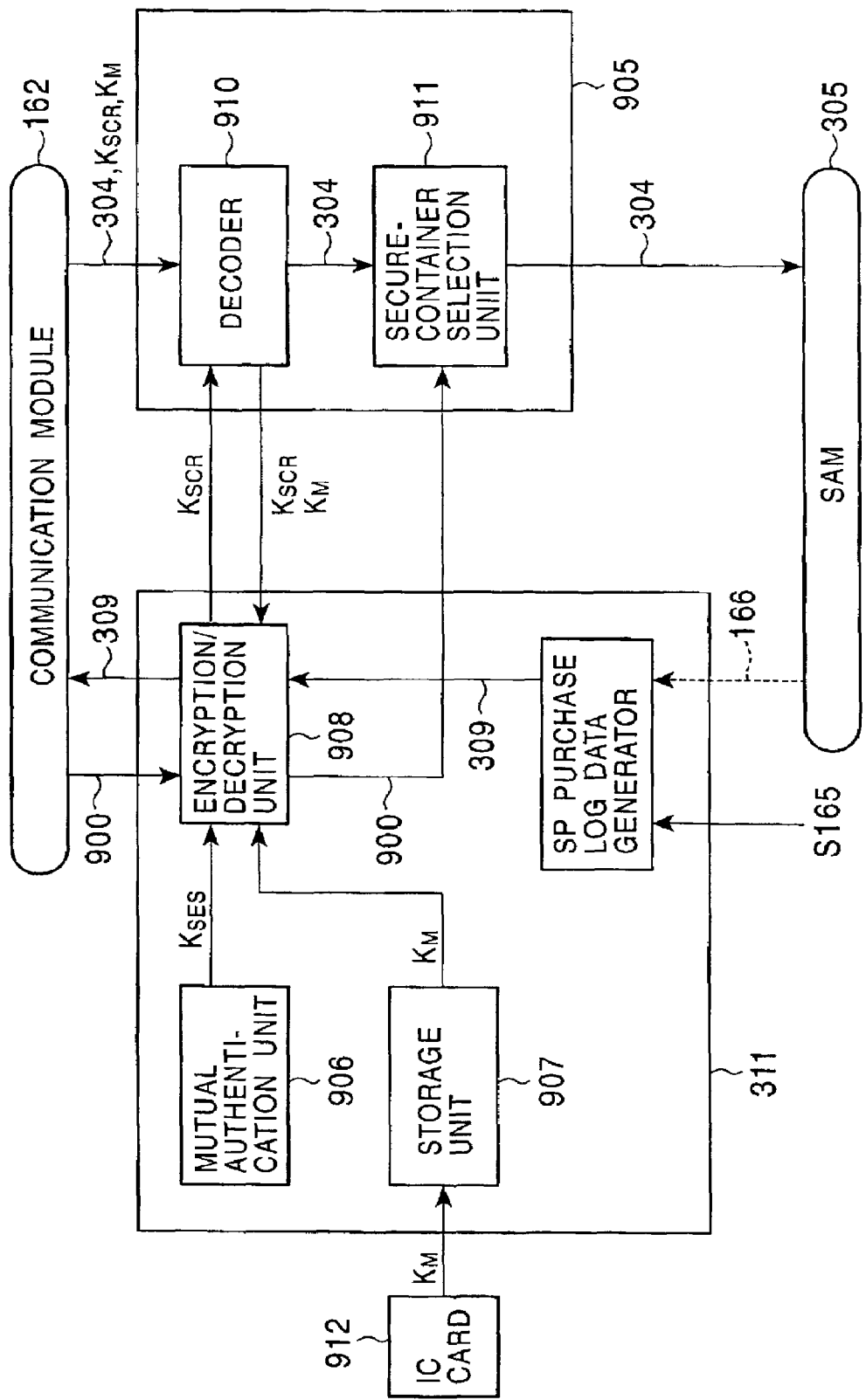
FIG. 89 is a functional block diagram illustrating a CA module shown in FIG. 88.

FIG. 89 is a functional block illustrating the CA module 311 and the decoding module 905.

The CA module 311 includes, as shown in FIG. 89, a mutual authentication unit 906, a storage unit 907, an encryption/decryption unit 908, and a SP purchase log data generator 909.

In sending and receiving data between the CA module 311 and the service provider 310 via a telephone line, the mutual authentication unit 906 performs mutual authentication with the service provider 310 so as to create the session key data $K_{SES}$ and outputs it to the encryption/decryption unit 908.

The storage unit 907 stores the master key data $K_M$ supplied offline from the service provider 310 by being stored in an IC card 912 after the service provider 310 has made a contract with the user.

The encryption/decryption unit 908 receives the encrypted scrambling key data $K_{SCR}$ and work key data $K_W$ from a decoder 910 of the decoding module 905, and decrypts the work key data $K_W$ by using the master key data $K_M$ read from the storage unit 907. The encryption/decryption unit 908 then decrypts the scrambling key data $K_{SCR}$ by using the decrypted work key data $K_W$, and outputs it to the decoder 910.

The encryption/decryption unit 908 also decrypts the user favorite filter data 900 received from the service provider 310 by the communication module 162 via, for example, a telephone line, by using the session key data $K_{SES}$ from the mutual authentication unit 906, and outputs it to a secure-container selection unit 911 of the decoding module 905.

The encryption/decryption unit 908 decrypts the SP purchase log data 309 received from the SP purchase log data generator 909 by using the session key data $K_{SES}$ from the mutual authentication unit 906, and sends it to the service provider 310 via the communication module 162.

The SP purchase log data generator 909 generates the SP purchase log data 309 indicating the purchase log of the content data C unique to the service provider 310 based on the operation signal S165 obtained by performing the user's operation on the operation unit 165 shown in FIG. 88, or based on the UCS data 166 from the SAM 305₁. The SP purchase log data generator 909 then outputs the SP purchase log data 309 to the encryption/decryption unit 908.

The SP purchase log data 309 includes information on distribution services of the service provider 310 reflecting the user's opinion, a monthly basic fee (incurred by using a network), contract (update) information, and purchase log information.

The CA module 311 communicates with an account database of the service provider 310, if the service provider 310 has an accounting function, a client management database, and a marketing information database. In this case, the CA module 311 sends account data for distribution services of the content data to the service provider 310.

The decoding module 905 includes the decoder 910 and the secure-container selection unit 911.

The decoder 910 receives the encrypted secure container 304, the scrambling key data $K_{SCR}$, and the work key data $K_W$ from the communication module 162. The decoder 910 then outputs the encrypted scrambling key data $K_{SCR}$ and the work key data $K_W$ to the encryption/decryption unit 908 of the CA module 311 and receives the decrypted scrambling key data $K_{SCR}$ from the encryption/decryption unit 908. The decoder 910 also decrypts the encrypted secure container 304 by using the scrambling key data $K_{SCR}$, and then outputs it to the secure-container selection unit 911.

If the secure container 304 is sent from the service provider 310 according to the MPEG2 transport stream method, the decoder 910 extracts the scrambling key data $K_{SCR}$ from the ECM of the TS Packet, and extracts the work key data $K_W$ from the EMM.

The ECM also contains program attribute information of each channel. The EMM also contains demonstration contract information of each user (viewer).

The secure-container selection unit 911 filters the secure container 304 received from the decoder 910 by using the user favorite filter data 900 received from the CA module 311 so as to select the secure container 104 according to the user's favorite, and outputs it to the SAM 305₁.

The SAM 305₁ is discussed in detail below.

The functions and the structure of the SAM 305₁ are basically similar to those of the SAM 105₁ of the first embodiment described with reference to FIGS. 22 through 72, except that it performs processing for not only the content provider 301, but also for the service provider 310, such as checking the signatures for the service provider 310.

The SAMs 305₁ through 305₄ are modules for performing accounting for each content and communicating with the EMD service center 302.

The configuration of the user home network 104 shown in FIG. 63 is applicable to the devices within the user home network 303. The configurations of the rights processing SAM, the medium SAM 133, the A/V compression/decompression SAM 163, and the medium drive SAM 260 described with reference to FIGS. 68 to 79 are applicable to the SAMs 305₁ through 305₄ within the user home network 303.

The SAMs 305₂ through 305₄ basically have the same functions as the SAM 305₁.

Details of the functions of the SAM 305₁ are as follows.

Figure 90:
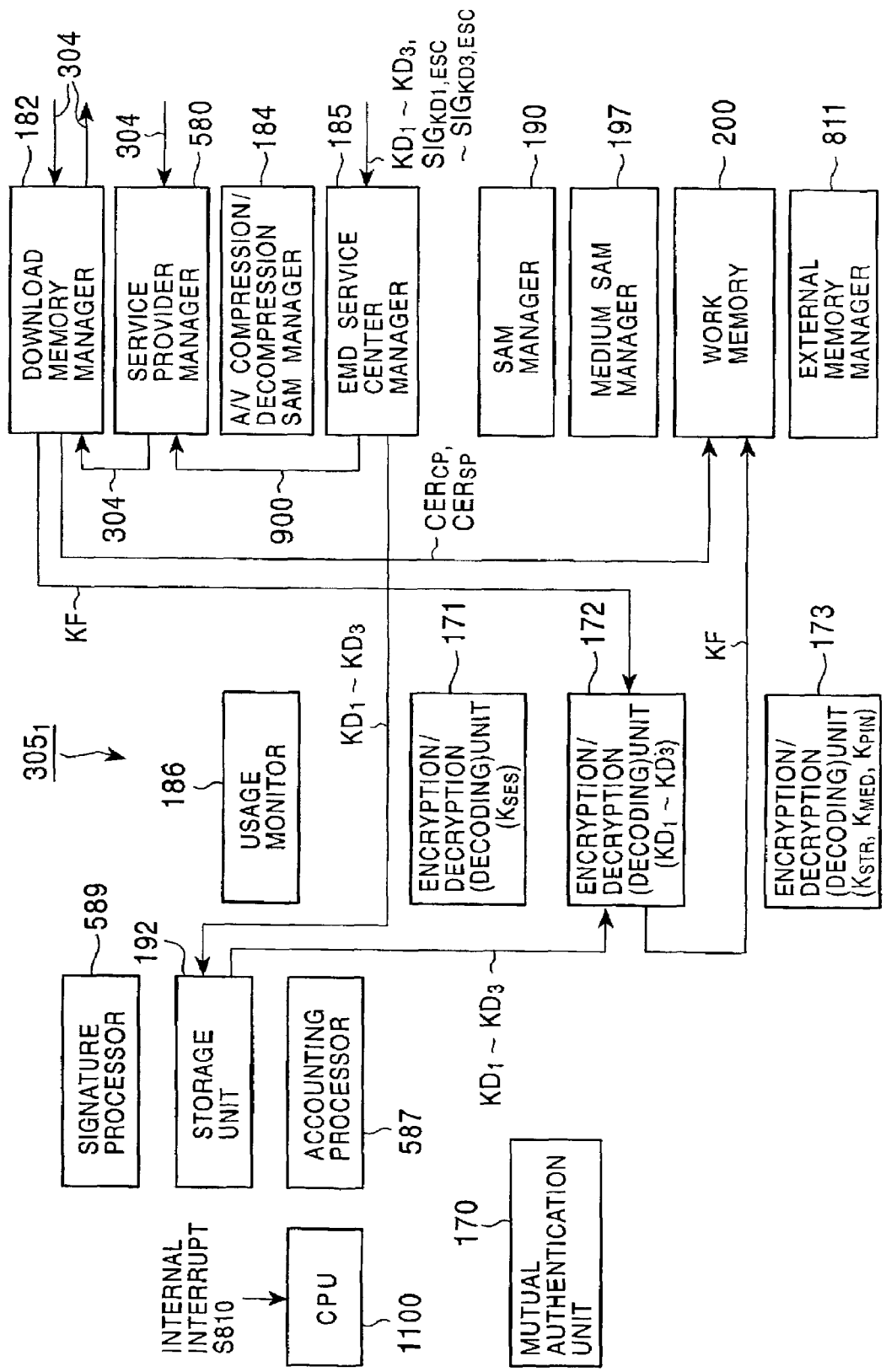
FIG. 90 is a functional block diagram illustrating a SAM shown in FIG. 82, and also illustrates the data flow when the secure container is received and decoded.

FIG. 90 is a block diagram illustrating the functions of the SAM 305₁, and also illustrates the flow of data relating to processing for receiving the secure container 304 from the service provider 310.

The SAM $305_1$ includes, as shown in FIG. 90, a mutual authentication unit 170, encryption/decryption units 171, 172, and 173, a download memory manager 182, an A/V compression/decompression SAM manager 184, an EMD service center manager 185, a usage monitor 186, a SAM manager 190, a storage unit 192, a medium SAM manager 197, a work memory 200, a service provider manager 580, an accounting processor 587, a signature processor 589, an external memory manager 811, and a CPU 1100.

As in the case of the SAM $105_1$, predetermined function of the SAM $305_1$ shown in FIG. 90 are implemented by executing the private program by the CPU.

In FIG. 90, the same functional blocks as those shown in FIG. 30 are designated with like reference numerals.

In the external memory 201 shown in FIG. 88, the usage log data 308 and the SAM registration list are stored by executing the processing discussed in the first embodiment and processing, which is discussed below.

In the work memory 200, as shown in FIG. 91, the content key data Kc, the UCP data 106, the lock key data $K_{LOC}$ of the storage unit 192, the public-key certificate data $CER_{CP}$ of the content provider 301, the public-key certificate data $CER_{SP}$ of the service provider 310, the UCS data 166, the SAM program download containers $SDC_1$ through $SDC_3$, and the price tag data 312.

Among the functional blocks of the SAM $305_1$, only the functional blocks unique to the second embodiment in FIG. 90 are explained below.

The signature processor 589 verifies the signature data within the secure container 304 by using the public key data $K_{ESC,P}$ of the EMD service center 302, the public key data $K_{CP,P}$ of the content provider 301, and the public key data $K_{SP,P}$ of the service provider 310, all of which are read from the storage unit 192 or the work memory 200.

Figure 92:
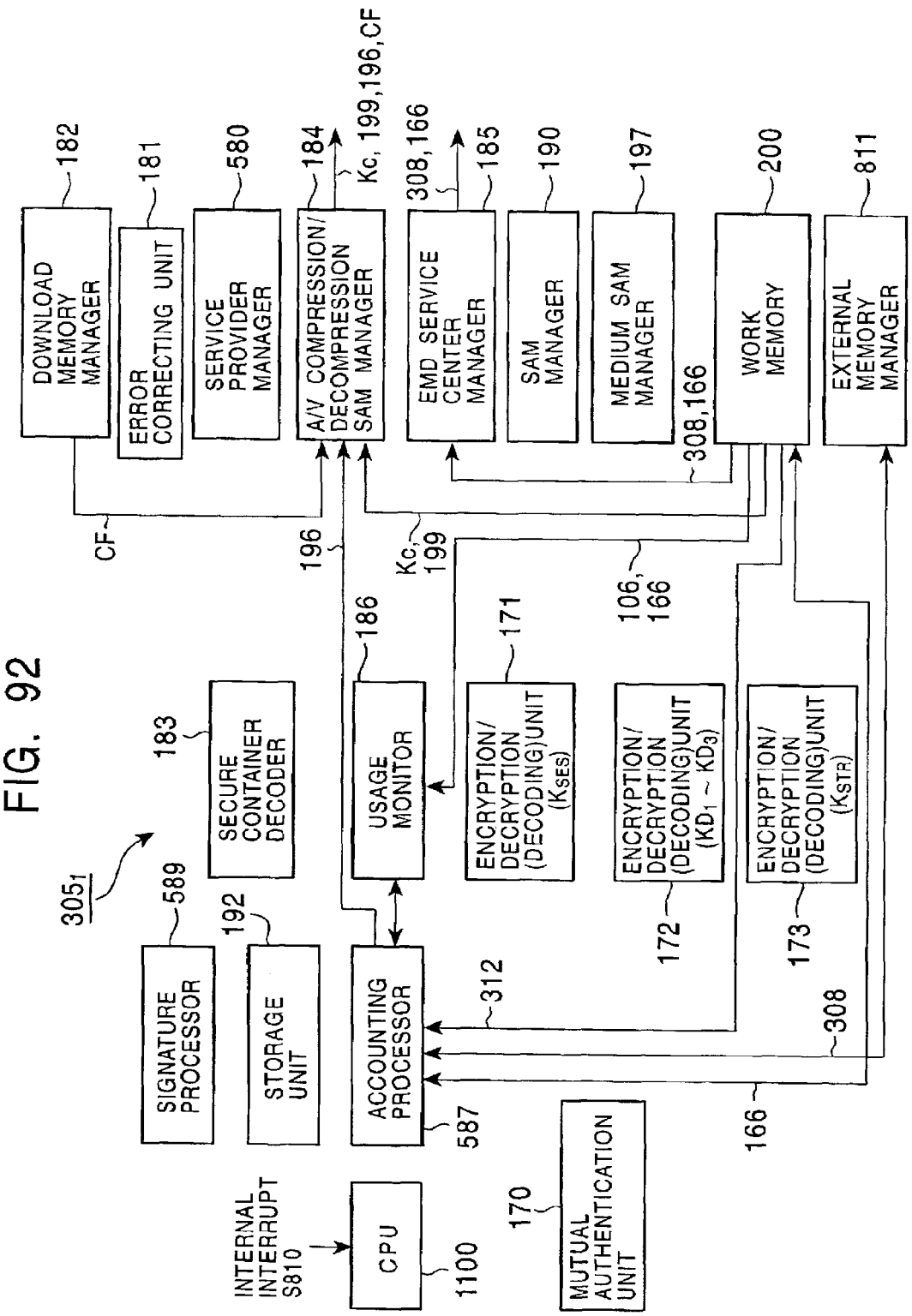
FIG. 92 is a functional block diagram illustrating the SAM shown in FIG. 82, and also illustrates the data flow when the purchase and usage modes of the content are determined.

When the CPU 1100 receives the internal interrupt S810 from the host CPU 810 in accordance with the user's operation, as shown in FIG. 92, the accounting processor 587 performs accounting processing under the control of the CPU 1100 in accordance with the content purchase and usage modes of the content based on the price tag data 312 read from the work memory 200.

The price tag data 312, which indicates the sales price of the content data to the user, is output to the exterior of the SAM $305_1$ via predetermined output means in determining the purchase mode of the content data by the user.

The accounting processing by the accounting processor 587 is executed based on the contents of rights, such as the licensing agreement conditions indicated by the UCP data 106, and the UCS data 166, under the monitoring of the usage monitor 186. That is, the user is able to purchase and utilize the content within the allowances of the rights.

In performing the accounting processing, the accounting processor 587 creates or updates the usage log data 308, and writes it into the external memory 201 via the external memory manager 811.

The usage log data 308, as well as the usage log data 108 used in the first embodiment, is used for determining the payment of the license fee for the secure container 304 by the EMD service center 302.

The accounting processor 587 also creates the UCS data 166 indicating the purchase and usage modes of the content determined by the user under the control of the CPU 1100, and writes it into the work memory 200.

The purchase modes of the content include "sell through" in which no restriction is imposed on playback operation by the purchaser and copying for the use of the purchaser, "pay per play" in which charging incurs every time the content is played back, and so on.

The UCS data 166 is created upon determining the purchase mode by the user, and is used for controlling the use of the content to make sure that the user utilizes the content within the allowances of rights. In the UCS data 166, the content ID, the purchase mode, the sell through price, the SAM_ID of the SAM which has purchased the content, the USER_ID of the user who has purchased the content, and so on.

If the determined purchase mode is "pay per play", "pay per SCMS", or "pay per copy N without copy guard", the SAM $305_1$ sends the UCS data 166 to the service provider 310 in real time, and the service provider 310 instructs the EMD service center 302 to obtain the usage log data 308 from the SAM $305_1$.

If the determined purchase mode is "sell through", the UCS data 166 is sent to the service provider 310 and the EMD service center 302 in real time.

In the SAM $305_1$, as illustrated in FIG. 90, the user favorite filter data 900 received from the EMD service center 302 via the EMD service center manager 185 is output to the service provider manager 580. Then, in the service provider manager 580, the secure container 304, which has been received from the decoding module 905 shown in FIG. 89 and filtered based on the user favorite filter data 900, is selected, and the selected secure container 304 is output to the download memory manager 182. This enables the SAM $305_1$ to select the content data C according to the user's favorite, based on the purchase of the content data C, obtained from all the service providers 310 which have made a contract with the user.

The flows of the processes within the SAM $305_1$ are as follows.

Processing to be Executed when Receiving License Key Data

The flow of the process within the SAM $305_1$ for storing the license key data $KD_1$ through $KD_3$ received from the EMD service center 302 in the storage unit 192 is similar to that of the first embodiment discussed with reference to FIG. 35.

Processing to be Executed when Receiving the Secure Container 304 from the Service Provider 310

Figure 93:
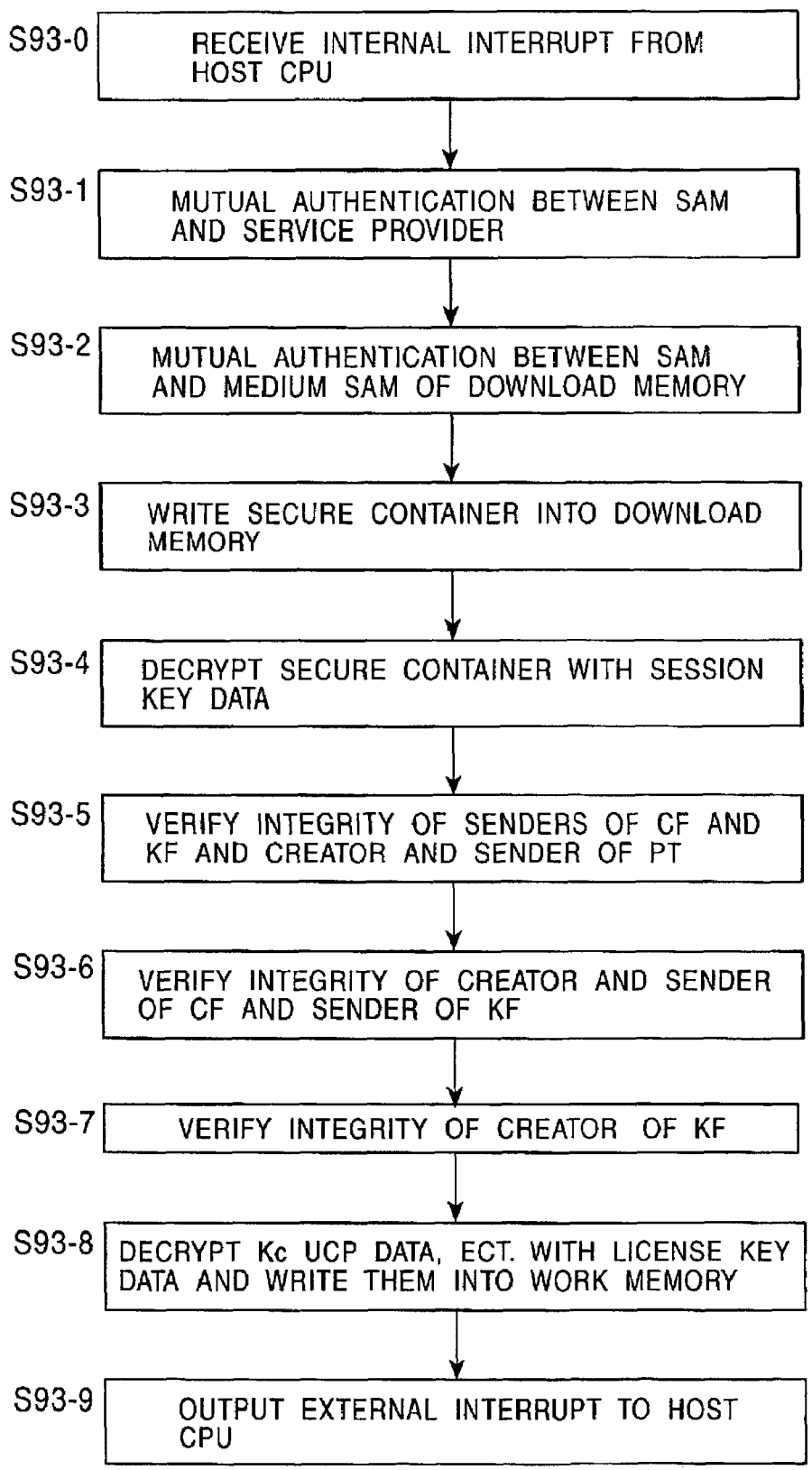
FIG. 93 is a flow chart illustrating the processing for receiving the secure container by the SAM shown in FIG. 82.

The flow of the process within the SAM $305_1$ when receiving the secure container 304 from the service provider 310 is described below with reference to FIG. 93.

In the following example, in the SAM $305_1$, various types of signature data are checked when receiving the secure container 304. However, the signature data may be checked when determining the purchase and usage modes rather than when receiving the secure container 304.

In step S93-0, the CPU 1100 of the SAM $305_1$ shown in FIG. 90 receives from the host CPU 810 the internal interrupt S810 indicating an instruction to perform processing for receiving the secure container.

In step S93-1, the mutual authentication unit 170 of the SAM $305_1$ shown in FIG. 90 performs mutual authentication with the service provider 310.

Then, in step S93-2, the mutual authentication unit 170 of the SAM $305_1$ conducts mutual authentication with the medium SAM 167a of the download memory 167.

In step S93-3, the secure container 304 received from the service provider 310 is written into the download memory 167. Simultaneously, the secure container 304 is encrypted in the mutual authentication unit 170, and is decrypted in the medium SAM 167a by using the session key data obtained in step S93-2.

In step S93-4, the SAM $305_1$ decodes the secure container 304 by using the session key data obtained in step S93-1.

Subsequently, in step S93-5, the signature processor 589 verifies the signature data $SIG_{61,ESC}$ shown in FIG. 84D, and then verifies the integrity of the signature data $SIG_{62,SP}$, $SIG_{63,SP}$, and $SIG_{64,SP}$ by using the public key data $K_{SP,P}$ of the service provider 310 stored in the public-key certificate data $CER_{SP}$ shown in FIG. 84D.

When verifying the integrity of the signature data $SIG_{62,SP}$, the integrity of the sender of the content file CF is verified. When verifying the integrity of the signature data $SIG_{63,SP}$, the integrity of the sender of the key file KF is verified. When verifying the integrity of the signature data $SIG_{64,SP}$, the integrity of the creator and the sender of the price tag data 312 is verified.

In step S93-6, the signature processor 589 verifies the signature data $SIG_{1,ESC}$ shown in FIG. 84D, and then, verifies the signature data $SIG_{6,CP}$ and $SIG_{7,CP}$ by using the public key data $K_{CP,P}$ of the content provider 301 stored in the public-key certificate data $CER_{CP}$ shown in FIG. 84D.

When verifying the integrity of the signature data $SIG_{6,CP}$, the integrity of the creator and the sender of the content file CF is verified. When verifying the integrity of the signature data $SIG_{7,CP}$, the sender of the key file KF is verified.

In step 93-7, the signature processor 589 checks the signature data $SIG_{K1,ESC}$ within the key file KF shown in FIG. 84B by using the public key data $K_{ESC,P}$ read from the storage unit 192 so as to verify the integrity of the creator of the key file KF and the official registration of the key file KF in the EMD service center 302.

Then, in step S93-8, the encryption/decryption unit 172 decrypts the content key data Kc, the UCP data 106, and the SAM program download containers $SDC_1$ through $SDC_3$ within the key file KF shown in FIG. 84B by using the license key data $KD_1$ through $KD_3$ of corresponding periods read from the storage unit 192, and writes them into the work memory 200.

In step S93-9, the CPU 1100 determines whether the above-described processing for receiving the secure container has been correctly performed, and reports the corresponding information to the host CPU 810 through an external interrupt.

Alternatively, the CPU 1100 may set a flag in the SAM status register indicating whether the above-described processing is suitably performed, and the host CPU 810 may read the flag by polling.

Processing for Determining the Purchase Mode of Downloaded Secure Container

The processing for determining the purchase mode of the downloaded secure container is basically similar to that performed by the SAM $105_1$ of the first embodiment described with reference to FIG. 38. According to this processing, the key file $KF_1$ shown in FIG. 97C, which is discussed later, is stored in the download memory 167 via the work memory 200 and the download memory manager 182.

Playback Processing of Content Data

The playback processing of the content data C, for which the purchase mode is determined, stored in the download memory 167 is basically similar to the processing performed by the SAM $105_1$ of the first embodiment described with reference to FIG. 40.

Figure 94:
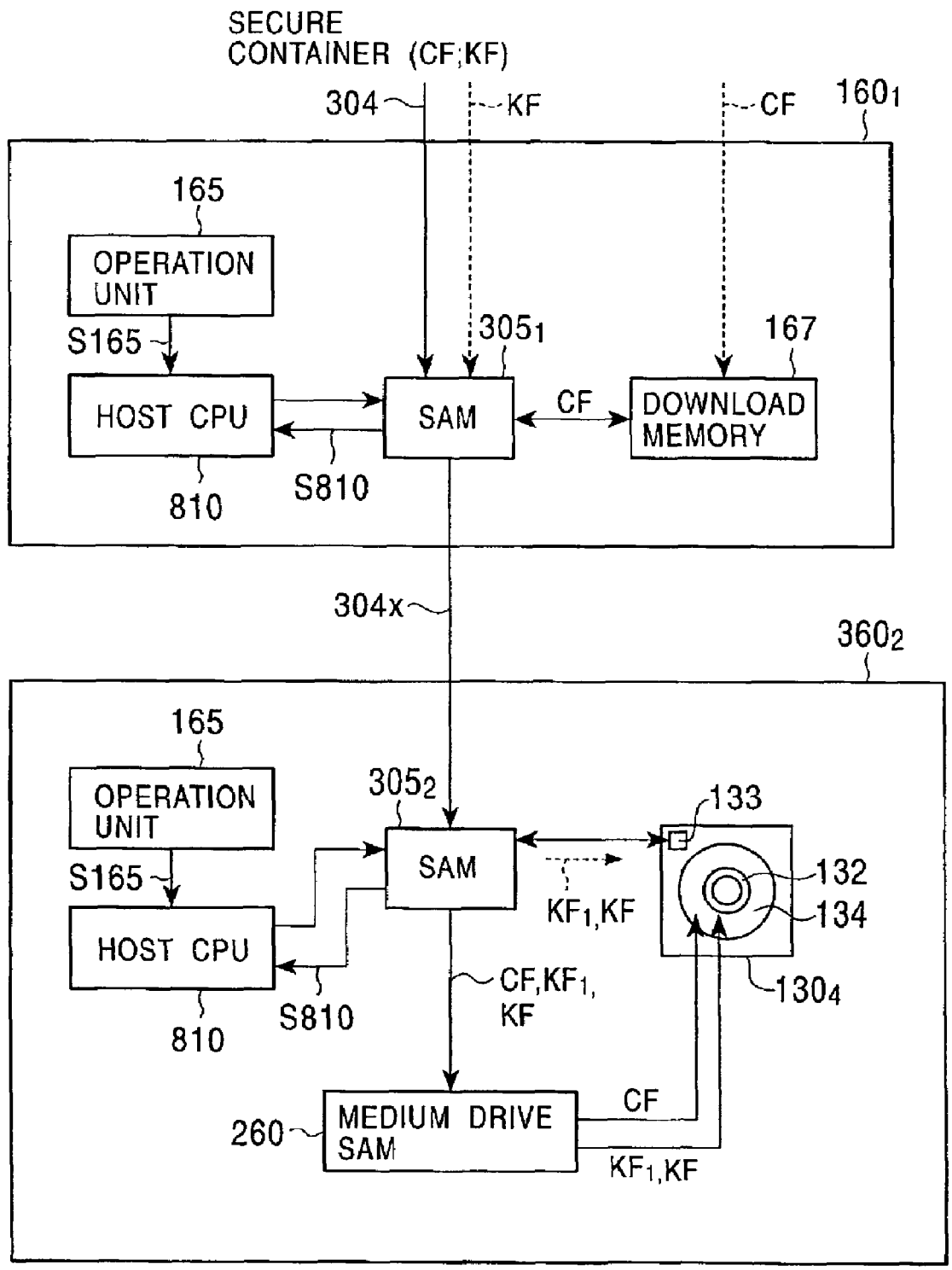
FIG. 94 is a block diagram illustrating the operation of transferring the content file, for which the purchase mode is determined, downloaded into a download memory of the network device shown in FIG. 82 to a SAM of an A/V machine.

Processing to be Executed when the UCS Data 166 of One Machine is Utilized for Re-Purchasing the Content in Another Machine After determining the purchase mode of the content file CF downloaded into the download memory 167 of the network device $360_1$, as shown in FIG. 94, a new secure container 304x storing the content file CF is created, and is transferred from the SAM $305_1$ to the SAM $305_2$ of the A/V machine $360_2$ via the bus 191. This processing in the SAM $305_1$ is discussed below with reference to FIGS. 95 and 96.

Figure 96:
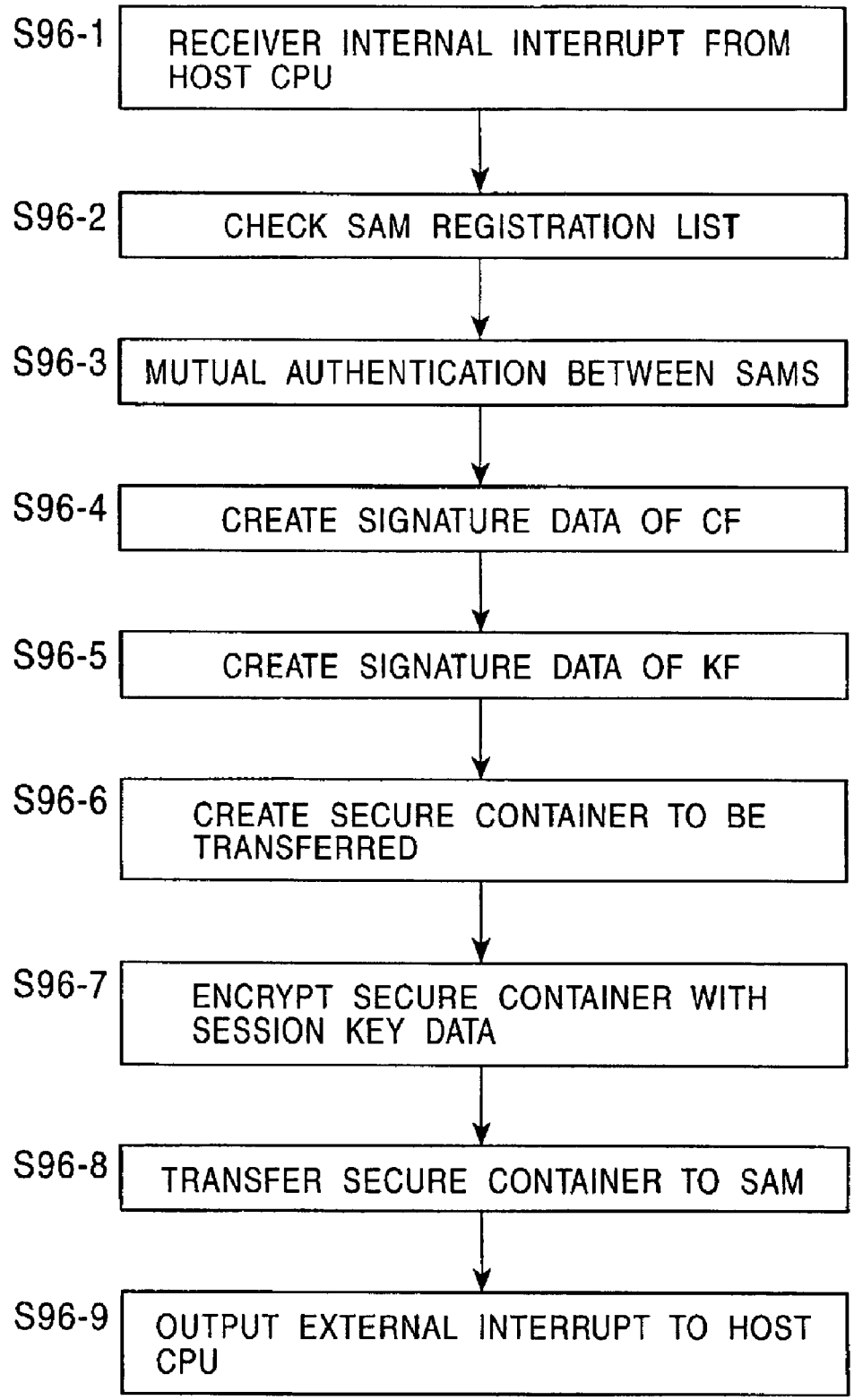
FIG. 96 is a flow chart illustrating the processing performed by the sender SAM shown in FIG. 95.
Figure 97:
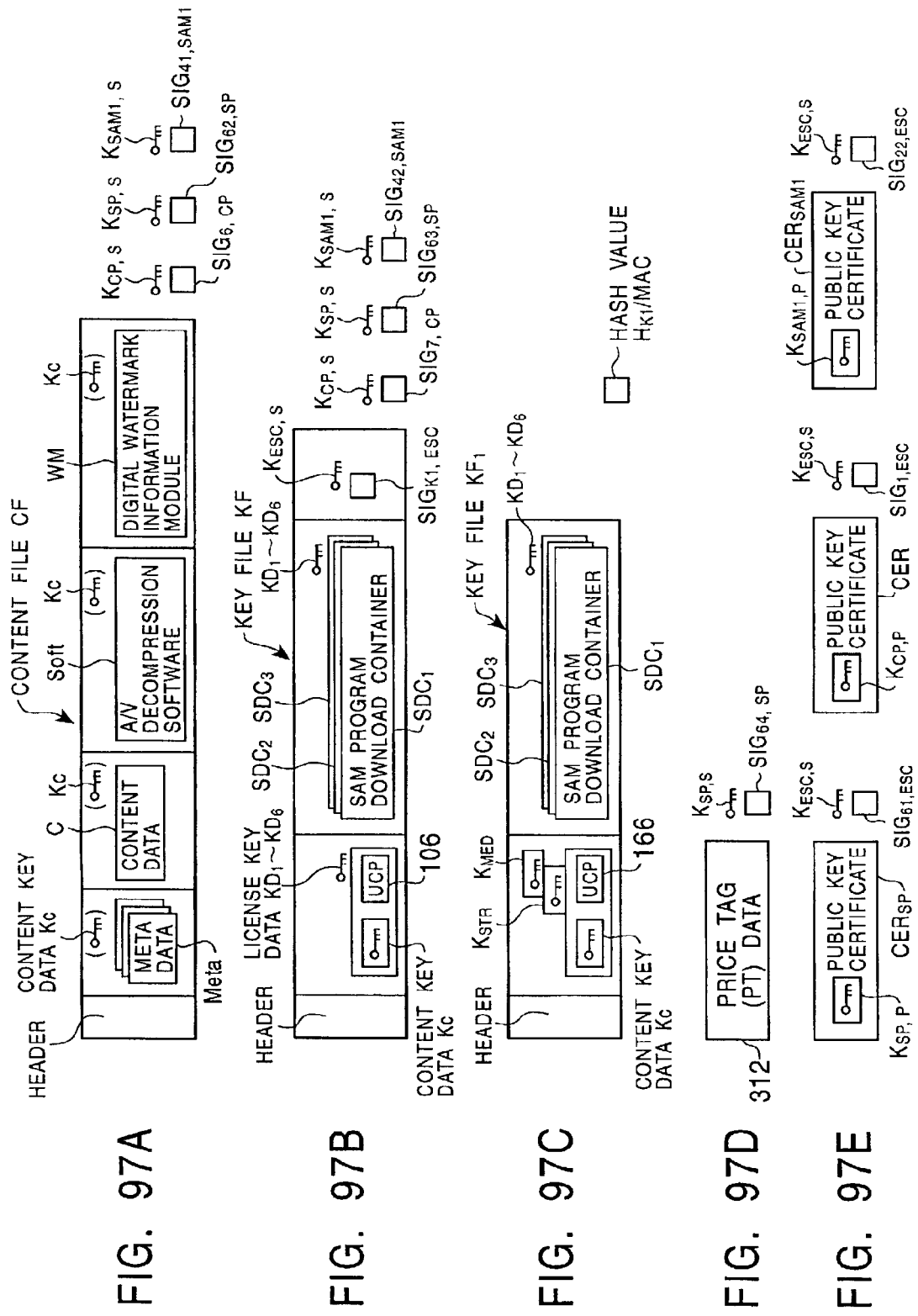
FIGS. 97A through 97E illustrate the format of the secure container transferred from the sender SAM to the receiver SAM shown in FIG. 94.

The processing indicated by the flow chart of FIG. 96 is executed, assuming that the key file $KF_1$ and the hash value $H_{K1}$ therefor shown in FIG. 97C are stored in the work memory 200 of the SAM $305_1$ according to the above-described purchase processing.

Figure 95:
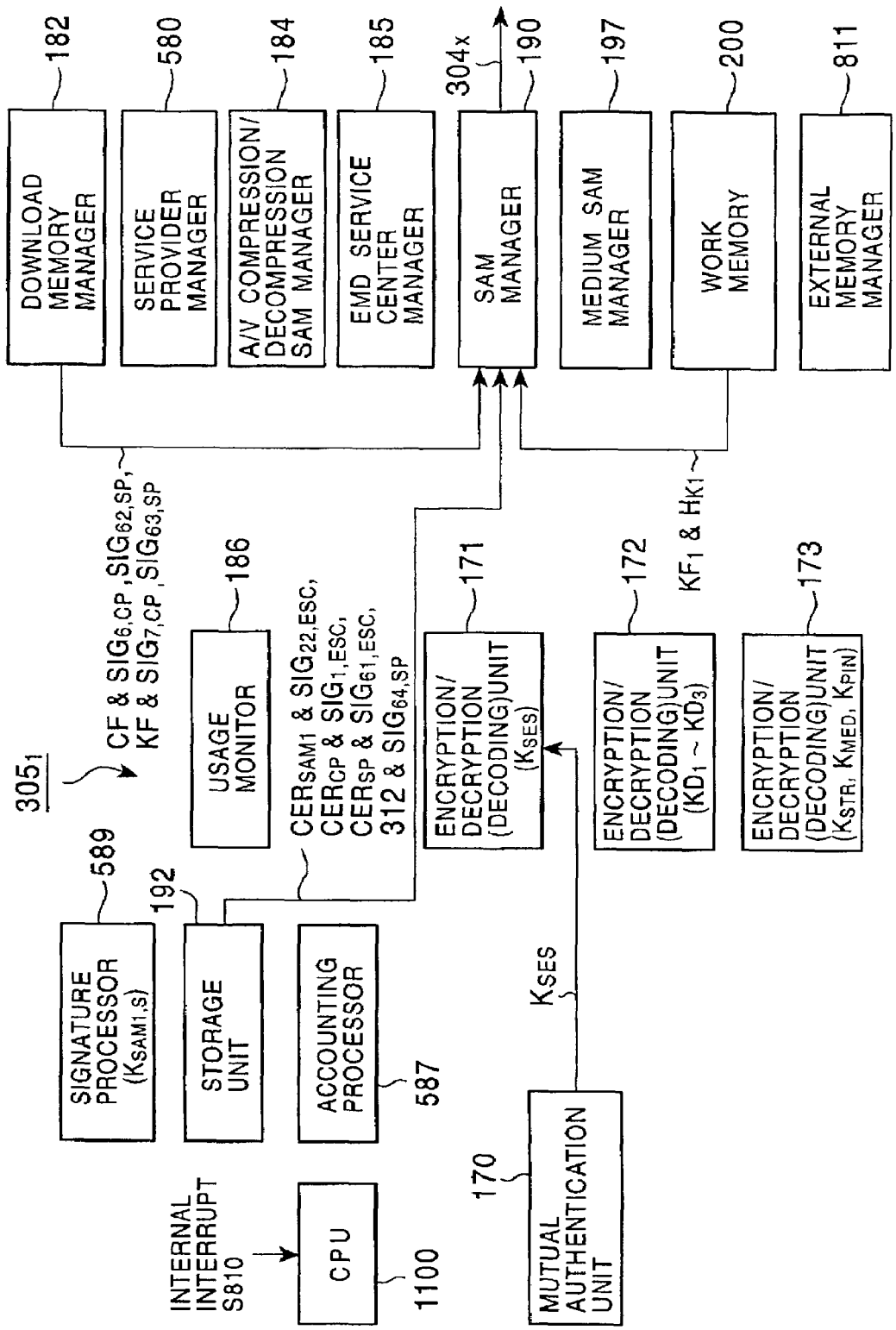
FIG. 95 illustrates the data flow within the receiver SAM shown in FIG. 94.

In step S96-1, according to the user's operation on the operation unit 165 shown in FIGS. 88 and 94, the internal interrupt S810 making an instruction to transfer the secure container, for which the purchase mode is determined, to the SAM $305_2$ is output from the host CPU 810 to the CPU 1100 shown in FIG. 95. The accounting processor 587 updates the usage log data 308 stored in the external memory 201 according to the determined purchase mode under the control of the CPU 1100.

In step S96-2, the SAM $305_1$ checks the SAM registration list discussed in the first embodiment so as to determine whether the SAM $305_2$, which receives the secure container, is officially registered. If so, the SAM $305_1$ executes processing of step S96-3. The SAM $305_1$ also determines whether the SAM $305_2$ is a SAM within the user home network 303.

Then, in step S96-3, the mutual authentication unit 170 shares the session key data $K_{SES}$ obtained by mutual authentication with the SAM $305_2$.

In step S96-4, the SAM manager 190 reads the content file CF and the signature data $SIG_{6,CP}$ and $SIG_{7,CP}$ shown in FIG. 84A from the download memory 211, and causes the signature processor 189 to create the signature data $SIG_{41,SAM1}$ by using the private key data $K_{SAM1}$ of the SAM $305_1$.

In step S96-5, the SAM manager 190 reads the key file KF and the signature data $SIG_{7,CP}$ and $SIG_{63,SP}$ shown in FIG. 84B from the download memory 211, and causes the signature processor 589 to create the signature data $SIG_{42,SAM1}$ by using the private key data $K_{SAM1}$ of the SAM $305_1$.

Thereafter, in step S96-6, the SAM manager 190 creates the secure container 304x shown in FIGS. 97A through 97E.

In step S96-7, the encryption/decryption unit 171 encrypts the secure container 304x shown in FIGS. 97A through 97E by using the session key data $K_{SES}$ obtained in step S96-3.

Then, in step S96-8, the SAM manager 190 outputs the secure container 304x to the SAM $305_2$ of the A/V machine $360_2$ shown in FIG. 94. In this case, not only mutual authentication between the SAMs $305_1$ and $305_2$, but also mutual authentication of the bus 191, which is an IEEE-1394 serial bus, is performed.

In step S96-9, the CPU 1100 determines whether the above-described processing for transferring the secure container 304x has been correctly performed, and reports the corresponding information to the host CPU 810 through an external interrupt.

Alternatively, the CPU 1100 may set a register in the SAM status register indicating whether the above-described processing has been precisely performed, and the host CPU 810 may read the flag by polling.

Figure 98:
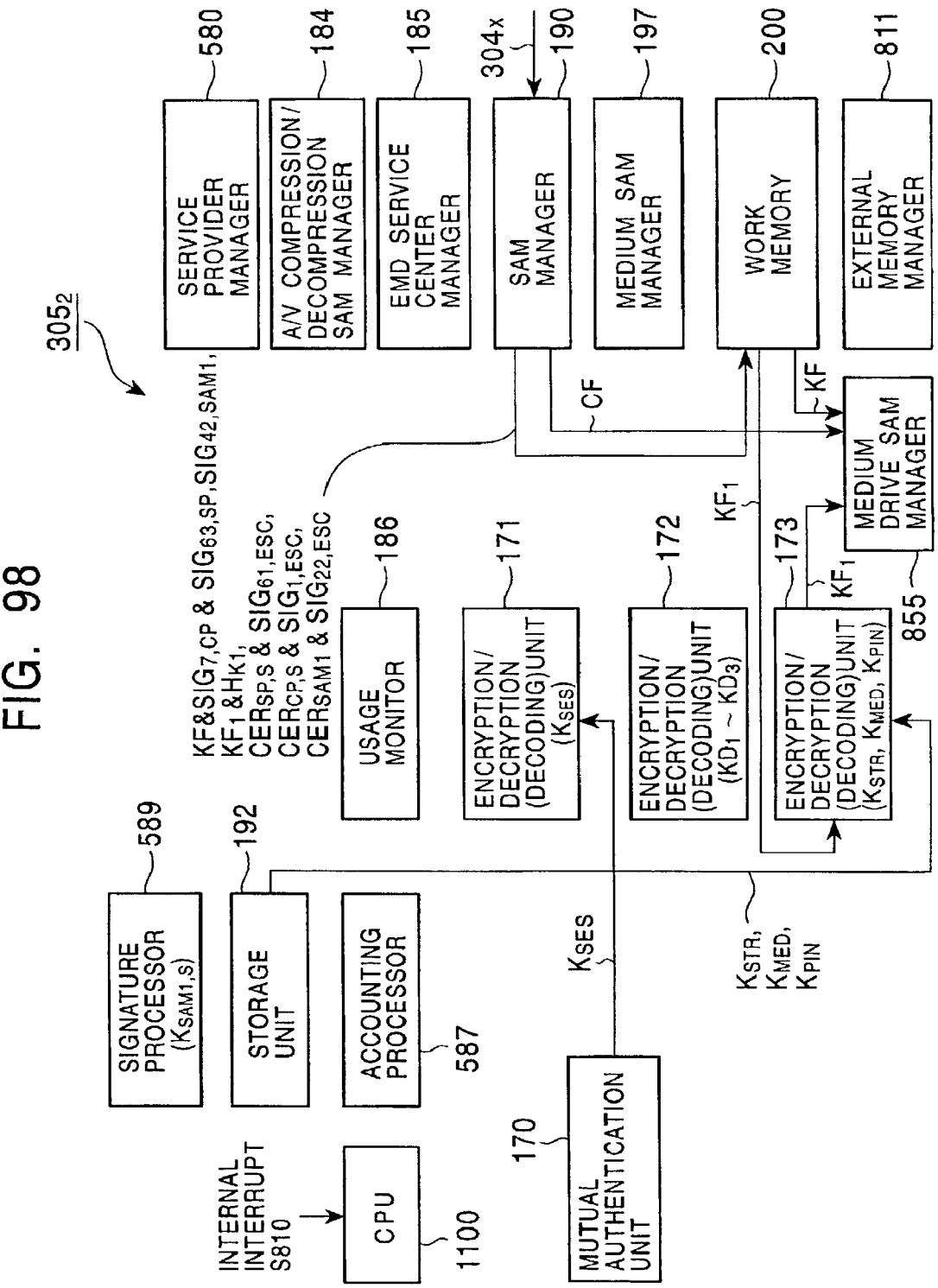
FIG. 98 illustrates the data flow within the receiver SAM shown in FIG. 94.
Figure 99:
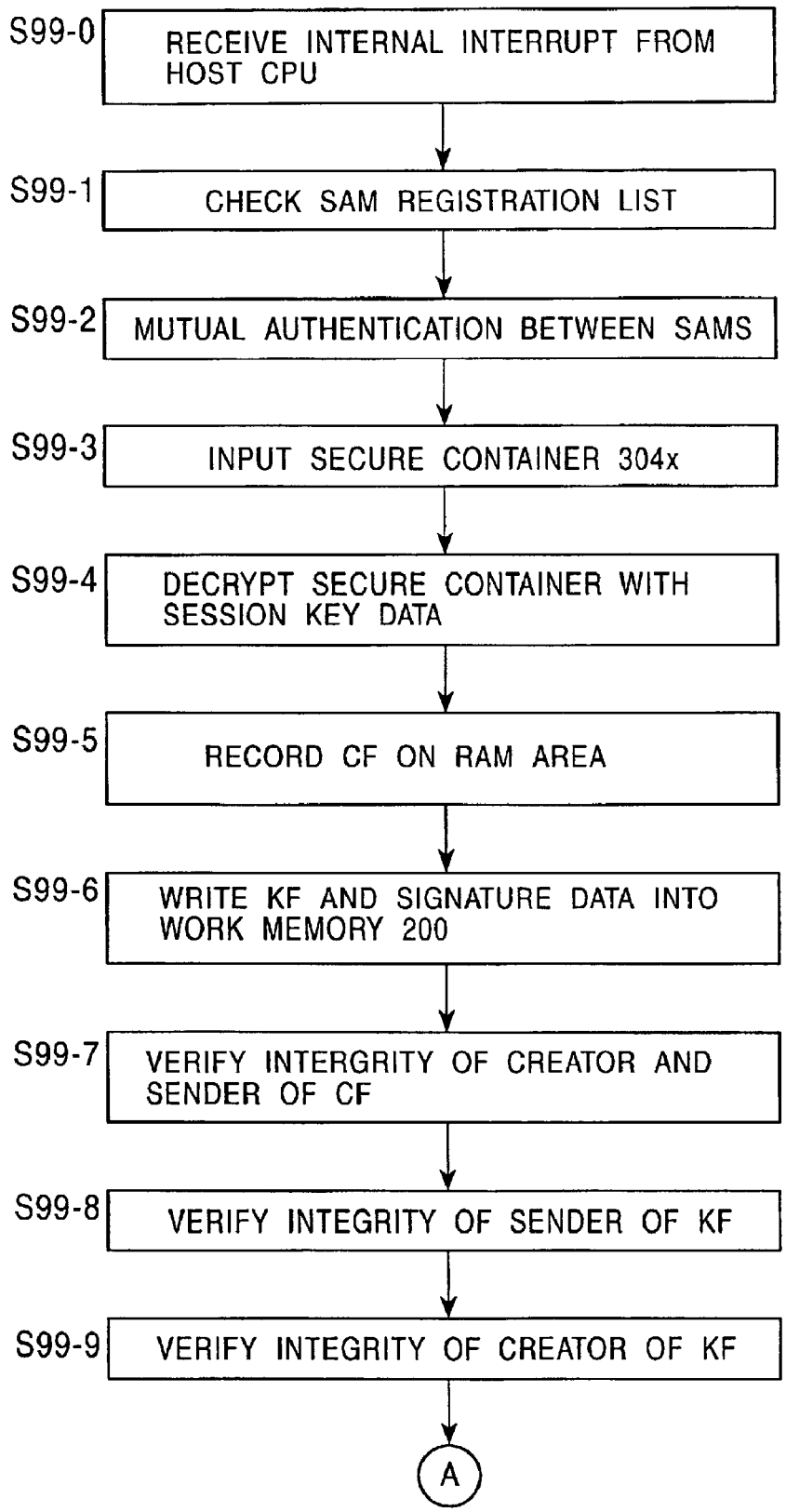

A description is now given, with reference to FIGS. 98, 99, and 100, of the flow of the process within the SAM $305_2$ when writing the secure container 304x shown in FIGS. 97A through 97E input from the SAM $305_1$ into the recording medium (RAM) $130_4$, as shown in FIG. 94.

FIGS. 99 and 100 are a flow chart illustrating the above-described processing. The recording medium (RAM) $130_4$ includes, as shown in FIG. 14, the unsecured RAM area 134, the medium SAM 133, and the secure RAM area 132.

In step S99-0, the CPU 1100 of the SAM $305_2$ shown in FIG. 98 receives from the host CPU 810 the internal interrupt S810 indicating an instruction to record the received secure container, for which the purchase mode is determined, on a recording medium.

Then, in step S99-1, the SAM $305_2$ checks the SAM registration list to determine whether the SAM $305_1$, which has sent the secure container, is officially registered. If so, the SAM $305_2$ executes step S99-2. The SAM $305_2$ also determines whether the SAM $305_1$ is a SAM within the user home network 303.

In step S99-2, as the processing corresponding to step S96-3, the SAM $305_2$ shares the session key data $K_{SES}$ obtained by performing mutual authentication with the SAM $305_1$.

Then, in step S99-3, the SAM manager 190 of the SAM $305_2$ receives, as shown in FIG. 94, the secure container 304x from the SAM $305_1$ of the network device $360_1$.

In step S99-4, the encryption/decryption unit 171 decrypts the secure container 304x received via the SAM manager 190 by using the session key data $K_{SES}$ shared in step S99-2.

Subsequently, in step S99-5, the content file CF within the decrypted secure container 304x undergoes processing, such as sectorizing, adding a sector header, scrambling, ECC encoding, modulating, and synchronizing, by the medium drive SAM 260 shown in FIG. 94, and is then recorded on the RAM area 134 of the recording medium (RAM) $130_4$.

In step S99-6, the signature data $SIG_{6,CP}$, $SIG_{62,SP}$, and $SIG_{41,SAM1}$ within the secure container 304x decrypted with the session key data $K_{SES}$, the key file KF and the signature data $SIG_{7,CP}$, $SIG_{63,SP}$, and $SIG_{42,SAM1}$, the key file $KF_1$ and the hash value $H_{K1}$, the public key signature data $CER_{SP}$ and signature data $SIG_{61,ESC}$, the public key signature data $CER_{CP}$ and signature data $SIG_{1,ESC}$, and the public key signature data $CER_{SAM1}$ and signature data $SIG_{22,ESC}$ are written into the work memory 200.

In step S99-7, in the signature processor 589, the signature data $SIG_{61,ESC}$, $SIG_{1,ESC}$, and $SIG_{22,ESC}$ read from the work memory 200 is checked by using the public key data $K_{ESC,P}$ read from the storage unit 192 so as to verify the integrity of the public-key certificate data $CER_{SP}$, $CER_{CP}$, and $CER_{SAM1}$.

Then, in the signature processor 589, the integrity of the signature data $SIG_{6,CP}$ is verified by using the public key data $K_{CP,P}$ stored in the public-key certificate data $CER_{CP}$ so as to verify the integrity of the creator of the content file CF. Also in the signature processor 589, the integrity of the signature data $SIG_{62,SP}$ is verified by using the public key data $K_{SP,P}$ stored in the public-key certificate data $CER_{SP}$ so as to verify the integrity of the sender of the content file CF. The signature processor 589 verifies the integrity of the signature data $SIG_{41,SAM1}$ by using the public key data $K_{SAM1,P}$ stored in the public-key certificate data $CER_{SAM1}$ so as to verify the integrity of the sender of the content file CF.

In step S99-8, in the signature processor 589, the integrity of the signature data $SIG_{7,CP}$, $SIG_{63,SP}$, and $SIG_{42,SAM1}$ stored in the work memory 200 is verified by using the public key data $K_{CP,P}$, $K_{SP,P}$ and $K_{SAM1,P}$ stored in the public-key certificate data $CER_{CP}$, $CER_{SP}$, and $CER_{SAM1}$, respectively.

Then, in step S99-9, in the signal processor 589, the integrity of the signature data $SIG_{K1,ESC}$ stored in the key file KF shown in FIG. 97B is verified by using the public key data $K_{ESC,P}$ read from the storage unit 192 so as to verify the integrity of the creator of the key file KF.

In step S99-10, the signature processor 589 checks the integrity of the hash value $H_{K1}$ so as to verify the integrity of the creator and the sender of the key file $KF_1$.

In this embodiment, the creator and the sender of the key file $KF_1$ are the same. However, if they are different, signature data for the creator and signature data for the sender are created, and the integrity of both signature data is verified in the signal processor 589.

In step S99-11, the usage monitor 186 starts to control the purchase and usage modes of the content data C by using the UCS data 166 stored in the key file $KF_1$ decrypted in step S99-10.

Then, in step S99-12, the user determines the purchase mode by operating the operation unit 165, and the corresponding operation signal S165 is output to the accounting processor 587.

In step S99-13, the accounting processor 587 updates the usage log data 308 stored in the external memory 201 based on the operation signal S165. The accounting processor 587 also updates the UCS data 166 according to the determined purchase mode every time the purchase mode of the content data C is determined.

Subsequently, in step S99-14, the encryption/decryption unit 173 encrypts the UCS data 166 generated in step S99-12 by sequentially using the storage key data $K_{STR}$, the medium key data $K_{MED}$, the purchaser key data $K_{PIN}$ read from the storage unit 192, and outputs the encrypted UCS data 166 to the medium drive SAM manager 855.

In step S99-15, the medium drive SAM manager 855 performs processing, such as sectorizing, adding a sector header, scrambling, ECC encoding, modulating, and synchronizing, on the key file $KF_1$ in which the new UCS data 166 is stored, and records it on the secure RAM area 132 of the recording medium (RAM) $130_4$.

Thereafter, in step S99-16, the key file KF is read from the work memory 200, and is written into the secure RAM area 132 of the recording medium (RAM) $130_4$ by the medium drive SAM 260 shown in FIG. 94 via the medium drive SAM manager 855.

In step S99-17, the CPU 1100 determines whether the above-described processing has been correctly performed, and reports the corresponding information to the host CPU 810 through an external interrupt.

Alternatively, the CPU 1100 may set a flag in the SAM status register indicating whether the above-described processing has been correctly performed, and the host CPU 810 may read the flag by polling.

The processing for determining the purchase mode of the content data by a recording medium (ROM), and the processing for writing the content data into a recording medium (RAM) after the purchase mode of the content data is determined by a recording medium (ROM) are similar to those performed by the SAM $305_1$ of the first embodiment, except that the signature data $SIG_{SP}$ attached by using the private key data $K_{SP,P}$ by the service provider 310 is checked.

A method for implementing the SAM $305_1$ is similar to that of the SAM $105_1$ of the first embodiment.

The configuration of the user home network 103 discussed in the first embodiment is applicable to the devices employed in the user home network 303. In this case, the configurations of the first embodiment discussed with reference to FIGS. 64 through 79 are applicable to the circuit modules of the SAM $305_1$, the A/V compression/decompression SAM 163, the medium drive SAM 260, and the medium SAM 133.

Similarly, the security functions described with reference to FIG. 62 are applicable to those of the EMD system 300, except for the content provider 101 is substituted with the service provider 310.

The connection models of the various devices in the user home network 303 are as follows.

Figure 101:
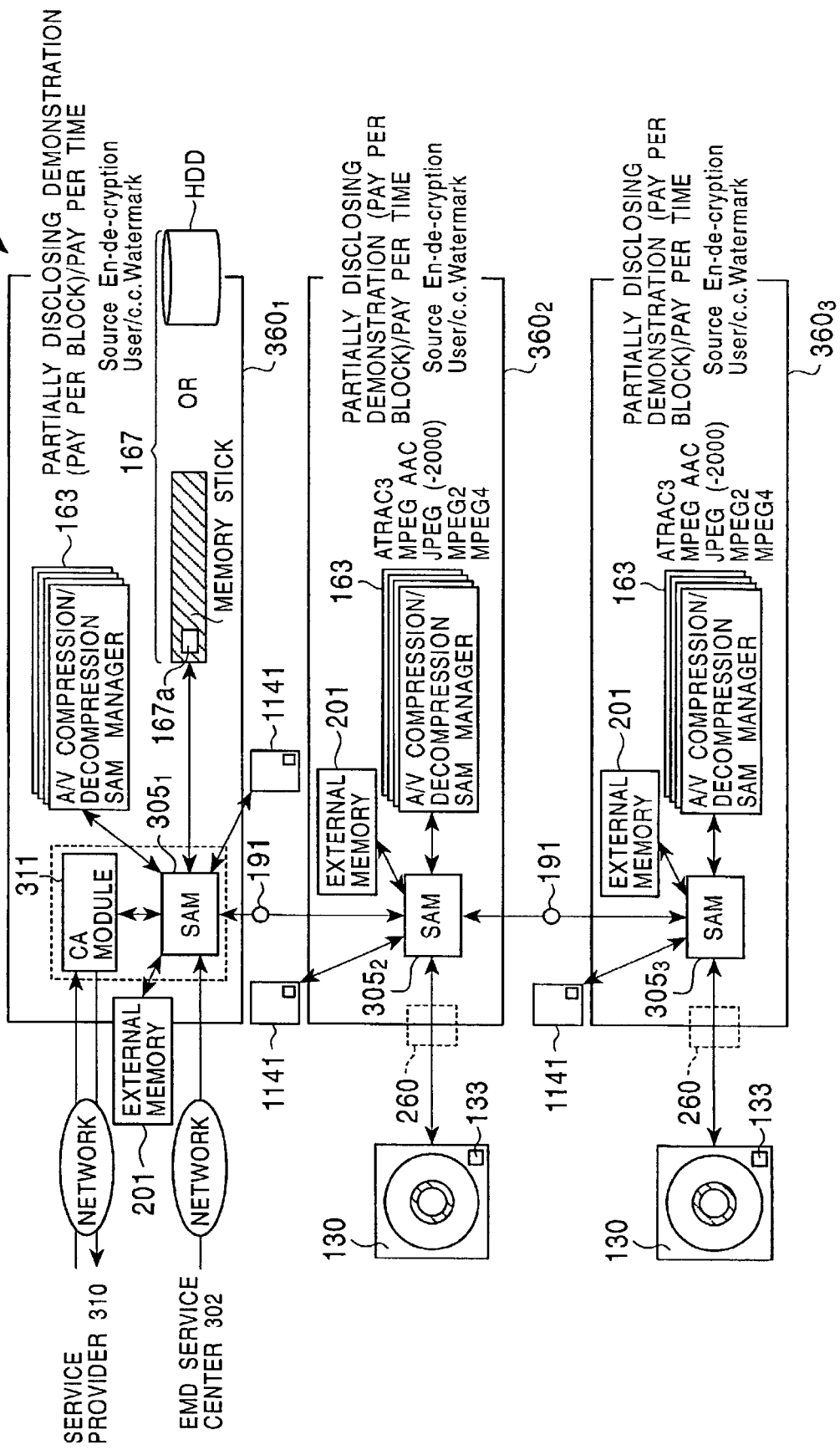
FIG. 101 illustrates an example of connection models of the SAMs within the user home network shown in FIG. 82.

FIG. 101 illustrates an example of the connection models of the devices in the user home network 303.

As shown in FIG. 101, the network device $360_1$, and the A/V machines $360_2$ and $360_3$ in the user home network 303 are connected to each other via the IEEE-1394 serial bus 191.

The network device $360_1$ includes the external memory 201, the SAM $305_1$, the CA module 311, the A/V compression/decompression SAM 163, and the download memory 167.

The CA module 311 communicates with the service provider 310 via a network, such as a public line. The SAM $305_1$ communicates with the EMD service center 302 via a network, such as a public line. As the download memory 167, a Memory Stick provided with the medium SAM 167a or a hard disk drive (HDD) may be used. The download memory 167 stores the secure container 304 downloaded from the service provider 310.

Each device integrates a plurality of A/V compression/decompression SAMs 163 compatible with various compression/decompression methods, such as ATRAC3 and MPEG.

The SAM $305_1$ is able to communicate with the contact-type or non-contact-type IC card 1141. The IC card 1141 stores various types of data, such as a user ID, and is used for performing user authentication in the SAM $305_1$.

The A/V machine $360_2$ is, for example, a storage device, and after performing predetermined processing between the SAMs $305_1$ and $305_2$, the secure container received from the network device $360_1$ via the IEEE-1394 serial bus 191 is recorded on the recording medium 130.

Likewise, the A/V machine $360_3$ is, for example, a storage device, and after performing predetermined processing between the SAMs $305_2$ and $305_3$, the secure container received from the A/V machine $360_2$ via the IEEE-1394 serial bus 191 is recorded on the recording medium 130.

In the example shown in FIG. 101, the medium SAM 133 is loaded on the recording medium 130. However, if the medium SAM 133 is not provided for the recording medium 130, mutual authentication between the SAMs $305_2$ and $305_3$ is performed by using the medium drive SAM 260 indicated by a one-dot chain rectangle in FIG. 101.

The overall operation of the EMD system 300 shown in FIG. 82 is described below with reference to FIGS. 102 and 103.

In this case, the secure container 304 is sent online from the service provider 310 to the user home network 303 by way of example. The processing shown in FIGS. 102 and 103 is executed, assuming that the registration of the content provider 301, the service provider 310, and the SAMs $305_1$ through $305_4$ in the EMD service center 302 is completed.

Figure 102:
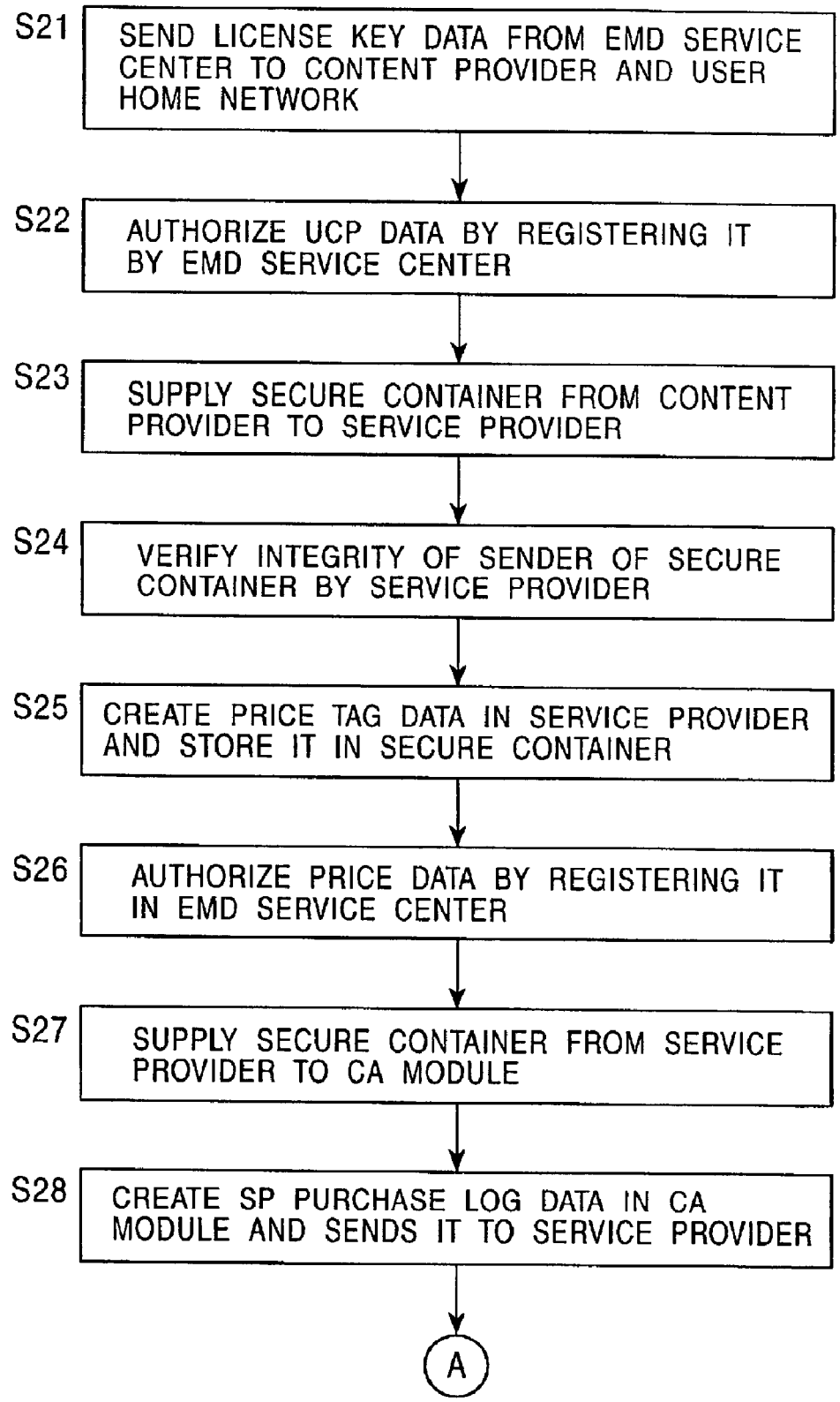
FIGS. 102 and 103 are a flow chart illustrating the overall operation of the EMD system shown in FIG. 82.

Referring to FIG. 102, in step S21, the EMD service center 302 sends to the content provider 301 the public key certificate $CER_{CP}$ of the public key data $K_{CP,P}$ of the content provider 301 together with the signature data $SIG_{1,ESC}$ of the EMD service center 302.

The EMD service center 302 also sends to the service provider 310 the public key certificate $CER_{SP}$ of the public key data $K_{SP,P}$ of the service provider 310 together with the signature data $SIG_{61,ESC}$ of the EMD service center 302.

The EMD service center 302 also sends the license key data $KD_1$ through $KD_3$ for three months, each having a one-month effective period, to the SAMs $305_1$ through $305_4$ of the user home network 303.

In step S22, after performing mutual authentication, the content provider 301 authorizes the UCP data 106 and the content key data Kc by registering them in the EMD service center 302. The EMD service center 302 creates the key file KF for six months shown in FIG. 3B, and sends it to the content provider 301.

Then, in step S23, the content provider 301 creates the content file CF and the signature data $SIG_{6,CP}$ shown in FIG. 3A, and the key file KF and the signature data $SIG_{7,CP}$ shown in FIG. 3B, and provides the secure container 104 in which the above-described files and signature data, and the public-key certificate data $CER_{CP}$ and the signature data $SIG_{1,ESC}$ are stored to the service provider 310 online and/or offline.

In step S24, after checking the signature data $SIG_{1,ESC}$ shown in FIG. 3C, the service provider 310 verifies the integrity of the signature data $SIG_{6,CP}$ and $SIG_{7,CP}$ shown in FIGS. 3A and 3B, respectively, by using the public key data $K_{CP,P}$ stored in the public-key certificate data $CER_{CP}$, thereby verifying that the secure container 104 has been sent from the legal content provider 301.

Subsequently, in step S25, the service provider 310 creates the price tag data 312 and the signature data $SIG_{64,SP}$ so as to generate the secure container 304 shown in FIG. 87 in which the above-described data is stored.

In step S26, the service provider 310 authorizes the price tag data 312 by registering it in the EMD service center 302.

In step S27, the service provider 310 sends the secure container 304 created in step S25 to the decoding module 905 of the network device $360_1$ shown in FIG. 89 online or offline in response to, for example, a request from the CA module 311 of the user home network 303.

Then, in step S28, the CA module 311 creates the SP purchase log data 309 and appropriately sends it to the service provider 310.

Figure 103:
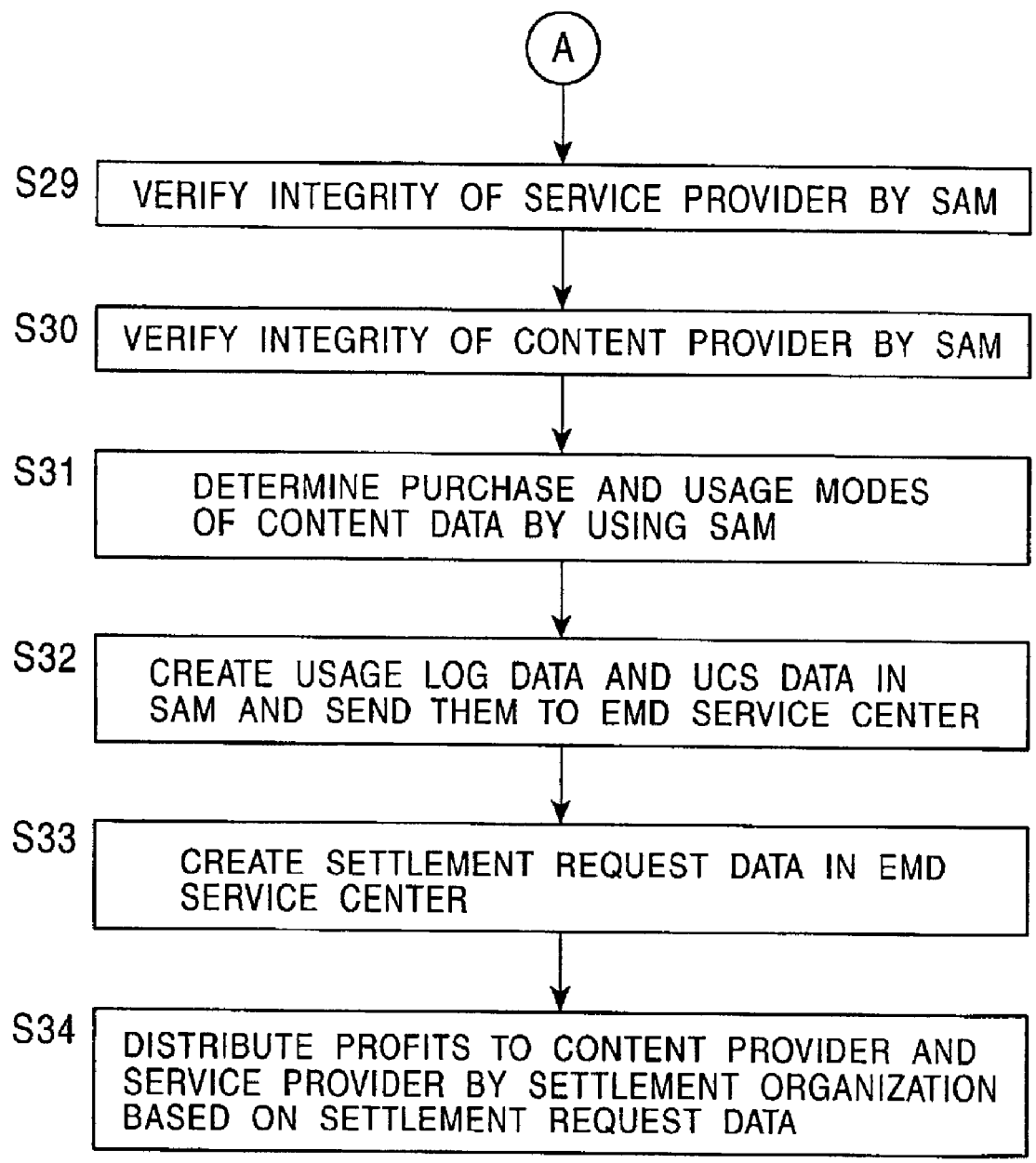

Referring to FIG. 103, in step S29, after verifying the integrity of the signature data $SIG_{61,ESC}$ shown in FIG. 84D, one of the SAMs $305_1$ through $305_4$ verifies the integrity of the signature data $SIG_{62,SP}$, $SIG_{63,SP}$, and $SIG_{64,SP}$ shown in FIGS. 84A, 84B, and 84C, respectively, by using the public key data $K_{SP,P}$ stored in the public-key certificate data $CER_{SP}$, thereby determining whether the predetermined data within the secure container 304 has been created and sent by the legal service provider 310.

Thereafter, in step S30, after verifying the integrity of the signature data $SIG_{1,ESC}$ shown in FIG. 84D, one of the SAMs $305_1$ through $305_4$ verifies the integrity of the signature data $SIG_{6,CP}$ and $SIG_{7,CP}$ shown in FIGS. 84A and 84B, respectively, by using the public key data $K_{CP,P}$ stored in the public-key certificate data $CER_{CP}$, thereby determining whether the content file CF within the secure container 304 has been created by the legal content provider 301, and whether the key file KF has been sent from the legal content provider 301.

Additionally, one of the SAMs $305_1$ through $305_4$ verifies the integrity of the signature data $SIGK_{1,ESC}$ within the key file KF shown in FIG. 84B by using the public key data $K_{ESC,P}$, thereby determining whether the key file KF has been created by the legal EMD service center 302.

In step S31, the user determines the purchase and usage modes of the content by operating the operation unit 165 shown in FIG. 88.

In step S32, in the SAMs $305_1$ through $305_4$, the usage log data 308 of the secure container 304 is generated based on the internal interrupt S810 output from the host CPU 810 to the SAMs $305_1$ through $305_4$ in step S31.

The usage log data 308 and the signature data $SIG_{205,SAM1}$ are sent from the SAMs $305_1$ through $305_4$ to the EMD service center 302. The UCS data 166 is also sent from the SAMs $305_1$ through $305_4$ to the EMD service center 302 in real time every time the purchase mode is determined.

In step S33, the EMD service center 302 determines (calculates) the accounting content for each of the content provider 301 and the service provider 310 based on the usage log data 308, and creates the settlement request data 152c and 152s based on the accounting content.

Subsequently, in step S34, the EMD service center 302 sends the settlement request data 152c and 152s together with signature data of the EMD service center 302 to the settlement organization 91 via the payment gateway 90. Accordingly, the payment made by the user of the user home network 303 is distributed to the content provider 301, the content rights holders, the service provider 310, and the service-provider rights holders.

As described above, in the EMD system 300, the secure container 104 shown in FIGS. 3A through 3C is distributed from the content provider 301 to the service provider 310, and the secure container 304 in which the content file CF and the key file KF of the secure container 104 are stored is sent from the service provider 310 to the user home network 303. The processing for the key file KF is executed in the SAMs $305_1$ through $305_4$.

The content key data Kc and the UCP data 106 stored in the key file KF are encrypted with the license key data $KD_1$ through $KD_3$, and is decrypted only in the SAMs $305_1$ through $305_4$ which hold the license key data $KD_1$ through $KD_3$. The SAMs $305_1$ through $305_4$ are tamper-resistant modules, which determine the purchase and usage modes of the content data C based on the handling policy of the content data C described in the UCP data 106.

Consequently, according to the EMD system 300, the content data C in the user home network 303 can be reliably purchased and utilized based on the UCP data 106 created by the content provider 301 or a content-provider related organization, independent of the processing in the service provider 310. That is, in the EMD system 300, the UCP data 106 cannot be managed by the service provider 310.

Thus, in the EMD system 300, even when the content data C is distributed to the user home network 303 via a plurality of different service providers 310, rights processing for the content data C in the SAM of the user home network 303 can be performed based on the common UCP data 106 created by the content provider 301 or the content-provider related organization.

In the EMD system 300, the files and data within the secure containers 104 and 304 are provided with signature data, which verifies the creators and the senders of the files and data. It is thus possible for the service provider 310 and the SAMs $305_1$ through $305_4$ to check the integrity of the files and data, and the integrity of the creators and the senders thereof, thereby effectively preventing the illegal use of the content data C.

In the EMD system 300, the secure container 304 is used for distributing the content data C from the service provider 310 to the user home network 303 regardless of whether it is sent online or offline. This enables the SAMs $105_1$ through $105_4$ of the user home network 303 to perform the same rights processing regardless of whether the secure container 304 is sent online or offline.

In purchasing, utilizing, recording, and transferring the content data C in the network device $360_1$ and the A/V machines $360_2$ through $360_4$ within the user home network 303, processing is always executed based on the UCP data 106. Thus, rights processing rules in common to the whole user home network 303 can be established.

Figure 104:
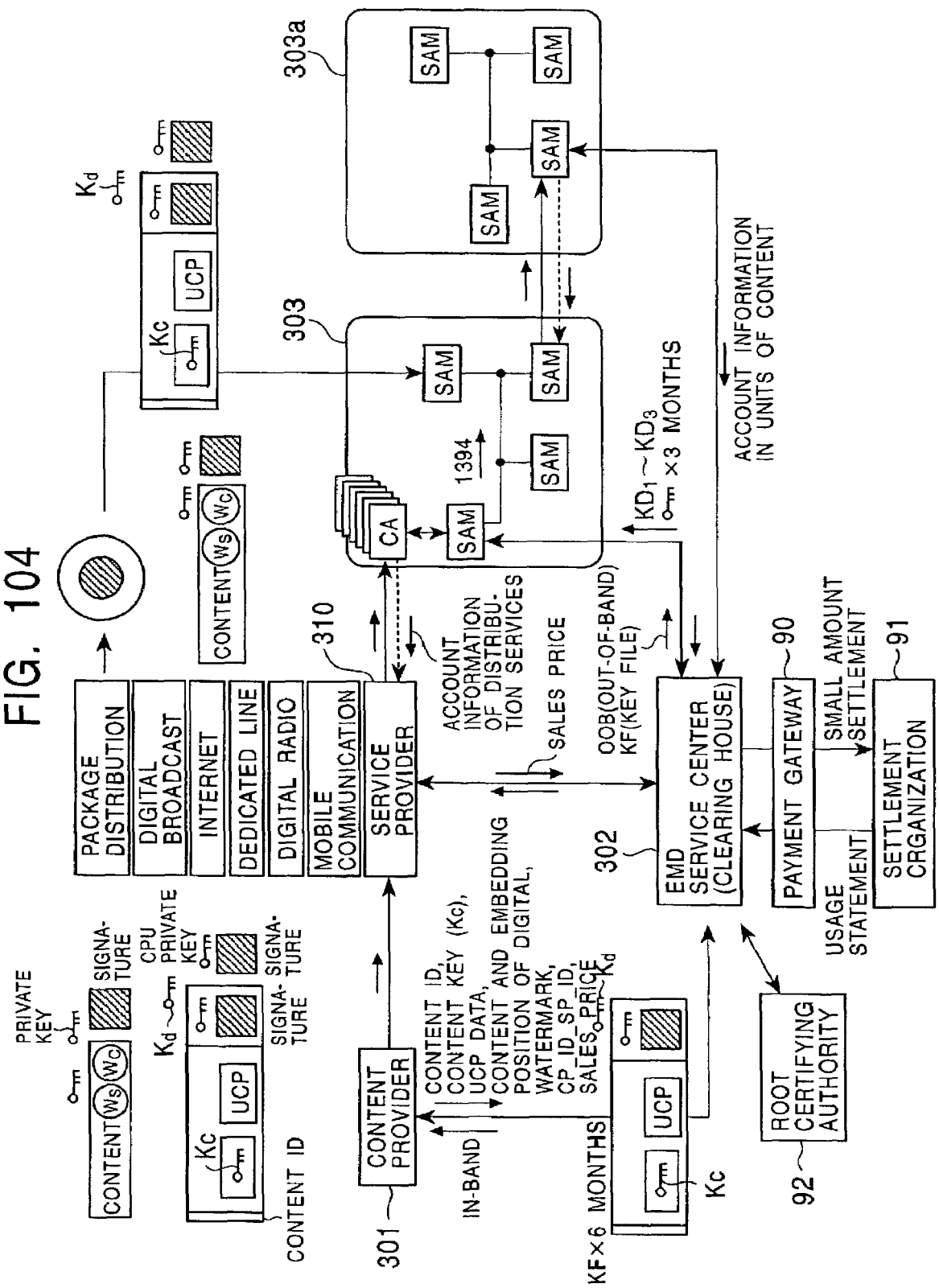
FIG. 104 illustrates an example of service models of the EMD system shown in FIG. 82.

For example, as shown in FIG. 104, the content data C provided from the content provider 301 may be distributed from the service provider 310 to the user home network 303 by any method (path), such as package distribution, a digital broadcast, the Internet, a dedicated line, a digital radio, or a mobile communication. Even if any one of the above-described methods is used, the common rights processing rules can be employed in SAMs in the user home networks 303 and 303a based on the UCP data 106 created by the content provider 301.

According to the EMD system 300, the EMD service center 302 has an authentication function, a key-data management function, and a rights processing (profits distribution) function. Thus, the payment made by the user is reliably distributed to the content provider 301 and the EMD service center 302 according to predetermined ratios.

Also, the UCP data 106 of the same content file CF supplied from the same content provider 301 is supplied to the SAMs $305_1$ through $305_4$, independent of the services of the service provider 310. Accordingly, the content file CF can be utilized in the SAMs $305_1$ through $305_4$ based on the UCP data 106 at the discretion of the content provider 301.

That is, according to the EMD system 300, in providing services of the content or utilizing the content by the user, the rights and profits of the content provider 301 can be reliably protected according to technical means without depending on an auditor organization 725, which is conventionally required.

The distribution protocols for, for example, the secure container, employed in the EMD system 300 of the second embodiment are as follows.

Figure 105:
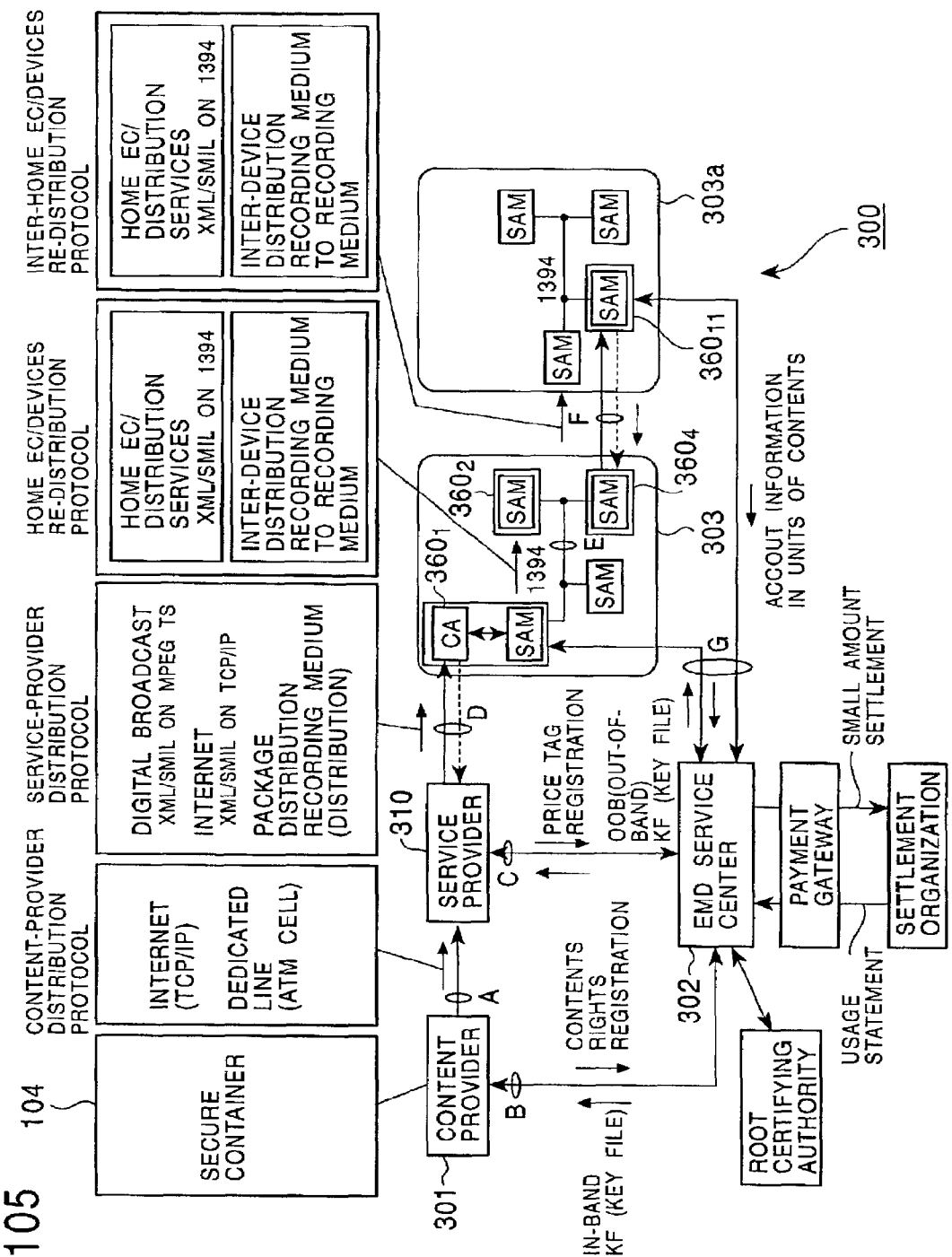
FIG. 105 illustrates distribution protocols for the secure container employed in the EMD system shown in FIG. 82.
Figure 106:
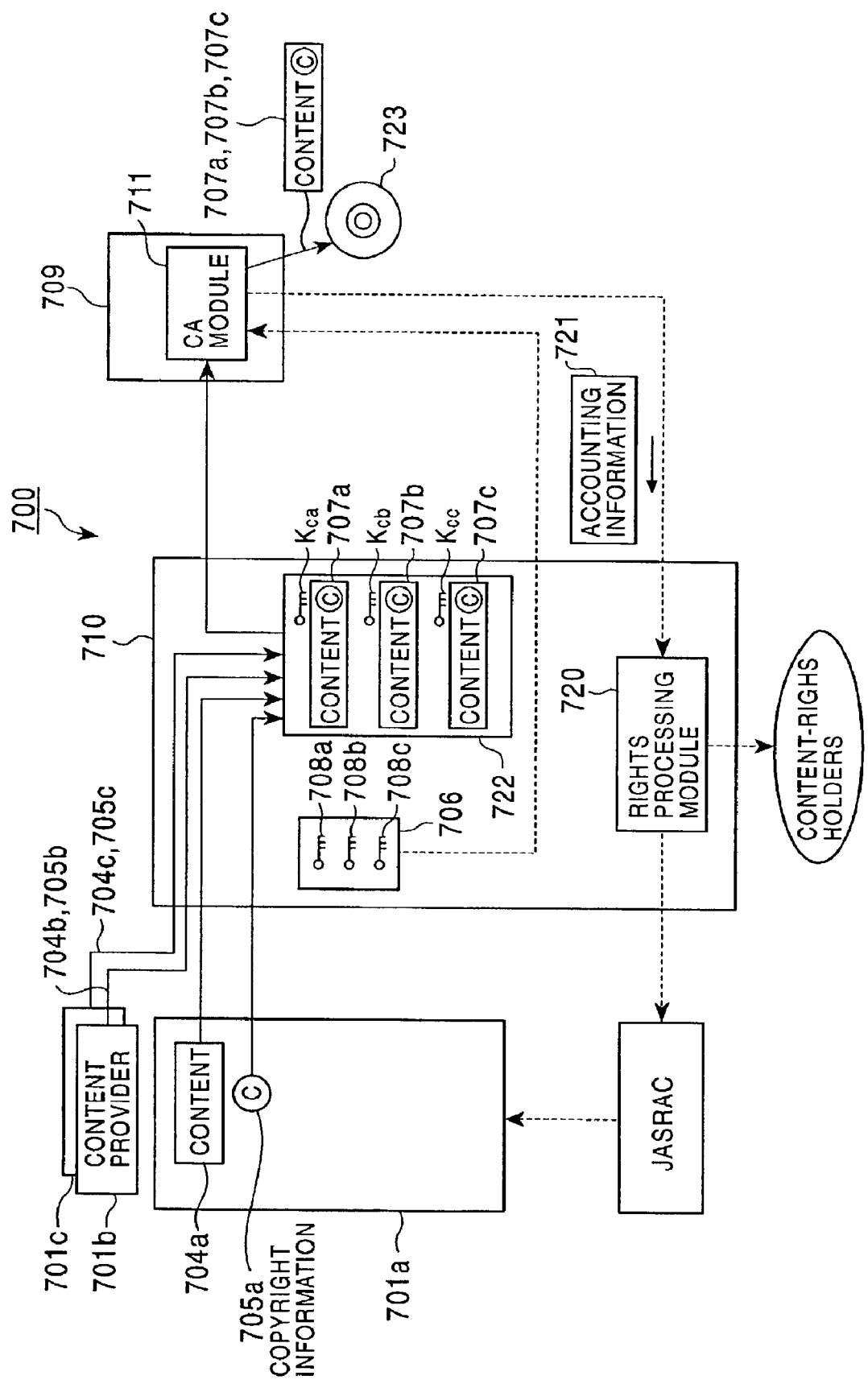
FIG. 106 is a block diagram illustrating a conventional EMD system.

The secure container 104 created in the content provider 301 is distributed to the service provider 310, as shown in FIG. 105, by using content-provider distribution protocols, such as the Internet (TCP/IP) or a dedicated line (ATM Cell).

The service provider 310 then distributes the secure container 104 created from the secure container 104 to the user home network 303 by using service-provider distribution protocols, such as a digital broadcast (XML/SMIL on MPEG-TS) the internet (XML/SMIL on TCP/IP), or package distribution (recording medium).

Within the user home network 303 or 303a, or between the user home networks 303 and 303a, or between the SAMs, the secure container is transferred by using a home electric commerce (EC)/distribution services (XML/SMIL on a 1394-serial bus interface) or a recording medium.

While the present invention has been described with reference to what are presently considered to be the preferred embodiments, it is to be understood that the invention is not limited to the disclosed embodiments.

For example, although in the foregoing embodiments the key file KF is created in the EMD service center 102 or 302, it may be created in the content provider 101 or 301.

As is seen from the foregoing description, the data processing apparatus of the present invention offers the following advantages. Rights processing for the content data can be performed based on UCP data indicating the handling of the content data in a secure environment. As a result, if the UCP data is created by a content provider, profits of the content data can be suitably protected, and also, a load for monitoring by the content provider can be reduced.

What is claimed is:

1. A data processing apparatus for performing rights processing of content data encrypted with content key data based on usage control policy data, and for decrypting the encrypted content key data, the data processing apparatus comprising within a tamper-resistant circuit module:
   an input circuit for receiving a secure container from a content provider, wherein the secure container contains a content file, a key file, and a signature data of the content provider, and for receiving license key data from an electronic distribution center, wherein the content file contains the encrypted content data, and wherein the key file contains the encrypted content key, the usage control policy data, and signature data of the electronic distribution center;
   a first bus;
   an arithmetic processing circuit connected to the first bus, for performing the rights processing of the content data based on the usage control policy data;
   a storage circuit connected to the first bus;
   a second bus;
   a first interface circuit interposed between the first bus and the second bus;
   an encryption processing circuit connected to the second bus, for decrypting the content key data using the license key data;
   a hash-value generating circuit that generates hash values of the content data, the content key data, and the usage control policy data;
   a public key encryption circuit that creates signature data of the data processing apparatus using the hash values and verifies the integrity of the signature data of the content provider and the signature data of the electronic distribution center;
   a common key encryption circuit;
   an external bus interface circuit connected to the second bus; and
   a usage monitor;
   wherein the arithmetic processing circuit determines at least one of a purchase mode and a usage mode of the content data based on a handling policy indicated by the usage control policy data, and creates log data which includes a unique identifier of the content data, discount information, and tracing information and indicates result of the determined mode; and the arithmetic processing circuit creates usage control status data in accordance with the determined purchase mode, and controls the use of the content data based on the usage control status data;
   the usage control status data comprising a content identification for the content data, the purchase mode, an identification for the tamper-resistant circuit module, and a user identification for a user who has purchased the content data;
   wherein the log data is transmitted to the electronic distribution center;
   wherein the usage monitor monitors the usage control policy data and the usage control status data to make sure that the content data is purchased and used as restricted by the usage control policy data and the usage control status data; and
   wherein the purchase mode is determined from one or more purchase mode options, and each purchase mode option has a different level of restriction imposed on a playback operation.

2. A data processing apparatus according to claim 1, further comprising a second interface circuit within the tamper-resistant circuit module, wherein the first bus comprises a third bus connected to the arithmetic processing circuit and the storage circuit, and a fourth bus connected to the first interface circuit, and the second interface circuit is interposed between the third bus and the fourth bus.

3. A data processing apparatus according to claim 2, further comprising within the tamper-resistant circuit module:
   a fifth bus;
   a third interface circuit connected to the fifth bus, for performing communication with a data processing circuit having an authentication function which is loaded on one of a recording medium and an integrated circuit card; and
   a fourth interface circuit interposed between the fourth bus and the fifth bus.

4. A data processing apparatus according to claim 1, wherein:
   the storage circuit stores private key data of the data processing apparatus and public key data of a second data processing apparatus;
   the public-key encryption circuit verifies the integrity of the usage control policy data, by using the public key data, and when recording the content data, the content key data, and the usage control policy data on a recording medium or when sending the content data, the content key data, and the usage control policy data to the second data processing apparatus, the public-key encryption circuit creates the signature data of the data processing apparatus, which verifies the integrity of the content data, the content key data, and the usage control policy data, by using the private key data; and
   the common-key encryption circuit decrypts the content key data, and when sending the content data, the content key data, and the usage control policy data to the second data processing apparatus online, the common-key encryption circuit encrypts and decrypts the content data, the content key data, and the usage control policy data by using session key data obtained by performing mutual authentication with the second data processing apparatus.

5. A data processing apparatus according to claim 1, further comprising a random-number generating circuit within the tamper-resistant circuit module, the random-number generating circuit being connected to the second bus, for generating a random number for performing mutual authentication with a second data processing apparatus when sending the content data, the content key data, and the usage control policy data to the second data processing apparatus online.

6. A data processing apparatus according to claim 1, wherein the external bus interface circuit is connected to an external storage circuit for storing at least one of the content data, the content key data, and the usage control policy data.

7. A data processing apparatus according to claim 6, further comprising a storage-circuit control circuit for controlling access to the storage circuit and access to the external storage circuit via the external bus interface circuit in accordance with a command from the arithmetic processing circuit.

8. A data processing apparatus according to claim 6, further comprising a storage management circuit for managing an address space of the storage circuit and an address space of the external storage circuit.

9. A data processing apparatus according to claim 1, wherein the external bus interface circuit is connected to a host arithmetic processing apparatus on which the data processing apparatus is loaded.

10. A data processing apparatus according to claim 1, wherein, when the license key data has an effective period, the storage circuit stores the license key data, the data processing apparatus further comprises a real time clock for generating real time, the arithmetic processing circuit reads the effective license key data from the storage circuit based on the real time indicated by the real time clock, and the common-key encryption circuit decrypts the content key data by using the read license key data.

11. A data processing apparatus according to claim 1, wherein the storage circuit writes and erases data in units of blocks, and the data processing apparatus comprises within the tamper-resistant circuit module, a write-lock control circuit for controlling the writing and erasing of the data into and from the storage circuit in units of blocks under the control of the arithmetic processing circuit.

12. A data processing apparatus for performing rights processing of content data encrypted with content key data based on usage control policy data, and for decrypting the encrypted content key data, the data processing apparatus comprising within a tamper-resistant circuit module:

an input circuit for receiving a secure container from a content provider, wherein the secure container contains a content file, a key file, and a signature data of the content provider, and for receiving license key data from an electronic distribution center, wherein the content file contains the encrypted content data, and wherein the key file contains the encrypted content key, the usage control policy data, and signature data of the electronic distribution center;

a first bus;

an arithmetic processing circuit connected to the first bus, for performing the rights processing of the content data based on the usage control policy data;

a storage circuit connected to the first bus;

a second bus;

an interface circuit interposed between the first bus and the second bus;

an encryption processing circuit connected to the second bus, for decrypting the content key data using the license key data;

a hash-value generating circuit that generates hash values of the content data, the content key data, and the usage control policy data;

a public key encryption circuit that creates signature data of the data processing apparatus using the hash values and verifies the integrity of the signature data of the content provider and the signature data of the electronic distribution center;

a common key encryption circuit;

an external bus interface circuit connected to the second bus; and a usage monitor;

wherein, upon receiving an interrupt from an external circuit via the external bus interface circuit, the arithmetic processing circuit becomes a slave for the external circuit so as to perform processing designated by the interrupt, and reports a result of the processing to the external circuit;

wherein the arithmetic processing circuit determines at least one of a purchase mode and a usage mode of the content data based on a handling policy indicated by the usage control policy data, and creates log data which includes a unique identifier of the content data, discount information, and tracing information and indicates a result of the determined mode; and the arithmetic processing circuit creates usage control status data in accordance with the determined purchase mode, and controls the use of the content data based on the usage control status data;

the usage control status data comprising a content identification for the content data, the purchase mode, an identification for the tamper-resistant circuit module, and a user identification for a user who has purchased the content data;

wherein the log data is transmitted to the electronic distribution center;

wherein the usage monitor monitors the usage control policy data and the usage control status data to make sure that the content data is purchased and used as restricted by the usage control policy data and the usage control status data; and wherein the purchase mode is determined from one or more purchase mode options, and each purchase mode option has a different level of restriction imposed on a playback operation.

13. A data processing apparatus according to claim 12, wherein the arithmetic processing circuit reports the result of the processing by outputting an interrupt to the external circuit.

14. A data processing apparatus according to claim 13, wherein the storage circuit stores an interrupt program describing the processing designated by the interrupt, and the arithmetic processing circuit performs the processing by executing the interrupt program read from the storage circuit.

15. A data processing apparatus according to claim 14, wherein the storage circuit stores a plurality of the interrupt programs, and a plurality of sub-routines to be read when executing the interrupt program, and the arithmetic processing circuit appropriately reads and executes the sub-routines from the storage circuit when executing the interrupt program read from the storage circuit.

16. A data processing apparatus according to claim 12, wherein the external bus interface comprises a common memory for the arithmetic processing circuit and the external circuit, and the arithmetic processing circuit writes the result of the processing into the common memory, and the external circuit obtains the result of the processing by polling.

17. A data processing apparatus according to claim 16, wherein the external bus interface comprises:

a first status register indicating an execution status of the processing requested from the external circuit in the arithmetic processing circuit, and including a flag set by the arithmetic processing circuit and read by the external circuit;

a second status register indicating whether the external circuit has requested the arithmetic processing circuit to perform processing, and including a flag set by the external circuit and read by the arithmetic processing circuit; and the common memory for storing a result of the processing.

18. A data processing method of performing rights processing for content data encrypted with content key data based on usage control policy data, and of decrypting the encrypted content key data, the data processing method comprising the steps of:

receiving a secure container from a content provider, wherein the secure container contains a content file, a key file, and a signature data of the content provider;

receiving license key data from an electronic distribution center, wherein the content file contains the encrypted content data, and wherein the key file contains the encrypted content key, the usage control policy data, and signature data of the electronic distribution center;

determining at least one of a purchase mode and a usage mode of the content data based on a handling policy indicated by the usage control policy data;

creating log data which includes a unique identifier of the content data, discount information, and tracing information and indicates a result of the determined purchase mode;

transmitting the log data to the electronic distribution center;

creating usage control status data in accordance with the determined purchase mode; the usage control status data comprising a content identification for the content data, the purchase mode, an identification for a tamper-resistant circuit module, and a user identification for a user who has purchased the content data;

monitoring the usage control policy data and the usage control status data to make sure that the content data is purchased and used as restricted by the usage control policy data and the usage control status data;

controlling the use of the content data based on the usage control status data;

recording the content data, for which the purchase mode is determined, on a recording medium;

generating hash values of the content data, the content key data, and the usage control policy data;

performing authentication;

creating a signature data of a data processing apparatus using the hash values;

verifying the integrity of the signature data of the content provider and the signature data of the electronic distribution center;

sharing session key data obtained by the authentication; and encrypting the content key data and the usage control status data by using the session key data;

wherein the purchase mode is determined from one or more purchase mode options, and each purchase mode option has a different level of restriction imposed on a playback operation.

* * * * *